(12) United States Patent
Blackley et al.

(10) Patent No.: US 12,266,280 B2
(45) Date of Patent: Apr. 1, 2025

(54) HOLOGRAPHICALLY DISPLAYING THREE-DIMENSIONAL OBJECTS

(71) Applicant: PACIFIC LIGHT & HOLOGRAM, INC., San Gabriel, CA (US)

(72) Inventors: Jonathan Seamus Blackley, South Pasadena, CA (US); Richard Bahr, Atherton, CA (US); Watson Brent Boyett, Los Angeles, CA (US); Sylvain Marcel Colin, Ventura, CA (US); Robin James Green, Duvall, WA (US); Isaac Serrano Guasch, Barcelona (ES); Stephen John Hart, San Juan Capistrano, CA (US); Robert Alan Hess, Mesa, AZ (US); Margaret H. Hsu, Pasadena, CA (US); Christoph Von Jutrzenka, Santa Barbara, CA (US); DeaGyu Kim, Pasadena, CA (US); Mark Anthony Loya, Temple City, CA (US); Kelly Swan MacNeill, Seattle, WA (US); Benjamin Francis Neil, South Pasadena, CA (US); Kamran Qaderi, San Gabriel, CA (US); Tina Qin, Rosemead, CA (US); Jesus Manuel Caridad Ramirez, Altadena, CA (US); Jayakrishna Sashidharan, San Gabriel, CA (US); Asher Zelig Sefami, Altadena, CA (US); Jeff Smith, Las Vegas, NV (US); Robert David Srinivasiah, Mountain View, CA (US); Sameer Sudhir Walavalkar, Glendale, CA (US); Joshua D. Wiensch, Altadena, CA (US); Daniel Dereck Williamson, Brighton (GB)

(73) Assignee: Pacific Light & Hologram, Inc., San Gabriel, CA (US)

( * ) Notice: Subject to any disclaimer, the term of this patent is extended or adjusted under 35 U.S.C. 154(b) by 0 days.

(21) Appl. No.: 18/906,076

(22) Filed: Oct. 3, 2024

(65) Prior Publication Data
US 2025/0061826 A1    Feb. 20, 2025

Related U.S. Application Data

(63) Continuation of application No. PCT/US2024/028873, filed on May 10, 2024, which
(Continued)

(51) Int. Cl.
*G09G 3/00* (2006.01)
*G02F 1/1343* (2006.01)
(Continued)

(52) U.S. Cl.
CPC ....... *G09G 3/003* (2013.01); *G02F 1/134309* (2013.01); *G02F 1/13439* (2013.01); *G09G 3/3413* (2013.01); *G09G 3/36* (2013.01)

(58) Field of Classification Search
None
See application file for complete search history.

(56) References Cited

U.S. PATENT DOCUMENTS

| | | | |
|---|---|---|---|
| 4,586,780 A | 5/1986 | Chern et al. | |
| 5,016,950 A | 5/1991 | Smith | |

(Continued)

FOREIGN PATENT DOCUMENTS

| | | |
|---|---|---|
| CN | 101226325 | 7/2008 |
| CN | 101241603 | 8/2008 |

(Continued)

OTHER PUBLICATIONS

Notice of Allowance in U.S. Appl. No. 18/906,110, dated Jan. 16, 2025, 8 pages.

(Continued)

*Primary Examiner* — Kirk W Hermann
(74) *Attorney, Agent, or Firm* — Fish & Richardson P.C.

(57) ABSTRACT

Methods, apparatus, devices, subsystems, and systems for holographically displaying three-dimensional objects are provided. A system includes a display and a controller. The display includes: a backplane having a plurality of circuits and a plurality of display elements arranged on the backplane. The plurality of display elements form an irregular pattern. Each of the plurality of display elements is coupled to a respective circuit of the plurality of circuits. The controller is coupled to the display and configured to transmit at least one control signal to at least one display element of the display for modulating at least one property of the at least one display element.

30 Claims, 71 Drawing Sheets

Related U.S. Application Data is a continuation-in-part of application No. 18/410,185, filed on Jan. 11, 2024, now Pat. No. 12,170,038, which is a continuation of application No. 18/468,571, filed on Sep. 15, 2023, now Pat. No. 11,900,842.

(60) Provisional application No. 63/501,928, filed on May 12, 2023.

(51) Int. Cl.
*G09G 3/34* (2006.01)
*G09G 3/36* (2006.01)

(56) References Cited

U.S. PATENT DOCUMENTS

| | | | |
|---|---|---|---|
| 5,144,288 A | 9/1992 | Hamada | |
| 5,347,375 A | 9/1994 | Saito | |
| 5,668,648 A | 9/1997 | Saito | |
| 5,719,600 A | 2/1998 | Alcorn | |
| 5,753,349 A | 5/1998 | Boswell | |
| 5,825,448 A | 10/1998 | Bos et al. | |
| 6,256,120 B1 | 7/2001 | Suzuki | |
| 6,288,803 B1 | 9/2001 | Hattori et al. | |
| 6,580,388 B1 | 6/2003 | Stoyanov | |
| 6,606,095 B1 | 8/2003 | Lengyel | |
| 7,103,099 B1 | 9/2006 | Paz | |
| 7,277,209 B1 | 10/2007 | Grossetie | |
| 7,660,039 B2 | 2/2010 | Santoro et al. | |
| 7,837,361 B2 | 11/2010 | Santoro et al. | |
| 8,047,673 B2 | 11/2011 | Santoro | |
| 8,218,211 B2 | 7/2012 | Kroll | |
| 8,233,204 B1 | 7/2012 | Robbins et al. | |
| 8,400,696 B2 | 3/2013 | Ikeda | |
| 8,786,925 B2 | 7/2014 | Hart et al. | |
| 8,976,081 B2 | 3/2015 | Rao | |
| 9,270,978 B2 | 2/2016 | Li | |
| 9,515,099 B2 | 12/2016 | Kwon | |
| 9,710,957 B2 | 7/2017 | Berghoff | |
| 9,715,215 B2 | 7/2017 | Christmas et al. | |
| 9,946,224 B2 | 4/2018 | Kroll et al. | |
| 9,959,808 B2 | 5/2018 | Sun | |
| 9,990,877 B2 | 6/2018 | Kim | |
| 10,098,565 B2 | 10/2018 | Brannan | |
| 10,156,725 B2 | 12/2018 | TeKolste et al. | |
| 10,379,496 B2 | 8/2019 | Onural | |
| 10,445,556 B2 | 10/2019 | Vilenskii et al. | |
| 10,475,370 B2 | 11/2019 | Spitzer | |
| 10,534,209 B1 | 1/2020 | Fu | |
| 10,712,667 B2 | 7/2020 | Oemrawsingh et al. | |
| 10,853,999 B2 | 12/2020 | Blackley | |
| 10,854,000 B2 | 12/2020 | Blackley | |
| 10,867,439 B2 | 12/2020 | Blackley | |
| 10,878,622 B2 | 12/2020 | Blackley | |
| 10,878,623 B2 | 12/2020 | Blackley | |
| 10,884,240 B2 | 1/2021 | Song et al. | |
| 10,902,673 B2 | 1/2021 | Blackley | |
| 10,909,756 B2 | 2/2021 | Blackley | |
| 10,964,103 B2 | 3/2021 | Blackley | |
| 10,969,740 B2 | 4/2021 | Shi et al. | |
| 11,204,540 B2 | 12/2021 | Popovich et al. | |
| 11,347,185 B2 | 5/2022 | Qaderi et al. | |
| 11,360,429 B2 | 6/2022 | Qaderi et al. | |
| 11,360,430 B2 | 6/2022 | Qaderi et al. | |
| 11,360,431 B2 | 6/2022 | Qaderi et al. | |
| 11,378,917 B2 | 7/2022 | Qaderi et al. | |
| 11,410,384 B2 | 8/2022 | Blackley et al. | |
| 11,415,937 B2 | 8/2022 | Qaderi et al. | |
| 11,762,333 B2 | 9/2023 | Qaderi et al. | |
| 11,900,842 B1 | 2/2024 | Blackley et al. | |
| 11,953,856 B2 | 4/2024 | Song et al. | |
| 11,995,769 B2 | 5/2024 | Blackley et al. | |
| 12,170,038 B2 | 12/2024 | Blackley et al. | |
| 2001/0024177 A1 | 9/2001 | Popovich | |
| 2002/0180720 A1 | 12/2002 | Ishiyama | |
| 2003/0081154 A1 | 5/2003 | Coleman et al. | |
| 2003/0090599 A1 | 5/2003 | Ochiai et al. | |
| 2003/0151809 A1 | 8/2003 | Takahashi | |
| 2004/0004586 A1 | 1/2004 | Endo et al. | |
| 2004/0066547 A1 | 4/2004 | Parker et al. | |
| 2004/0094699 A1 | 5/2004 | Goto et al. | |
| 2004/0105091 A1 | 6/2004 | Zaidi et al. | |
| 2005/0078374 A1 | 4/2005 | Taira et al. | |
| 2005/0122454 A1 | 6/2005 | Sharp | |
| 2006/0139711 A1 | 6/2006 | Leister et al. | |
| 2006/0239171 A1 | 10/2006 | Ooi et al. | |
| 2006/0279528 A1 | 12/2006 | Schobben | |
| 2007/0024999 A1 | 2/2007 | Crossland | |
| 2007/0242325 A1 | 10/2007 | Kitamura | |
| 2007/0257943 A1 | 11/2007 | Miller | |
| 2008/0037131 A1 | 2/2008 | Steenblik et al. | |
| 2008/0247128 A1 | 10/2008 | Khoo | |
| 2008/0297390 A1 | 12/2008 | Ko et al. | |
| 2008/0300478 A1 | 12/2008 | Zuhars et al. | |
| 2009/0015922 A1 | 1/2009 | St. Hilaire | |
| 2009/0128562 A1 | 5/2009 | McCombe | |
| 2009/0303597 A1 | 12/2009 | Miyawaki et al. | |
| 2010/0033781 A1 | 2/2010 | Leister | |
| 2010/0085642 A1 | 4/2010 | Drinkwater | |
| 2010/0149139 A1 | 6/2010 | Kroll | |
| 2010/0157399 A1 | 6/2010 | Kroll | |
| 2010/0207851 A1 | 8/2010 | Cok et al. | |
| 2010/0238528 A1 | 9/2010 | Govil et al. | |
| 2010/0328433 A1 | 12/2010 | Li | |
| 2010/0328759 A1 | 12/2010 | Kirkby et al. | |
| 2011/0002020 A1 | 1/2011 | Khan | |
| 2011/0050655 A1 | 3/2011 | Mukawa | |
| 2011/0157667 A1 | 6/2011 | Lacoste | |
| 2012/0008181 A1 | 1/2012 | Cable | |
| 2012/0218481 A1 | 8/2012 | Popovich et al. | |
| 2012/0236415 A1 | 9/2012 | Nagano et al. | |
| 2013/0022222 A1 | 1/2013 | Zschau | |
| 2013/0100513 A1 | 4/2013 | Choi et al. | |
| 2013/0101253 A1 | 4/2013 | Popovich et al. | |
| 2013/0135290 A1 | 5/2013 | Davidson | |
| 2013/0208508 A1 | 8/2013 | Nichols et al. | |
| 2013/0268357 A1 | 10/2013 | Heath | |
| 2013/0271731 A1 | 10/2013 | Popovich et al. | |
| 2013/0278631 A1 | 10/2013 | Border | |
| 2013/0306627 A1 | 11/2013 | Libman | |
| 2014/0064655 A1 | 3/2014 | Nguyen et al. | |
| 2014/0071539 A1 | 3/2014 | Gao | |
| 2014/0222884 A1 | 8/2014 | Gupta | |
| 2014/0240342 A1* | 8/2014 | Xu | G09G 3/36 345/590 |
| 2014/0240843 A1* | 8/2014 | Kollin | G02B 5/30 359/633 |
| 2014/0300966 A1 | 10/2014 | Travers et al. | |

(56) References Cited

U.S. PATENT DOCUMENTS

| | | |
|---|---|---|
| 2014/0354697 A1 | 12/2014 | Endisch |
| 2014/0358002 A1 | 12/2014 | Daoura |
| 2015/0123964 A1 | 5/2015 | Lee et al. |
| 2015/0277378 A1 | 10/2015 | Smithwick |
| 2015/0325035 A1 | 11/2015 | Howell |
| 2015/0355597 A1 | 12/2015 | Schwerdtner |
| 2015/0378080 A1 | 12/2015 | Georgiou |
| 2016/0055778 A1 | 2/2016 | Kim |
| 2016/0077367 A1 | 3/2016 | Lo et al. |
| 2016/0078683 A1 | 3/2016 | Sudol |
| 2016/0104750 A1 | 4/2016 | Jinta et al. |
| 2016/0147000 A1 | 5/2016 | Yoon |
| 2016/0147003 A1 | 5/2016 | Morozov |
| 2016/0157828 A1 | 6/2016 | Sumi |
| 2016/0161914 A1 | 6/2016 | Onural |
| 2016/0223987 A1 | 8/2016 | Park |
| 2016/0291544 A1 | 10/2016 | Kroll et al. |
| 2016/0291545 A1 | 10/2016 | Fan |
| 2016/0336484 A1 | 11/2016 | McGroddy |
| 2016/0349508 A1 | 12/2016 | Horikawa |
| 2016/0379606 A1 | 12/2016 | Kollin et al. |
| 2017/0038727 A1 | 2/2017 | Kim |
| 2017/0160547 A1 | 6/2017 | Webster et al. |
| 2017/0248825 A1 | 8/2017 | Georgiou et al. |
| 2017/0269767 A1 | 9/2017 | Yang |
| 2017/0293259 A1 | 10/2017 | Ochiai |
| 2017/0308988 A1 | 10/2017 | Li |
| 2017/0322414 A1 | 11/2017 | Ishii |
| 2017/0323125 A1 | 11/2017 | Yang |
| 2017/0351944 A1 | 12/2017 | Yang |
| 2018/0024289 A1 | 1/2018 | Fattal |
| 2018/0039072 A1 | 2/2018 | Okumura |
| 2018/0130251 A1 | 5/2018 | Berghoff |
| 2018/0196390 A1* | 7/2018 | Collin .................. G02B 5/32 |
| 2018/0231789 A1 | 8/2018 | Ng |
| 2018/0253869 A1 | 9/2018 | Yumer |
| 2018/0275350 A1 | 9/2018 | Oh |
| 2018/0284460 A1 | 10/2018 | Cheng et al. |
| 2018/0364641 A1 | 12/2018 | Park |
| 2019/0004478 A1 | 1/2019 | Gelman et al. |
| 2019/0008388 A1 | 1/2019 | Ando |
| 2019/0014319 A1 | 1/2019 | Jannard |
| 2019/0028674 A1 | 1/2019 | Smits |
| 2019/0101866 A1 | 4/2019 | Georgiou |
| 2019/0113802 A1 | 4/2019 | Won et al. |
| 2019/0121196 A1* | 4/2019 | Kumar .............. G02F 1/133711 |
| 2019/0121291 A1 | 4/2019 | Leister |
| 2019/0155033 A1 | 5/2019 | Gelman et al. |
| 2019/0196400 A1 | 6/2019 | Chang |
| 2019/0212557 A1 | 7/2019 | Waldern et al. |
| 2019/0243142 A1 | 8/2019 | TeKolste et al. |
| 2019/0285897 A1* | 9/2019 | Topliss .............. G02B 27/0172 |
| 2019/0324991 A1 | 10/2019 | Lehtinen et al. |
| 2019/0361396 A1 | 11/2019 | Christmas |
| 2020/0050145 A1 | 2/2020 | Kim et al. |
| 2020/0264560 A1 | 8/2020 | Chen |
| 2020/0271949 A1 | 8/2020 | Colin |
| 2020/0272098 A1 | 8/2020 | Colin et al. |
| 2020/0273236 A1 | 8/2020 | Colin |
| 2020/0273242 A1 | 8/2020 | Colin |
| 2020/0275081 A1 | 8/2020 | Colin |
| 2020/0275082 A1 | 8/2020 | Colin |
| 2020/0275088 A1 | 8/2020 | Colin |
| 2020/0278498 A1 | 9/2020 | Schultz et al. |
| 2020/0278543 A1 | 9/2020 | Shultz et al. |
| 2020/0280715 A1 | 9/2020 | Colin |
| 2020/0309944 A1 | 10/2020 | Thoresen et al. |
| 2020/0341194 A1 | 10/2020 | Waldern et al. |
| 2020/0363641 A1 | 11/2020 | Noguchi |
| 2020/0393680 A1 | 12/2020 | Hogstedt et al. |
| 2021/0209846 A1 | 7/2021 | Blackley |
| 2021/0216163 A1 | 7/2021 | Wang et al. |
| 2021/0264849 A1 | 8/2021 | Suzuki |
| 2021/0294003 A1 | 9/2021 | Roehrig et al. |
| 2021/0373493 A1 | 12/2021 | Song et al. |
| 2021/0397128 A1 | 12/2021 | Hirose et al. |
| 2022/0028334 A1 | 1/2022 | Park et al. |
| 2022/0050298 A1 | 2/2022 | Klug et al. |
| 2022/0058356 A1 | 2/2022 | Yamamoto et al. |
| 2022/0082886 A1 | 3/2022 | Qaderi et al. |
| 2022/0082998 A1 | 3/2022 | Qaderi et al. |
| 2022/0083000 A1 | 3/2022 | Qaderi et al. |
| 2022/0083001 A1 | 3/2022 | Qaderi et al. |
| 2022/0083002 A1 | 3/2022 | Qaderi et al. |
| 2022/0083003 A1 | 3/2022 | Qaderi et al. |
| 2022/0083006 A1 | 3/2022 | Qaderi et al. |
| 2022/0084226 A1 | 3/2022 | Uludag |
| 2022/0086419 A1 | 3/2022 | Qaderi et al. |
| 2022/0101597 A1 | 3/2022 | Panneer et al. |
| 2022/0350369 A1 | 11/2022 | Xu et al. |
| 2022/0366647 A1 | 11/2022 | Blackley et al. |
| 2023/0006027 A1 | 1/2023 | Liu |
| 2023/0104826 A1 | 4/2023 | Gu |
| 2023/0113022 A1 | 4/2023 | Blackley et al. |
| 2023/0123926 A1 | 4/2023 | Hasegawa |
| 2023/0142054 A1 | 5/2023 | Qaderi et al. |
| 2023/0213767 A1 | 7/2023 | Grant et al. |
| 2023/0221818 A1 | 7/2023 | Ozbas et al. |
| 2023/0273678 A1* | 8/2023 | Border .............. G02B 27/0189 345/156 |
| 2024/0379003 A1 | 11/2024 | Blackley et al. |
| 2024/0379031 A1 | 11/2024 | Blackley et al. |
| 2024/0394977 A1 | 11/2024 | Blackley et al. |
| 2025/0029526 A1 | 1/2025 | Blackley et al. |
| 2025/0029527 A1 | 1/2025 | Blackley et al. |
| 2025/0029529 A1 | 1/2025 | Qaderi et al. |
| 2025/0029530 A1 | 1/2025 | Blackley et al. |
| 2025/0029531 A1 | 1/2025 | Blackley et al. |
| 2025/0029532 A1 | 1/2025 | Blackley et al. |
| 2025/0029533 A1 | 1/2025 | Qaderi et al. |
| 2025/0029534 A1 | 1/2025 | Blackley et al. |

FOREIGN PATENT DOCUMENTS

| | | | |
|---|---|---|---|
| CN | 103760676 A | | 4/2014 |
| CN | 104466007 | | 3/2015 |
| CN | 104776865 | | 7/2015 |
| CN | 109564403 | | 4/2019 |
| CN | 113866984 A | * | 12/2021 |
| CN | 114019715 A | * | 2/2022 |
| EP | 3690505 | | 8/2020 |
| JP | 2010-503035 | | 1/2010 |
| JP | 2011-513786 | | 4/2011 |
| JP | 2013-050566 | | 3/2013 |
| JP | 2013-524270 | | 6/2013 |
| JP | 2013-540278 | | 10/2013 |
| JP | 2015064593 A | | 4/2015 |
| JP | 2016-042036 | | 3/2016 |
| JP | 2017-097370 | | 6/2017 |
| KR | 1020140063528 A | | 5/2014 |
| KR | 1020170015884 A | | 2/2017 |
| TW | 201833680 | | 9/2018 |
| WO | WO 2008/138984 | | 11/2008 |
| WO | WO 2011/121130 | | 2/2011 |
| WO | WO 2017/120320 | | 7/2017 |
| WO | WO 2017/198713 | | 11/2017 |
| WO | WO 2019/143729 | | 7/2019 |
| WO | WO 2022/060734 | | 3/2022 |

OTHER PUBLICATIONS

Notice of Allowance in U.S. Appl. No. 18/907,303, dated Jan. 15, 2025, 7 pages.

Office Action in U.S. Appl. No. 18/907,241, dated Jan. 16, 2025, 8 pages.

[No Author Listed], "Google definition of integrated," Nov. 11, 2024, retrieved from Google.com, 3 pages (Year: 2024).

Notice of Allowance in Korean Appln. No. 10-2020-7020715, dated Oct. 30, 2024, 8 pages (with English translation).

Notice of Allowance in U.S. Appl. No. 18/907,386, dated Dec. 27, 2024, 9 pages.

Notice of Allowance in U.S. Appl. No. 18/906,124, dated Dec. 6, 2024, 8 pages.

(56) References Cited

OTHER PUBLICATIONS

Office Action in U.S. Appl. No. 18/906,950, dated Dec. 27, 2024, 6 pages.
Office Action in U.S. Appl. No. 18/906,013, dated Jan. 2, 2025, 9 pages.
Office Action in U.S. Appl. No. 18/906,970, dated Dec. 4, 2024, 27 pages.
Office Action in U.S. Appl. No. 18/907,119, dated Nov. 27, 2024, 31 pages.
Chapter II Amendment for corresponding PCT Appl No. PCT/US19/13857, dated Aug. 15, 2019.
Extended European Search Report in European Appln No. 19741590.4, dated Oct. 27, 2021, 7 pages.
Ichikawa et al., "Realistic expression for full-parallax computer-generated holograms with the ray-tracing method," Optical Society of America, Nov. 16, 2012, 9 pages.
Ichikawa et al., "Proceedings of Spie; Realistic 3D image reconstruction in CGH with Fourier transform optical system," Proc. SPIE 8644, Practical Holography XXVII: Materials and Applications, Mar. 1, 2013, doi: 10.1117112.2003371.
International Preliminary Report on Patentability for corresponding PCT Appl No. PCT/US19/13857, dated Dec. 13, 2019.
International Preliminary Report on Patentability in International Appln. No. PCT/US2021/050271, mailed on Mar. 30, 2023, 13 pages.
International Preliminary Report on Patentability in International Appln. No. PCT/US2021/050275, mailed on Mar. 30, 2023, 12 pages.
International Search Report and Written Opinion for corresponding PCT Appl No. PCT/US19/13857, dated Jun. 26, 2019.
International Search Report and Written Opinion in International Appln. No. PCT/US2021/050271, dated Jan. 27, 2022, 16 pages.
International Search Report and Written Opinion in International Appln. No. PCT/US2021/050275, dated Dec. 13, 2021, 13 pages.
International Search Report and Written Opinion in International Appln. No. PCT/US2024/028873, mailed on Sep. 4, 2024, 19 pages.
Invitation to Pay Additional Fees and, Where Applicable, Protest Fee in International Appln. No. PCT/US2021/050271, dated Nov. 2, 2021, 3 pages.
Notice of Allowance in U.S. Appl. No. 17/815,780, dated Apr. 17, 2024, 8 pages.
Notice of Allowance in U.S. Appl. No. 18/079,788, dated Jul. 19, 2024, 9 pages.
Office Action in Japanese Appln. No. 2020-537759, dated Nov. 29, 2022, 12 pages (with English translation).
Office Action in Japanese Appln. No. 2023-114422, dated Feb. 20, 2024, 13 pages (with English translation).
Office Action in Japanese Appln. No. 2023-114422, dated Jun. 4, 2024, 6 pages (with English translation).
Office Action in Korean Appln. 2020-7020715, dated Jan. 31, 2024, 8 pages (with English translation).
Office Action in U.S. Appl. No. 17/815,780, dated Dec. 14, 2023, 17 pages.
Office Action in U.S. Appl. No. 18/079,788, dated Jul. 26, 2023, 15 pages.
Office Action in U.S. Appl. No. 18/079,788, dated Mar. 15, 2024, 20 pages.
Office Action in U.S. Appl. No. 18/079,788, dated Nov. 14, 2023, 19 pages.
Office Action in U.S. Appl. No. 18/468,571, dated Nov. 16, 2023, 12 pages.
Office Action in U.S. Appl. No. 18/079,788, dated Jul. 1, 2024, 22 pages.
Search Report in Taiwanese Appln. 110134968, dated Jul. 5, 2023, 3 pages (with English translation).
Search Report in Taiwanese Appln. 110134969, dated Jul. 5, 2023, 3 pages (with English translation).
Zhang et al., "Elimination of a zero-order beam induced by a pixelated spatial light modulator for holographic projection," Applied Optics, Oct. 2009, 48(30):5834-5841.
Office Action in U.S. Appl. No. 18/660,929, dated Feb. 3, 2025, 10 pages.
Notice of Allowance in U.S. Appl. No. 18/906,013, dated Jan. 30, 2025, 8 pages.
Notice of Allowance in U.S. Appl. No. 18/906,950, dated Jan. 29, 2025, 10 pages.
Notice of Allowance in U.S. Appl. No. 18/906,970, dated Jan. 22, 2025, 8 pages.
Office Action in U.S. Appl. No. 18/906,936, dated Jan. 29, 2025, 10 pages.

* cited by examiner

Table of Vertices

| No. | Coordinates | | | Color | Texture | Occlusion | Shading | Viewpoint-dependent shading (VDS) |
|---|---|---|---|---|---|---|---|---|
| | x | y | z | | | | | |
| V1 | x1 | y1 | z1 | C1 | T1 | O1 | S1 | VDS1 |
| V2 | x2 | y2 | z2 | C2 | T2 | O2 | S2 | VDS2 |
| V3 | x3 | y3 | z3 | C3 | T3 | O3 | S3 | VDS3 |
| V4 | x4 | y4 | z4 | C4 | T4 | O4 | S4 | VDS4 |
| ... | ... | ... | ... | ... | ... | ... | ... | ... |
| Vn | xn | yn | zn | Cn | Tn | On | Sn | VDSn |

400 ↗

(a)

Table of Primitives

| No. | Vertices | Color | Texture | Occlusion | Shading | Viewpoint-dependent shading (VDS) |
|---|---|---|---|---|---|---|
| P1 | V1, V2, V3 | PC1 | PT1 | PO1 | PS1 | PVDS1 |
| P2 | V2, V3, V4 | PC2 | PT2 | PO2 | PS2 | PVDS2 |
| P3 | V3, V4, V5 | PC3 | PT3 | PO3 | PS3 | PVDS3 |
| P4 | V5, V6 | PC4 | PT4 | PO4 | PS4 | PVDS4 |
| ... | ... | ... | ... | ... | ... | ... |
| Pn | Vn, Vn+1 | PCn | PTn | POn | PSn | PVDSn |

452 — Obtain information of a plurality of primitives corresponding to at least one object, the information including respective primitive identifiers of the plurality of primitives 454 — Obtain primitive data of the plurality of primitives based on the information of the plurality of primitives 456 — For each primitive of the plurality of primitives, determine an electromagnetic (EM) field contribution to each of a plurality of display elements of a display based on primitive data of the primitive 458 — For each of the plurality of display elements of the display, generate a sum of the EM field contributions of the plurality of primitives to the display element

FIG. 4E

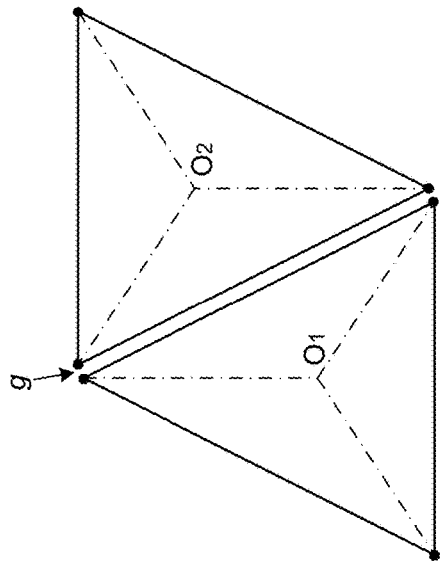
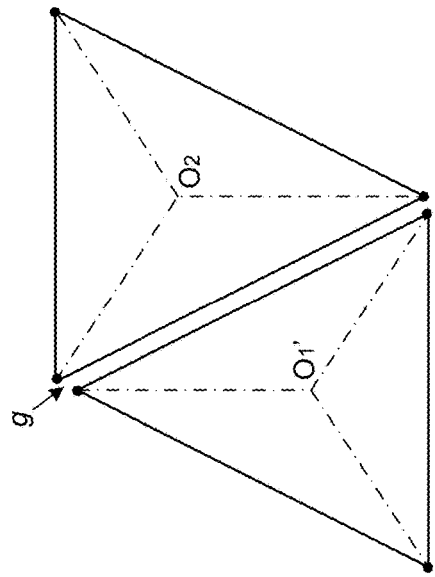
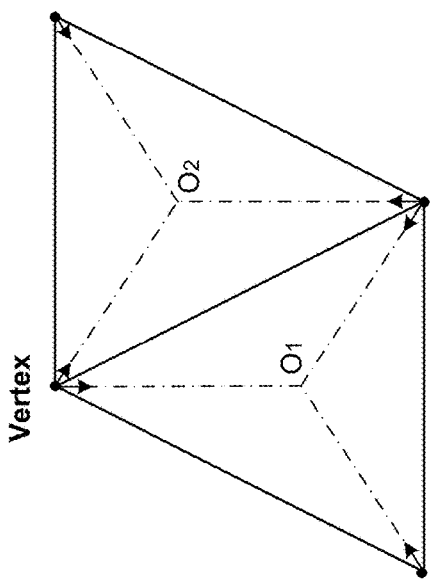
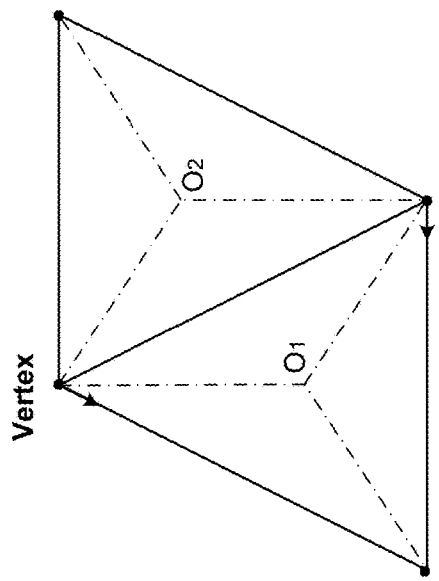
FIG. 8D-1
FIG. 8D-2

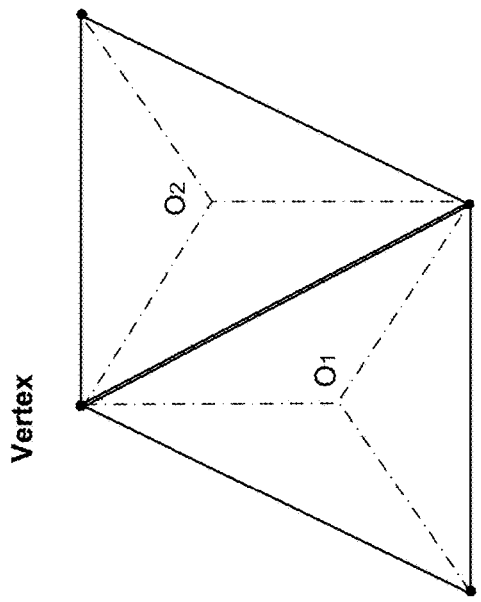
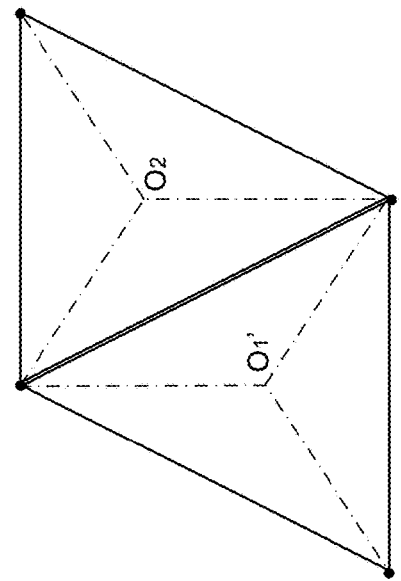
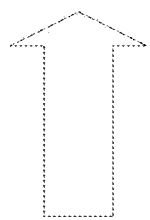
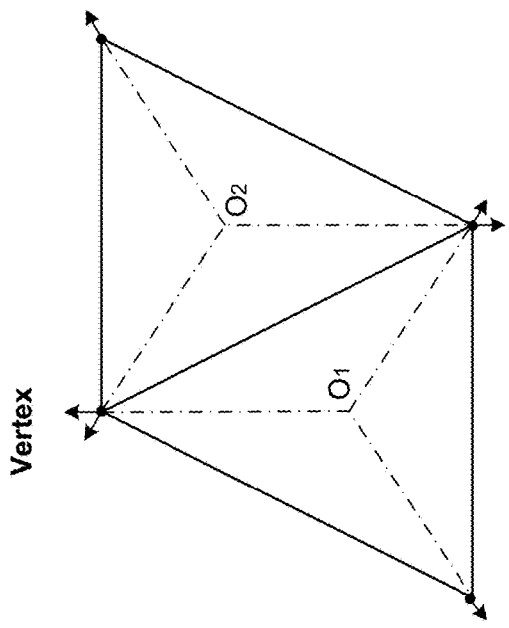
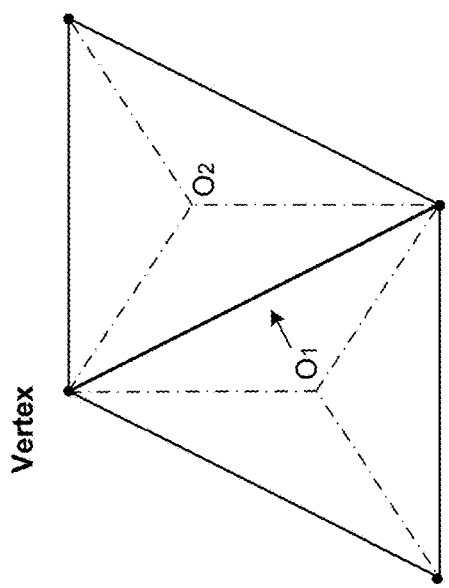
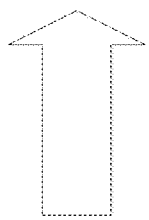
FIG. 8E-1
FIG. 8E-2

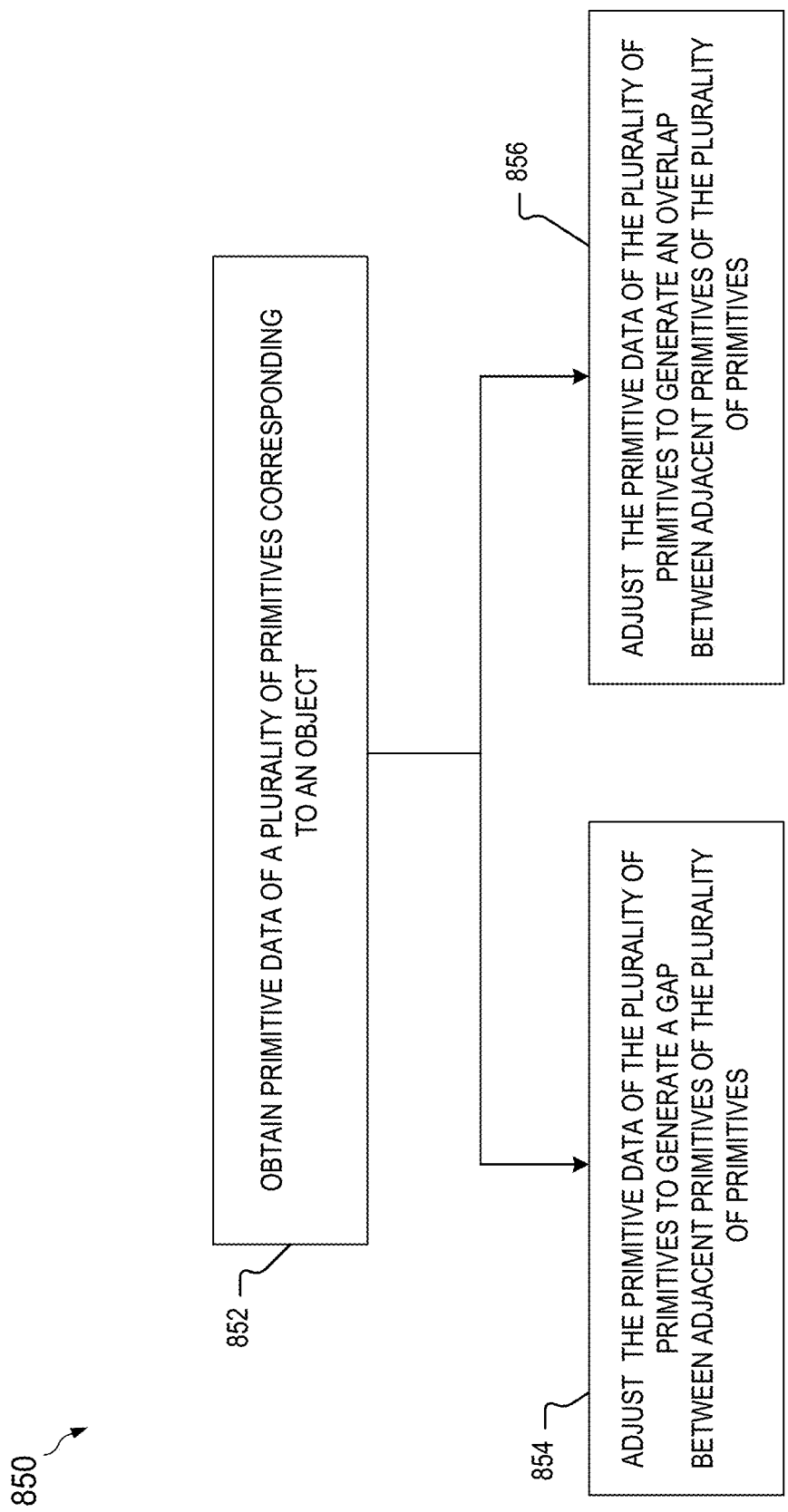

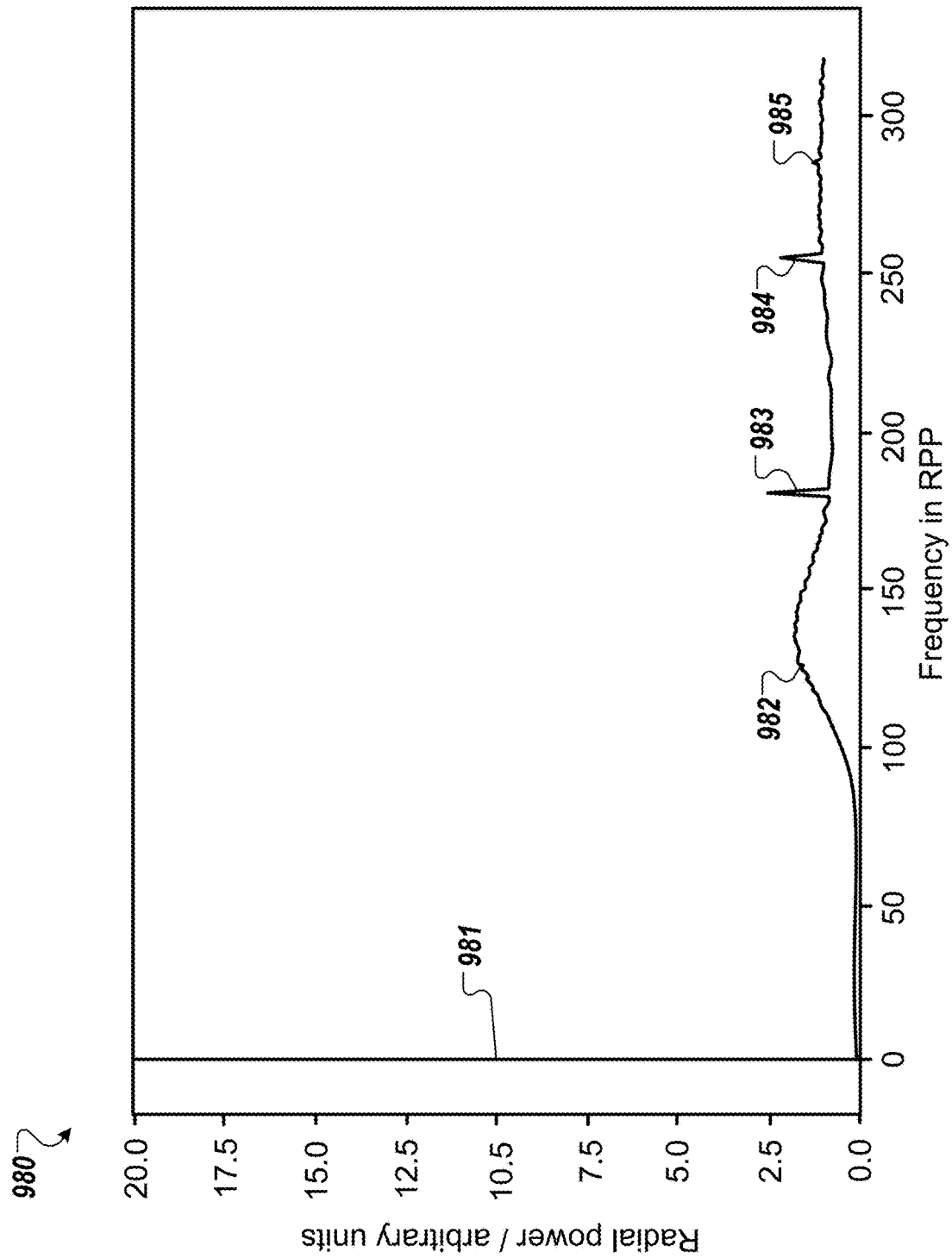

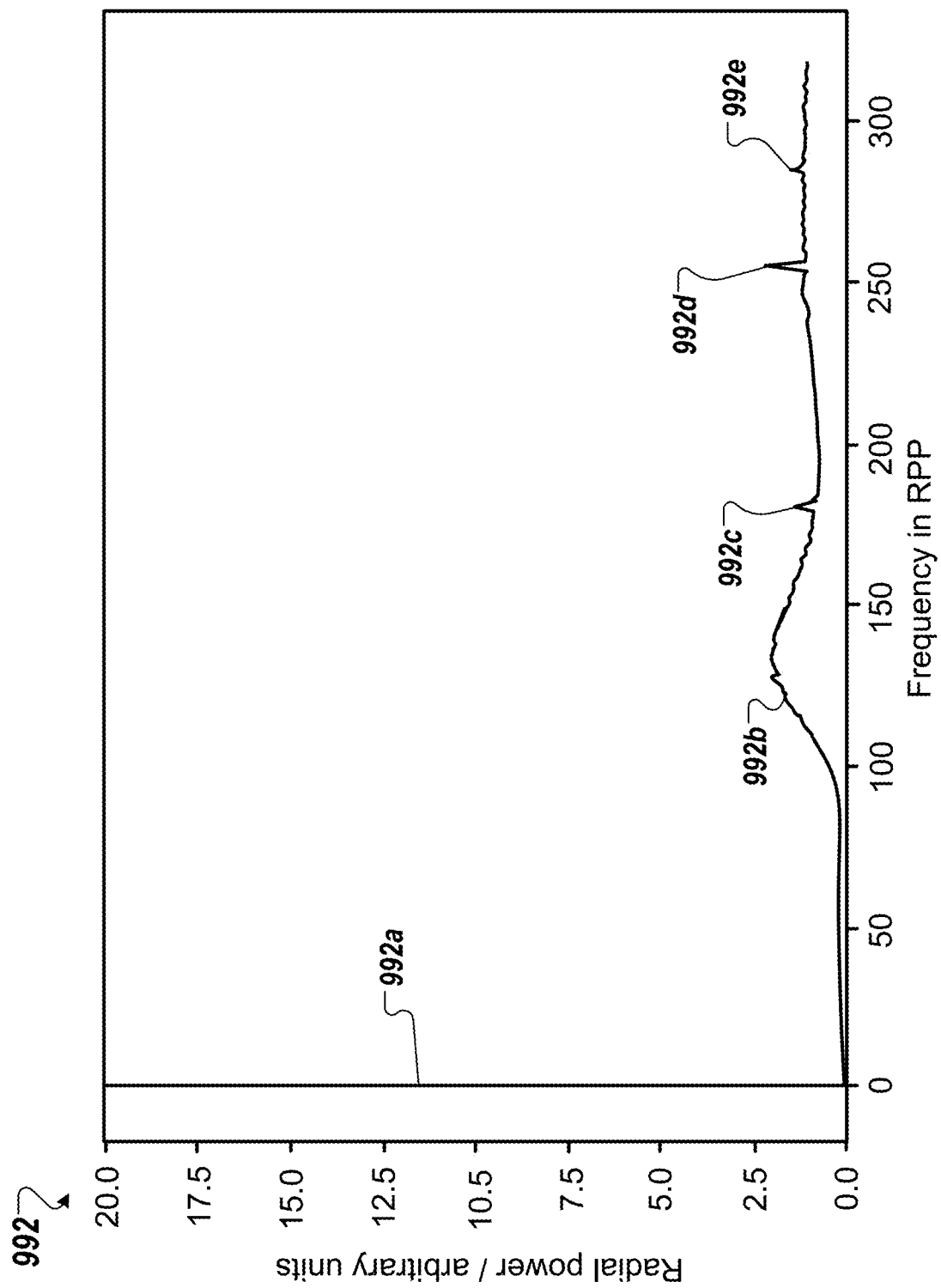

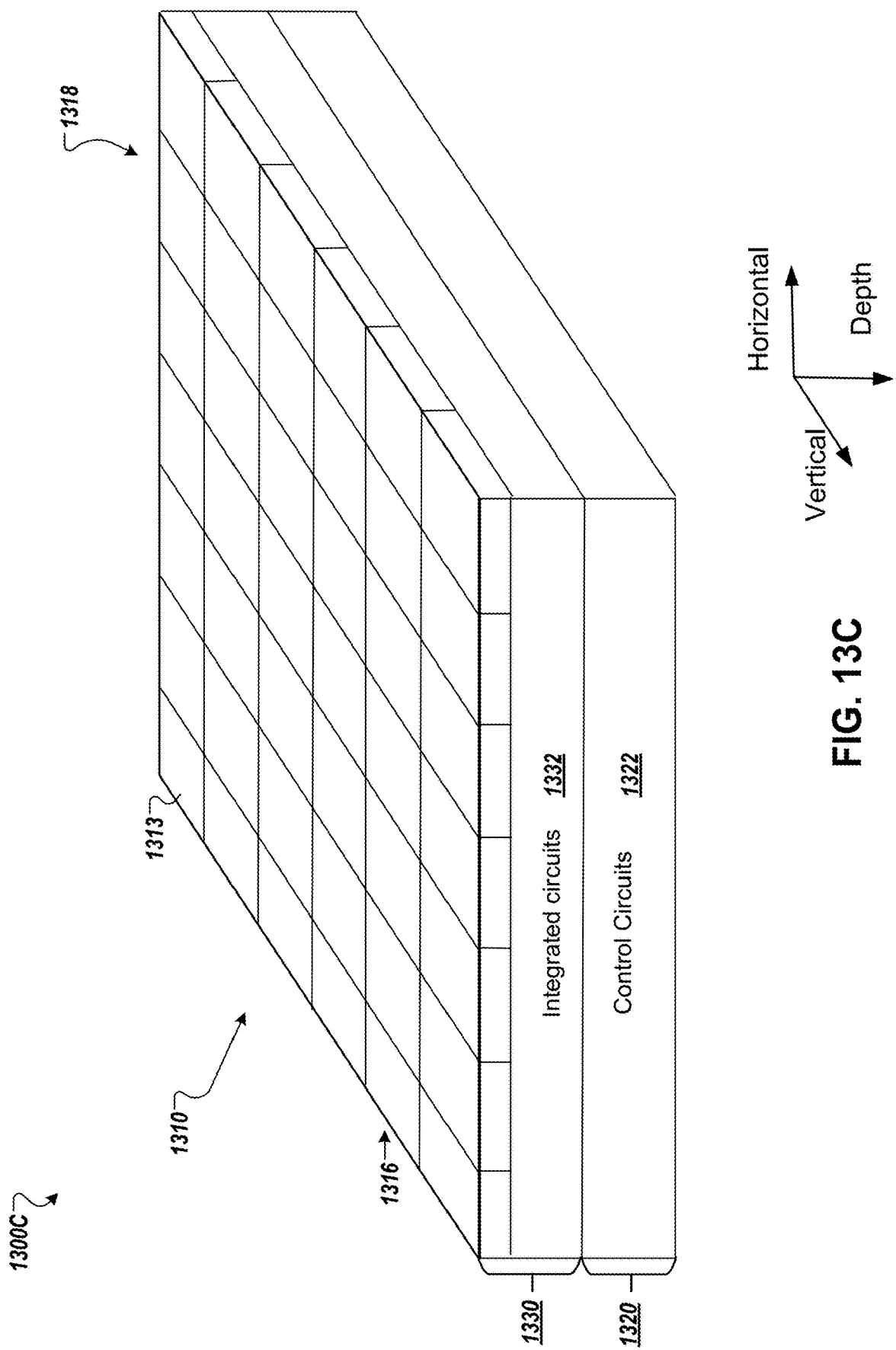

HOLOGRAPHICALLY DISPLAYING THREE-DIMENSIONAL OBJECTS

CROSS-REFERENCE TO RELATED APPLICATIONS

This application is a continuation of, and claims benefit under 35 U.S.C. § 120 to international application PCT/US2024/028873 filed on May 10, 2024, which claims priority to U.S. application Ser. No. 18/410,185 filed on Jan. 11, 2024, U.S. application Ser. No. 18/468,571 filed on Sep. 15, 2023, and U.S. Provisional Patent Application Ser. No. 63/501,928 filed on May 12, 2023, the entire contents of which are hereby incorporated by reference.

TECHNICAL FIELD

This disclosure relates to three-dimensional (3D) displays, and more particularly to displaying 3D objects.

BACKGROUND

Advances in traditional two-dimensional (2D) projection and 3D rendering have led to new approaches for 3D displays, including numerous hybrid techniques that mix head and eye tracking with conventional display devices for virtual reality (VR), augmented reality (AR), and mixed reality (MR). These techniques attempt to replicate an experience of holographic imagery, combined with tracking and measurement-based calculations, to simulate stereo or in-eye light field that can be represented by an actual hologram.

SUMMARY

The present disclosure also describes methods, apparatus, devices, subsystems, and systems for displaying 3D objects. The technology can enable relatively compact optical systems for displaying 3D objects with relatively high efficiency, fast computation speed, high display refresh rate, and high image quality.

One aspect of the present disclosure features a computer-implemented method of manipulating data of a plurality of primitives corresponding to at least one object, the data comprising primitive data of each primitive of the plurality of primitives, a primitive comprising at least one vertex, primitive data of the primitive comprising data of the at least one vertex, the computer-implemented method comprising: for each of a plurality of vertices of the plurality of primitives, associating a respective vertex identifier of the vertex with respective vertex data of the vertex, and storing the association between the respective vertex identifier and the respective vertex data of the vertex in a memory; and for each of the plurality of primitives, associating a respective primitive identifier of the primitive with one or more respective vertex identifiers of one or more vertices of the primitive in the memory, and storing an association between the respective primitive identifier and the one or more respective vertex identifiers for the primitive in the memory.

Another aspect of the present disclosure features a computer-implemented method, comprising: obtaining data of a plurality of primitives corresponding to at least one object, the data comprising primitive data of each primitive of the plurality of primitives, where a primitive comprises at least one vertex, and primitive data of the primitive comprises vertex data of the at least one vertex; for each of a plurality of vertices of the plurality of primitives, associating a respective vertex identifier of the vertex with respective vertex data of the vertex, and storing the association between the respective vertex identifier and the respective vertex data of the vertex in a memory; and for each of the plurality of primitives, associating a respective primitive identifier of the primitive with one or more respective vertex identifiers of one or more vertices of the primitive in the memory, and storing an association between the respective primitive identifier and the one or more respective vertex identifiers for the primitive in the memory.

In some implementations, the computer-implemented method further comprises: determining primitive identifiers of multiple primitives associated with a command instruction; and transmitting a command including the command instruction and the primitive identifiers of the multiple primitives to a processing device.

In some implementations, the computer-implemented method further comprises: determining vertex identifiers associated with the primitive identifiers; and transmitting the command including the command instruction, the vertex identifiers associated with the primitive identifiers, and the primitive identifiers of the multiple primitives, to the processing device. In some implementations, the command indicates drawing the multiple primitives according to the command instruction and based on at least one of the primitive identifiers of the multiple primitives or the vertex identifiers associated with the primitive identifiers.

In some implementations, the computer-implemented method further comprises: determining the respective vertex identifiers of the plurality of vertices based on an order of the plurality of vertices in a vertex stream corresponding to the plurality of primitives.

In some implementations, the computer-implemented method further comprises: determining the respective primitive identifiers of the plurality of primitives based on an order of the plurality of primitives in a primitive stream corresponding to the at least one object.

In some implementations, the at least one object comprises a representative object in a three-dimensional (3D) simulation application that is configured to generate the data of the plurality of primitives.

In some implementations, the respective vertex data of the vertex comprises at least one of: a vertex identifier of the vertex, coordinate information of the vertex in a 3D coordinate system, color information associated with the vertex, texture coordinate information associated with the vertex, shading information associated with the vertex, viewpoint dependent shading information (e.g., geometric specular reflection) associated with the vertex, or occlusion information associated with the vertex.

In some implementations, the primitive data of the primitive comprises at least one of: a primitive identifier of the primitive, at least one vertex identifier of the at least one vertex, coordinate information of the primitive in a 3D coordinate system, color information of the primitive, texture coordinate information of the primitive, shading information for the primitive, viewpoint dependent shading information (e.g., geometric specular reflection) for the primitive, or occlusion information of the primitive.

In some implementations, the computer-implemented method further comprises: adjusting vertex data of the plurality of vertices of the plurality of primitives to generate a gap or overlap between adjacent primitives of the plurality of primitives; and based on a result of the adjusting, updating the vertex data of the plurality of vertices in the memory.

Another aspect of the present disclosure features a non-transitory, computer-readable medium storing one or more instructions executable by at least one processor to perform the method as described above.

Another aspect of the present disclosure features an apparatus comprising: at least one processor; and at least one memory coupled to the at least one processor and having instructions stored thereon that are executable by the at least one processor to perform the method as described above.

Another aspect of the present disclosure features a method comprising: obtaining primitive data of a plurality of primitives corresponding to at least one object based on information of the plurality of primitives that comprises respective primitive identifiers of the plurality of primitives; for each primitive of the plurality of primitives, determining an electromagnetic (EM) field contribution to each of a plurality of display elements of a display based on primitive data of the primitive; and for each of the plurality of display elements of the display, generating a sum of the EM field contributions of the plurality of primitives to the display element.

Another aspect of the present disclosure features a method comprising: obtaining information of a plurality of primitives corresponding to at least one object, where the information comprises respective primitive identifiers of the plurality of primitives; obtaining primitive data of the plurality of primitives based on the information of the plurality of primitives; for each primitive of the plurality of primitives, determining an electromagnetic (EM) field contribution to each of a plurality of display elements of a display based on primitive data of the primitive; and for each of the plurality of display elements of the display, generating a sum of the EM field contributions of the plurality of primitives to the display element.

In some implementations, obtaining the information of the plurality of primitives corresponding to the object comprises: receiving a command from a computing device, where the command comprises the information of the plurality of primitives, without the primitive data of the plurality of primitives, and the command comprises an instruction for drawing the plurality of primitives based on the information of the plurality of primitives. Obtaining the primitive data of the plurality of primitives based on the information of the plurality of primitives can include: receiving the primitive data of the plurality of primitives from the computing device, where the primitive data and the respective primitive identifiers of the plurality of primitives are associated and stored in the computing device.

In some implementations, each primitive of the plurality of primitives comprises one or more vertices, and the primitive data of the primitive comprises vertex data of the one or more vertices. In some implementations, the information of the plurality of primitives comprises: for each of the plurality of primitives, one or more vertex identifiers of the one or more vertices, and an association between a primitive identifier of the primitive and the one or more vertex identifiers of the one or more vertices of the primitive.

In some implementations, the plurality of primitives comprises a plurality of vertices. Obtaining the primitive data of the plurality of primitives based on the information of the plurality of primitives comprises: retrieving the primitive data of the plurality of primitives from a memory based on vertex identifiers of the plurality of vertices of the plurality of primitives. The primitive data comprises respective vertex data of each of the plurality of vertices, and the memory stores vertex data of the plurality of vertices associated with the vertex identifiers of the plurality of vertices.

In some implementations, the respective vertex data of the vertex comprises at least one of: a vertex identifier of the vertex, coordinate information of the vertex in a 3D coordinate system, color information associated with the vertex, texture coordinate information associated with the vertex, viewpoint dependent shading information associated with the vertex, or occlusion information associated with the vertex.

In some implementations, the plurality of primitives comprises first and second primitives that are adjacent to each other. The first primitive and the second primitive have at least one shared vertex.

In some implementations, for each primitive of the plurality of primitives, determining the electromagnetic (EM) field contribution to each of the plurality of display elements of the display based on the primitive data of the primitive comprises: determining a first EM field contribution of the first primitive to a display element of the display based on primitive data of the first primitive; and determining a second EM field contribution of the second primitive to the display element of the display based on the first EM field contribution and primitive data of the second primitive.

In some implementations, the method further comprises: adjusting vertex data associated with at least one of the first primitive or the second primitive to generate a gap between the first primitive and the second primitive, such that there is no shared vertex between the first primitive and the second primitive.

In some implementations, the gap is identical to or greater than a predetermined diffraction limit of the display. In some implementations, for each primitive of the plurality of primitives, determining the electromagnetic (EM) field contribution to each of the plurality of display elements of the display based on the primitive data of the display comprises: determining the EM field contribution of the at least one of the first primitive or the second primitive based on the adjusted vertex data associated with the at least one of the first primitive or the second primitive.

In some implementations, for each primitive of the plurality of primitives, determining the electromagnetic (EM) field contribution to each of the plurality of display elements of the display based on the primitive data of the display comprises: determining a first EM contribution of the primitive to a first display element of the display; and determining a second EM contribution of the primitive to a second display element of the display based on the first EM contribution, the second display element being adjacent to the first display element.

In some implementations, for each primitive of the plurality of primitives, determining the electromagnetic (EM) field contribution to each of the plurality of display elements of the display based on the primitive data of the display comprises: determining, in a three-dimensional (3D) coordinate system, at least one distance between the display element and the primitive based on coordinate information of the display element and coordinate information of the primitive, and determining the EM field contribution of the primitive to the display element based on a predetermined expression for the primitive and the at least one distance.

In some implementations, the predetermined expression is determined based on at least one of: analytically calculating an EM field propagation from the primitive to the display element, a solution of Maxwell's equations with a boundary condition defined by the display, or at least one function from a group of functions comprising a sine function, a cosine function, and an exponential function, where determining the EM field contribution comprises identifying a value of the at least one function in a table stored in a memory.

In some implementations, the method comprises: determining first respective EM field contributions from a first primitive of the plurality of primitives to each display element of the plurality of display elements; determining second respective EM field contributions from a second primitive of the plurality of primitives to each display element of the plurality of display elements; and accumulating the EM field contributions for each display element of the plurality of display elements by adding the first and second respective EM field contributions corresponding to the display element.

In some implementations, determining the first respective EM field contributions from the first primitive to each display element of the plurality of display elements is performed in parallel with determining the second respective EM field contributions from the second primitive to each display element of the plurality of display elements.

In some implementations, for each primitive of the plurality of primitives, determining the electromagnetic (EM) field contribution to each of the plurality of display elements of the display based on the primitive data of the display comprises at least one of: determining a first EM field contribution of a first primitive to a first display element in parallel with determining a second EM field contribution of a second primitive to the first display element, determining a first EM field contribution of a first primitive to a first display element in parallel with determining a second EM field contribution of a second primitive to a second display element, or determining a first EM field contribution of a first primitive to a first display element in parallel with determining a second EM field contribution from the first primitive to a second display element.

In some implementations, the method further comprises: obtaining sums of EM field contributions for the plurality of display elements of the display by pipeline processing of determining the EM field contributions of each of the plurality of primitives to each of the plurality of display elements and generating the sum of the EM field contribution from the plurality of primitives to each of the plurality of display elements.

In some implementations, the method further comprises: generating a hologram corresponding to the object, the hologram comprising sums of EM field contributions for the plurality of display elements of the display. The hologram can be a complex-valued hologram.

In some implementations, the method further comprises: converting the complex-valued hologram to a phase-only hologram. In some implementations, the hologram is a phase hologram or an amplitude hologram.

In some implementations, the method further comprises: storing the hologram in a storage device. In some implementations, the method further comprises: transmitting the hologram to a driving device for the display.

In some implementations, the method further comprises: changing the hologram by adjusting a respective phase for each of the plurality of display elements.

In some implementations, adjusting the respective phase for each of the plurality of display elements comprises: adding a corresponding phase to the respective phase for each of the plurality of display elements.

In some implementations, the corresponding phase for each of the plurality of display elements is expressed as:

$$\emptyset = 2\pi(x\cos\theta + y\sin\theta)/\lambda,$$

where $\emptyset$ represents the corresponding phase for the display element, $\lambda$ represents a wavelength of light to be incident on the display element with an incident angle, $\theta$ represents an angle corresponding to a redirecting angle of an optically redirecting device configured to redirect light from the display, and x and y represent coordinates of the display element in a global 3D coordinate system where the EM field contribution of each of the plurality of display elements to the display element is determined.

In some implementations, the corresponding phase for each of the plurality of display elements is expressed as:

$$\emptyset = \frac{\pi}{\lambda f}(ax^2 + by^2),$$

where $\emptyset$ represents the corresponding phase for the display element, a and b represent constants, $\lambda$ represents a wavelength of light to be incident on the display, f represents a focal length of an optically diverging component configured to diverge light from the display, x and y represent coordinates of the display element in a coordinate system where the EM field contribution of each of the plurality of display elements to the display element is determined.

In some implementations, the method further includes: after obtaining the primitive data of the plurality of primitives, adjusting the primitive data of the plurality of primitives, where the adjusted primitive data of the plurality of primitives corresponds to a virtual object moved with respect to the display in a global 3D coordinate system. For each primitive of the plurality of primitives, determining the electromagnetic (EM) field contribution to each of the plurality of display elements of the display based on the primitive data of the primitive comprises: determining the EM field contribution of the primitive to each of the plurality of display elements of the display based on the adjusted primitive data of the primitive in the 3D coordinate system.

In some implementations, the adjusted primitive data of the plurality of primitives corresponds to the virtual object rotated with an angle with respect to the display in the global 3D coordinate system. The angle corresponds to a redirecting angle of an optically redirecting device configured to redirect light from the display, such that modulated light by the plurality of display elements forms a holographic scene, while display zero order light from the display is redirected away from the holographic scene.

In some implementations, the adjusted primitive data of the plurality of primitives corresponds to the virtual object moved, with respect to the display, in the global 3D coordinate system, along a direction perpendicular to the display with a distance, and the distance corresponds to a focal length of an optically diverging component configured to diverge light from the display, such that modulated light by the plurality of display elements forms a holographic scene without divergence, while display zero order light from the display is diverged and suppressed in the holographic scene.

In some implementations, the method comprises: calculating one or more mathematical functions using at least one of fixed point number representations or floating point number representations.

In some implementations, the method comprises: calculating respective EM field contributions of each primitive of the plurality of primitives to each display element of the plurality of display elements. The calculation of the respective EM field contributions can be without at least one member selected from the group consisting of: expanding a geometry of the object into the plurality of display elements; applying visibility tests before packing wavefronts; and decision making or communication between parallel calculations for different primitives of the plurality of primitives. The calculation of the respective EM field contributions can be configured to cause at least one member selected from the group consisting of: tuning parallel calculations for multiple primitives to speed, cost, size or energy optimization; reducing latency between initiating a draw and a result being ready for display; increasing an accuracy using fixed point number representations; skipping unpacking and repacking of float point number representations between mathematical operations; and optimizing computation speed by optimizing mathematical functions.

In some implementations, the plurality of primitives comprises at least one of a point primitive, a line primitive, and a polygon primitive.

In some implementations, the primitive data of the primitive comprises at least one of: a primitive identifier of the primitive, coordinate information of the primitive in a 3D coordinate system, color information of the primitive, texture coordinate information of the primitive, viewpoint dependent shading information (e.g., geometric specular reflection) for the primitive, shading information for the primitive, or occlusion information of the primitive.

In some implementations, the primitive data of the primitive comprises texture coordinate information of the primitive that includes values associated with discrete cosine transform (DCT) amplitudes for pixels of an image to be mapped on a specified surface of one or more primitives of the plurality of primitives, where the DCT amplitudes for the pixels of the image are associated with DCT weights of the pixels of the image. For each primitive of the plurality of primitives, determining the electromagnetic (EM) field contribution to each of the plurality of display elements of the display based on the primitive data of the primitive comprises: calculating the EM field contribution from each of the one or more primitives to each of the plurality of display elements with the values associated with the DCT amplitudes for the pixels of the image.

In some implementations, the primitive data of the primitive comprises occlusion information of the primitive. The method comprises: determining one or more particular display elements that make no contribution to a reconstruction of a given primitive based on occlusion information of the given primitive; and for each of the one or more particular display elements, generating a respective sum of EM field contributions of the plurality of primitives to the particular display element by excluding an EM field contribution of the given primitive to the particular display element.

In some implementations, the primitive data of the primitive comprises occlusion information of the primitive. The method comprises: for each display element of the plurality of display elements, determining a respective part of a given primitive that make no EM field contribution to the display element based on occlusion information of the given primitive; and for each display element of the plurality of display elements, generating a sum of EM field contributions from the plurality of primitives to the display element by excluding an EM field contribution from the respective part of the given primitive to the display element.

In some implementations, the primitive data of the primitive comprises viewpoint dependent shading information for the primitive. The method comprises: determining a respective EM field contribution of each primitive of the plurality of primitives to each display element of the plurality of display elements by taking into consideration of the viewpoint dependent shading information for the primitive.

In some implementations, the method further comprises: obtaining information of the display, where the information of the display comprises coordinate information of a plurality of points corresponding to the plurality of display elements. For each primitive of the plurality of primitives, determining the electromagnetic (EM) field contribution to each of the plurality of display elements of the display based on the primitive data of the display comprises: calculating, in a three-dimensional (3D) coordinate system, EM propagation from the primitive to the display based on coordinate information of the primitive and coordinate information of a point corresponding to the display element.

In some implementations, each of the plurality of display elements has a respective shape of a plurality of shapes in an area of the display, each of the plurality of shapes uniquely enclosing a respective point of the plurality of points, adjacent shapes of the plurality of shapes being different from each other. The coordinate information of the plurality of points comprises coordinate information of a plurality of spaced points in the area of the display and offset data comprising a respective offset between each point of the plurality of points and a corresponding space point of the plurality of space points.

Another aspect of the present disclosure features a device comprising: at least one processor; and at least one memory coupled to the at least one processor and having instructions stored thereon that are executable by the at least one processor to perform the method as described above.

Another aspect of the present disclosure features a device comprising: a command processor configured to: receive a command from a computing device, the command comprising information of a plurality of primitives corresponding to at least one object, the information comprising respective primitive identifiers of the plurality of primitives, and process the command to obtain primitive data of the plurality of primitives from the computing device based on the information of the plurality of primitives; a plurality of computing units configured to calculate an electromagnetic (EM) field contribution of each of the plurality of primitives to each of the plurality of display elements based on the primitive data of the plurality of primitives; and an accumulator configured to: accumulate EM field contributions of the plurality of primitives to each of the plurality of display elements, and generate a hologram comprising a respective sum of the EM field contributions of the plurality of primitives to each of the plurality of display elements.

In some implementations, the command processor, the plurality of computing units, and the accumulator are connected in series, and the plurality of computing units are connected in parallel between the command processor and the accumulator.

In some implementations, the device comprises at least one of: an application-specific integrated circuit (ASIC), a field-programmable gate array (FPGA), a programmable gate array (PGA), a central processing unit (CPU), a graphics processing unit (GPU), a phasel processing unit (PPU), or standard computing units.

In some implementations, the device is configured to communicate with the computing device through peripheral component interconnect express (PCIe). In some implementations, the device is an integrated chip insertable in a PCIe slot of the computing device. In some implementations, the device is configured to be integrated with the display in a package, external to the computing device.

Another aspect of the present disclosure features a method comprising: generating modulation control signals for a plurality of display elements of a display based on a hologram for the display, where the hologram comprises, for each display element of the plurality of display elements, a respective sum of electromagnetic (EM) field contributions of a plurality of primitives corresponding to at least one object to the display element. Generating the modulation control signals comprises: generating, for each display element of the plurality of display elements, a respective modulation control signal based on the respective sum of EM field contributions of the plurality of primitives to the display element.

Another aspect of the present disclosure features a method comprising: obtaining a hologram for a display, where the display comprises a plurality of display elements, and the hologram comprises, for each display element of the plurality of display elements, a respective sum of electromagnetic (EM) field contributions of a plurality of primitives corresponding to at least one object to the display element; generating, for each display element of the plurality of display elements, a respective modulation control signal based on the respective sum of EM field contributions of the plurality of primitives to the display element; and outputting the respective modulation control signal to each display element of the plurality of display elements for modulating the display element.

In some implementations, the hologram is a complex-valued hologram, and where the method further comprises: converting the complex-valued hologram to a phase-only hologram, where the respective modulation control signals for the plurality of display elements are generated based on the phase-only hologram.

In some implementations, the method comprises: receiving the complex-valued hologram from a processing device; and storing the complex-valued hologram in a memory; and after converting the complex-valued hologram to the phase-only hologram, storing the phase-only hologram in the memory.

In some implementations, outputting the respective modulation control signal to each display element of the plurality of display elements comprises: continuously outputting the respective modulation control signal to each display element of the plurality of display elements in a sequential order.

In some implementations, the method further comprises: transmitting an illumination control signal to an illuminator to activate the illuminator to illuminate light on the display such that the light is caused by the modulated display elements of the display to form a volumetric light field corresponding to the at least one object.

In some implementations, outputting the respective modulation control signal to each display element of the plurality of display elements is in coordination with transmitting the illumination control signal to the illuminator.

In some implementations, the illuminator comprises two or more light emitting elements each configured to emit light with a different color, and the method comprises: sequentially transmitting a respective illumination control signal to sequentially activate each of the two or more light emitting elements of the illuminator.

In some implementations, the method comprises: sequentially outputting a first modulation control signal to modulate the display with information associated with a first color during a first time period, and a second modulation control signal to modulate the display with information associated with a second color during a second, sequential time period; and sequentially outputting a first illumination control signal to activate the illuminator to turn on a first light emitting element to emit light with a first color during the first time period, and a second illumination control signal to activate the illuminator to turn on a second light emitting element to emit light with the second color during the second time period.

Another aspect of the present disclosure features a device comprising: at least one processor; and at least one memory coupled to the at least one processor and having instructions stored thereon that are executable by the at least one processor to perform the method as described above.

Another aspect of the present disclosure features a device comprising: a memory configured to store a hologram for a display; and a display driver coupled to the memory and the display. The display comprises a plurality of display elements, and the hologram comprises, for each display element of the plurality of display elements, a respective sum of electromagnetic (EM) field contributions of a plurality of primitives corresponding to at least one object to the display element. The display driver is configured to: generate, for each display element of the plurality of display elements, a respective modulation control signal based on the respective sum of EM field contributions of the plurality of primitives to the display element, and output the respective modulation control signal to each display element of the plurality of display elements for modulating the display element.

In some implementations, the device further comprises an illuminator driver coupled to an illuminator, and where the illuminator driver is configured to generate and transmit an illumination control signal to an illuminator to activate the illuminator to illuminate light on the display such that the light is caused by the modulated display elements of the display to form a volumetric light field corresponding to the at least one object.

In some implementations, the display driver and the illuminator driver are configured to communicate with each other, such that outputting the respective modulation control signal to each display element of the plurality of display elements by the display driver is in coordination with transmitting the illumination control signal to the illuminator by the illuminator driver.

In some implementations, the memory comprises a first memory buffer coupled to the display driver and a second memory buffer coupled to the illuminator driver, and the second memory buffer has a smaller size than the first memory buffer.

In some implementations, the device is configured to perform the method as described above.

Another aspect of the present disclosure features a device comprising: a backplane comprising a plurality of circuits and a plurality of elements on the backplane, the plurality of elements forming an irregular pattern. The plurality of elements are coupled to the plurality of circuits by conductive vias that are regularly spaced.

In some implementations, the device includes a display, a camera, or an image sensor. The elements can include phasels or pixels.

In some implementations, the irregular pattern comprises a Voronoi pattern.

In some implementations, at least one element of the plurality of elements has an irregular polygon shape.

In some implementations, adjacent elements of the plurality of elements have different shapes.

In some implementations, a size distribution of the plurality of elements is around a value that is identical to a spatial frequency response of the device.

In some implementations, the device comprises: a liquid crystal layer; a transparent conductive layer on a top side of the liquid crystal layer as a common electrode; and a plurality of metallic electrodes on a bottom side of the liquid crystal layer. Each of the plurality of metallic electrodes is conductively isolated from each other and individually controllable by the backplane. Each of the plurality of metallic electrodes is one-to-one conductively coupled to a respective circuit of the plurality of circuits in the backplane via a corresponding conductive via of the conductive vias.

In some implementations, the plurality of metallic electrodes form the irregular pattern, and each of the plurality of metallic electrodes corresponds to a respective element of the plurality of elements.

In some implementations, for each of the plurality of metallic electrodes, the corresponding conductive via is positioned at a centroid of the metallic electrode.

In some implementations, the device comprises multiple pairs of layers of metallic electrodes and conductive vias that are sequentially stacked between the liquid crystal layer and the plurality of circuits along a first direction. In some implementations, first conductive vias of a first pair of the multiple pairs are positioned between the plurality of circuits and first metallic electrodes of the first pair and regularly spaced along a second direction perpendicular to the first direction. In some implementations, second conductive vias of a second pair of the multiple pairs are positioned between the first metallic electrodes of the first pair and second metallic electrodes of the second pair and regularly spaced along the second direction. In some implementations, adjacent first conductive via and second conductive via are offset from each other along the second direction.

In some implementations, the first metallic electrodes of the first pair form a first irregular pattern, and the second metallic electrodes of the second pair form a second irregular pattern. The irregular pattern is associated with the first irregular pattern and the second irregular pattern.

In some implementations, the device further comprises: a first alignment layer on top of the liquid crystal layer; a second alignment layer underneath the liquid crystal layer; and spacers. The liquid crystal layer is between the first and second alignment layers, and the first and second alignment layers are separated by the spacers to maintain a thickness of the liquid crystal layer.

In some implementations, each of the plurality of metallic electrodes is configured to reflect light through the liquid crystal layer.

Another aspect of the present disclosure features a display comprising: a backplane; and a plurality of display elements arranged on the backplane, the plurality of display elements forming an irregular pattern.

In some implementations, the irregular pattern comprises a Voronoi pattern. In some implementations, at least one display element of the plurality of display elements has an irregular polygon shape. In some implementations, adjacent display elements of the plurality of display elements have different shapes.

In some implementations, a gap between adjacent display elements of the plurality of display elements is smaller than a wavelength of an incident light.

In some implementations, a size distribution of the plurality of display elements is around a value that is identical to a spatial frequency response of the display.

In some implementations, the display comprises: a liquid crystal layer; a transparent conductive layer on a top side of the liquid crystal layer as a common electrode; and a plurality of metallic electrodes on a bottom side of the liquid crystal layer.

In some implementations, each of the plurality of metallic electrodes is conductively isolated from each other and individually controllable by the backplane. The plurality of metallic electrodes can have the irregular pattern.

In some implementations, the backplane comprises a plurality of circuits, and each of the plurality of metallic electrodes is one-to-one conductively coupled to a respective circuit of the plurality of circuits in the backplane via a respective conductive via. In some implementations, two or more conductive vias are conductively coupled to a corresponding circuit of the plurality of circuits in the backplane.

In some implementations, at least one of the plurality of metallic electrodes is conductively coupled to a respective circuit of the plurality of circuits in the backplane via two or more corresponding conductive vias that are conductively coupled to the respective circuit of the plurality of circuits in the backplane. In some implementations, respective conductive vias coupled between the plurality of metallic electrodes and the plurality of circuits are regularly spaced.

In some implementations, the display further comprises: a first alignment layer underneath the liquid crystal layer; a second alignment layer on top of the liquid crystal layer; and spacers. The liquid crystal layer is between the first and second alignment layers, and the first and second alignment layers are separated by the spacers to maintain a thickness of the liquid crystal layer.

In some implementations, each of the plurality of metallic electrodes is configured to reflect light through the liquid crystal layer.

Another aspect of the present disclosure features a method comprising: generating, by at least one processor, a plurality of shapes based on a plurality of points according to an irregular pattern, the plurality of points being irregularly positioned in an area for a display, each of the plurality of shapes uniquely enclosing a respective point of the plurality of points; and generating, by the at least one processor, a profile of the display according to the plurality of shapes, the display comprising a plurality of display elements each corresponding to a respective shape of the plurality of shapes.

Another aspect of the present disclosure features a method comprising: determining, by at least one processor, a plurality of points that are irregularly positioned in an area for a display; generating, by the at least one processor, a plurality of shapes based on the plurality of points according to an irregular pattern, each of the plurality of shapes uniquely enclosing a respective point of the plurality of points; and generating, by the at least one processor, a profile of the display according to the plurality of shapes, the display comprising a plurality of display elements each corresponding to a respective shape of the plurality of shapes.

In some implementations, the irregular pattern comprises a Voronoi pattern.

In some implementations, determining the plurality of points that are irregularly positioned in the area for the display comprises: determining a plurality of spaced points in the area for the display; and adding different offsets to the plurality of spaced points to generate the plurality of points that are irregular positioned in the area for the display.

In some implementations, the method further includes: determining the different offsets based on a Poisson noise distribution. In some implementations, the plurality of spaced points define a regularly spaced pattern. In some implementations, first spaced points in a first region of the area have a first spacing period, and second spaced points in a second region of the area have a second spacing period that can be different from the first spacing period. In some implementations, at least one offset of the different offsets is identical to or greater than a half of a distance of adjacent spaced points.

In some implementations, the method further includes: storing the different offsets in a repository; and associating the different offsets with the plurality of spaced points in the repository.

Another aspect of the present disclosure features a method of fabricating an irregular display, comprising: fabricating the irregular display according to a profile of the irregular display, the profile of the irregular display comprising information of a plurality of shapes each corresponding to a respective display element of a plurality of display elements of the irregular display, the plurality of shapes forming an irregular pattern.

Another aspect of the present disclosure features a method of fabricating an irregular display, comprising: obtaining a profile of the irregular display, the irregular display comprising a plurality of display elements each corresponding to a respective shape of a plurality of shapes, the plurality of shapes forming an irregular pattern; and fabricating the irregular display according to the profile of the irregular display.

In some implementations, fabricating the irregular display according to the profile of the irregular display comprises: forming a plurality of metallic electrodes corresponding to the plurality of shapes, the plurality of metallic electrodes having the irregular pattern.

In some implementations, fabricating the irregular display according to the profile of the irregular display comprises: forming a plurality of circuits on a substrate; forming a plurality of conductive vias on top of the plurality of circuits, where each of the plurality of conductive vias is conductively coupled to a respective circuit of the plurality of circuits; forming a metallic layer on top of the plurality of conductive vias; and patterning the metallic layer according to the irregular pattern to obtain the plurality of metallic electrodes.

In some implementations, the plurality of conductive vias are regularly spaced on top of the plurality of circuits. In some implementations, first conductive vias in a first region are regularly spaced with a first spacing distance, and second conductive vias in a second region are regularly spaced with a second spacing distance that is different from the first spacing distance. In some implementations, among the plurality of conductive vias, at least two pairs of adjacent conductive vias have different spaces. In some implementations, the metallic layer is configured to be a reflective mirror.

In some implementations, fabricating the irregular display according to the profile of the irregular display comprises: forming a first alignment layer on top of the plurality of metallic electrodes; forming separate spacers on the first alignment layer; forming a liquid crystal layer on the first alignment layer; forming a second alignment layer on top of the plurality of the liquid crystal layer and the separate spacers; and forming a transparent conductive layer on top of the second alignment layer as a common electrode.

Another aspect of the present disclosure features a method comprising: generating, by at least one processor, a plurality of shapes based on a plurality of points according to an irregular pattern, the plurality of points being irregularly positioned in an area for a device, each of the plurality of shapes uniquely enclosing a respective point of the plurality of points; and generating, by the at least one processor, a profile of the device according to the plurality of shapes, the device comprising a plurality of elements each corresponding to a respective shape of the plurality of shapes.

In some implementations, the irregular pattern comprises a Voronoi pattern.

In some implementations, the method further comprises determining the plurality of points that are irregularly positioned in the area for the device by determining a plurality of spaced points in the area for the device; and adding different offsets to the plurality of spaced points to generate the plurality of points that are irregular positioned in the area for the device.

In some implementations, the method further comprises: determining the different offsets based on a Poisson noise distribution.

In some implementations, the plurality of spaced points define a regularly spaced pattern.

In some implementations, the method further comprises: storing the different offsets in a repository and associating the different offsets with the plurality of spaced points in the repository.

Another aspect of the present disclosure features a method of fabricating an irregular device, comprising: fabricating the irregular device according to a profile of the irregular device, the profile of the irregular device comprising information of a plurality of shapes each corresponding to a respective element of a plurality of elements of the irregular device, the plurality of shapes forming an irregular pattern.

In some implementations, fabricating the irregular device according to the profile of the irregular device comprises: forming a plurality of metallic electrodes corresponding to the plurality of shapes, the plurality of metallic electrodes having the irregular pattern.

In some implementations, fabricating the irregular device according to the profile of the irregular device comprises: forming a plurality of circuits on a substrate; forming a plurality of conductive vias on top of the plurality of circuits, where each of the plurality of conductive vias is conductively coupled to a respective circuit of the plurality of circuits; forming a metallic layer on top of the plurality of conductive vias; and patterning the metallic layer according to the irregular pattern to obtain the plurality of metallic electrodes.

In some implementations, the plurality of conductive vias are regularly spaced on top of the plurality of circuits.

In some implementations, among the plurality of conductive vias, at least two pairs of adjacent conductive vias have different spaces.

In some implementations, the metallic layer is configured to be a reflective mirror.

In some implementations, fabricating the irregular device according to the profile of the irregular device comprises: forming a first alignment layer on top of the plurality of metallic electrodes; forming separate spacers on the first alignment layer; forming a liquid crystal layer on the first alignment layer; forming a second alignment layer on top of the plurality of the liquid crystal layer and the separate spacers; and forming a transparent conductive layer on top of the second alignment layer as a common electrode.

Another aspect of the present disclosure features a system, comprising a display and a controller. The display comprises: a backplane comprising a plurality of circuits and a plurality of display elements arranged on the backplane. The plurality of display elements form an irregular pattern, and the plurality of display elements are coupled to the plurality of circuits by conductive vias that are regularly spaced. The controller is coupled to the display and configured to transmit at least one control signal to at least one display element of the display for modulating at least one property of the at least one display element.

In some implementations, the controller comprises at least one of: an application-specific integrated circuit (ASIC), a field-programmable gate array (FPGA), a programmable gate array (PGA), a central processing unit (CPU), a graphics processing unit (GPU), a phasel processing unit (PPU), or standard computing cells.

In some implementations, the controller is configured to: for each of a plurality of primitives corresponding to at least one object, determine an electromagnetic (EM) field contribution to each of the plurality of display elements of the display by computing, in a three-dimensional (3D) coordinate system, EM field propagation from the primitive to the display element; and for each of the plurality of display elements, generate a sum of EM field contributions from each of the plurality of primitives to the display element. The at least one control signal corresponds to a corresponding sum of EM field contributions from each of the plurality of primitives to the at least one display element.

In some implementations, each of the plurality of display elements is associated with a respective spaced point of a plurality of spaced points and a respective offset associated with the respective spaced point. The controller is configured to: for each of the plurality of display elements, obtain a position of the respective spaced point and the respective offset associated with the respective spaced point; and compute the EM field propagation from the primitive to the display element based on the position of the respective spaced point and the respective offset associated with the respective spaced point. The respective offset represents a distance between the respective spaced point and a seed point of the display element.

In some implementations, the controller is configured to sequentially modulate the display with information associated with a first color during a first time period and modulate the display with information associated with a second color during a second, sequential time period. The controller is configured to control an illuminator to sequentially turn on a first light emitting element to emit light with the first color during the first time period and a second light emitting element to emit light with the second color during the second, sequential time period.

Another aspect of the present disclosure features a system comprising: a display and a controller. The display comprises: a backplane and a plurality of display elements arranged on the backplane, the plurality of display elements forming an irregular pattern. The controller is coupled to the display and configured to transmit at least one control signal to at least one display element of the display for modulating at least one property of the at least one display element.

In some implementations, the controller comprises at least one of: an application-specific integrated circuit (ASIC), a field-programmable gate array (FPGA), a programmable gate array (PGA), a central processing unit (CPU), a graphics processing unit (GPU), a phasel processing unit (PPU), or standard computing cells.

In some implementations, the controller is configured to: for each of a plurality of primitives corresponding to at least one object, determine an electromagnetic (EM) field contribution to each of the plurality of display elements of the display by computing, in a three-dimensional (3D) coordinate system, EM field propagation from the primitive to the display element; and for each of the plurality of display elements, generate a sum of EM field contributions from each of the plurality of primitives to the display element, where the at least one control signal corresponds to a corresponding sum of EM field contributions from each of the plurality of primitives to the at least one display element.

In some implementations, each of the plurality of display elements is associated with a respective regular display element with a regular shape. The controller is configured to: for each of the plurality of display elements, obtain a position of a center point of the respective regular display element and an offset associated with the center point of the respective regular display element; and compute the EM field propagation from the primitive to the display element based on the position of the center point and the offset associated with the center point, where the offset represents a distance between the center point of the respective regular display element and a seed point of the display element.

In some implementations, each of the plurality of display elements is associated with a respective spaced point of a plurality of spaced points and a respective offset associated with the respective spaced point. The controller is configured to: for each of the plurality of display elements, obtain a position of the respective spaced point and the respective offset associated with the respective spaced point; and compute the EM field propagation from the primitive to the display element based on the position of the respective spaced point and the respective offset associated with the respective spaced point, where the respective offset represents a distance between the respective spaced point and a seed point of the display element. A shape of the display element can be generated based on the seed point of the display element and an irregular pattern. The plurality of spaced points can be the center points of a plurality of display elements of a regular display.

In some implementations, the controller is configured to sequentially modulate the display with information associated with a first color during a first time period and modulate the display with information associated with a second color during a second, sequential time period; and the controller is configured to control an illuminator to sequentially turn on a first light emitting element to emit light with the first color during the first time period and a second light emitting element to emit light with the second color during the second, sequential time period.

Another aspect of the present disclosure features a system comprising: a display comprising a plurality of display elements; and the driving device as described above, where the driving device is configured to perform the method as described above.

In some implementations, the system further includes: the processing device as described above and the processing device is configured to perform the method as described above.

Another aspect of the present disclosure features a system comprising: a display comprising a plurality of display elements; and a driving device coupled to the driving device and configured to: obtain a hologram for the display, where the hologram comprises, for each display element of the plurality of display elements, a respective sum of electromagnetic (EM) field contributions of a plurality of primitives corresponding to at least one object to the display element; generate, for each display element of the plurality of display elements, a respective modulation control signal based on the respective sum of EM field contributions of the plurality of primitives to the display element; and output the respective modulation control signal to each display element of the plurality of display elements for modulating the display element.

In some implementations, the driving device comprises: a memory configured to store the hologram; and a display driver coupled to the memory and the display.

In some implementations, the system further comprises: a processing device coupled to the driving device and configured to: obtain information of the plurality of primitives corresponding to the at least one object, where the information comprises respective primitive identifiers of the plurality of primitives; obtain primitive data of the plurality of primitives based on the information of the plurality of primitives; for each primitive of the plurality of primitives, determine an electromagnetic (EM) field contribution to each of a plurality of display elements of a display based on primitive data of the primitive; and for each of the plurality of display elements of the display, generate a sum of the EM field contributions of the plurality of primitives to the display element.

In some implementations, the processing device comprises: a command processor configured to: receive a command from a computing device, the command comprising the information of the plurality of primitives corresponding to the at least one object, and process the command to obtain the primitive data of the plurality of primitives from the computing device based on the information of the plurality of primitives; a plurality of computing units configured to calculate an electromagnetic (EM) field contribution of each of the plurality of primitives to each of the plurality of display elements based on the primitive data of the plurality of primitives; and an accumulator configured to: accumulate EM field contributions of the plurality of primitives to each of the plurality of display elements, and generate the hologram comprising a respective sum of the EM field contributions of the plurality of primitives to each of the plurality of display elements.

In some implementations, the driving device and the processing device are integrated in a package as a controller for the display. In some implementations, the controller is integrated with the display.

In some implementations, the system further comprises an illuminator, where the driving device comprises an illuminator driver for the illuminator. In some implementations, the controller, the illuminator, and the display are integrated in a package.

In some implementations, the system further comprises: a computing device configured to perform a corresponding method as described above. The processing device is configured to be integrated with the computing device. In some implementations, the processing device is insertable in a PCIe slot of the computing device.

In some implementations, the computing device is configured to: generate scene data using a 3D simulation application running on the computing device, where the scene data comprises information of a plurality of primitives corresponding to at least one object; and generate the primitive data of the plurality of primitives corresponding to the at least one object based on the scene data using an application programming interface (API).

In some implementations, the API is configured to adjust initial primitive data of the plurality of primitives generated from the scene data to generate the primitive data of the plurality of primitives, and the API is configured to perform a corresponding method as described above.

In some implementations, the display is an irregular display, and the plurality of display elements form an irregular pattern.

In some implementations, the system further comprises: an optical device adjacent to the display, where the optical device comprises a substrate and an optically diffractive element disposed on the substrate and configured to diffract light to the display. In some implementations, the optically diffractive element comprises a diffraction grating with a diffraction efficiency for the light, the diffraction efficiently being lower than a predetermined threshold. In some implementations, the predetermined threshold is 20%, 15%, or 10%. In some implementations, the holographic grating comprises a photopolymer material or a silver halide material.

In some implementations, the system further comprises: a polarization controller arranged between the optical device and the display. The polarization controller is configured to: make the light from the optical device to be incident on the display have S polarization state, and make returned light from the display to be incident on the optical device have P polarization state or an intermediate state between S and P polarization states. In some implementations, the polarization controller comprises a Faraday rotator.

In some implementations, the optical diffractive element is configured such that, when a plurality of different colors of light is incident on the optically diffractive element, the optically diffractive element separates or combines light of individual colors of the different colors while suppressing crosstalk between the different colors.

In some implementations, the optically diffractive element comprises: at least one optically diffractive components; and at least one of one or more color-selective polarizers or at least one of one or more reflective layers or one or more transmissive layers.

In some implementations, the optical device further comprises an optically redirecting element disposed on the substrate. The display is configured to diffract a portion of the light illuminating one or more display elements, and the optically redirecting element is configured to transmit the diffracted portion of the light to form a holographic scene and to redirect display zero order light away from the holographic scene in a three-dimensional (3D) space, the display zero order light comprising reflected light from the display.

In some implementations, the optically diffractive element is arranged on a first side of the substrate, facing a display surface of the display, and the optically redirecting element is arranged on a second side of the substrate opposite to the first side of the substrate.

In some implementations, the system further comprises: an illuminator arranged adjacent to the optical device and configured to provide a plurality of different colors of light to the optical device, where the illuminator comprises a plurality of light emitting elements each configured to emit a corresponding color of light; and a coupling device arranged between the illuminator and the optical device and configured to receive the plurality of different colors of light from the illuminator and to output the plurality of different colors of light to the optical device.

In some implementations, the coupling device comprises: a prism element between the illuminator and the optical device and configured to receive the plurality of different colors of light from an input surface of the prism element; one or more expansion gratings adjacent an exit surface of the prism element, each of the one or more expansion gratings configured to expand a beam profile of a different corresponding color of light by a factor in at least one dimension; and one or more reflectors downstream of the one or more expansion gratings, each of the one or more reflectors being configured to reflect a respective color of light into the optically diffractive element, where a tilt angle of each of the one or more reflectors is independently adjustable to cause a uniformity of diffraction from the optical device to the display.

In some implementations, the optical device is positioned facing a display surface of the display along a perpendicular direction to the display surface. In some implementations, the coupling device is configured to couple the plurality of different colors of light into the optically diffractive element from a side surface of the coupling device. In some implementations, the coupling device is configured to couple the plurality of different colors of light into the optically diffractive element from a bottom surface or a top surface of the coupling device.

In some implementations, the system comprises a plurality of optical components comprising at least one first optical component configured to cause a positive optical dispersion for light incident on the display and at least one second optical component configured to cause a negative optical dispersion for the light, the light having a spectral bandwidth with a peak wavelength. The positive optical dispersion and the negative optical dispersion can be compensated with each other, such that a holographic scene reconstructed from the light has no or little light dispersion.

In some implementations, the at least one first optical component comprises a first diffraction grating, and the at least one second optical component comprises a second diffraction grating. In some implementations, the first diffraction grating and the second diffraction grating are configured to cause a same magnitude of dispersion for the light. In some implementations, the system is configured to cause the light with an odd number of reflections between the first diffraction grating and the second diffraction grating, and the first diffraction grating and the second diffraction grating are configured to cause a same dispersion for the light. In some implementations, the system is configured to cause the light with an even number of reflections between the first diffraction grating and the second diffraction grating, and the first diffraction grating and the second diffraction grating are configured to cause opposite dispersions having a same magnitude for the light.

In some implementations, the positive optical dispersion caused by the at least one first optical component has a first magnitude of dispersion, and the negative optical dispersion caused by the at least one second optical component has a second magnitude of dispersion, and a magnitude ratio of the first magnitude of dispersion over the second magnitude of dispersion is different from 1.

In some implementations, the at least one second optical component is arranged downstream of the at least one first optical component along a light path of the light to be incident on the display, where the system is configured to change a beam width of the light from the at least one first optical component to the at least one second optical component by a width factor in one dimension, and where the width factor is identical to the magnitude ratio.

In some implementations, the system is configured to change the beam width of the light from the at least one first optical component to the at least one second optical component by a first width factor in a first dimension and by a second width factor in a second dimension different from the first dimension, and each of the first width factor and the second width factor is identical to the magnitude ratio.

In some implementations, the at least one first optical component is arranged downstream of the at least one second optical component along a light path of the light to be incident on the display, the system is configured to change a beam width of the light from the at least one second optical component to the at least one first optical component by a width factor in one dimension, and the width factor is identical to an inversion of the magnitude ratio.

In some implementations, the system is configured to change the beam width of the light from the at least one second optical component to the at least one first optical component by a first width factor in a first dimension and by a second width factor in a second dimension different from the first dimension, and each of the first width factor and the second width factor is identical to an inversion of the magnitude ratio.

In some implementations, the plurality of optical components comprise at least one third optical component configured to cause an optical dispersion for the light, and the at least one first optical component, the at least one second optical component, and the at least one third optical component are configured to compensate respective caused optical dispersions for the light.

In some implementations, the plurality of optical components comprise: first optical components configured for optical dispersion compensation for a first color of light, and second optical component configured for optical dispersion compensation for a second color of light, the second color of light being different from the first color of light.

In some implementations, the plurality of optical components comprise: a first group of optical components each configured to cause a first optical dispersion for a respective color of light of a plurality of colors of light, and a second group of optical components each configured to cause a second optical dispersion for a respective color of light of the plurality of colors of light, where the first group of optical components and the second group of optical components are configured to compensate optical dispersion for each of the plurality of colors of light.

In some implementations, at least one of the first group of optical components and the second group of optical components comprises a series of holographic gratings made of a same material. In some implementations, the plurality of optical components are configured to compensate optical dispersion for a first color of light with a first spectral width, without compensation for a second color of light with a second spectral width that is narrower than the first spectral width.

Another aspect of the present disclosure features a method comprising: recording a diffraction grating in a recording material by illuminating an object beam and a reference beam with mismatched polarization states into the recording material.

Another aspect of the present disclosure features a method comprising: forming a recording material on a substrate; and illuminating an object beam and a reference beam into the recording material to record a diffraction grating in the recording material, where the object beam and the reference beam have mismatched polarization states.

In some implementations, the diffraction grating has a diffraction efficiency lower than a predetermined threshold. In some implementations, the predetermined threshold is 10%, 15% or 20%.

In some implementations, one of the object beam and the reference beam has one of S polarization state and P polarization state, and the other one of the object beam and the reference beam has an intermediate polarization state between S polarization state and P polarization state.

In some implementations, one of the object beam and the reference beam has a first intermediate polarization state between S polarization state and P polarization state, and the other one of the object beam and the reference beam have a second intermediate polarization state between S polarization state and P polarization state, and the second intermediate polarization state is different from the first intermediate polarization state. In some implementations, each of the object beam and the reference beam has P polarization state.

In some implementations, the method further comprises: measuring a diffraction efficiency of the diffraction grating; and adjusting a polarization state of at least one of the object beam or the reference beam based on the measured diffraction efficiency. In some implementations, adjusting the polarization state of the at least one of the object beam or the reference beam based on the measured diffraction efficiency comprises: in response to determining that the measured diffraction efficiency is higher than a predetermined threshold, adjusting the polarization state of the at least one of the object beam and the reference beam to increase a mismatch between the polarization states of the object beam and the reference beam. In some implementations, adjusting the polarization state of the at least one of the object beam and the reference beam to increase the mismatch between the polarization states of the object beam and the reference beam comprises: adjusting the polarization state of the at least one of the object beam and the reference beam closer to P polarization state than to S polarization state.

In some implementations, an inter-beam angle between the object beam and the reference beam is in a range from 70° to 80°. In some implementations, a beam ratio between the object beam and the reference beam is in a range from 1 to 30.

In some implementations, the method further comprises: measuring a diffraction efficiency of the diffraction grating; and adjusting a beam ratio between the object beam and the reference beam based on the measured diffraction efficiency.

In some implementations, adjusting the beam ratio between the object beam and the reference beam based on the measured diffraction efficiency comprises: in response to determining that the measured diffraction efficiency is higher than a predetermined threshold, increasing the beam ratio between the object beam and the reference beam.

In some implementations, the method further comprises: inducing a motion in at least one of the object beam and the reference beam during recording the diffraction grating.

In some implementations, the recording material comprises a photopolymer material or a silver halide material.

Another aspect of the present disclosure features a method comprising: adjusting, by at least one processor, primitive data of a plurality of primitives corresponding to an object to generate a gap between adjacent primitives of the plurality of primitives.

In some implementations, for at least one pair of adjacent primitives, the gap is no smaller than a predetermined value. In some implementations, before the adjusting, the adjacent primitives are in contact and have at least one shared edge.

In some implementations, adjusting the primitive data of the plurality of primitives corresponding to the object to generate the gap between the adjacent primitives of the plurality of primitives comprises: for each primitive of the adjacent primitives, shrinking the primitive by a half of the gap towards a center of the primitive.

In some implementations, coordinate information of the center of the primitive in a three-dimensional (3D) coordinate system remains unchanged, and a perpendicular distance between an edge of the primitive and the center of the primitive is decreased by the half of the gap.

In some implementations, coordinate data of the center of the primitive in a 3D coordinate system remain unchanged, and coordinate data of vertices defining the primitive are adapted with respect to the center of the primitive to create the gap.

In some implementations, adjusting the primitive data of the plurality of primitives corresponding to the object to generate the gap between the adjacent primitives of the plurality of primitives comprises: scaling a shared edge of a first primitive adjacent to a second primitive; and updating the respective primitive data for the first primitive based on a result of the scaling.

In some implementations, scaling the shared edge of the first primitive adjacent to the second primitive comprises: moving two vertices of the shared edge of the first primitive towards at least one adjacent vertex of the first primitive.

In some implementations, the first primitive has only one neighboring primitive that is the second primitive, and one or more other edges of the first primitive remain unscaled.

In some implementations, the method further comprises: receiving an input to generate the gap among the plurality of primitives, where adjusting the primitive data of the plurality of primitives corresponding to the object to generate the gap between the adjacent primitives of the plurality of primitives is in response to receiving the input.

In some implementations, at least one of the plurality of primitives comprises a triangle primitive or a polygon primitive.

In some implementations, primitive data of a primitive comprises at least one of: texture information of the primitive, viewpoint dependent shading information for the primitive, color information of the primitive, or coordinate information of the primitive in a 3D coordinate system.

In some implementations, the method further comprises: generating, by the at least one processor, the primitive data of the plurality of primitives based on scene data of the object, the scene data comprising information of the plurality of primitives.

In some implementations, the method further comprises: generating, by the at least one processor, the scene data of the object using the 3D simulation application.

Another aspect of the present disclosure features a non-transitory, computer-readable medium storing one or more instructions executable by at least one processor to perform the method as described above.

Another aspect of the present disclosure features a method, comprising: generating control signals for a plurality of display elements of a display based on primitive data of a plurality of primitives corresponding to at least one object, where the primitive data indicates a gap between adjacent primitives of the plurality of primitives.

Another aspect of the present disclosure features a method, comprising: obtaining primitive data of a plurality of primitives corresponding to an object, where the primitive data indicates a gap between adjacent primitives of the plurality of primitives; for each of the plurality of primitives, determining an electromagnetic (EM) field contribution to each of a plurality of display elements of a display by computing, in a three-dimensional (3D) coordinate system, EM field propagation from the primitive to the display element using primitive data of the primitive and coordinate data of the display element; and for each of the plurality of display elements, generating a sum of the EM field contributions from each of the plurality of primitives to the display element.

In some implementations, the method further comprises: transmitting a respective control signal to each of the plurality of display elements of the display to modulate at least one property of the display element based on the sum of EM field contributions to the display element.

In some implementations, the method further comprises: illuminating light on modulated display elements of the display to form a volumetric light field in a three-dimensional (3D) space, the volumetric light field corresponding to a reconstruction of the object, where the reconstruction of the object comprises reconstructed adjacent primitives corresponding to the adjacent primitives with the gap.

In some implementations, the gap is configured to make the reconstructed adjacent primitives be resolvable from each other. In some implementations, the gap is configured to be small enough to make the reconstructed adjacent primitives appear seamless. In some implementations, the gap is configured such that there is no overlap between the reconstructed adjacent primitives.

In some implementations, the gap is configured to be identical to or greater than a predetermined diffraction limit of the display. In some implementations, a ratio between the gap and the predetermined diffraction limit of the display is in a range from 1 to 10. In some implementations, the ratio is in a range from 3 to 5.

In some implementations, the predetermined diffraction limit of the display is in accordance with Rayleigh Criterion. In some implementations, the predetermined diffraction limit of the display is based on a size of a display element of the display and a wavelength of light to be incident on the display.

In some implementations, the predetermined diffraction limit of the display is expressed as:

$$res = 0.61\lambda/\tan\theta_o,$$

where res represents the predetermined diffraction limit of the display, $\lambda$ represents a wavelength of light in air, and $\theta o$ represents an output angle from a surface of the display.

In some implementations, the display comprises a cover on top of the plurality of display elements of the display, and the output angle $\theta_o$ is expressed as:

$$\theta_o = a\sin\left(\frac{n_i}{n_o} * \sin\theta_i\right), \text{ and}$$

$$\theta_i = a\sin(\lambda_i/\Lambda),$$

where $\theta_i$ represents an incident angle on an interface between the cover and a surrounding medium, $n_i$ and $n_o$ represent a refractive index of a material of the cover and a refractive index of the surrounding medium, $\lambda_i$ represents a wavelength of light in the material of the cover, and $\Lambda$ represents a display element period of the display.

In some implementations, the display element period of the display is one of a period along a first direction of the display element of the display, or a period along a second direction of the display element of the display that is perpendicular to the first direction.

Another aspect of the present disclosure features a method, comprising: obtaining primitive data of a plurality of primitives corresponding to an object, where the primitive data indicates a gap between adjacent primitives of the plurality of primitives; generating control signals for a plurality of display elements of a display using the primitive data of the plurality of primitives; and transmitting the control signals to the display to modulate the plurality of display elements of the display based on the control signals.

In some implementations, the method further comprises: transmitting a timing control signal to an illumination source to illuminate light on modulated display elements of the display to form a volumetric light field in a three-dimensional (3D) space, the volumetric light field corresponding to a reconstruction of the object, where the reconstruction of the object comprises reconstructed adjacent primitives corresponding to the adjacent primitives with the gap, and where the gap is configured to make the reconstructed adjacent primitives be resolvable from each other.

Another aspect of the present disclosure features a non-transitory, computer-readable medium storing one or more instructions executable by at least one processor to perform the method as described above.

Another aspect of the present disclosure features a method comprising: obtaining primitive data of a plurality of primitives corresponding to an object; adjusting the primitive data of the plurality of primitives to generate a gap between adjacent primitives of the plurality of primitives; generating control signals for a plurality of display elements of a display using the adjusted primitive data of the plurality of primitives; modulating the plurality of display elements of the display based on the control signals; and illuminating light on modulated display elements of the display to form a volumetric light field in a three-dimensional (3D) space, the volumetric light field corresponding to a reconstruction of the object. The reconstruction of the object comprises reconstructed adjacent primitives corresponding to the adjacent primitives with the gap, and the gap is configured to make the reconstructed adjacent primitives be resolvable from each other.

In some implementations, the gap is configured to be small enough to make the reconstructed adjacent primitives appear seamless and great enough to make no overlap between the reconstructed adjacent primitives.

In some implementations, generating the control signals for the plurality of display elements of the display using the adjusted primitive data of the plurality of primitives comprises: for each of the plurality of primitives, determining an electromagnetic (EM) field contribution to each of the plurality of display elements of the display by computing, in a three-dimensional (3D) coordinate system, EM field propagation from the primitive to the display element using adjusted primitive data of the primitive and coordinate data of the display element, and for each of the plurality of display elements, generating a sum of the EM field contributions from each of the plurality of primitives to the display element, and generating a respective control signal based on the sum of the EM field contributions for the display element.

In some implementations, the method further comprises: generating scene data of the object using a 3D simulation application; and generating the primitive data of the plurality of primitives based on the scene data of the object, the scene data comprising information of the plurality of primitives.

In some implementations, the gap is configured to be identical to or greater than a predetermined diffraction limit of the display in accordance with Rayleigh Criterion.

Another aspect of the present disclosure features a method comprising: adjusting, by at least one processor, primitive data of a plurality of primitives corresponding to an object to generate an overlap between adjacent primitives of the plurality of primitives.

In some implementations, adjusting the primitive data of the plurality of primitives to generate the overlap between the adjacent primitives comprises: for each primitive of the adjacent primitives, scaling up the primitive away from a center of the primitive.

In some implementations, coordinate data of the center of the primitive in a 3D coordinate system remain unchanged, and coordinate data of vertices defining the primitive are adapted with respect to the center of the primitive to create the overlap.

In some implementations, adjusting the primitive data of the plurality of primitives to generate the overlap between the adjacent primitives comprises: for each primitive of the adjacent primitives, moving a first primitive relative to a second primitive adjacent to the first primitive to generate the overlap.

In some implementations, the method further comprises: receiving an input to generate the overlap among the plurality of primitives, where adjusting the primitive data of the plurality of primitives to generate the overlap between the adjacent primitives of the plurality of primitives is in response to receiving the input.

Another aspect of the present disclosure features a method, comprising: generating control signals for a plurality of display elements of a display based on primitive data of a plurality of primitives corresponding to at least one object, where the primitive data indicates an overlap between adjacent primitives of the plurality of primitives.

Another aspect of the present disclosure features a method comprising: obtaining primitive data of a plurality of primitives corresponding to an object, where the primitive data indicates an overlap between adjacent primitives of the plurality of primitives; generating control signals for a plurality of display elements of a display using the primitive data of the plurality of primitives; and transmitting the control signals to the display to modulate the plurality of display elements of the display based on the control signals.

In some implementations, the method further comprises: transmitting a timing control signal to an illumination source to illuminate light on modulated display elements of the display to form a volumetric light field in a three-dimensional (3D) space, the volumetric light field corresponding to a reconstruction of the object. The reconstruction of the object comprises reconstructed adjacent primitives corresponding to the adjacent primitives with the overlap, and the overlap is configured to make the reconstructed adjacent primitives overlap with each other.

Another aspect of the present disclosure features a system, comprising: a display and a controller coupled to the display. The controller is configured to: obtain primitive data of a plurality of primitives corresponding to an object, where the primitive data indicates a gap between adjacent primitives of the plurality of primitives; for each of the plurality of primitives, determine an electromagnetic (EM) field contribution to each of a plurality of display elements of the display by computing, in a three-dimensional (3D) coordinate system, EM field propagation from the primitive to the display element using primitive data of the primitive and coordinate data of the display element; and for each of the plurality of display elements, generate a sum of the EM field contributions from each of the plurality of primitives to the display element.

Another aspect of the present disclosure features a system, comprising: a display and a controller coupled to the display. The controller is configured to: obtain primitive data of a plurality of primitives corresponding to an object, where the primitive data indicates a gap between adjacent primitives of the plurality of primitives; generate control signals for a plurality of display elements of a display using the primitive data of the plurality of primitives; and transmit the control signals to the display to modulate the plurality of display elements of the display based on the control signals.

Another aspect of the present disclosure features a system, comprising: a display and a controller coupled to the display. The controller is configured to: obtain primitive data of a plurality of primitives corresponding to an object, where the primitive data indicates an overlap between adjacent primitives of the plurality of primitives; generate control signals for a plurality of display elements of a display using the primitive data of the plurality of primitives; and transmit the control signals to the display to modulate the plurality of display elements of the display based on the control signals.

In some implementations, the controller is coupled to a computing device. The computing device is configured to: generate scene data using a 3D simulation application, where the scene data comprises information of the plurality of primitives of the object; and generate the primitive data of the plurality of primitives corresponding to the object based on the scene data using an application programming interface (API).

In some implementations, the API is configured to adjust initial primitive data of the plurality of primitives generated from the scene data to generate the primitive data of the plurality of primitives.

Another aspect of the present disclosure features a device, comprising: an optical guiding device configured to guide light to propagate along a first direction within the optical guiding device, the light having a spectral bandwidth with a peak wavelength; an in-coupling diffractive structure configured to diffract the light to propagate in the optical guiding device; and one or more out-coupling diffractive structures arranged downstream of the in-coupling diffractive structure along the first direction and configured to diffract at least part of the light out of the optical guiding device along a second direction different from the first direction. The in-coupling diffractive structure is configured to cause a first optical dispersion of the light, and at least one of the one or more out-coupling diffractive structures is configured to cause a second optical dispersion for the light, and the first optical dispersion and the second optical dispersion are compensated by each other, such that light diffracted out of the optical guiding device has no or little optical dispersion.

In some implementations, the optical guiding device is configured to guide the light via total internal reflection (TIR).

In some implementations, the in-coupling diffractive structure comprises a first diffraction grating, and the at least one of the one or more out-coupling diffractive structures comprises a second diffraction grating, and the first diffraction grating and the second diffraction grating are configured to cause the first optical dispersion and the second optical dispersion to be opposite dispersions having a same magnitude for the light.

In some implementations, the first diffraction grating has first fringe planes with a first fringe tilt angle, and the second diffraction grating has second fringe planes with a second fringe tilt angle, and where the first fringe tilt angle and the second fringe tilt angle have a same value with opposite directions, and the first diffraction grating has a first fringe spacing perpendicular to the first fringe planes, and the second diffraction grating has a second fringe spacing perpendicular to the second fringe planes, and where the first fringe spacing is identical to the second fringe spacing.

In some implementations, light diffracted by the first diffraction grating has a first beam width, and light diffracted by the second diffraction grating has a second beam width, and the first beam width and the second beam width are identical.

In some implementations, a first diffraction efficiency of the first diffraction grating for light with the peak wavelength is greater than a second diffraction efficiency of the second diffraction grating for the light with the peak wavelength.

In some implementations, the first diffraction efficiency is no smaller than 60%, and the second diffraction efficiency is no greater than 20%.

In some implementations, the first diffraction grating is a reflection grating, a transmission grating, or a transflection grating, and the second diffraction grating is a reflection grating or a transmission grating.

In some implementations, the in-coupling diffractive structure is arranged in or on the optical guiding device, and where the one or more out-coupling diffractive structures comprise a plurality of out-coupling diffractive structures arranged in or on the optical guiding device along the first direction.

In some implementations, the in-coupling diffractive structure and the plurality of out-coupling diffractive structures are arranged on a same side of the optical guiding device.

In some implementations, the in-coupling diffractive structure and the plurality of out-coupling diffractive structures are arranged on opposite sides of the optical guiding device.

In some implementations, the plurality of out-coupling diffractive structures are in contact with or overlap with one another along the first direction, and where the in-coupling diffractive structure is spaced from the plurality of out-coupling diffractive structures.

In some implementations, along the first direction, a width of the in-coupling diffractive structure is identical to a width of each of the plurality of out-coupling diffractive structures.

In some implementations, the in-coupling diffractive structure comprises a first diffraction grating, and each of the plurality of out-coupling diffractive structures comprises a respective second diffraction grating, and the first diffraction grating and the respective second diffraction grating are configured to cause opposite dispersions having a same magnitude for the light.

In some implementations, the respective second diffraction gratings are configured to cause a same dispersion having a same magnitude and a same direction for the light.

In some implementations, the plurality of out-coupling diffractive structures comprise a first out-coupling diffractive structure and a second output-coupling diffractive structure that is arranged farther away from the in-coupling diffractive structure than the first out-coupling diffractive structure, and the second output-coupling diffractive structure has a higher diffraction efficiency for light with the peak wavelength than the first output-coupling diffractive structure.

In some implementations, the first out-coupling diffractive structure is configured to diffract a first portion of the light incident on the first out-coupling diffractive structure out of the optical guiding device, the diffracted first portion of the light having a first optical power, the second out-coupling diffractive structure is configured to diffract a second portion of the light incident on the second out-coupling diffractive structure out of the optical guiding device, the diffracted second portion of the light having a second optical power, and the first portion of the light has a higher optical power than the second portion of the light, and the first out-coupling structure and the second out-coupling structure are configured such that the second optical power is identical to the first optical power.

In some implementations, part of the first portion of the light that is not diffracted by the first out-coupling diffractive structure propagates in the optical guiding device via total internal reflection (TIR) along the first direction to be incident on the second out-coupling diffractive structure, In some implementations, the diffracted light from the in-coupling diffractive structure propagates via total internal reflection in the optical guiding device along the first direction to be sequentially incident on each of the plurality of out-coupling diffractive structures along the first direction, and the plurality of out-coupling diffractive structures are configured to have gradually increased diffraction efficiencies for the light along the first direction, such that diffracted light by each of the plurality of out-coupling diffractive structures out of the optical guiding device has a same optical power.

In some implementations, the diffracted light from the in-coupling diffractive structure is incident on each of the plurality of out-coupling diffractive structures with a same incident angle, and each of the plurality of out-coupling diffractive structures is configured such that the diffracted light by each of the plurality of out-coupling diffractive structures has a same diffraction angle.

In some implementations, the in-coupling diffractive structure is configured to receive the light at a first incident angle and diffract the light at a first diffraction angle, and the first incident angle is identical to the same diffraction angle, and the first diffraction angle is identical to the same incident angle.

In some implementations, the incident angle is no smaller than 60°, and where the diffraction angle is about 0°. In some implementations, the optical guiding device comprises a waveguide or a lightguide.

In some implementations, the light comprises light with different colors, and the in-coupling diffractive structure comprises a first corresponding diffraction grating for light with each of the different colors, and each of the one or more out-coupling diffractive structures comprises a second corresponding diffraction grating for the light with each of the different colors, In some implementations, the first corresponding diffraction gratings for the light with the different colors are recorded in a same first recording medium, or the second corresponding diffraction gratings for the light with the different colors are recorded in a same second recording medium, or each of the first corresponding diffraction gratings for the light with the different colors is recorded in a respective first recording medium, or each of the second corresponding diffraction gratings for the light with the different colors is recorded in a respective second recording medium.

In some implementations, a system comprises a display and an optical device. The optical device comprises: an optical guiding device configured to guide light to propagate along a first direction within the optical guiding device, the light having a spectral bandwidth with a peak wavelength; an in-coupling diffractive structure configured to diffract the light to propagate in the optical guiding device; and a plurality of out-coupling diffractive structures arranged downstream of the in-coupling diffractive structure along the first direction and configured to diffract at least part of the light out of the optical guiding device along a second direction that is different from the first direction. The in-coupling diffractive structure is configured to cause a first optical dispersion for the light, and each of the plurality of out-coupling diffractive structures is configured to cause a second optical dispersion for the light, and the first optical dispersion and the second optical dispersion are compensated with each other, such that light diffracted out of the optical guiding device has no or little optical dispersion.

In some implementations, the in-coupling diffractive structure comprises a first diffraction grating, and each of the plurality of out-coupling diffractive structures comprises a respective second diffraction grating, and the first diffraction grating and the respective second diffraction grating are configured to cause opposite dispersions having a same magnitude for the light.

In some implementations, each of the first diffraction grating and the respective second diffraction grating is a reflection grating.

In some implementations, the first diffraction grating is a reflection grating or a transmission grating, and the respective second diffraction grating is a reflection grating or a transmission grating.

In some implementations, the diffracted light from the in-coupling diffractive structure propagates via total internal reflection in the optical guiding device along the first direction to be sequentially incident on each of the plurality of out-coupling diffractive structures along the first direction, and the plurality of out-coupling diffractive structures are configured to have gradually increased diffraction efficiencies for the light along the first direction, such that diffracted light by each of the plurality of out-coupling diffractive structures out of the optical guiding device has a same optical power.

In some implementations, the plurality of out-coupling diffractive structures are configured such that the diffracted light by each of the plurality of out-coupling diffractive structures propagates to illuminate a respective portion of the display, a sum of the respective portions of the display being no smaller than an area of the display.

In some implementations, the respective portion of the display has a width along the first direction and a length along a third direction perpendicular to the first direction and the second direction.

In some implementations, the widths of the respective portions of the display are identical to each other.

In some implementations, along the first direction, a width of the in-coupling diffractive structure is identical to a width of each of the plurality of out-coupling diffractive structures.

In some implementations, the in-coupling diffractive structure is configured to receive the light at a first incident angle and diffract the light at a first diffraction angle, and each of the plurality of out-coupling diffractive structures is configured to receive reflected light from the optical guiding device at a second incident angle and diffract the reflected light at a second diffraction angle, and the first incident angle is identical to the second diffraction angle, and the first diffraction angle is identical to the second incident angle. In some implementations, the second incident angle is no smaller than 60°, and where the second diffraction angle is about 0°.

In some implementations, the display comprises a plurality of display elements extending along the first direction and a third direction perpendicular to the first direction and the second direction. The optical guiding device is a first optical guiding device, the in-coupling diffractive structure is a first in-coupling diffractive structure, and the plurality of out-coupling diffractive structures is a plurality of first out-coupling diffractive structures. The system further comprises: a second optical guiding device extending along the first direction and the third direction, a plurality of second in-coupling diffractive structures arranged in or on the second optical guiding device along the first direction, and multiple groups of second out-coupling diffractive structures, each group of second out-coupling diffractive structures being arranged in or on the second optical guiding device along the third direction. For each of the plurality of second in-coupling diffractive structures, the second in-coupling diffractive structure is configured to receive first light diffracted from a respective first out-coupling diffractive structure and diffract the first light to propagate in the second optical guiding device via TIR along the third direction to be sequentially incident on a corresponding group of second out-coupling diffractive structures, and each of the corresponding group of second out-coupling diffractive structures is configured to receive second light reflected from the second optical guiding device and diffract the second light out of the second optical guiding device towards the display along the second direction.

In some implementations, the second in-coupling diffractive structure has a higher diffraction efficiency than the respective first out-coupling diffractive structure and each of the corresponding group of second out-coupling diffractive structures, the second in-coupling diffractive structure comprises a first diffraction grating, and each of the corresponding group of second out-coupling diffractive structures comprises a respective second diffraction grating, and the first diffraction grating and the respective second diffraction grating are configured to cause opposite dispersions having a same magnitude for the light.

In some implementations, the corresponding group of second out-coupling diffractive structures are configured to have gradually increased diffraction efficiencies for the light along the third direction, such that diffracted light by each of the corresponding group of second out-coupling diffractive structures out of the optical guiding device towards the display has a same optical power.

In some implementations, the first in-coupling diffractive structure, the plurality of first out-coupling diffractive structures, the plurality of second in-coupling diffractive structures, and the multiple groups of second out-coupling diffractive structures are configured such that diffracted light from each of the multiple groups of second out-coupling diffractive structures along the second direction towards the display has a uniform optical power.

In some implementations, the multiple groups of second out-coupling diffractive structures are configured such that the diffracted light by each of the multiple groups of second out-coupling diffractive structures propagates to illuminate a respective portion of the display, a sum of the respective portions of the display being no smaller than an area of the display.

In some implementations, the respective portion of the display has a same size along the first direction and the third direction. In some implementations, the respective portions of the display are identical to each other.

In some implementations, the first optical guiding device and the second optical guiding device are integrated into one piece.

In some implementations, the system further comprises one or more absorbers arranged in or on end surfaces of the optical guiding device and configured to absorb light that propagates out of the optical guiding device.

In some implementations, the light comprises light with different colors, and the in-coupling diffractive structure comprises a corresponding first diffraction grating for light with each of the different colors, and each of the plurality of out-coupling diffractive structures comprises a corresponding second diffraction grating for light with each of the different colors.

In some implementations, the display comprises: a backplane comprising a plurality of circuits; and a plurality of display elements arranged on the backplane, the plurality of display elements forming an irregular pattern, where each of the plurality of display elements is coupled to a respective circuit of the plurality of circuits.

In some implementations, the system further comprises: an illuminator configured to emit the light; and a controller coupled to the display and the illuminator. The controller is configured to: transmit at least one control signal to at least one display element of the display for modulating at least one property of the at least one display element, sequentially modulate the display with information associated with a first color during a first time period and modulate the display with information associated with a second color during a second, sequential time period; and control the illuminator to sequentially turn on a first light emitting element to emit light with the first color during the first time period and a second light emitting element to emit light with the second color during the second, sequential time period.

In some implementations, an optical device comprises: a first optical guiding device configured to guide light to propagate along a first direction within the first optical guiding device via total internal reflection, the light having a spectral bandwidth with a peak wavelength; a first in-coupling diffractive structure configured to diffract the light to propagate in the first optical guiding device; a first plurality of out-coupling diffractive structures arranged downstream of the first in-coupling diffractive structure along the first direction and configured to diffract at least part of the light out of the first optical guiding device along a second direction that is different from the first direction; a second optical guiding device extending along the first direction and a third direction perpendicular to the first direction and the second direction; a plurality of second in-coupling diffractive structures arranged in or on the second optical guiding device along the first direction; multiple groups of second out-coupling diffractive structures, each group of second out-coupling diffractive structures being arranged in or on the second optical guiding device along the third direction. The first in-coupling diffractive structure is configured to cause a first optical dispersion for the light, and each of the plurality of first out-coupling diffractive structures is configured to cause a second optical dispersion for the light, and where the first optical dispersion and the second optical dispersion are compensated with each other, such that light diffracted out of the first optical guiding device has no or little optical dispersion, and for each of the plurality of second in-coupling diffractive structures, the second in-coupling diffractive structure is configured to receive first light diffracted from a respective first out-coupling diffractive structure and diffract the first light to propagate in the second optical guiding device via total internal reflection along the third direction to be sequentially incident on a corresponding group of second out-coupling diffractive structures, each of the corresponding group of second out-coupling diffractive structures is configured to receive second light reflected from the second optical guiding device and diffract the second light out of the second optical guiding device along the second direction, and the second in-coupling diffractive structure and each of the corresponding group of second out-coupling diffractive structures are configured to cause opposite dispersions to compensate with each other, such that light diffracted out of the second optical guiding device has no or little optical dispersion.

In some implementations, the first in-coupling diffractive structure, the plurality of first out-coupling diffractive structures, the plurality of second in-coupling diffractive structures, and the multiple groups of second out-coupling diffractive structures are configured such that diffracted light from each of the multiple groups of second out-coupling diffractive structures along the second direction towards has a uniform optical power.

In some implementations, a method of forming a device includes: providing an optical guiding device configured to guide light to propagate along a first direction within the optical guiding device, the light having a spectral bandwidth with a peak wavelength; forming an in-coupling diffractive structure configured to diffract the light to propagate in the optical guiding device; and forming one or more out-coupling diffractive structures arranged downstream of the in-coupling diffractive structure along the first direction and configured to diffract at least part of the light out of the optical guiding device along a second direction different from the first direction. The in-coupling diffractive structure is configured to cause a first optical dispersion for the light, and at least one of the one or more out-coupling diffractive structures is configured to cause a second optical dispersion for the light, and the first optical dispersion and the second optical dispersion are compensated with each other, such that light diffracted out of the optical guiding device has no or little optical dispersion.

Another aspect of the present disclosure features a system comprising: an optical device configured to deflect target light towards a target device; a linear polarizer configured to transmit light with a linear polarization state; and an optical retarder configured to alter a polarization state of light passing through the optical retarder, where the linear polarizer and the optical retarder are configured to cause ambient light coming from a first side of the linear polarizer to pass through the linear polarizer and the optical retarder to be incident on the target device and deflected back from the target device to pass through the optical retarder to be blocked from a second side of the linear polarizer by the linear polarizer, the second side of the linear polarizer being opposite to the first side of the linear polarizer, and where the optical device, the linear polarizer, and the optical retarder are configured to cause the target light to be incident on the target device and deflected back from the target device to transmit from the second side of the linear polarizer through the linear polarizer.

In some implementations, the optical device is configured to guide the target light along a first direction and diffract to the target device along a second direction different from the first direction, without passing through the linear polarizer from the first side of the linear polarizer.

In some implementations, the linear polarizer and the optical retarder are configured to cause the ambient light to pass through the linear polarizer once and the optical retarder twice sequentially, and the optical device, the linear polarizer, and the optical retarder are configured to cause the target light to pass through the optical retarder twice and the linear polarizer once sequentially.

In some implementations, the linear polarizer and the optical retarder are configured to cause the ambient light incident on the second side of the linear polarizer and the ambient light transmitted out from the first side of the linear polarizer to be in opposite polarization states.

In some implementations, the optical retarder is configured to perform at least one of: altering linearly polarized light passing through the optical retarder into circular polarized light, or altering circular polarized light passing through the optical retarder into linearly polarized light.

In some implementations, the optical retarder comprises a quarter-wave plate (QWP).

In some implementations, the optical retarder comprises an achromatic quarter-wave plate (QWP) or a wide-angle quarter-wave plate (QWP).

In some implementations, the quarter-wave plate is oriented at 45° to a transmission angle of the linear polarizer.

In some implementations, the target device is configured to: deflect the ambient light, without altering a polarization state of the ambient light, and deflect the target light, without altering a polarization state of the target light.

In some implementations, an intensity of the target light transmitted from the linear polarizer is about a half of an intensity of the target light deflected from the display.

In some implementations, the target device is a reflective device.

In some implementations, the linear polarizer and the optical retarder are arranged on a first side of the optical device, and the target device is arranged on a second side of the optical device that is opposite to the first side of the optical device, and the optical retarder is between the linear polarizer and the optical device.

In some implementations, the target light is deflected by the optical device with a first polarization state that is the same as the linear polarization state of the linear polarizer, the target light is incident on the linear polarizer from the second side of the linear polarizer with a circular polarization state, and the target light is incident on the target device with the first polarization state, and deflected back from the target device with the first polarization state.

In some implementations, the linear polarization state is a first linear polarization state, the ambient light is incident on a first side of the optical retarder with the first linear polarization state, and the optical retarder converts the first linear polarization state of the ambient light into a circular polarization state, the ambient light is deflected back from the target device with the circular polarization state to a second side of the optical retarder opposite to the first side of the optical retarder, and the optical retarder converts the circular polarization state of the ambient light to a second linear polarization state that is opposite to the first linear polarization state.

In some implementations, the first linear polarization state is one of S polarization state and P polarization state, and the second linear polarization state is the other one of S polarization stat and P polarization state.

In some implementations, the first linear polarization state is S polarization state, and the second linear polarization state is P polarization state.

In some implementations, the linear polarizer is arranged on a first side of the optical device, and the target device is arranged on a second side of the optical device that is opposite to the first side of the optical device, and the optical retarder is arranged on the second side of the optical device and between the optical device and the target device.

In some implementations, the linear polarization state is a first linear polarization state, the target light is deflected by the optical device with a second linear polarization state to be incident on a first side of the optical retarder, the second linear polarization state being opposite to the first linear polarization state, and the optical retarder converts the second linear polarization state of the target light into a circular polarization state, the target light is incident on the target device with the circular polarization state, and is deflected back from the target device with the circular polarization state to a second side of the optical retarder that is opposite to the first side of the optical retarder, and the optical retarder converts the circular polarization state of the target light into the first linear polarization state, and the target light is incident on the second side of the linear polarizer with the first linear polarization state and transmitted through the linear polarizer.

In some implementations, the linear polarization state is a first linear polarization state, the ambient light is incident on a first side of the optical retarder with the first linear polarization state, and the optical retarder converts the first linear polarization state of the ambient light into a circular polarization state, the ambient light is deflected back from the target device with the circular polarization state to the optical retarder, and the optical retarder converts the circular polarization state of the ambient light to a second linear polarization state that is opposite to the first linear polarization state, and the ambient light is incident on the second side of the linear polarizer with the second linear polarization state and is blocked by the linear polarizer.

In some implementations, the first linear polarization state is one of S polarization state and P polarization state, and the second linear polarization state is the other one of S polarization stat and P polarization state. In some implementations, the first linear polarization state is P polarization state, and the second linear polarization state is S polarization state.

In some implementations, the linear polarizer and the optical retarder are formed on the optical device, and the system further comprises an anti-reflection (AR) coating formed on the first side of the linear polarizer.

In some implementations, the target device comprises a plurality of elements forming an irregular pattern.

In some implementations, the optical device comprises: an optical guiding device configured to guide the target light to propagate along a first direction within the optical guiding device, the light having a spectral bandwidth with a peak wavelength; an in-coupling diffractive structure configured to diffract the light to propagate in the optical guiding device; and one or more out-coupling diffractive structures arranged downstream of the in-coupling diffractive structure along the first direction and configured to diffract at least part of the light out of the optical guiding device to the target device along a second direction different from the first direction.

In some implementations, the in-coupling diffractive structure is configured to cause a first optical dispersion for the light, and at least one of the one or more out-coupling diffractive structures is configured to cause a second optical dispersion for the light, and the first optical dispersion and the second optical dispersion are compensated with each other, such that light diffracted out of the optical guiding device has no or little optical dispersion.

In some implementations, the target light comprises light with different colors, and the in-coupling diffractive structure comprises a corresponding first diffraction grating for light with each of the different colors, and each of the plurality of out-coupling diffractive structures comprises a corresponding second diffraction grating for light with each of the different colors.

In some implementations, the linear polarizer and the optical retarder are formed on a same side of the optical device.

In some implementations, the linear polarizer and the optical retarder are formed on opposite sides of the optical device.

In some implementations, the target device comprises a display, a light sensor, or a camera.

In some implementations, the system further comprises the target device.

In some implementations, the target device is a display comprising: a backplane comprising a plurality of circuits; and a plurality of display elements arranged on the backplane, the plurality of display elements forming an irregular pattern, where each of the plurality of display elements is coupled to a respective circuit of the plurality of circuits.

In some implementations, the system further comprises: an illuminator configured to emit the target light; and a controller coupled to the display and the illuminator. The controller is configured to: transmit at least one control signal to at least one display element of the display for modulating at least one property of the at least one display element, sequentially modulate the display with information associated with a first color during a first time period and modulate the display with information associated with a second color during a second, sequential time period; and control the illuminator to sequentially turn on a first light emitting element to emit light with the first color during the first time period and a second light emitting element to emit light with the second color during the second, sequential time period.

Another aspect of the present disclosure features a device comprising: an optical device configured to deflect target light towards a target device, the target light being linearly polarized; a linear polarizer configured to transmit light with a linear polarization state; and an optical retarder configured to alter a polarization state of light passing through the optical retarder, where the linear polarizer and the optical retarder are configured to cause ambient light to pass through the linear polarizer once and the optical retarder twice sequentially to be blocked by the linear polarizer, and the optical device, the linear polarizer, and the optical retarder are configured to cause the target light to pass through the optical retarder twice and the linear polarizer once sequentially to be transmitted through the linear polarizer.

Another aspect of the present disclosure features a method comprising: determining whether a device to be formed is capable of suppressing light with higher diffractive orders with respect to a main order based on a plurality of shapes in an area for the device to be formed, each of the plurality of shapes uniquely corresponding to a respective point of a plurality of points in the area; if the device to be formed is capable of suppressing light with higher diffractive orders, for each of the plurality of shapes: determining whether a position relationship between the shape and the respective point satisfies one or more criteria, and if the position relationship between the shape and the respective point fails to satisfy the one or more criteria, modifying the shape to make a position relationship between the modified shape and the respective point satisfy the one or more criteria; and generating a profile of the device to be formed based on shapes satisfying the one or more criteria, the device to be formed comprising a plurality of elements to be formed each corresponding to a respective shape of the shapes satisfying the one or more criteria.

In some implementations, the method further comprises: if the position relationship between the shape and the respective point satisfies the one or more criteria, determining the shape to be a shape satisfying the one or more criteria.

In some implementations, the method further comprises: if the device to be formed is uncapable of suppressing light with higher diffractive orders, adjusting one or more parameters for generating the plurality of shapes to generate a plurality of new shapes in the area for the device based on the plurality of points in the area.

In some implementations, the method further comprises: generating a plurality of irregularly-spaced points in the area based on the plurality of points, each of the plurality of irregularly-spaced points corresponding to a respective point of the plurality of points; and generating the plurality of shapes in the area for the device to be formed based on the plurality of irregularly-spaced points according to an irregular pattern, each of the plurality of shapes uniquely enclosing a respective irregularly-spaced point of the plurality of irregularly-spaced points.

In some implementations, the plurality of points are regularly spaced in the area, and the plurality of points define a regularly spaced pattern.

In some implementations, generating the plurality of irregularly-spaced points in the area based on the plurality of points comprises: adding different offsets to the plurality of points to generate the plurality of irregularly-spaced points.

In some implementations, the method further comprises: determining the different offsets based on a Poisson noise distribution.

In some implementations, determining whether the device to be formed is capable of suppressing light with higher diffractive orders based on the plurality of shapes in the area for the device to be formed comprises: performing a discrete Fourier transform on centroids of the plurality of shapes; and determining whether the device to be formed is capable of suppressing light with higher diffractive orders based on a result of the discrete Fourier transform.

In some implementations, determining whether the device to be formed is capable of suppressing light with higher diffractive orders based on the result of the discrete Fourier transform comprises: determining a first intensity of light with the main order and a second intensity with the higher diffractive orders based on the result of the discrete Fourier transform; and determining whether a ratio of the first intensity of light with the main order and the second intensity with the higher diffractive orders is greater than a predetermined threshold.

In some implementations, the method further comprises: if the device to be formed is capable of suppressing light with higher diffractive orders based on the result of the discrete Fourier transform, fabricating a sample on a substrate according to the plurality of shapes, and measuring a diffractive pattern of the sample; determining whether the sample is capable of suppressing light with higher diffractive orders based on the measured diffractive pattern of the sample; if the sample is capable of suppressing light with higher diffractive orders based on the measured diffractive pattern of the sample, determining that the device to be formed is capable of suppressing light with higher diffractive orders; and if the sample is uncapable of suppressing light with higher diffractive orders based on the measured diffractive pattern of the sample, determining that the device to be formed is uncapable of suppressing light with higher diffractive orders.

In some implementations, fabricating the sample on the substrate according to the plurality of shapes comprises: etching a metal-coated substrate according to the plurality of shapes.

In some implementations, the method further comprises: fabricating a sample on a substrate according to the plurality of shapes, and measuring a diffractive pattern of the sample; determining whether the sample is capable of suppressing light with higher diffractive orders based on the measured diffractive pattern of the sample; if the sample is capable of suppressing light with higher diffractive orders based on the measured diffractive pattern of the sample, determining that the device to be formed is capable of suppressing light with higher diffractive orders; and if the sample is uncapable of suppressing light with higher diffractive orders based on the measured diffractive pattern of the sample, determining that the device to be formed is uncapable of suppressing light with higher diffractive orders.

In some implementations, determining whether the position relationship between the shape and the respective point satisfies the one or more criteria comprises: determining whether a distance between each vertex of the shape and the respective point is smaller than a predetermined threshold; and if the distance between a vertex of the shape and the respective point is smaller than the predetermined threshold, moving the vertex along a line between the vertex and the respective point to make a distance between the moved vertex and the respective point be greater than or identical to the predetermined threshold, and connecting the moved vertex with one or more other vertices of the shape.

In some implementations, each point of the plurality of points corresponds to a via for connecting to an element of the device to be formed based on a corresponding shape, and the predetermined threshold is determined based on at least one of a radius of the via, a fabrication tolerance, or a gap between adjacent elements of the plurality of elements to be formed.

In some implementations, determining whether the position relationship between the shape and the respective point satisfies the one or more criteria comprises: determining whether a distance between each edge of the shape and the respective point is smaller than a second threshold; and if the distance between an edge of the shape and the respective point is smaller than the second threshold, modifying the edge of the shape.

In some implementations, modifying the edge of the shape comprises: inserting a new vertex that is between two vertices of the edge and is spaced from the respective point with a distance no smaller than the predetermined threshold, and modifying the shape by connecting the new vertex with the two vertices of the edge respectively.

In some implementations, a line connecting the new vertex and the respective points is perpendicular to the edge. In some implementations, distances between new vertices and respective points are identical to a value greater than or identical to the predetermined threshold. In some implementations, distances between at least two new vertices and respective points are different.

In some implementations, modifying the edge of the shape is performed after determining that each vertex of the edge is spaced from the respective point with a corresponding distance no smaller than the predetermined threshold.

In some implementations, the method comprises: iteratively repeating (i) determining whether a distance between each vertex of the shape and the respective point is smaller than the predetermined threshold and (ii) determining whether a distance between each edge of the shape and the respective point is smaller than the second threshold until all shapes in the area satisfy the one or more criteria.

In some implementations, the second threshold is determined based on the predetermined threshold.

In some implementations, each shape of the shapes satisfying the one or more criteria has at least one of: a distance between each vertex of the shape and a respective point being no smaller than a first threshold, or a distance between each edge of the shape and the respective point is no smaller than second threshold.

In some implementations, the method further comprises: performing a discrete Fourier transform on centroids of the shapes satisfying the one or more criteria; and determining whether the device to be formed is capable of suppressing light with higher diffractive orders based on a result of the discrete Fourier transform.

In some implementations, the method further comprises: if the device to be formed is capable of suppressing light with higher diffractive orders based on the result of the discrete Fourier transform, fabricating a sample on a substrate according to the shapes, and measuring a diffractive pattern of the sample; determining whether the sample is capable of suppressing light with higher diffractive orders based on the measured diffractive pattern of the sample; and if the sample is capable of suppressing light with higher diffractive orders based on the measured diffractive pattern of the sample, determining that the device to be formed is capable of suppressing light with higher diffractive orders, where generating the profile of the device to be formed is in response to determining that the device to be formed is capable of suppressing light with the higher diffractive orders.

Another aspect of the present disclosure features a method of fabricating an irregular device, comprising: forming a plurality of elements on a backplane comprising a plurality of circuits, where each of the plurality of elements comprises a metallic electrode, metallic electrodes of the plurality of elements being isolated from one another and forming an irregular pattern, where each of the metallic electrodes is coupled to a respective circuit of the plurality of circuits in the backplane through a corresponding via of a plurality of vias, and where a position relationship between the metallic electrode and the corresponding via satisfies one or more criteria.

In some implementations, the position relationship between the metallic electrode and the corresponding via comprises: a distance between each vertex of a shape of the metallic electrode and a central point of the corresponding via being no smaller than a first threshold; and a distance between each edge of the shape and the central point is no smaller than second threshold.

In some implementations, at least one of the first threshold or the second threshold is determined based on at least one of a radius of the corresponding via, a fabrication tolerance, or a gap between adjacent metallic electrodes.

In some implementations, forming the plurality of elements comprises: forming a metallic layer on top of the plurality of vias; and patterning the metallic layer according to the irregular pattern to obtain the metallic electrodes.

In some implementations, the method further comprises: before forming the plurality of elements, aligning a patterning beam with positions of the plurality of vias on the backplane.

In some implementations, aligning the patterning beam with the positions of the plurality of vias on the backplane comprises: aligning the patterning beam with at least one alignment mark on a peripheral area of the plurality of elements; forming a testing pattern in an area of the plurality of elements, where the testing pattern comprises one or more shapes; determining whether a corresponding via is located in a region defined by the one or more shapes; and if a targeted via is located in the region defined by the one or more shapes, determining that the patterning beam is aligned with the positions of the plurality of vias, where the plurality of elements is formed in response to determining that the patterning beam is aligned with the positions of the plurality of vias.

In some implementations, the method comprises: if the targeted via is out of the region defined by the one or more shapes of the testing pattern, aligning again the patterning beam with the positions of the plurality of vias on the backplane.

In some implementations, the region defined by the one or more shapes has a size no greater than a tolerance distance for the plurality of vias, and the tolerance distance is determined based on at least one of a radius of the plurality of the vias, a fabrication tolerance, or a gap between adjacent metallic electrodes.

In some implementations, forming the plurality of elements on the backplane is based on a profile of the irregular device, the profile of the irregular device comprising information of a plurality of shapes each corresponding to a respective metallic electrode of the metallic electrodes, and the position relationship between the metallic electrode and the corresponding via is determined based on information of a corresponding shape of the metallic electrode and information of a central point of the corresponding via.

In some implementations, the plurality of elements is distributed into a plurality of panels that are adjacently arranged on the backplane, and the method comprises: aligning, for each panel of the plurality of panels, the patterning beam with positions of vias in the panel, and after the alignment, forming corresponding metal electrodes in the panel.

In some implementations, the plurality of vias are regularly spaced on the plurality of circuits. In some implementations, among the plurality of vias, at least two pairs of adjacent vias have different spaces.

In some implementations, forming the plurality of elements comprises: forming a first alignment layer on top of the metallic electrodes; forming separate spacers on the first alignment layer; forming a liquid crystal layer on the first alignment layer; forming a second alignment layer on top of the plurality of the liquid crystal layer and the separate spacers; and forming a transparent conductive layer on top of the second alignment layer as a common electrode.

Another aspect of the present disclosure features a device comprising: a backplane comprising a plurality of circuits; and a plurality of elements arranged on the backplane, where each of the plurality of elements comprises a metallic electrode, where each of the metallic electrodes is coupled to a respective circuit of the plurality of circuits in the backplane through a corresponding via of a plurality of vias, and where a position relationship between the metallic electrode and the corresponding via satisfies one or more criteria.

Another aspect of the present disclosure features a system comprising: a device and a controller. The device comprises: a backplane comprising a plurality of circuits; and a plurality of elements arranged on the backplane, where each of the plurality of elements comprises a metallic electrode, where each of the metallic electrodes is coupled to a respective circuit of the plurality of circuits in the backplane through a corresponding via of a plurality of vias, and where a position relationship between the metallic electrode and the corresponding via satisfies one or more criteria. The controller is coupled to the device and configured to transmit at least one control signal to at least one element of the device for modulating at least one property of the at least one element.

Another aspect of the present disclosure features a device, comprising: a plurality of elements arranged in rows and columns; and a controller coupled to the plurality of elements, the controller comprising a plurality of driving circuits and a plurality of row scanners. Each of the plurality of elements is coupled to a respective driving circuit of the plurality of driving circuits. The plurality of row scanners comprise a row scanner having a series of selectors that are arranged in a column between two adjacent columns of elements, each selector of the series of selectors being configured to select a corresponding row of elements through corresponding driving circuits coupled to the corresponding row of elements.

In some implementations, the plurality of elements comprise a column of elements arranged on the series of selectors of the row scanner, the column of elements being between the two adjacent columns of elements.

In some implementations, each of the plurality of elements comprises a respective electrode, and an electrode of an element of the column of elements is coupled to an electrode of a corresponding element in one of the two adjacent columns of elements.

In some implementations, the respective electrodes of the plurality of elements are coupled to the plurality of driving circuits by conductive vias that are regularly spaced.

In some implementations, the column of elements comprises a first element and a second element adjacent to the first element along the column of elements. An electrode of the first element is coupled to an electrode of a first neighboring element in a first column of the two adjacent columns of elements, and an electrode of the second element is coupled to an electrode of a second neighboring element in a second column of the two adjacent columns of elements. The first element and the first neighboring element are in a same first row, and the second element and the second neighboring element are in a same second row adjacent to the same first row.

In some implementations, each of the plurality of elements comprises a respective electrode, and respective electrodes of the column of elements are coupled together to a driver configured to set a fixed value or randomized values for each refresh of the column of elements.

In some implementations, the plurality of elements form an irregular pattern. The irregular pattern comprises a Voronoi pattern. In some implementations, at least one element of the plurality of elements has an irregular polygon shape. In some implementations, adjacent elements of the plurality of elements have different shapes.

In some implementations, a row of elements extends along a first direction, and a column of elements extends along a second direction perpendicular to the first direction, the row scanner is a first row scanner coupled to a first plurality of elements coupled to a plurality of first driving circuits in a first panel, and where the plurality of row scanners comprises a second row scanner coupled to a second plurality of elements coupled to a plurality of second driving circuits in a second panel, and the first panel and the second panel are arranged along the second direction.

In some implementations, the controller comprises control circuits arranged on a peripheral area adjacent to the plurality of elements, the control circuits comprise a first control circuit and a second control circuit that are on opposite sides of the plurality of elements, and the first control circuit is adjacent to and coupled to the plurality of first driving circuits in the first panel, and the second control circuit is adjacent to and coupled to the plurality of second driving circuits in the second panel.

In some implementations, the first control circuit comprises: a digital circuit configured to receive digital data for modulating the first plurality of elements, and an analog circuit comprising: one or more digital-analog-converter (DAC)s coupled to the digital circuit and configured to convert the digital data into corresponding analog voltage signals, and one or more drivers coupled to the plurality of first driving circuits and configured to drive each of the analog voltage signals to a respective first driving circuit of the plurality of first driving circuits to modulate a corresponding element of the first plurality of elements.

In some implementations, a row of elements extends along a first direction, and a column of elements extends along a second direction perpendicular to the first direction, and the controller comprises control circuits that are stacked together with the plurality of driving circuits and the plurality of row scanners along a third direction perpendicular to the first direction and the second direction.

In some implementations, the plurality of driving circuits and the plurality of row scanners are arranged in a first layer, and the control circuits are arranged in a second layer, and the first layer and the second layer are stacked along the third direction.

In some implementations, the plurality of elements comprise a common electrode, and each of the plurality of elements comprises a respective metallic electrode. The driving circuit comprises: a selection switch, a transfer switch, a reset switch that are coupled in series between a first input and a second input of the driving circuit, where the driving circuit is configured to receive a first input voltage at the first input and a second input voltage at the second input, a first capacitor having a first terminal coupled between the transfer switch and the reset switch and a second terminal coupled to the second input, the first terminal of the first capacitor being coupled to a metallic electrode of a corresponding element associated with the driving circuit, and a second capacitor having a first terminal coupled between the selection switch and the transfer switch and a second terminal coupled to an output of the driving circuit, where a voltage at the metallic electrode of the corresponding element is identical to a voltage at the first terminal of the first capacitor, and a change of the voltage at the first terminal of the first capacitor is based on a change of the first input voltage, a capacitance of the first capacitor, and a capacitance of the second capacitor.

In some implementations, the plurality of elements comprise a common electrode, and each of the plurality of elements comprises a respective metallic electrode, the driving circuit is a differential circuit that comprises a capacitor having a first terminal coupled to a first circuit portion of the driving circuit and a second terminal coupled to a second circuit portion of the driving circuit, the first terminal being coupled to a metallic electrode of a corresponding element associated with the driving circuit, and a voltage at the metallic electrode of the corresponding element is identical to a voltage at the first terminal of the capacitor, and a change of the voltage at the first terminal is based on a difference between a first input voltage of the first circuit portion and a second input voltage of the second circuit portion.

In some implementations, a selector of the row scanner comprises a shift register with a flip-flop or a latch.

Another aspect of the present disclosure features a device comprising: a plurality of elements, where the plurality of elements comprises a common electrode, and each of the plurality of elements comprises a respective metallic electrode, metallic electrodes of the plurality of elements being isolated from one another; and a controller coupled to the plurality of elements, where the controller comprises a plurality of driving circuits, where each of the plurality of elements is coupled to a respective driving circuit of the plurality of driving circuits. A driving circuit of the plurality of driving circuits comprises a capacitor having a first terminal coupled to a first circuit portion of the driving circuit and a second terminal coupled to a second circuit portion of the driving circuit, the first terminal being coupled to a metallic electrode of a corresponding element associated with the driving circuit, and a voltage at the metallic electrode of the corresponding element is identical to a voltage at the first terminal of the capacitor, and a change of the voltage at the first terminal is based on a difference between a first input voltage of the first circuit portion and a second input voltage of the second circuit portion.

In some implementations, the corresponding element is configured to be modulated based on a difference of a common voltage applied on the common electrode and the voltage at the first terminal, the driving circuit is configured to drive the corresponding element during a refresh time period having a negative period and a positive period, the common voltage applied on the common electrode is set to a first fixed voltage during the negative period and to a second fixed voltage during the positive period, the first fixed voltage being higher than the second fixed voltage, the first input voltage is configured to vary from a first higher input voltage to a first lower input voltage during the negative period and to vary from the first lower input voltage to the first higher input voltage during the positive period, and the second input voltage is configured to vary from a second lower input voltage to a second higher input voltage during the negative period and to vary from the second higher input voltage to the second lower input voltage during the positive period.

In some implementations, the first lower input voltage is identical to the second lower input voltage, and the first higher input voltage is identical to the second higher input voltage.

In some implementations, the driving circuit comprises a first input as an input of the first circuit portion configured to receive the first input voltage, a second input as an input of the second circuit portion configured to receive the second input voltage, and a third input configured to receive a third input voltage, the second terminal of the capacitor is coupled to the third input of the driving circuit and configured to receive the third input voltage, and a sum of the first input voltage and the second input voltage is identical to twice of the third input voltage.

In some implementations, the capacitor is a first capacitor, and the driving circuit comprises a second capacitor, and a first terminal of the second capacitor is coupled to a node between an input for the first circuit portion and the first terminal of the first capacitor in the first circuit portion, and a second terminal of the second capacitor is coupled to a node between an input for the second circuit portion and the second terminal of the first capacitor in the second circuit portion.

In some implementations, the change of the voltage at the first terminal is based on a capacitance of the first capacitor and a capacitance of the second capacitor, where the change of the voltage at the first terminal satisfies an expression as below:

$$\Delta vPe = 2\frac{Cs}{Cs + Ce} * \Delta vDat,$$

where ΔvPe represents the change of the voltage at the first terminal, Ce represents the capacitance of the first capacitor, Cs represents the capacitance of the second capacitor, ΔvDat represents the difference between the first input voltage and the second input voltage.

In some implementations, a ratio of the capacitance of the second capacitor Cs and the capacitance of the first capacitor Ce is greater than 1.

In some implementations, the first circuit portion comprises a first selection switch and a first transfer switch coupled in series between the input of the first circuit portion and the first terminal of the first capacitor, the first terminal of the second capacitor being coupled between the first selection switch and the first transfer switch, and the second circuit portion comprises a second selection switch and a second transfer switch coupled in series between the input of the second circuit portion and the second terminal of the first capacitor, the second terminal of the second capacitor being coupled between the second selection switch and the second transfer switch.

In some implementations, the first selection switch and the second selection switch are configured to receive a same selection signal to be simultaneously turned on or off, and the first transfer switch and the second transfer switch are configured to receive a same transfer signal to be simultaneously turned on or off.

In some implementations, the driving circuit further comprises a reset switch coupled between the first terminal of the first capacitor and the second terminal of the first capacitor, where the reset switch is configured to receive a reset signal to reset the voltage at the metallic electrode.

In some implementations, at least one of the first selection switch, the second selection switch, the first transfer switch, the second transfer switch, or the reset switch comprises a transistor.

In some implementations, the driving circuit is configured to operate in a series of states comprising:
i) a waiting state, during which the first selection switch, the second selection switch, the first transfer switch, the second transfer switch, and the reset switch are turned off,
ii) a sampling state, during which the first selection switch and the second selection switch are turned on to receive the first input voltage at the first terminal of the second capacitor and the second input voltage at the second terminal of the second capacitor, and the first transfer switch, the second transfer switch, and the reset switch are turned off,
iii) a resetting state, during which the first selection switch, the second selection switch, the first transfer switch, and the second transfer switch are turned off, and the reset switch is turned on to reset the voltage at the metallic electrode to be same as a reset voltage of the driving circuit, and
iv) a transferring state, during which the first selection switch, the second selection switch, and the reset switch are turned off, and the first transfer switch and the second transfer switch are turned on, such that the voltage at the first terminal of the first capacitor is identical to a voltage at the first terminal of the second capacitor, and the voltage at the second terminal of the first capacitor is identical to a voltage at the second terminal of the second capacitor.

In some implementations, the voltage at the second terminal of the first capacitor and the voltage at the second terminal of the second capacitor are identical to the reset voltage of the driving circuit.

In some implementations, during the transferring state, the voltage at the first terminal of the first capacitor satisfies an expression as below:

$$vPe = vSp = \frac{Cs}{Cs + Ce} * (vDatp - vDatn) + vCm,$$

where vPe represents the voltage at the first terminal of the first capacitor, vSp represents the voltage at the first terminal of the second capacitor, Ce represents a capacitance of first capacitor, Cs represents a capacitance of the second capacitor, vDatp represents the first input voltage, vDatn represents the second input voltage, and vCm represents the reset voltage.

In some implementations, the corresponding element is configured to be modulated based on a difference of a common voltage applied on the common electrode and the voltage at the first terminal, where the driving circuit is configured to drive the corresponding element during a refresh time period having a negative period and a positive period, where the common voltage applied on the common electrode is set to a first fixed voltage during the negative period and to a second fixed voltage during the positive period, the first fixed voltage being higher than the second fixed voltage, and where the common voltage is changed from the first fixed voltage to the second fixed voltage during the resetting state and before the transferring state.

Another aspect of the present disclosure features a device comprising: a first integrated structure comprising a plurality of elements extending in rows along a first direction and in columns along a second direction perpendicular to the first direction; and a second integrated structure comprising control circuits for the plurality of elements, the first integrated structure and the second integrated structure are stacked together along a third direction perpendicular to the first direction and the second direction, the plurality of elements form an irregular pattern.

In some implementations, the first integrated structure comprises a plurality of driving circuits, each of the plurality of driving circuits being coupled to a respective element of the plurality of elements.

In some implementations, the first integrated structure comprises a plurality of row scanners, where the plurality of row scanners comprise a row scanner having a series of selectors that are arranged under a column of elements between two adjacent columns of elements, each selector of the series of selectors being configured to select a corresponding row of elements through corresponding driving circuits coupled to the corresponding row of elements.

In some implementations, the first integrated structure comprises a plurality of row scanners coupled to the plurality of driving circuits, and the plurality of row scanners and the plurality of driving circuits are stacked together along the third direction.

In some implementations, the plurality of elements comprise a common electrode, and each of the plurality of elements comprises a respective metallic electrode, a driving circuit of the plurality of driving circuits comprises a capacitor having a first terminal coupled to a first circuit portion of the driving circuit and a second terminal coupled to a second circuit portion of the driving circuit, the first terminal being coupled to a metallic electrode of a corresponding element associated with the driving circuit, and a voltage at the metallic electrode of the corresponding element is identical to a voltage at the first terminal of the capacitor, and a change of the voltage at the first terminal is based on a difference between a first input voltage of the first circuit portion and a second input voltage of the second circuit portion.

In some implementations, the control circuits comprise: digital circuits configured to receive digital data for modulating the plurality of elements, and analog circuits each comprising: one or more digital-analog-converter (DAC)s coupled to a corresponding digital circuit and configured to convert corresponding digital data into corresponding analog voltage signals, and one or more drivers coupled to corresponding driving circuits and configured to drive each of the analog voltage signals to a respective driving circuit of the corresponding driving circuits to modulate a corresponding element of the plurality of elements.

In some implementations, the first integrated structure and the second integrated structure are integrated together by bonding. The bonding can include at least one of direct bonding or hybrid bonding.

The present disclosure provides technology that can overcome limitations present in known technologies. As an example, the technology disclosed herein can be implemented without the use of cumbersome wearable devices, such as "3D glasses." As another example, the technology disclosed herein can optionally be implemented without being limited by the accuracy of tracking mechanisms, the quality of the display devices, relatively long processing times and/or relatively high computational demands, and/or by an inability to display objects to multiple viewers simultaneously. As a further example, the technology can be implemented without specialized tools and software to develop contents that extend above and beyond the tools and software used in conventional 3D content creation. Various embodiments can exhibit one or more of the foregoing advantages. For example, certain implementations of the present disclosure can produce real-time, full color, genuine 3D images that appear to be real 3D objects in the world and can be viewed without encumbrances by multiple viewers simultaneously from different points.

In the present disclosure herein, the term "primitive" refers to a basic element for input or output within a computing system. The element can be a geometric element or a graphical element. For example, in vector computer graphics, CAD systems, and geographic information systems, geometric primitive (or prim) is the simplest (e.g., 'atomic' or irreducible) geometric shape that the system can handle (e.g., draw, store). The term "vertex" refers to a node of a primitive that can be connected with one or more other nodes to form the primitive. The term "hologram" refers to a pattern displayed by (or uploaded to) a display which contains amplitude information or phase information, or some combination thereof, regarding an object. The term "holographic reconstruction" refers to a volumetric light field (e.g., a holographic light field) from a display when illuminated.

As used herein, the term "irregular" represents "non-periodic" and/or "non-uniform". For example, the term "irregular shape" can indicate that a shape has sides and/or angles with different lengths and/or sizes. The term "irregular pattern" can indicate that: i) components (e.g., phasels) in an area of the pattern are arranged in a non-periodic way, and the components can be same or different from each other, or ii) the components have different irregular shapes.

Shading is a process of adding value to create an illusion of form, space, and light in a drawing. Shading can make a drawing appear three dimensional and create a convincing image. Shading can be different from techniques of adding shadows, such as shadow mapping or shadow volumes, which fall under global behavior of light. The term "shading information" refers to depiction information of depth perception in 3D models (e.g., within the field of 3D computer graphics) or illustrations (e.g., in visual art) by varying a level of darkness. Shading information can approximate a local behavior of light on an object's surface. The shading information can be obtained by any customary CGI surface shading method that involves modulating color or brightness of a surface of the primitive. Primitive data disclosed herein can include shading information associated with the primitive.

The term "view-dependent shading information" can be a larger generalization of the term "geometric specular reflection". Specular reflection is a subset of view-dependent shading. Specular reflection is something like a blurred, recolored image of a light source that is described by bi-directional reflectance distribution function ("BRDF") of a particular material. like plastic or shiny wood. View-dependent shading can encompass specular BRDFs as well as perfect mirror surfaces and image-based lighting. For example, to render a spherical Christmas decoration, an image of the environment surrounding the decoration and an environment that also includes the positions and sizes of each light source can be reflected, and the position of the viewer can be part of that reflection calculation. The reflection appears to move as a viewpoint is changed, revealing different parts of the environment. Similarly, the position of the bright specular area on a plastic surface can be the sum of view-dependent projections of the Christmas lights reflected off the spherical decoration multiplied by the BRDF. Primitive data disclosed herein can include view-dependent shading information associated with the primitive.

The details of one or more implementations of the subject matter of this specification are set forth in the accompanying drawings and associated description. Other features, aspects, and advantages of the subject matter will become apparent from the description, the drawings, and the claims.

It is to be understood that various aspects of implementations can be combined in different manners. As an example, features from certain methods, devices, or systems can be combined with features of other methods, devices, or systems.

DESCRIPTION OF DRAWINGS

FIG. 4A illustrates example tables of vertex data and primitive data.

FIG. 4E is a flowchart of an example process of calculating EM field contributions using a processing device.

FIG. 7D-2 illustrates an example system with single-color multi-extraction illumination with display zero order suppression and/or color crosstalk suppression.

FIG. 8D-1 illustrates an example of managing tessellation of adjacent primitives for primitive kissing.

FIG. 8D-2 illustrates another example of managing tessellation of adjacent primitives for primitive kissing.

FIG. 8E-1 illustrates an example of managing tessellation of adjacent primitives for overlapping effect.

FIG. 8E-2 illustrates another example i of managing tessellation of adjacent primitives for overlapping effect.

FIG. 8F is a flowchart of an example process of managing tessellation of primitives for 3D displaying.

FIG. 9D-1 is a flowchart of an example process of designing an irregular display based on fabrication tolerances.

FIG. 9D-2 is a flowchart of an example process depicting steps of the process of FIG. 9D-1.

FIG. 9F illustrates an example result of Discrete Fourier Transform (DFT) of the designed plurality of shapes of FIG. 9E.

FIG. 9K illustrates an example result of DFT of the plurality of shapes of FIG. 9J.

FIG. 13C depicts a multilayer device with an array of elements.

FIG. 14D-1 depicts a system including multiple driving circuits with an embedded row scanner.

FIG. 14D-2 depicts a schematic of an embedded row scanner between columns of elements.

FIG. 14D-3 depicts a circuit diagram of a row scanner.

Like reference numbers and designations in the various drawings indicate like elements.

DETAILED DESCRIPTION

Figure 1A:
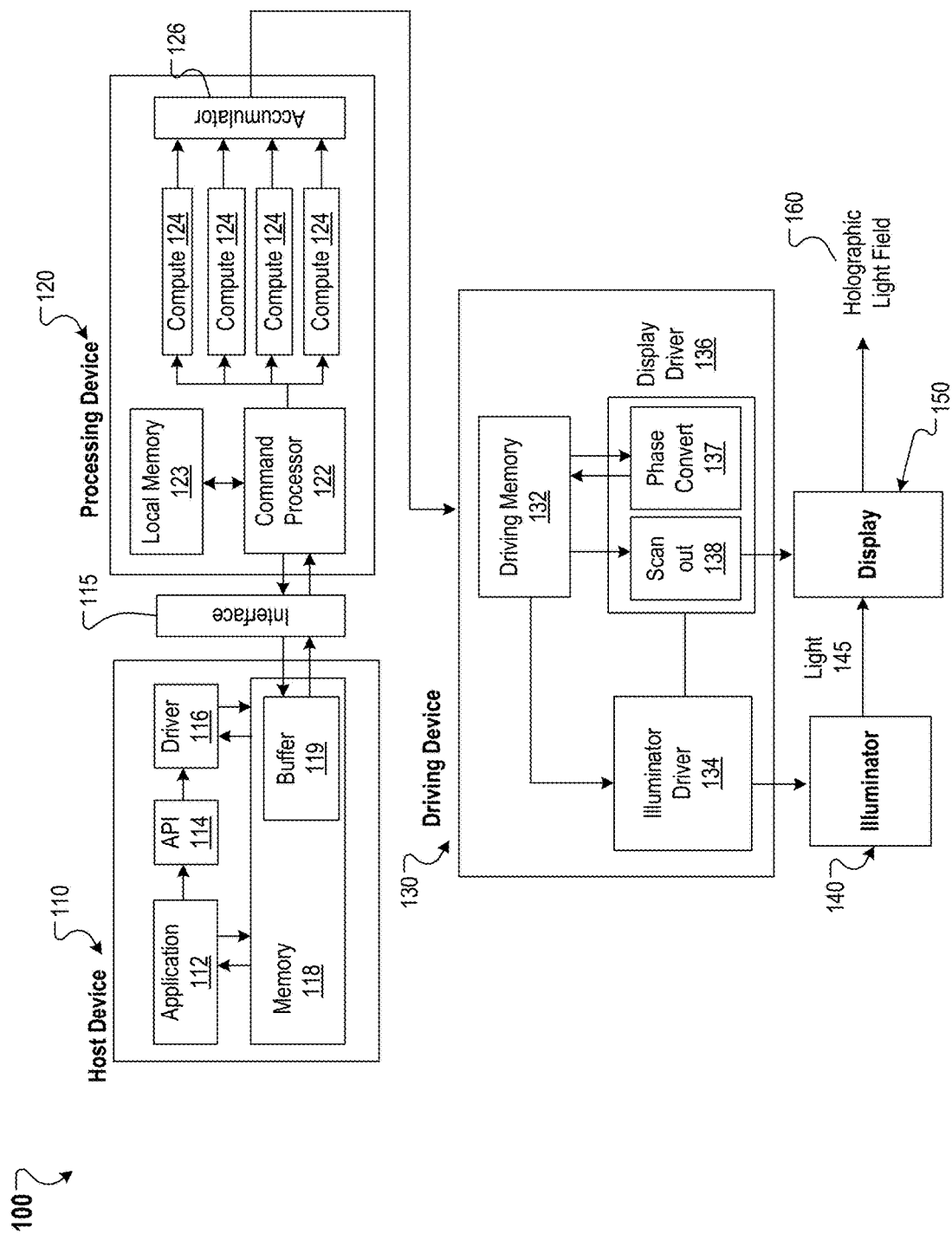
FIG. 1A illustrates a schematic diagram of an example system for 3D display.

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

Implementations of the present disclosure are described herein according to the following general outline:

1. General Overview
2. System Overview
   2.1 Application programming interface (API)
   2.2 Processing Device
   2.3 Driving Device
   2.4 Display
   2.5 Example System for 3D Display
3. Electromagnetic (EM) Computations
   3.1 EM Field Contributions for Primitives
   3.2 Computations for Primitives
   3.3 Computation Implementation
4. Holographic Display Systems
   4.1 Example System Setups
   4.2 Bottom Illumination
   4.3 Side Illumination
   4.4 Dispersion Compensation
   4.5 Field Gratings with Low Diffraction Efficiency
   4.6 Multi-Extraction Illumination
   4.7 Ambient Light Blocking
5. Display Implementations
6. Primitive Tessellations
   6.1 Primitive Kissing
   6.2 Primitive Overlapping
   6.3 Example Processes
7. Irregular Displays
   7.1 Designing Irregular Displays
   7.2 Designing with Fabrication Tolerances
   7.3 Example Irregular Displays and Fabrication Processes
8. Integrated Circuit Designs for Displays
9. Occlusion and Specular Lighting
10. Texture Mapping
11. Calibration
    11.1 Phase Calibration
    11.2 Alignment Calibration
    11.3 Color Calibration 1. General Overview Implementations of the present disclosure feature technologies for enabling 3D displays of complex computer-generated scenes as genuine holograms. The technologies provide a novel and deterministic solution to real time dynamic computational holography based upon Maxwell's Equations for electromagnetic fields, which can be represented as MAXWELL HOLOGRAPHY® (or MAXWELL HOLOGRAPHY™). The calculation (or computation) in MAXWELL HOLOGRAPHY® can be represented as Maxwell holographic calculation (or Maxwell holographic computation). In embodiments, the disclosure approaches a hologram as a Dirichlet or Cauchy boundary condition problem for a general electric field, utilizing tools including field theory, topology, analytic continuation, and/or symmetry groups, which enables to solve for holograms in real time without the limitations of legacy holographic systems. In embodiments, the technologies can be used to make phase-only, amplitude-only, or phase-and-amplitude holograms, utilizing spatial light modulators (SLMs) or any other holographic devices.

Implementations of the present disclosure can provide: 1) a mechanism of approximation of a hologram as an electromagnetic boundary condition, using field theory and contact geometry, instead of classic optics; 2) derivation and implementation into computer codes and application programming interfaces (APIs) of the electromagnetic boundary condition approach to computational holography, that is, implementation of the hologram calculation as a 2D analytic function on a plane of the hologram and subsequent discretization into parallel algorithms; and/or 3) implementation of a complete set of fully 3D, holographic versions of standard computer graphics primitives (e.g., point, line, triangle, and texture triangle), which can enable full compatibility with standard existing computer graphics tools and techniques. The technologies can enable devices to display general existing content that is not specifically created for holography, and simultaneously allows existing content creators to create holographic works without having to learn special techniques, or use special tools.

The technologies disclosed herein can involve the use of a mathematical formulation (or expression) of light as an electromagnetic (EM) phenomenon in lieu of the mathematical formulation of classical optics that is commonly used in computational holography, e.g., the Gerchberg-Saxton (G-S)

algorithm. The mathematical formulation can be derived from Maxwell's Equations. In embodiments, the technologies disclosed herein involve treating the displayed image as an electromagnetic field and treating a hologram as a boundary value condition that produces the electromagnetic field (e.g., a Dirichlet problem). Additionally, a desired image can be constructed using a primitive (or vertex) paradigm ubiquitous in computer graphics, allowing, for example, the technologies to be used to display any 3D imagery as a holographic reconstruction, e.g., a holographic light field, instead of as a projective image on a 2D screen. Compared to depth point clouds technologies that suffer from bandwidth limitations, the technologies can avoid these limitations and use any suitable types of primitives, e.g., a point primitive, a line primitive, or a polygon primitive such as a triangle primitive. Moreover, the primitives can be rendered with color information, texture information, and/or shading information. This can help achieve a recording and compression scheme for CG holographic content including holographic videos.

In embodiments, the technologies disclosed herein use Maxwell's Equations to compute generated holograms as a boundary condition problem for modeling an electromagnetic field, which can remove dependency on the fast Fourier transform (FFT) and its inherent limitations, remove dependency on collimated light sources such as lasers or light emitting diodes (LEDs), and/or remove limitations of previous approaches to computational holography and non-deterministic solutions.

In embodiments, the technologies disclosed herein can be optimized for computational simplicity and speed through a mathematical optimization process that constrains independent inputs to a surface of the hologram, depending on parameters of computer-generated (CG) primitives needed to build the scene. This allows work to be performed in a highly parallel and highly optimal fashion in computing architectures, e.g., application specific integrated circuits (ASIC) and multicore architectures. The process of computing the hologram can be considered as a single instruction that executes on input data in a form of a computer-generated imagery (CGI) scene, and can theoretically be completed in a single clock cycle per CGI primitive.

In embodiments, the technologies disclosed herein treat a holographic scene as an assembly of fully 3D holographic primitive apertures which are functionally compatible with the standard primitives of conventional 3D graphics as employed in, for example, video games, movies, television, computer displays, or any other display technologies. The technologies can enable efficient implementation of these aperture primitives in hardware and software without limitations inherent in standard implementations of computational holography. Amplitude and color of the primitives can be automatically computed. Computational complexity can increase linearly with phase element number n, compared to $n^2$ or $n*\log(n)$ in standard computational holography. The images created are fully 3D and not an assemblage of planar images, and the technologies do not require iterative amplitude correction with unknown numbers of steps. Moreover, the generated holograms do not have "conjugate" images that take up space on the holographic device.

As the holographic primitives (or vertices of primitives) are part of a special collection of mathematical objects, they can be relatively simple and relatively fast to compute, and they can be uniquely suited to parallel, distributed computing approaches. The computability and parallelism can allow for interactive computation of large holograms to design large area holographic devices of theoretically unlimited size, which can act as holographic computer displays, phone displays, home theaters, and even holographic rooms. Moreover, the holograms can fill large areas with light, e.g., rendering large shaded areas in 3D, without limitations associated with conventional holographic computation methods which can cause elements to appear in outline instead of solid. Furthermore, the relatively simple and relatively fast computation allows for the display of real-time holograms at interactive speeds that are not constrained by $n^2$ computational load and by iterative amplitude correction.

In embodiments, the technologies can realize natural computability on modern ASIC and multicore architectures and can realize complete compatibility with modern graphics hardware, modern graphics software, and/or modern graphics tools and tool chains. For example, the technologies can implement clear and simple holographic APIs and enable high performance rendering of arbitrary CG models using conventional 3D content creation tools or software applications, e.g., 3ds Max®, SOLIDWORKS®, Maya®, or Unity, through the APIs. The APIs can enable developers or users to interact with a holographic device, e.g., a light modulator or holographic system. The holographic APIs can create computer graphics primitives as discrete holographic scene primitives, allowing for rich holographic content generation utilizing general purpose and specially designed holographic computation hardware. The creation of a mathematical and computational architecture can allow holograms to be rendered using the tools and techniques used to make conventional 3D content and software applications. The optimization of the mathematical and computational architecture can allow for performant embodiments of conventional graphics and renderings to be displayed as holographic reconstructions.

Algorithms in the technologies disclosed herein are relatively simple to implement in hardware. This not only allows the computational speeds needed for high quality rendering that users expect, but it also allows the algorithms to be implemented in relatively simple circuits, e.g., ASIC gate structures or FPGAs, as part of a holographic device. Accordingly, bandwidth issues that can plague high density displays can become irrelevant, as computation of scenes can be spread across the computing architecture built into the display device (e.g., built-in-computation) instead of having to be computed remotely and then written to each display element (or display pixel) of the display for each frame of content. It also means that the number of display elements, and thus the size of a holographic display, can be relatively unbounded by constraints that severely limit other technologies. In some implementations, the circuits that implement the algorithms can be formed as a circuit board to be integrated in a computing device (e.g., via a PCIe slot). The circuits can generate a hologram to be output to the display device for display. This may simplify the design of the display device for ease implementation.

The technologies disclosed herein can enable multiple interactive technologies using structured light to be implemented relatively simply and relatively inexpensively in different applications, including, for example, solid-state light detection and ranging (LIDAR) devices, 3D printing and machining, smart illuminators, smart microdisplays, optical switching, optical tweezers, or any other applications demanding structured light. The technologies disclosed herein can be also used for optical simulations, e.g., for grating simulations.

2. System Overview

FIG. 1A illustrates a schematic diagram of an example system 100 for 3D display. The system 100 can include a host device 110, a processing device 120, a driving device 130, an illuminator 140, and a display 150. The system 100 can be configured to reconstruct 2D/3D objects generated (e.g., configured or designed) in the host device 110 by the illuminator 140 illuminating the display 150 that is modulated with corresponding holograms generated by the processing device 120 and the driving device 130. As discussed with further details below, a number of techniques can be implemented in the system 100 to achieve 3D reconstruction/display with fast computation speed, high display refresh rate, high image quality, and high performance.

In some implementations, the host device 110 is configured to prepare data for a list of primitives corresponding to at least one object, e.g., a 3D object, and transmit the data to the processing device 120 via an interface 115, e.g., PCIe slot or any other high speed connection. The processing device 120 is configured to compute electromagnetic (EM) field contributions from each of the list of primitives to each of display elements of the display 150 (e.g., a modulator) and output a hologram to the driving device 130. Herein, the hologram refers to modulation data for the display 150, which contains complex information, amplitude information or phase information, or some combination thereof, regarding the at least one object. The driving device 130 is configured to generate control signals based on the hologram to modulate the display elements of the display 150, which diffracts light 145 from the illuminator 140 to form a holographic light field 160 corresponding to the at least one object in a 3D space. The holographic light field 160 can be a volumetric light field from the display 150 when illuminated, and can be also referred to holographic reconstruction. The holographic reconstruction includes at least one reconstructed object corresponding to the at least one object generated (e.g., configured or designed) in the host device 110.

The processing device 120 can be implemented as, for example, an ASIC, an FPGA, an integrated circuit, one or more computing units, or any combination thereof. In some implementations, the processing device 120 is packaged as a circuit board integrated in the host device 110 through a PCIe slot in the host device 110. In some implementations, the processing device 120 is integrated with the driving device 130, e.g., to function as a controller, which can be externally coupled to the host device 110 and the display 150 and/or the illuminator 140. In some implementations, the processing device 120 and the driving device 130 are integrated with the display 150 (and optionally the illuminator 140), e.g., attached together, to form an integrated device, which can be referred to as a holographic display device.

The host device 110 can be a computing device associated with a user (e.g., an operator, a developer, a programmer, a customer, or any suitable entity). The host device 110 can be any appropriate type of device, e.g., a desktop computer, a personal computer, a notebook, a tablet computing device, a personal digital assistant (PDA), a network appliance, a smart mobile phone, a smartwatch, an enhanced general packet radio service (EGPRS) mobile phone, a media player, a navigation device, an email device, a game console, or any appropriate combination of any two or more of these computing devices or other computing devices.

The host device 110 includes an operating system running a number of applications 112 as graphics engines. An application 112 can process or render a scene, e.g., any arbitrary computer-generated (CG) model using standard 3D content creation tools or 3D software application, e.g., 3ds Max®, SOLIDWORKS®, Maya®, or Unity. The scene can correspond to one or more real or imaginary 3D objects or a representation of objects. In some implementations, one application 112 or multiple applications 112 (operating in parallel) is configured to render a scene to obtain scene data or graphics abstraction. In some cases, the scene data is obtained by processing the graphics abstraction. The scene data can be stored in a memory 118 of the host device 110. The scene data can be also provided to an application programming interface (API) 114 for further processing. In some implementations, the scene data is directly provided to the processing device 120 for further processing.

2.1 Application Programming Interface (API)

An API is a type of software interface. The API can specify the interface between a software application and another software application or computer programs, an operation system, computer hardware, or an external device. In the system 100, the API 114 is configured to be a holographic API that enables a developer or a user to use the host device 110 to interact with a holographic device, e.g., the processing device 120. The holographic API can convert computer graphics primitives into discrete holographic scene primitives, allowing for rich holographic content generation utilizing general purpose and specially designed holographic computation hardware.

In some implementations, the API 114 specifies an interface between an application 112 and computer hardware (e.g., the memory 118) of the host device 110, e.g., through a driver 116. The driver 16 can include machine-readable or executable programming instructions or software. The driver 116 is configured to communicate between the API 114 with the memory 118, e.g., to store data (such as tables and commands) from the API 114 in the memory 118, or to retrieve data from the memory 118 to the API 114.

The API 114 can obtain the scene data from the application 112. In some examples, the scene data includes data of a plurality of primitives corresponding to one or more objects in the scene. In some examples, the API 114 processes the scene data to obtain the data of the plurality of primitives. The plurality of primitives can be indexed in a particular order. The primitives can include at least one of a point primitive, a line primitive, or a polygon primitive (e.g., a triangle primitive). The data of the primitives can include primitive data of each primitive of the number of primitives. A primitive includes at least one vertex, and primitive data of the primitive can include vertex data of the at least one vertex. For example, a triangle primitive includes three vertices that are connected with each other.

In some examples, primitive data of a primitive includes at least one of: coordinate information of the primitive in a 3D coordinate system, color information of the primitive (e.g., a textured color, a gradient color or both), texture coordinate information of the primitive, viewpoint-dependent shading information (e.g., geometric specular reflection information) associated with the primitive, shading information associated with the primitive, or occlusion information associated with the primitive. The primitive data can also include a primitive identifier of the primitive among the number of primitives, and/or at least one vertex identifier of the at least one vertex.

In some examples, vertex data of a vertex includes at least one of: coordinate information of the vertex in the 3D coordinate system, color information associated with the vertex (e.g., a textured color, a gradient color or both), texture coordinate information associated with the vertex, viewpoint-dependent shading information (e.g., geometric specular reflection information) associated with the vertex, shading information associated with the vertex, or occlusion information associated with the vertex. The vertex data can also include a vertex identifier of the vertex.

In some implementations, the API 114 can adjust vertex data of vertices of multiple primitives associated with an object or a holographic scene, e.g., in response to receiving a user input, a trigger signal or command, or a predetermined command. Based on a result of the adjusting, the API 114 can update the vertex data of the vertices in the memory 118 for further processing. For example, as discussed with further details in FIGS. 8A-8F, gaps between adjacent primitives can be adjusted to avoid kissing or overlapping, or to create an overlapping effect by adjusting coordinate information of the vertices.

The API 114 can be configured to process primitive data of the plurality of primitives and/or vertex data of a plurality of vertices (or vertexes) of the plurality of primitives to obtain data that can be processable by the processing device 120, including, but not limited to, generating a table showing information of vertices for each primitive, organizing vertices for parallel processing, and/or generating commands for the processing device 120 to draw primitives.

In some implementations, the API 114 is configured to: for each of a plurality of vertices of the number of primitives, associate a respective vertex identifier of the vertex with respective vertex data of the vertex, and store the association between the respective vertex identifier and the respective vertex data of the vertex, for example, together with the respective vertex data, in the memory 118. The API 114 can determine the respective vertex identifiers of the plurality of vertices based on an order of the plurality of vertices in a vertex stream corresponding to the plurality of primitives.

The API 114 can store the associations for the vertices in a table in the memory 118. As illustrated in FIG. 4A(a), table 400 shows information associated with the vertices, including, but not limited to, vertex identifier (No.), 3D coordinates (x, y, z), color information, texture mapping information, occlusion information, shading information, and/or viewpoint dependent shading information. As an example, vertex V1 has a vertex identifier n, coordinate (x1, y1, z1), color information (C1), texture mapping information (T1), occlusion information (O1), shading information (S1), and viewpoint dependent shading information (VDS1).

In some implementations, the API 114 is configured to: for each of the plurality of primitives, associate a respective primitive identifier of the primitive with one or more respective vertex identifiers of one or more vertices of the primitive (and optionally respective primitive data of the primitive) in the memory 118, and store an association between the respective primitive identifier and the one or more respective vertex identifiers for the primitive (and optionally respective primitive data of the primitive) in the memory 118. The API 114 can determine the respective primitive identifiers of the plurality of primitives based on an order of the plurality of primitives in a primitive stream corresponding to the scene.

The API 114 can store the associations for the vertices in a table in the memory 118. As illustrated in FIG. 4A(b), table 410 shows information associated with the primitives, including, but not limited to, primitive identifier (No.), vertex identifiers of vertices of the primitives, color information (PC), texture mapping information (PT), occlusion information (PO), shading information (PS), and/or viewpoint dependent shading information (PVDS). As an example, primitive P1 has a primitive identifier (P1), associated vertices' identifiers (V1, V2, V3), color information (PC1), texture mapping information (PT1), occlusion information (PO1), shading information (PS1), and viewpoint dependent shading information (PVDS1).

In some implementations, the API 114 generates a command to be sent to the processing device 120. The command can be generated based on an instruction, e.g., from the application 112 or a processor of the host device 110. The instruction can indicate reconstructing a holographic scene including one or more objects. For example, the command can include a command instruction for drawing a series of primitives associated with the one or more objects.

In some cases, the API 114 can determine primitive identifiers of the series of primitives associated with the command instruction and transmit the command including the command instruction and the primitive identifiers to the processing device 120 for further processing. In some cases, the API 114 can determine vertex identifiers associated with the primitive identifiers, and transmit the command including the command instruction with the vertex identifiers (and optionally the primitive identifiers) to the processing device 120 for further processing. The command can instruct the processing device 120 to draw the series of primitives based on the primitive identifiers, the vertex identifiers, or a combination thereof.

Figure 4B:
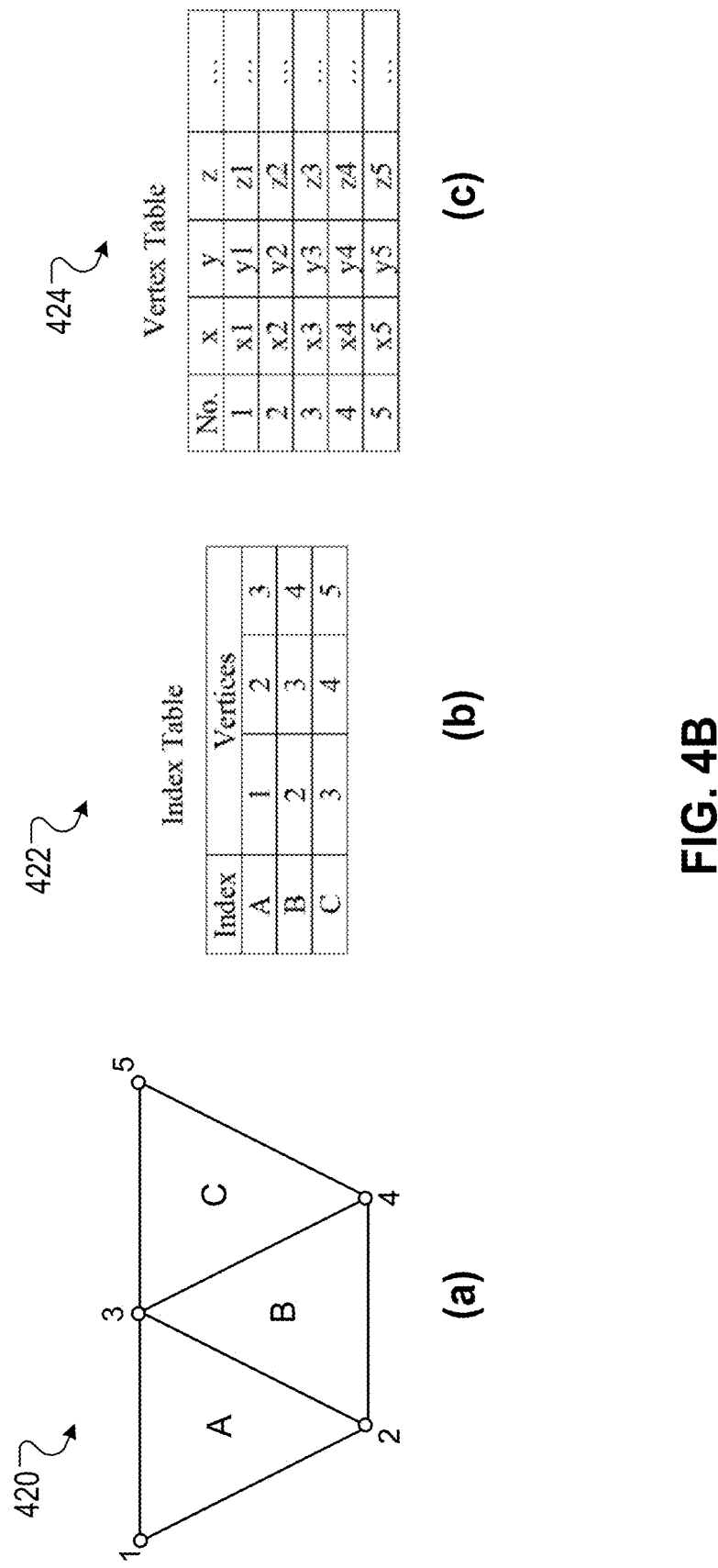
FIG. 4B illustrates example tables for adjacent primitives.

FIG. 4B illustrates example tables for a series of primitives associated with a command. The command can be drawing three connected triangle primitives A, B, C. As shown in diagram (a) of FIG. 4B, a graph 420 includes the three triangle primitives A, B, C that are connected together. Each primitive includes three vertices: primitive A has vertices 1, 2, 3; primitive B has vertices 2, 3, 4, and primitive C has vertices 3, 4, 5. The API 114 can determine the primitive identifiers A, B, C and associated vertex identifiers for each primitive identifier. In some examples, the API 114 can generate an index table 422 showing the associations between each primitive identifier and its associated vertex identifiers. The API 114 can also generate a vertex table 424 listing the vertex identifiers (e.g., vertices 1, 2, 3, 4, 5) associated with the command, optionally with vertex data associated with the vertex identifiers. The index table 422 and the vertex table 424 for the command can be stored in the memory 118. In some cases, the index table 422 and the vertex table 424 is stored in a buffer 119 (or cache) of the memory 118. The buffer 119 can be a ring buffer.

Figure 4C:
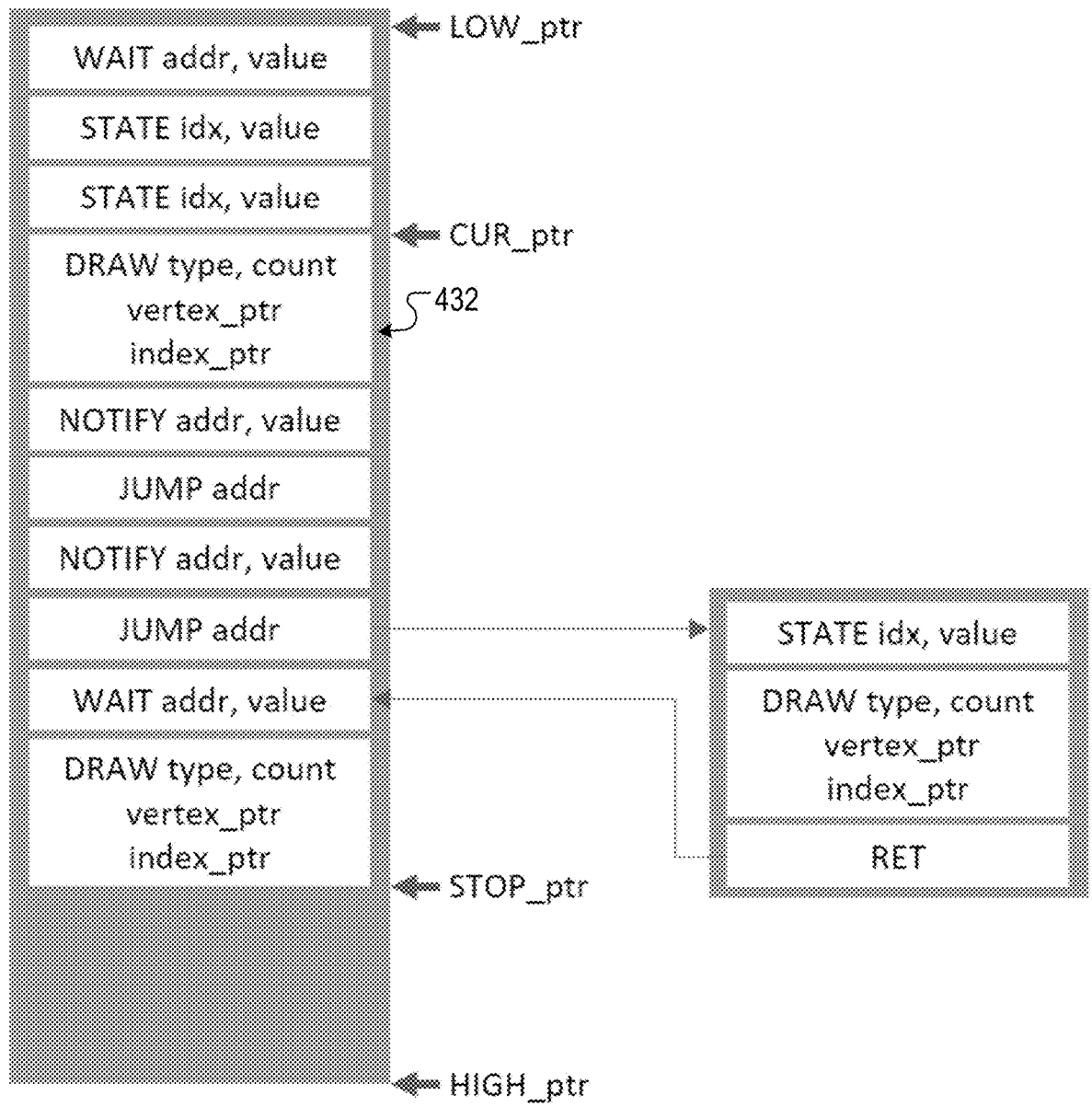
FIG. 4C illustrates an example command from an API.

FIG. 4C illustrates an example command list 430 transmitted from the API 114 to the processing device 120. As shown in FIG. 4C, the command list 430 includes a number of DRAW commands 432. Each DRAW command 432 specifies a command instruction (e.g., DRAW type and count) and associated vertices (e.g., vertex_ptr) and indexes (e.g., index_ptr). The vertex_ptr can be vertex identifiers associated with the Draw command, and the index_ptr can be the association between each primitive and vertex identifiers. For example, to draw the graph 420 of FIG. 4B, the DRAW command 432 can specify: DRAW type to be triangle primitives, DRAW count to be 3, vertex_ptr to be 1, 2, 3, 4, 5, and index_ptr to be A (1, 2, 3), B (2, 3, 4), and C (3, 4, 5), as shown in index table 422 of FIG. 4B. In such a way, a size of the DRAW command can be very small, and the DRAW command can be transmitted to the processing device 120 for processing with a high speed.

The API 114 is configured to transmit the DRAW command 432 to the processing device 120 for further processing. The DRAW command 432 can be cached in the buffer 119 of the memory 118 and then be transmitted to the processing device 120 through the interface 115. Compared to transmitting primitive data or vertex data of a number of primitives corresponding to a holographic scene (or one or more objects) from the API 114 to the processing device 120, transmitting the DRAW command 432 (or the command list 430) can be much efficient and faster. Moreover, the vertex_ptr and index_ptr include information of the number of primitives in the same DRAW command, which enables the processing device 120 to perform parallel processing to increase a computation speed.

2.2 Processing Device

The processing device 120 is in communication with the host device 110 and configured to generate a hologram corresponding to a holographic scene to be reconstructed based on data transmitted from the host device 110. The holographic scene includes one or more objects (e.g., 2D or 3D) in a 3D coordinate system. The data can include information of primitives corresponding to the one or more objects. The hologram corresponds to electromagnetic (EM) contributions from the primitives to display elements (or phasels) of the display 150. The processing device 120 can be referred to be a phasel processing unit (PPU). The processing device 120 is configured to compute the EM contributions with high speed, e.g., by parallel processing, simplified expressions, and/or any other techniques described with further details below.

The processing device 120 can include at least one of: an application-specific integrated circuit (ASIC), a field-programmable gate array (FPGA), a programmable gate array (PGA), a central processing unit (CPU), a graphics processing unit (GPU), a phasel processing unit (PPU), or standard computing units. In some implementations, the processing device 120 communicates with the host device 110 through peripheral component interconnect express (PCIe). The interface 115 can be a PCIe slot of the host device 110. The processing device 120 can be an integrated chip insertable in the PCIe slot of the host device 110. In some implementations, the processing device 120 is configured to be integrated with the driving device 130, optionally with the display 150 and/or the illuminator 140 in a package, external to the host device 110. The processing device 120 can communicate with the host device 110 via a wired or wireless connection, e.g., USB-C connection or any other high speed serial connection. In some implementations, the API 114 (and optionally the driver 116) can be implemented in the processing device 120.

In some implementations, the processing device 120 includes a command processor 122, a local memory 123, a plurality of computing units 124, and at least one accumulator 126 that can be coupled in series. The plurality of computing units 124 can be coupled in parallel, e.g., for parallel processing. In some implementations, a group of computing units 124 is coupled in series, and multiple groups are coupled in parallel with each other. In some implementations, the processing device 120 includes multiple accumulators 126 that can be coupled in parallel, and each accumulator 126 is coupled to a respective group of computing units 124.

The command processor 122 is in communication with the host device 110 (e.g., the buffer 119 in the memory 118) and configured to receive a command from the host device 110. The command can be similar to, or same as, the DRAW command 432 of FIG. 4C. The command can include information of a plurality of primitives corresponding to at least one object. The information can include primitive identifiers of the plurality of primitives, vertex identifiers associated with the primitive identifiers, and an index table showing associations between the primitive identifiers and the vertex identifiers. The command can include an instruction for drawing the plurality of primitives based on the information. As noted above, the command can include no primitive data of the plurality of primitives and no vertex data of vertices of the plurality of primitives.

The command processor 122 is configured to: process the command to identify the primitive identifiers or vertex identifiers and obtain primitive data of the plurality of primitives from the host device 110 based on the primitive identifiers or vertex identifiers. For example, the command processor 122 retrieves the primitive data from the memory 118 based on the primitive identifiers in the command, e.g., based on the stored table 410 of FIG. 4A. In some implementations, the command processor 122 retrieves the vertex data of the vertices based on the vertex identifiers in the command, e.g., based on the stored table 400 of FIG. 4A.

In some implementations, an object is represented by a large number of primitives. Drawing the object can be executed by a series of commands, where each command is associated with a respective small group of primitives. In such a way, a size of each command can become smaller. The transmission speed for transmitting the command, the retrieved primitive data, and/or the retrieved vertex data from the host device 110 to the command processor 122 can be faster. The processing speed of the processing device 120 can be also faster.

In some implementations, as noted above, the API 114 in the host device 110 can decode the object to obtain vertex information of vertices associated with the object (e.g., the table 400 of FIG. 4A) and/or primitive information of primitives associated with the object (e.g., the able 410 of FIG. 4B) that can be stored in the memory 118 (e.g., in the buffer 119). Before sending commands to the processing device 120, the API 114 can first transmit the vertex information of the vertices and/or the primitive information of the primitives (e.g., stored in the buffer 119) to the processing device 120. The vertex information of the vertices and/or the primitive information of the primitives can be stored in the local memory 123. After the API 114 sends a command to the command processor 122 in the processing device 120, the command processor 122 can retrieve corresponding index information (e.g., the index table 422 of FIG. 4B) from the memory 118 in the host device 110 and corresponding vertex information (e.g., in the table 400 of FIG. 4A or the vertex table 424 of FIG. 4B) from the local memory 123 in the processing device 120, and execute the command based on the retrieved corresponding index information and the retrieved corresponding vertex information. In such a way, the API 114 only needs to transmit the index information from the host device 110 to the processing device 120, without transmitting the vertex information, which can reduce data over the interface 115 and increase a transmission speed.

Different from a conventional 3D graphics system, which takes a 3D scene and renders it on to a 2D display device, the system 100 is configured to produce a 3D output such as a holographic reconstruction in a form of a light field, e.g., a 3D volume of light. In a hologram, each display element can contribute to every part of the holographic reconstruction of the scene. Hence, each display element may potentially be modulated for every part of the scene, e.g., each primitive in the list of primitives generated by the application 112, for complete holographic reproduction of the scene. In some implementations, modulation of certain elements can be omitted or simplified based on, for example, an acceptable level of accuracy in the reproduced scene or in some region of the scene, or occlusion.

In some implementations, the processing device 120 is configured to compute an EM field contribution, e.g., phase, amplitude, or both, from each primitive to each display element, and generate, for each display element, a sum of the EM field contributions from the list of primitives to the display element. This can be done either by running through every primitive and accruing its contribution to a given display element, or by running through each display element for each primitive, or by a hybrid blend of these two techniques.

The processing device 120 can compute the EM field contribution from each primitive to each display element based on a predetermined expression for the primitive. Different primitives can have corresponding expressions. In some cases, the predetermined expression is an analytic expression, as discussed with further detail below in relation to FIGS. 3A-3C. In some cases, the predetermined expression is determined by solving Maxwell's Equations with a boundary condition defined at the display 150. The boundary condition can include a Dirichlet boundary condition or a Cauchy boundary condition. Then, the display element can be modulated based on the sum of the EM field contributions, e.g., by modulating at least one of a refractive index, an amplitude index, a birefringence, or a retardance of the display element.

If values of an EM field, e.g., a solution to the Maxwell Equations, at each point on a surface that bounds the field are known, an exact, unique configuration of the EM field inside a volume bounded by a boundary surface can be determined. The list of primitives (or a holographic reconstruction of a corresponding hologram) and the display 150 define a 3D space, and a surface of the display 150 forms a portion of a boundary surface of the 3D space. By setting EM field states (e.g., phase or amplitude or phase and amplitude states) on the surface of the display 150, for example, by illuminating light on the display surface, the boundary condition of the EM field can be determined. Due to time symmetry of the Maxwell Equations, as the display elements are modulated based on the EM field contributions from the primitives corresponding to the hologram, a volumetric light field corresponding to the hologram can be obtained as the holographic reconstruction.

For example, a line primitive of illumination at a specific color can be set in front of the display 150. As discussed in further detail below with respect to FIG. 3B, an analytic expression for a linear aperture can be written as a function in space. Then the EM field contribution from the line primitive on a boundary surface including the display 150 can be determined. If EM field values corresponding to the computed EM field contribution are set in the display 150, due to time-symmetry of the Maxwell Equations, the same linear aperture used in the computation can appear at a corresponding location, e.g., a coordinate position of the linear primitive in the 3D coordinate system and with the specific color.

Figure 3A:
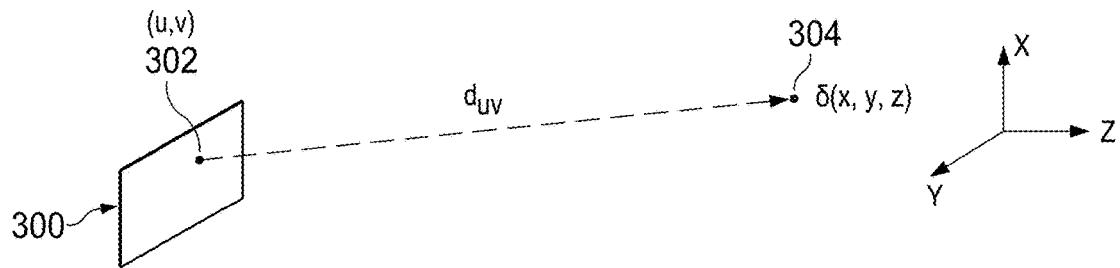
FIG. 3A illustrates an example EM propagation for a point primitive relative to a display element of a display.
Figure 3B:
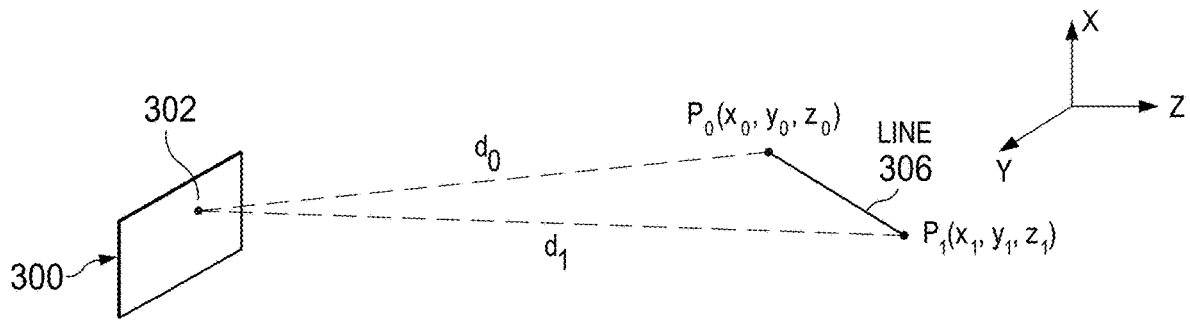
FIG. 3B illustrates an example EM propagation for a line primitive relative to a display element of a display.

In some examples, as discussed in further details with respect to FIG. 3B, suppose that there is a line of light between two points A and B in the 3D space. The light is evenly lit and has an intensity I per line distance l. At each infinitesimal dl along the line from A to B, an amount of light proportional to I*dl is emitted. The infinitesimal dl acts as a delta (point) source, and the EM field contribution from the infinitesimal dl to any point on a boundary surface around a scene corresponding to a list of primitives can be determined. Thus, for any display element of the display 150, an analytic equation that represents the EM field contribution at the display element from the infinitesimal segment of the line can be determined. A special kind of summation/integral that marches along the line and accrues the EM field contribution of the entire line to the EM field at the display element of the display can be determined as an expression. Values corresponding to the expression can be set at the display element, e.g., by modulating the display element and illuminating the display element. Then, through time reversal and a correction constant, the line can be created in the same location defined by points A and B in the 3D space.

Referring to FIG. 1A, after the command processor 122 obtains the primitive data or vertex data of the plurality of primitives, the command processor 122 transmits the primitive data or vertex data to the plurality of computing units 124 for further processing. The computing units 124 are configured to, for each primitive of the plurality of primitives, determine an EM field contribution of the primitive to each of a plurality of display elements of the display 150 in a 3D coordinate system based on the primitive data or vertex data of the plurality of primitives. The plurality of computing units 124 can be operated in parallel. The accumulator 126 is configured to accumulate EM field contributions of the plurality of primitives to each of the plurality of display elements from the plurality of computing units 124 and generate a respective sum of EM field contributions of the plurality of primitives to each of the plurality of display elements. The accumulator 126 can generate a hologram comprising a respective sum of the EM field contributions of the plurality of primitives for each of the plurality of display elements.

The 3D coordinate system can be, e.g., Cartesian coordinate system XYZ, polar coordinate system, cylindrical coordinate system, or spherical coordinate system. As discussed with further detail below (e.g., in FIGS. 2 and 3A-3C), the plurality of display elements in the display 150 can also have corresponding coordinate information in the 3D coordinate system. The primitives at coordinate locations can represent a 3D object adjacent to the plurality of display elements, e.g., in front of the display elements, behind the display elements, or straddling the display elements.

In some implementations, a computing unit 124 is configured to determine at least one distance between a display element of the display 150 and a primitive based on coordinate information of the display element and coordinate information of the primitive, and determine the EM field contribution of the primitive to the display element based on a predetermined expression for the primitive and the at least one distance. The predetermined expression can be determined based on at least one of: analytically calculating an EM field propagation from the primitive to the display element, a solution of Maxwell's equations with a boundary condition defined by the display, or at least one function from a group of functions comprising a sine function, a cosine function, and an exponential function, where determining the EM field contribution includes identifying a value of the at least one function in a table stored in a memory.

In some implementations, adjacent first and second primitives have at least one shared vertex, e.g., as shown in FIG. 4B. A computing unit 124 can determine a first EM field contribution of the first primitive to a display element of the display 150 based on primitive data of the first primitive and determining a second EM field contribution of the second primitive to the display element of the display based on the first EM field contribution and primitive data of the second primitive, e.g., by a distance between coordinates of the first primitive and the second primitive.

In some implementations, a computing unit 124 is configured to determine a first EM contribution of a primitive to a first display element of the display 150 and determine a second EM contribution of the primitive to a second display element of the display based on the first EM contribution, the second display element being adjacent to the first display element.

The computing units 124 can determine the EM field contributions from the plurality of primitives to the display elements of the display 150 in parallel. In some implementations, the computing units 124 are configured to determine a first EM field contribution of a first primitive to a first display element in parallel with determining a second EM field contribution of a second primitive to the first display element. In some implementations, the computing units 124 are configured to determine a first EM field contribution of a first primitive to a first display element in parallel with determining a second EM field contribution of a second primitive to a second display element. In some implementations, the computing units 124 are configured to determine a first EM field contribution of a first primitive to a first display element in parallel with determining a second EM field contribution from the first primitive to a second display element.

In some implementations, the computing units 124 are configured to determine first respective EM field contributions from a first primitive of the plurality of primitives to each display element of the plurality of display elements, and, in parallel, determine second respective EM field contributions from a second primitive of the plurality of primitives to each display element of the plurality of display elements. The accumulator 126 can be configured to accumulate the EM field contributions for each display element of the plurality of display elements by adding the first and second respective EM field contributions corresponding to the display element.

In some implementations, the processing device 120 is configured to obtain sums of EM field contributions for the plurality of display elements of the display 150 by pipeline processing of determining the EM field contributions of each of the plurality of primitives to each of the plurality of display elements and generating the sum of the EM field contribution from the plurality of primitives to each of the plurality of display elements.

Figure 4D:
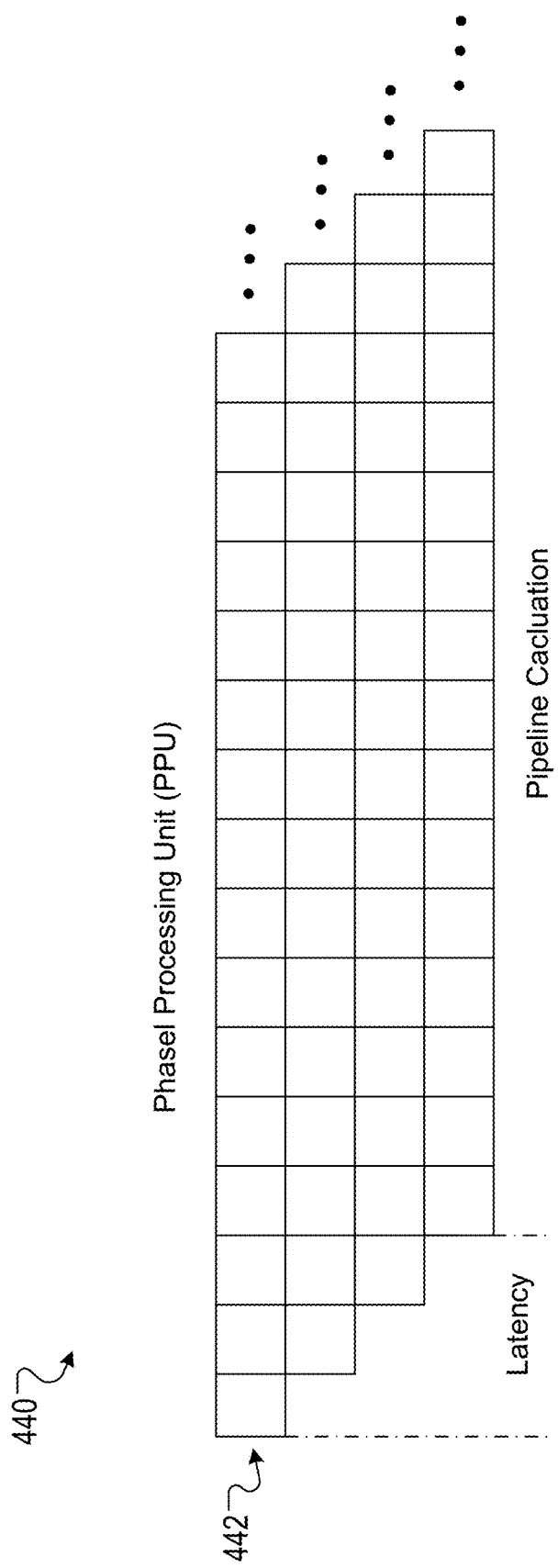
FIG. 4D illustrates an example pipeline calculation using phasel processing units.

FIG. 4D illustrates an example 440 of pipeline calculation using phasel processing units, e.g., the processing device 120. As noted above, the processing device 120 obtains the sum of the EM field contribution from the plurality of primitives to each display element through a series of steps 442. For example, calculating a predetermined expression can be divided into multiple steps. Each row can represent a respective series of steps 442 for a corresponding display element. Steps for multiple display elements can be executed in parallel.

As shown in FIG. 4D, after a first step for a first display element is completed, a second step for the first display element is executed, meanwhile, a first step for a second display element is executed (e.g., based on a result of the first step for the first display element). Then, after the second step for the first display element is completed and the first step for the second display element is also completed, a third step for the first display element is executed, a second step for the second display element can be also executed (e.g., based on a result of the second step for the first display element and a result of the first step for the second display element). Meanwhile, a first step for the third display element can be executed (e.g., based on the result of the first step for the second display element and/or the result of the first step of the first display element). In such a way, except a latency period at the beginning of the computation, the processing device 120 enables to execute the steps for the plurality of display elements in parallel according to the pipeline calculation.

In some implementations, e.g., as discussed with further details below in section 3.3, to improve computation speed and/or accuracy, the processing device 120 calculates one or more mathematical functions using fixed point number representations, updated floating point number presentations, or a combination thereof.

In some implementations, the processing device 120 calculates respective EM field contributions of each primitive of the plurality of primitives to each display element of the plurality of display elements. The calculation of the respective EM field contributions can be without at least one of: expanding a geometry of the object into the plurality of display elements; applying visibility tests before packing wavefronts; or decision making or communication between parallel calculations for different primitives of the plurality of primitives. The calculation of the respective EM field contributions can be configured to cause at least one of: tuning parallel calculations for multiple primitives to speed, cost, size or energy optimization; reducing latency between initiating a draw and a result being ready for display; increasing an accuracy using fixed point number representations; skipping unpacking and repacking of float point number representations between mathematical operations; or optimizing computation speed by optimizing mathematical functions.

After obtaining primitive data or vertex data associated with a plurality of primitives, the processing device 120 can be configured to adjust the primitive data or the vertex data of at least one of the plurality of primitives according to a corresponding setting, and compute EM field contributions associated with the at least one of the plurality of primitives based on the adjusted primitive data or vertex data.

In some examples, e.g., as discussed with further details in FIGS. 8A-8F, the processing device 120 adjusts primitive data or vertex data of at least one of adjacent primitives to generate a gap between the adjacent primitives, such that there is no shared vertex between the adjacent primitives. The gap can be identical to or greater than a predetermined diffraction limit of the display. The processing device 120 can determine the EM field contribution of the at least one of the adjacent primitives based on the adjusted vertex data associated with the at least one of the adjacent primitives.

After obtaining sums of EM field contributions for the plurality of elements of the display 150, the processing device 120 (e.g., the accumulator 126) can generate a hologram based on the sums of the EM field contributions. In some examples, the hologram is a complex-valued hologram. The processing device 120 can further convert the complex-valued hologram to an amplitude-only hologram or a phase-only hologram. The processing device 120 can also transmit the complex-valued hologram to the driving device 130 that can convert the complex-valued hologram to a phase-only hologram or an amplitude-only hologram.

In some examples, the hologram is a phase hologram or an amplitude hologram. In some implementations, the hologram is stored in a storage device, e.g., a USB. The processing device 120 can also transmit the phase hologram or the amplitude hologram to the driving device 130. The driving device 130 can then generate corresponding control signals for modulating the plurality of display elements based on the hologram.

For display zero order suppression, display zero order light can be deviated from a reconstruction cone of a holographic scene formed by diffracted first order light from the display. To achieve this, in some implementations, the processing device 120 can change the hologram for the plurality of display elements. In some implementations, instead of the processing device 120, the driving device 130 can change the hologram for the plurality of display elements after receiving the hologram from the processing device 120.

The hologram can be changed, e.g., by the processing device 120 or the driving device 130, by adjusting a respective phase for each of the plurality of display elements. The respective phase can be adjusted, e.g., by adding a corresponding phase to the respective phase for each of the plurality of display elements.

In some examples, the corresponding phase for each of the plurality of display elements can be expressed as:

$$\emptyset = 2\pi(x\cos\theta + y\sin\theta)/\lambda,$$

where Ø represents the corresponding phase for the display element, λ represents a wavelength of light to be incident on the display element with an incident angle, θ represents an angle corresponding to a redirecting angle of an optically redirecting device (e.g., the zero order redirecting grating structure 508-3 of FIG. 5A) configured to redirect light from the display 150, and x and y represent coordinates of the display element in a global 3D coordinate system where the EM field contribution of each of the plurality of display elements to the display element is determined. Adding these corresponding phases to the hologram can have a same or similar effect of preconfiguring the hologram using a software application (e.g., Unity), where a construction cone including one or more corresponding virtual objects is rotated with a corresponding angle.

In some examples, the corresponding phase for each of the plurality of display elements is expressed as:

$$\emptyset = \frac{\pi}{\lambda f}(ax^2 + by^2),$$

where Ø represents the corresponding phase for the display element, a and b represent constants, λ represents a wavelength of light to be incident on the display, f represents a focal length of an optically diverging component configured to diverge light from the display, x and y represent coordinates of the display element in a coordinate system where the EM field contribution of each of the plurality of display elements to the display element is determined. Adding these corresponding phases to the hologram can have a same or similar effect of preconfiguring the hologram using a software application (e.g., Unity), where a construction cone including one or more corresponding virtual objects is moved close or away from the display 150, such that the display zero order light is diverged by the optically diverging component (e.g., an optical lens) downstream of the display 150.

In some implementations, instead of adjusting the hologram, the processing device 120 can adjust the primitive data or vertex data associated with the plurality of primitives. The adjusted primitive data of the plurality of primitives corresponds to a virtual object moved with respect to the display in a global 3D coordinate system. The processing device 120 can then determine EM field contribution of a primitive to each of the plurality of display elements of the display based on the adjusted primitive data of the primitive in the 3D coordinate system.

In some examples, the adjusted primitive data of the plurality of primitives corresponds to the virtual object rotated with an angle with respect to the display in the global 3D coordinate system, and the angle corresponds to a redirecting angle of an optically redirecting device (e.g., the zero order redirecting grating structure 508-3 of FIG. 5A) configured to redirect light from the display, such that modulated light by the plurality of display elements forms a holographic scene, while display zero order light from the display is redirected away from the holographic scene.

In some examples, the adjusted primitive data of the plurality of primitives corresponds to the virtual object moved, with respect to the display, in the global 3D coordinate system, along a direction perpendicular to the display with a distance. The distance corresponds to a focal length of an optically diverging component (e.g., an optical lens) configured to diverge light from the display, such that modulated light by the plurality of display elements forms a holographic scene without divergence, while display zero order light from the display is diverged and suppressed in the holographic scene.

In some implementations, primitive data of a primitive includes texture coordinate information of the primitive. In some cases, the primitive data obtained from the API 114 can include values associated with discrete cosine transform (DCT) amplitudes for pixels of an image to be mapped on a specified surface of one or more primitives of the plurality of primitives, where the DCT amplitudes for the pixels of the image are associated with DCT weights of the pixels of the image. In some cases, after obtaining the primitive data, the processing device 120 can adjust the primitive data to include the values associated with the DCT amplitudes for the pixels of the image. For each primitive of the plurality of primitives, the processing device 120 can calculate the EM field contribution from each of the one or more primitives to each of the plurality of display elements with the values associated with the DCT amplitudes for the pixels of the image.

In some implementations, primitive data of a primitive includes occlusion information of the primitive. In some examples, the processing device 120 can determine one or more particular display elements that make no contribution to a reconstruction of a given primitive based on occlusion information of the given primitive. For each of the one or more particular display elements, the processing device 120 can generate a respective sum of EM field contributions of the plurality of primitives to the particular display element by excluding an EM field contribution of the given primitive to the particular display element. In some examples, the processing device 120 can be configured to: for each display element of the plurality of display elements, determine a respective part of a given primitive that make no EM field contribution to the display element based on occlusion information of the given primitive, and generate a sum of EM field contributions from the plurality of primitives to the display element by excluding an EM field contribution from the respective part of the given primitive to the display element.

In some implementations, primitive data of a primitive includes viewpoint dependent shading information for the primitive. The processing device 120 can be configured to: determine a respective EM field contribution of each primitive of the plurality of primitives to each display element of the plurality of display elements by taking into consideration of the viewpoint dependent shading information for the primitive.

Figure 8A:
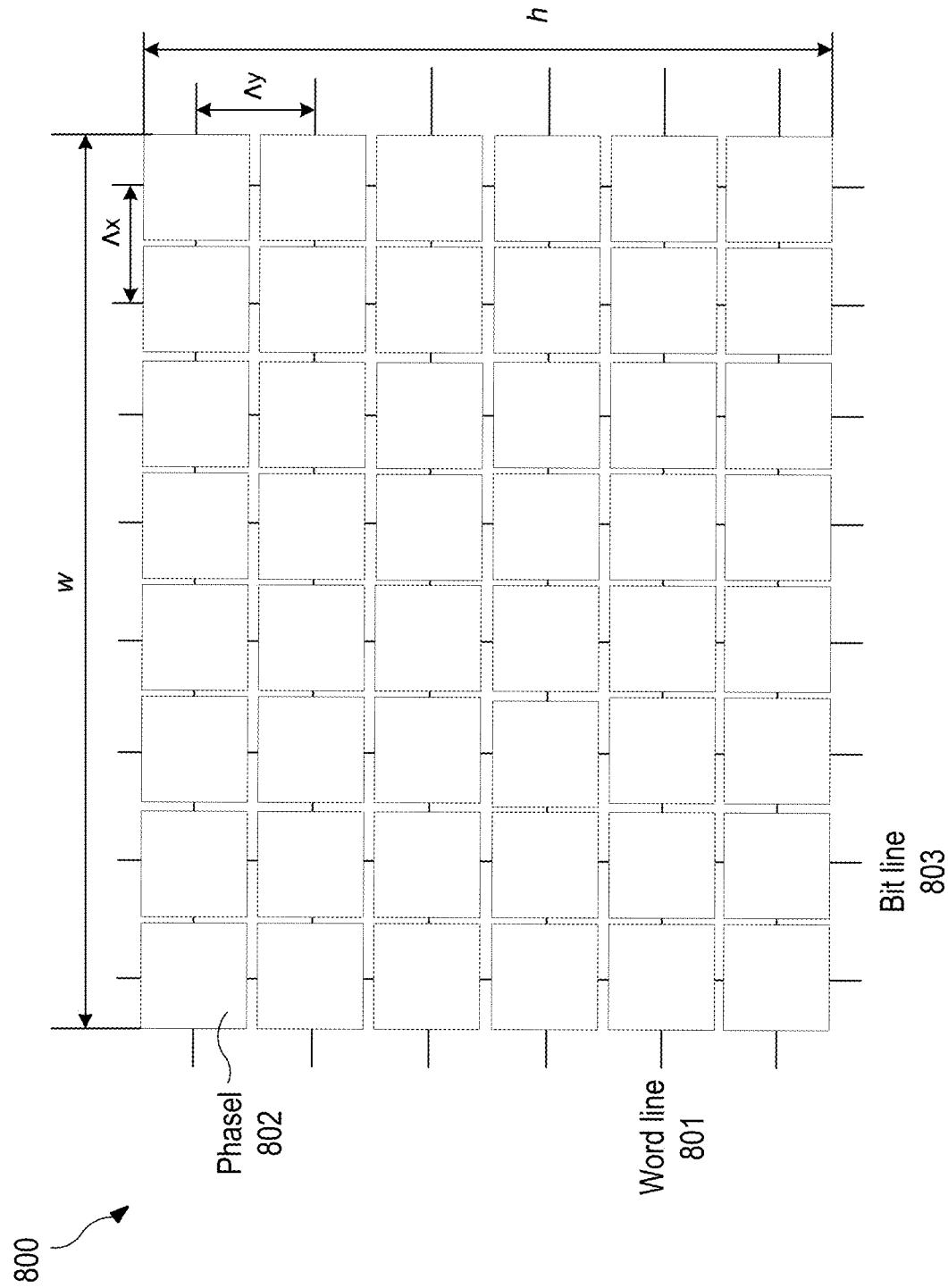
FIG. 8A illustrates an example display with display elements or phasels.
Figure 9A:
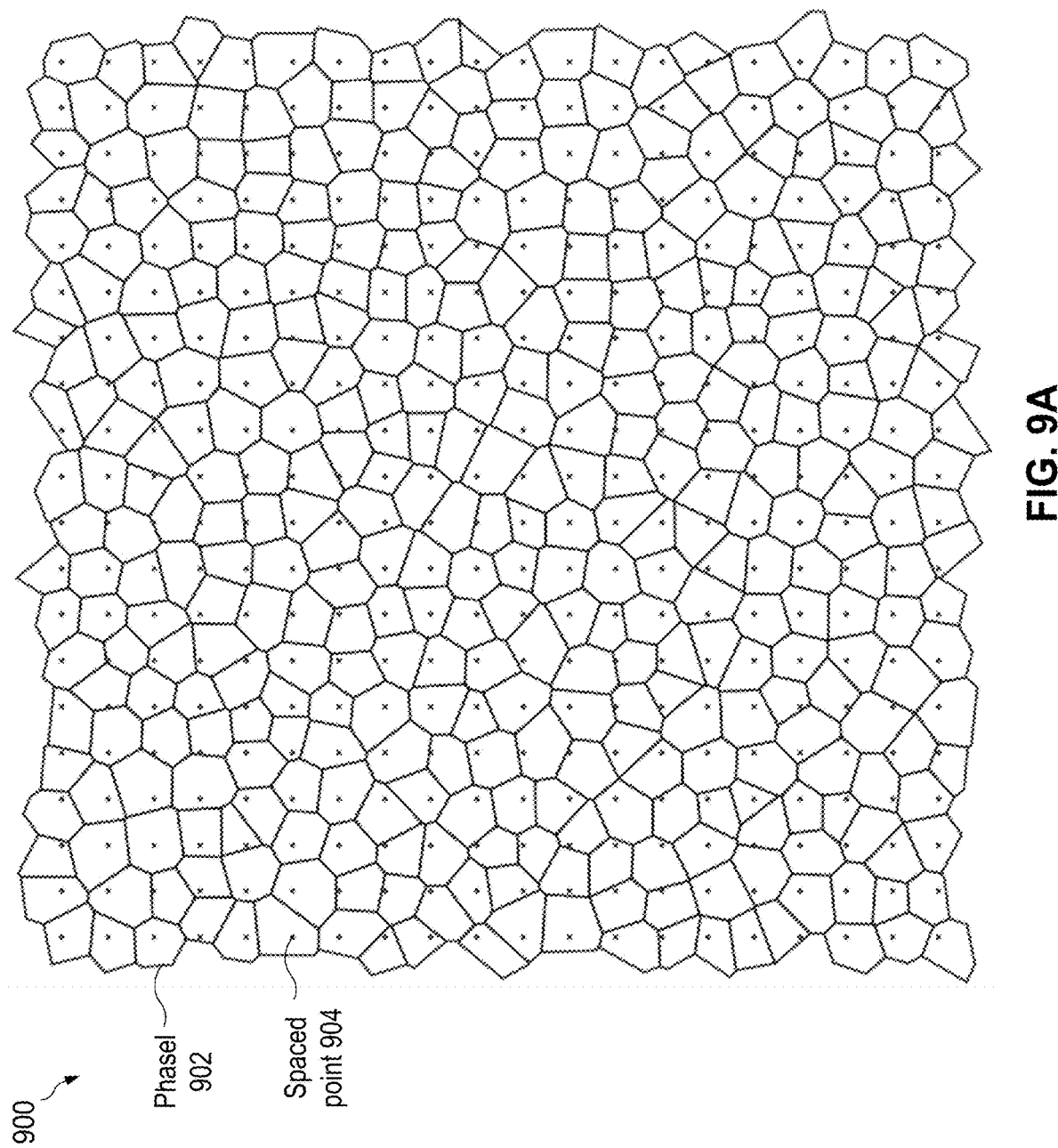
FIG. 9A illustrates an example of an irregular display.

In some implementations, the display 150 is a regular display where the plurality of display elements have a same shape and are spaced evenly in a display area (e.g., as illustrated in FIG. 8A below). In some implementations, the display 150 is an irregular display where the plurality of display elements form an irregular pattern, e.g., having different shapes or sizes and/or being irregularly positioned, for example, as illustrated in FIG. 9A below.

For either a regular display or an irregular display, the processing device 120 can be configured to: obtain information of the display 150 that includes coordinate information of a plurality of points corresponding to the plurality of display elements. For each primitive of the plurality of primitives, the processing device 120 determines the electromagnetic (EM) field contribution to each of the plurality of display elements of the display based on the primitive data of the display by: calculating, in a three-dimensional (3D) coordinate system, EM propagation from the primitive to the display based on coordinate information of the primitive and coordinate information of a point corresponding to the display element.

In some implementations, for the irregular display, each of the plurality of display elements has a respective shape of a plurality of shapes in an area of the display, each of the plurality of shapes uniquely enclosing a respective point of the plurality of points, adjacent shapes of the plurality of shapes being different from each other. The coordinate information of the plurality of points includes coordinate information of a plurality of spaced points in the area of the display and offset data including a respective offset between each point of the plurality of points and a corresponding space point of the plurality of space points.

2.3 Driving Device

The driving device 130 is coupled to the processing device 120 and is configured to receive a hologram from the processing device 120 (e.g., from the accumulator 126). The hologram is for modulating the display 150, and can include: for each display element of the plurality of display elements, a respective sum of electromagnetic (EM) field contributions of a plurality of primitives corresponding to at least one object to the display element. The driving device 130 can be configured to: generate, for each display element of the plurality of display elements, a respective modulation control signal (e.g., a voltage signal) based on the respective sum of EM field contributions of the plurality of primitives to the display element, and output the respective modulation control signal to each display element of the plurality of display elements for modulating the display element.

In some implementations, e.g., as illustrated in FIG. 1A, the driving device 130 includes a driving memory 132 coupled to the processing device 120, an illuminator driver 134 coupled to the driving memory 132 and the illuminator 140, and a display driver 136 coupled to the driving memory 132 and the display 150. The driving memory 132 can include a first memory buffer coupled to the display driver 136 and a second memory buffer coupled to the illuminator driver 134. The second memory buffer can be configured to store information for controlling amplitude and/or brightness of light emitting elements in the illuminator 140. The second memory buffer can have a smaller size than the first memory buffer. In some implementations, the driving memory 132 is included in the local memory 123 of the processing device 120.

The driving memory 132 is configured to receive and store the hologram from the processing device 120. In some cases, the hologram is a phase-only hologram. In some cases, the hologram is a complex-valued hologram. The driving device 130 can convert the complex-valued hologram to a phase-only hologram, and generate the respective modulation control signals for the plurality of display elements based on the phase-only hologram. The driving device 130 can also store the phase-only hologram in the driving memory 132, together with the complex-valued hologram. The phase-only hologram for the display 150 can include a respective phase for each of the plurality of display elements of the display 150. The respective phase corresponds to a sum of electromagnetic (EM) field contributions of the plurality of primitives corresponding to at least one object to the display element.

In some implementations, the display driver 136 includes a phase converter 137 and a scanning out unit 138. The phase converter 137 is configured to convert a respective phase for each of the plurality of display elements into a corresponding modulation control signal (e.g., a voltage signal), and the scanning out unit 138 is configured to transmit the corresponding modulation control signal to the display element. The phase converter 137 can sequentially and continuously convert the respective phases for the plurality of display elements, and the scanning out unit 138 can sequentially and continuously transmit the corresponding modulation control signals to the plurality of display elements once each of the corresponding modulation control signals is generated by the phase converter 137.

In some implementations, the phase converter 137 is included in the processing device 120 and coupled to the accumulator 126. The phase converter 137 can convert a complex hologram from the accumulator 126 into a phase hologram. The phase hologram can be transmitted from the processing device 120 to the driving device 130, and can be stored in the driving memory 132 of the driving device 130.

In some implementations, the phase converter 137 and the driving memory 132 are both in the processing device 120, where the driving memory 132 is included in the local memory 123 and the phase converter 137 is coupled to the accumulator 126 and coupled to the local memory 123. In such a way, the processing device 120 can directly output a phase hologram to the driving device 130. The driving device 130 can include the illuminator driver 134 and the display driver 136 including only the scanning out unit 139, which can greatly simply the driving device 130 and can be integrated with the display 150.

The display driver 136 and the display 150 can be connected using an interface, e.g., low voltage differential signal (LVDS) interface. The display driver 136 can be configured to drive a digital signal to the display 150 using the interface. For example, the digital signal can be a 9-bit digital value which can be turned into 512 different voltage signals for modulating display elements of the display 150.

Figure 13A:
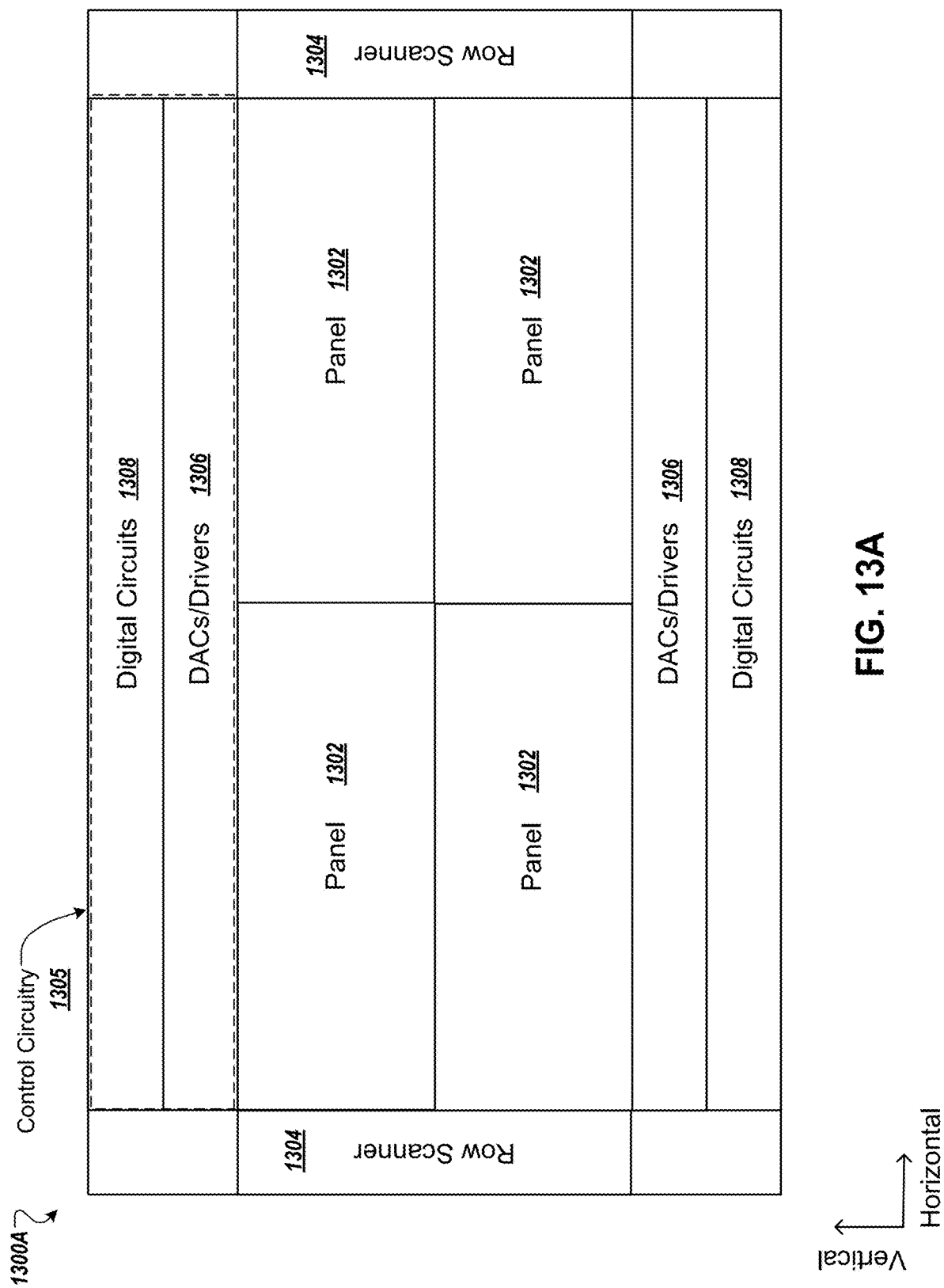
FIG. 13A depicts a display with peripheral row scanners.
Figure 13B:
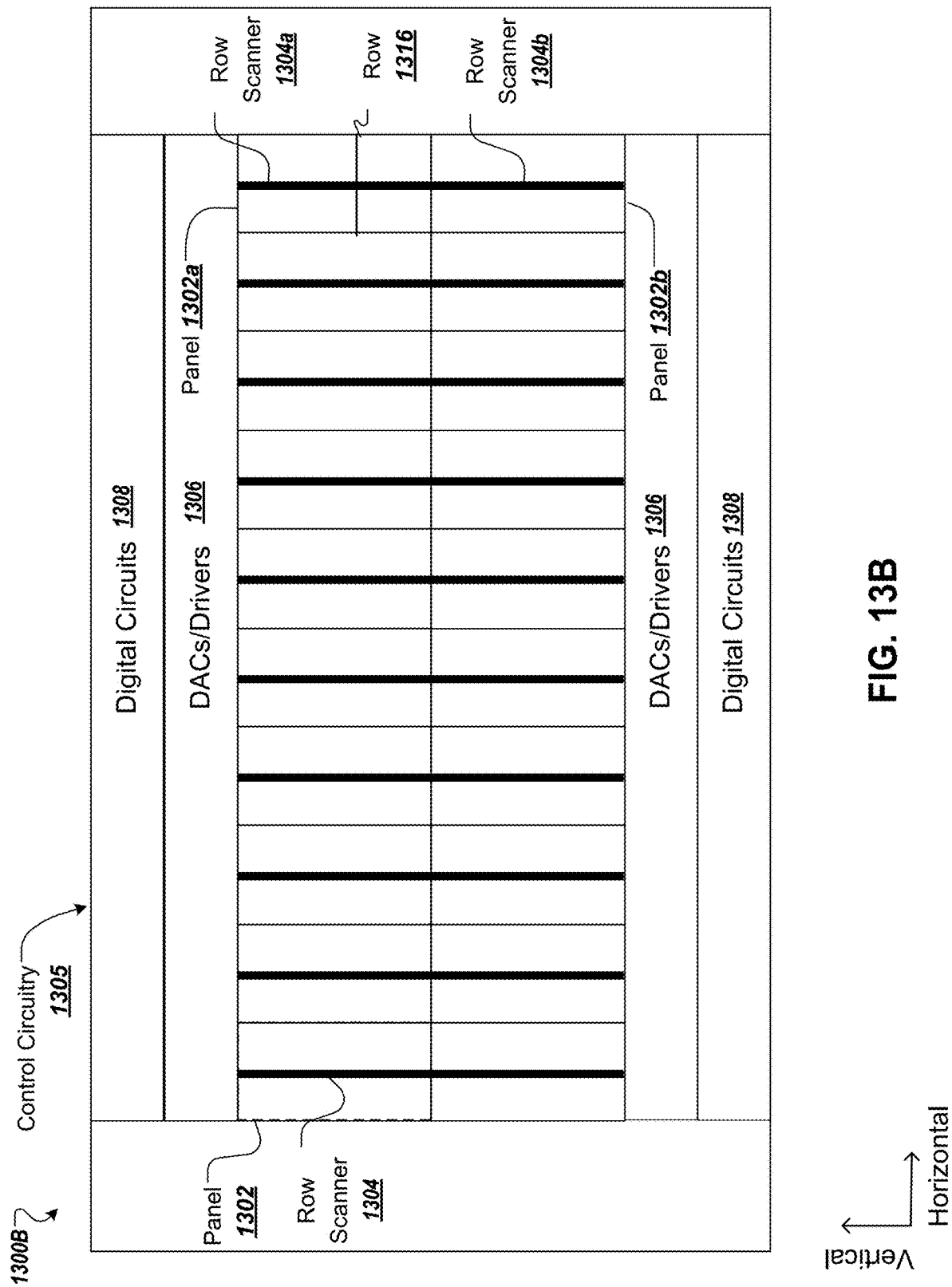
FIG. 13B depicts a display with embedded row scanners.

As discussed with further details in FIGS. 13A-13C, besides display elements, the display 150 can include digital circuits and analog circuits. The digital circuits can be configured to receive a digital data for modulating the elements, and optionally perform data processing on the digital phase signals (e.g., to reduce noise in the phases for the display elements). The analog circuits can include digital to analog converters (DACs), drivers, and row scanners. The DACs are configured to convert the digital data for the display elements into analog voltage signals. The drivers are coupled to the digital circuits and configured to drive the analog voltage signals to corresponding display elements.

The row scanners can be configured to sequentially select a row of display elements for modulating the row of display elements using corresponding voltage signals driven from the drivers.

The illuminator driver 134 can be configured to: transmit an illumination control signal (e.g., for amplitude and/or brightness control) to the illuminator 140 to activate the illuminator 140 to illuminate light on the display 150 such that light is caused by the modulated display elements of the display 150 to form a volumetric light field corresponding to the at least one object, e.g., the holographic light field 160. The resulting volumetric light field corresponds to a solution of Maxwell's equations with a boundary condition defined by the modulated elements of the display 150.

The display driver 136 and the illuminator driver 134 can be configured to communicate with each other, such that outputting the respective modulation control signal to each display element of the plurality of display elements by the display driver 136 is in coordination with transmitting the illumination control signal to the illuminator 140 by the illuminator driver 134.

In some implementations, the illuminator 140 includes two or more light emitting elements each configured to emit light with a different color (e.g., red, blue, or green), and the illuminator driver 134 can sequentially transmit a respective illumination control signal to sequentially activate each of the two or more light emitting elements of the illuminator.

In some implementations, the display driver 136 sequentially outputs: i) a first modulation control signal to modulate the display 150 with information associated with a first color during a first time period, and ii) a second modulation control signal to modulate the display 150 with information associated with a second color during a second, sequential time period. The illuminator driver 134 can sequentially output a first illumination control signal to activate the illuminator 140 to turn on a first light emitting element to emit light with a first color during the first time period, and a second illumination control signal to activate the illuminator 140 to turn on a second light emitting element to emit light with the second color during the second time period.

2.4 Display

The display 150 includes a number of display elements. In some implementations, the display 150 includes a spatial light modulator (SLM). The SLM can be a phase SLM, an amplitude SLM, or a phase and amplitude SLM. In some examples, the display 150 is a digital micro-mirror device (DMD), a liquid crystal on silicon (LCOS) device, optically addressed spatial light modulators (OASLMs), or any other type of light modulator that is capable of performing holography.

In some implementations, the display 150 is a regular display where the plurality of display elements have a same shape and are spaced evenly in a display area (e.g., as illustrated in FIG. 8A below). In some implementations, the display 150 is an irregular display where the plurality of display elements form an irregular pattern, e.g., having different shapes or sizes and/or being irregular positioned, for example, as illustrated with further details in FIG. 9A, FIG. 9B, FIG. 9E, FIG. 9J, FIG. 10A, or FIG. 10B.

The display elements of the display 150 can be modulated by the modulated control signals from the display driver 136. Each modulated control signal is for modulating a respective display element based on a sum of EM field contributions from a plurality of primitives corresponding to a scene (e.g., including one or more objects) for the respective display element.

In some implementations, a number of light emitting elements in the illuminator 140 can be smaller than a number of the display elements of the display 150, as long as light from the light emitting elements can illuminate over substantially a total surface of the display 150. For example, an illuminator having 64×64 OLEDs (organic light emitting diodes) can be used for a display having 1024×1024 elements. The driving device 130 (e.g., the illuminator driver 134) can be configured to simultaneously activate the number of lighting elements of the illuminator 140.

The illuminator 140 can include one or more coherent light sources (e.g., lasers), one or more semi-coherent light sources (e.g., LEDs (light emitting diodes) or superluminescent diodes (SLEDs)), one or more incoherent light sources, or a combination of such sources. In some implementations, the illuminator 140 is a monochromatic light source configured to emit a substantially monochromatic light, e.g., a red light, a green light, a yellow light, or a blue light. In some implementations, the illuminator 140 includes two or more light emitting elements, e.g., lasers or light emitting diodes (LEDs), each configured to emit light with a different color. For example, the illuminator 140 can include red, green, and blue lighting elements.

To display a full-color 3D object, three or more separate holograms for colors including at least red, green, and blue, can be computed, e.g., by the processing device 120. That is, at least three EM field contributions from corresponding primitives to the display elements can be obtained. The display elements can be modulated sequentially based on the at least three EM field contributions and the illuminator 140 can be controlled to sequentially turn on the at least red, green and blue lighting elements sequentially. For example, the driving device 130 can first transmit a first timing signal to turn on a blue lighting element and transmit first modulation control signals corresponding to a blue hologram to display elements of the display 150. After the blue hologram on the display 150 is illuminated with the blue light for a first period of time, the driving device 130 can transmit a second timing signal to turn on a green lighting element and transmit second control signals corresponding to a green hologram to display elements of the display 150. After the green hologram on the display 150 is illuminated with the green light for a second period of time, the driving device 130 can transmit a third timing signal to turn on a red lighting element and transmit third control signals corresponding to a red hologram to display elements of the display 150. After the red hologram on the display 150 is illuminated with the red light for a third period of time, the driving device 130 can repeat the above steps. Depending on temporal coherence-of vision effect in an eye of a viewer, the three colors can be combined in the eye to give an appearance of full color. In some cases, the illuminator 140 is switched off during a state change of the display image (or holographic reconstruction) and switched on when a valid image (or holographic reconstruction) is presented for a period of time. This can also depend on the temporal coherence of vision to make the image (or holographic reconstruction) appear stable.

In some implementations, the display 150 has a resolution small enough to diffract visible light, e.g., on an order of 0.5 µm or less. The illuminator 140 can include a single, white light source and the emitted white light can be diffracted by the display 150 into different colors for holographic reconstructions.

As discussed in further detail below with respect to FIGS. 5A-5D, there can be different configurations for the system 100. The display 150 can be reflective or transmissive. The display 150 can have various sizes, ranging from a small scale (e.g., 1-10 cm on a side) to a large scale (e.g., 100-1000 cm on a side). Illumination from the illuminator 140 can be from the front of the display 150 (e.g., for a reflective or transflective display) or from the rear of the display 150 (e.g., for a transmissive display). The illuminator 140 can provide uniform illumination across the display 150. In some implementations, an optical waveguide can be used to evenly illuminate a surface of the display 150.

In some implementations, the illuminator driver 134 and the illuminator 140 are integrated together as an illumination device, and the display driver 136 and the display 150 are integrated together as a display device. The driving memory 132 can be separated from the illuminator device and the display device, or the driving memory 132 can be integrated with one of the illuminator device and the display device. The illuminator device and the display device can communicate with each other.

In some implementations, the processing device 120 and the driving device 130 are integrated together as a controller for the display 150 and/or the illuminator 140. In some implementations, the processing device 120, the driving device 130, and the display 150 are integrated together as a single unit. The single unit can also be integrated with the illuminator 140. The single units can be arranged (or tiled) in arrays to form a larger device.

In some implementations, the driving device 130, the illuminator 140, and the display 150 are integrated together as a single unit, e.g., as a holographic display device. The processing device 120 can be integrated in the host device 110, e.g., through a PCIe slot. As noted above, the host device 110 can generate scene data using a 3D simulation application (e.g., the application 112), the scene data including information of a plurality of primitives corresponding to at least one object and generate the primitive data of the plurality of primitives corresponding to the at least one object based on the scene data using the API 114. The API 114 can be configured to adjust initial primitive data of the plurality of primitives generated from the scene data to generate the primitive data of the plurality of primitives, vertex data of vertices associated with the plurality of primitives, and/or tables and commands, e.g., as discussed with details in section 2.1.

In some implementations, an optically diffractive device, e.g., a field grating device, a waveguide device, or a lightguide device, as illustrated in FIGS. 5A to 5D, is coupled between the illuminator 140 and the display 150 and is configured to diffract light from the illuminator 140 into the display 150 that then diffracts the light to a viewer's eyes. The optically diffractive device can be positioned adjacent to the display 150, e.g., as illustrated in FIG. 5A to FIG. 6H.

In some examples, the light from the illuminator 140 can be incident on the optically diffractive device with a large incident angle from a side, such that the illuminator 140 does not block the viewer's view of the display 150. In some examples, the diffracted light from the optically diffractive device can be diffracted at a nearly normal incident angle into the display, such that the light can relatively uniformly illuminate the display 150 and be diffracted to the viewer's eyes with reduced (e.g., minimized) loss.

The optically diffractive device can include a field grating structure (e.g., the field grating structure 508-1 of FIG. 5A) formed on a first side of a substrate (e.g., the substrate 508-2 of FIG. 5A) and configured to suppress color crosstalk between different colors of light incident on the display 150 and/or a zero order redirecting structure (e.g., the zero order redirecting grating structure 508-3 of FIG. 5A) formed on a second, opposite side of the substrate and configured to suppress display zero order light. In some implementations, example optically diffractive devices are configured and performed as described in international application PCT/US2021/50271 entitled "DISPLAYING THREE-DIMENSIONAL OBJECTS" and filed on Sep. 14, 2021 and international application PCT/US2021/50275 entitled "RECONSTRUCTING OBJECTS WITH DISPLAY ZERO ORDER LIGHT SUPPRESSION" and filed on Sep. 14, 2021, which are commonly-owned and fully incorporated herein by reference.

In some implementations, the field grating structure includes at least one optically diffractive components and at least one of one or more color-selective polarizers or at least one of one or more reflective layers or one or more transmissive layers. In some implementations, e.g., as discussed with further details in section 4.5, the field grating structure includes at least one diffraction grating with a low diffraction efficiency for the light from the illuminator 140. The diffraction efficiency can be lower than a predetermined threshold, e.g., 20%, 15%, or 10%.

In some implementations, a coupling device is arranged between the illuminator 140 and the optically diffractive device (e.g., the field grating structure). The illuminator 140 can illuminate a plurality of different colors of light. The coupling device can be configured to receive the plurality of different colors of light from the illuminator 140 and to output the plurality of different colors of light to the optically diffractive device.

Figure 6A:
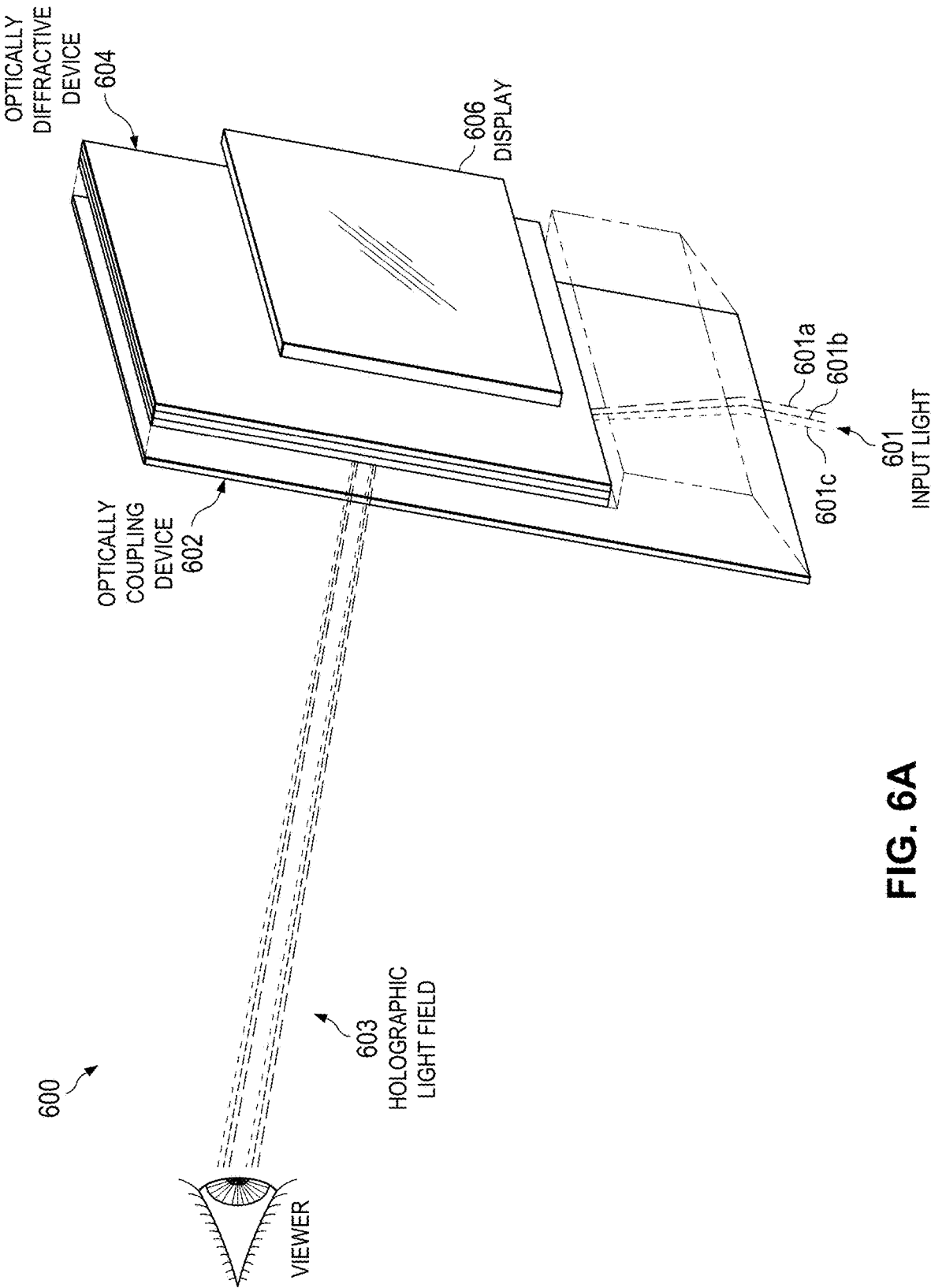
FIG. 6A illustrates an example system for 3D display with bottom illumination.
Figure 6B:
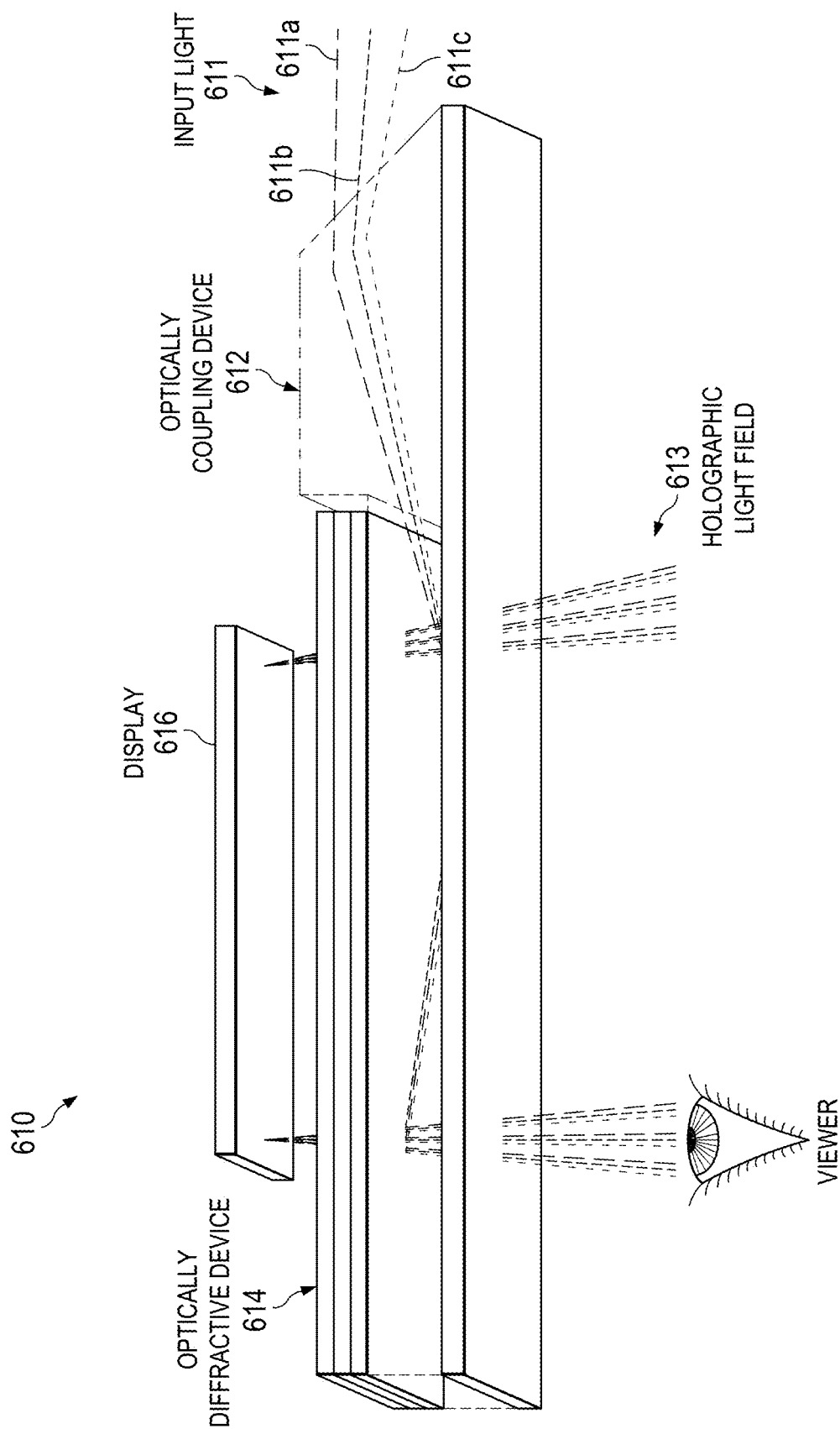
FIGS. 6B-6D show various views of an example system for 3D display with side illumination.
Figure 6C:
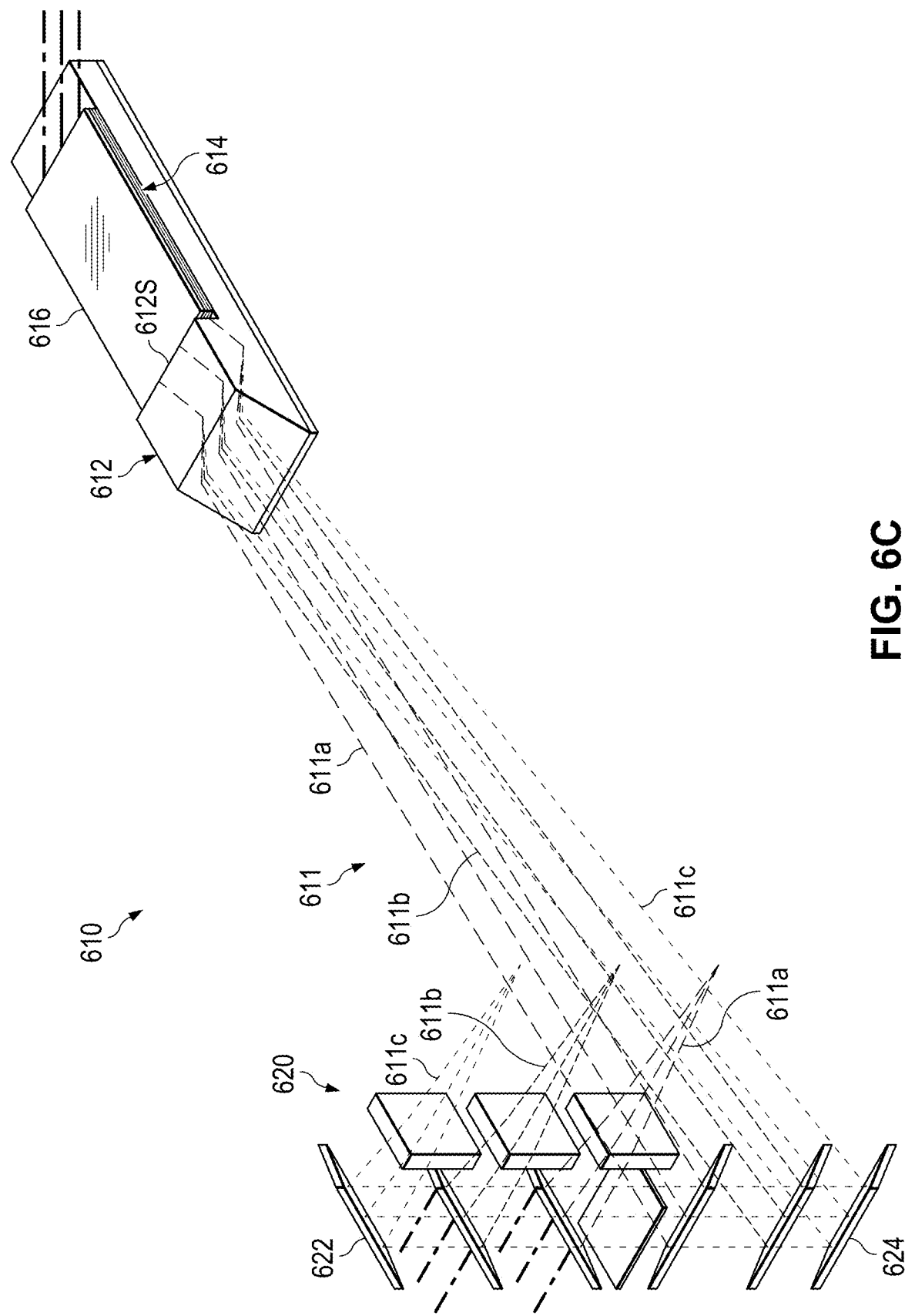
Figure 6D:
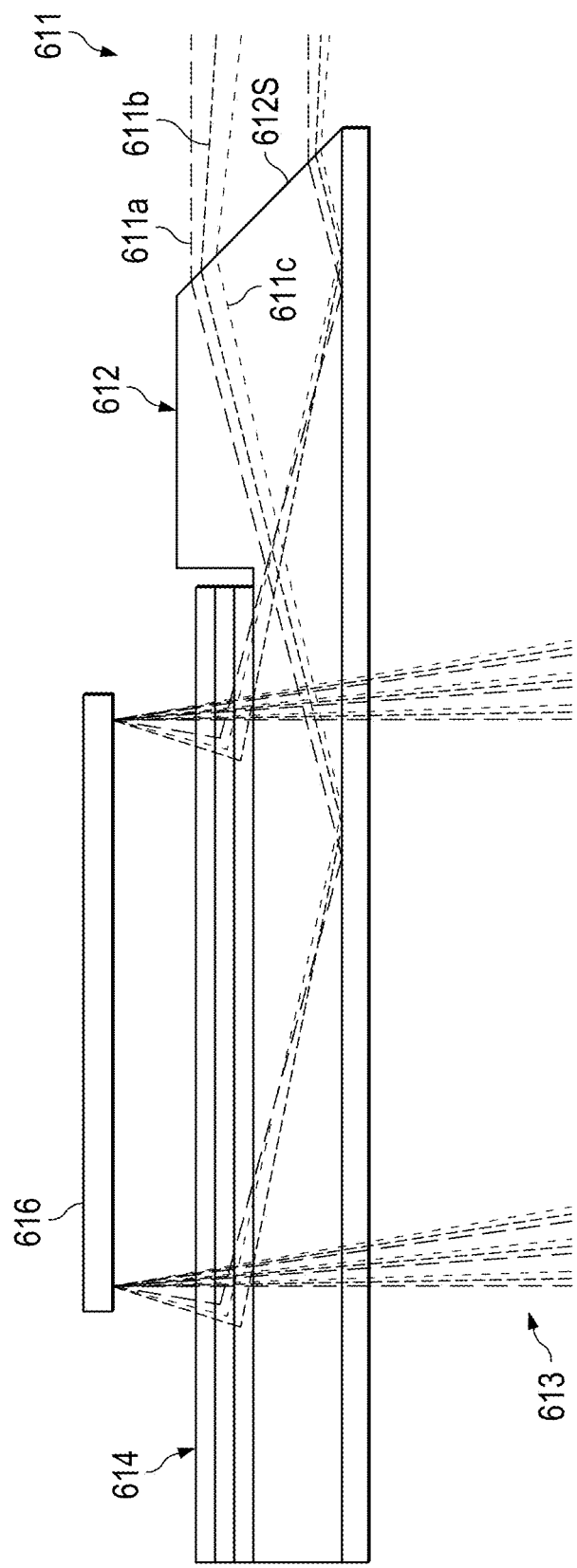
Figure 6E:
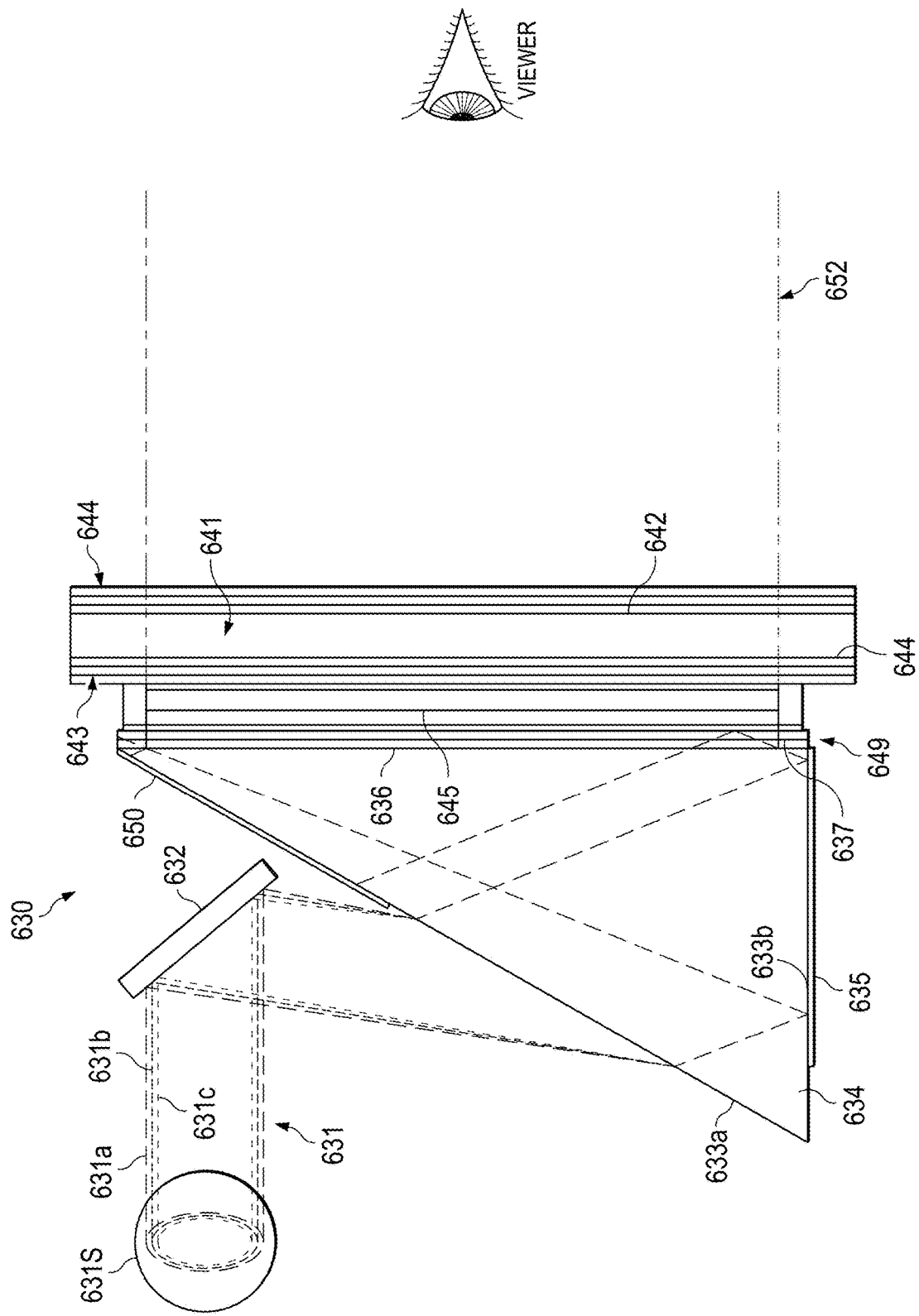
FIGS. 6E-6G illustrate an example system for 3D display with side illumination.
Figure 6F:
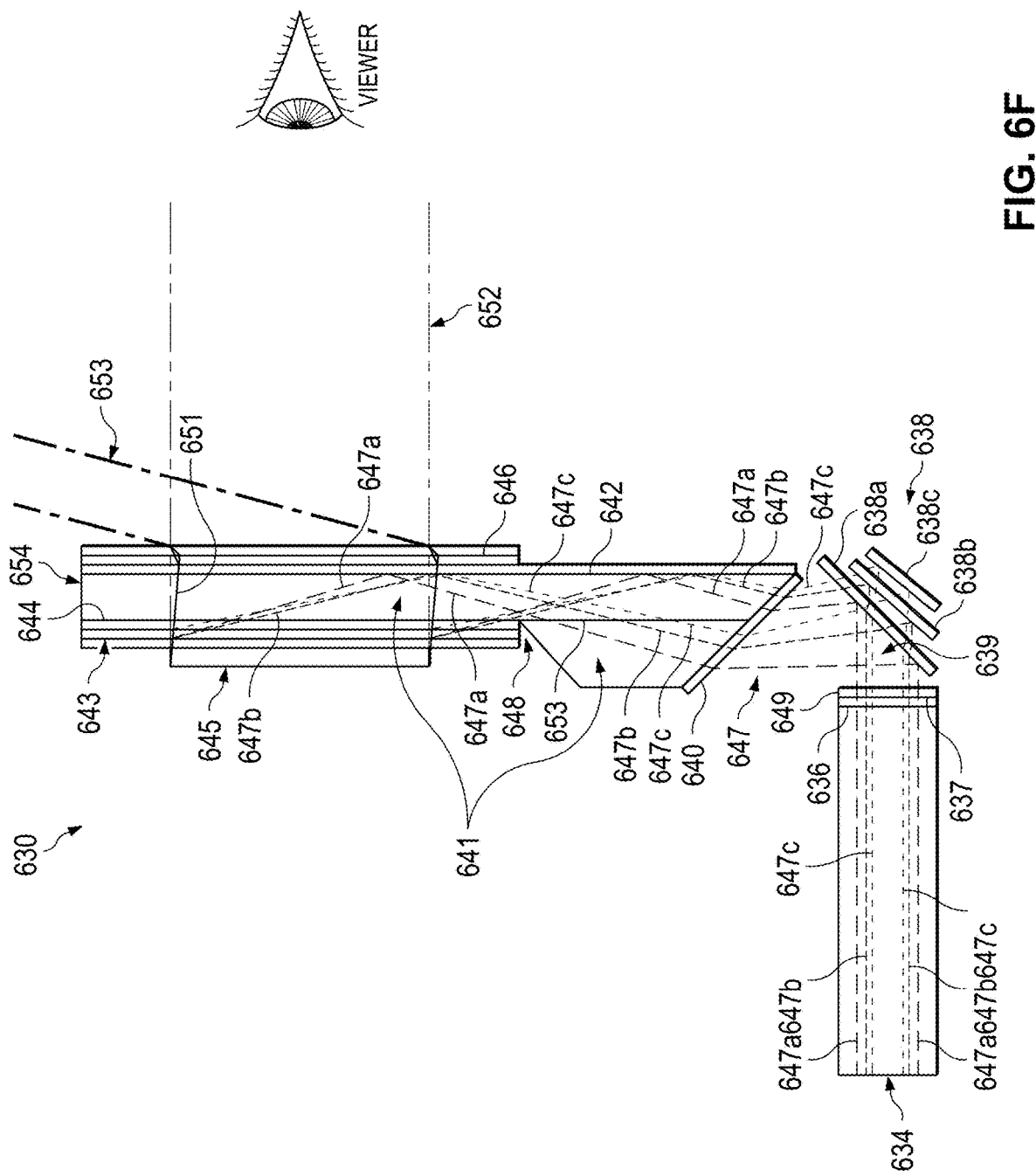
Figure 6G:
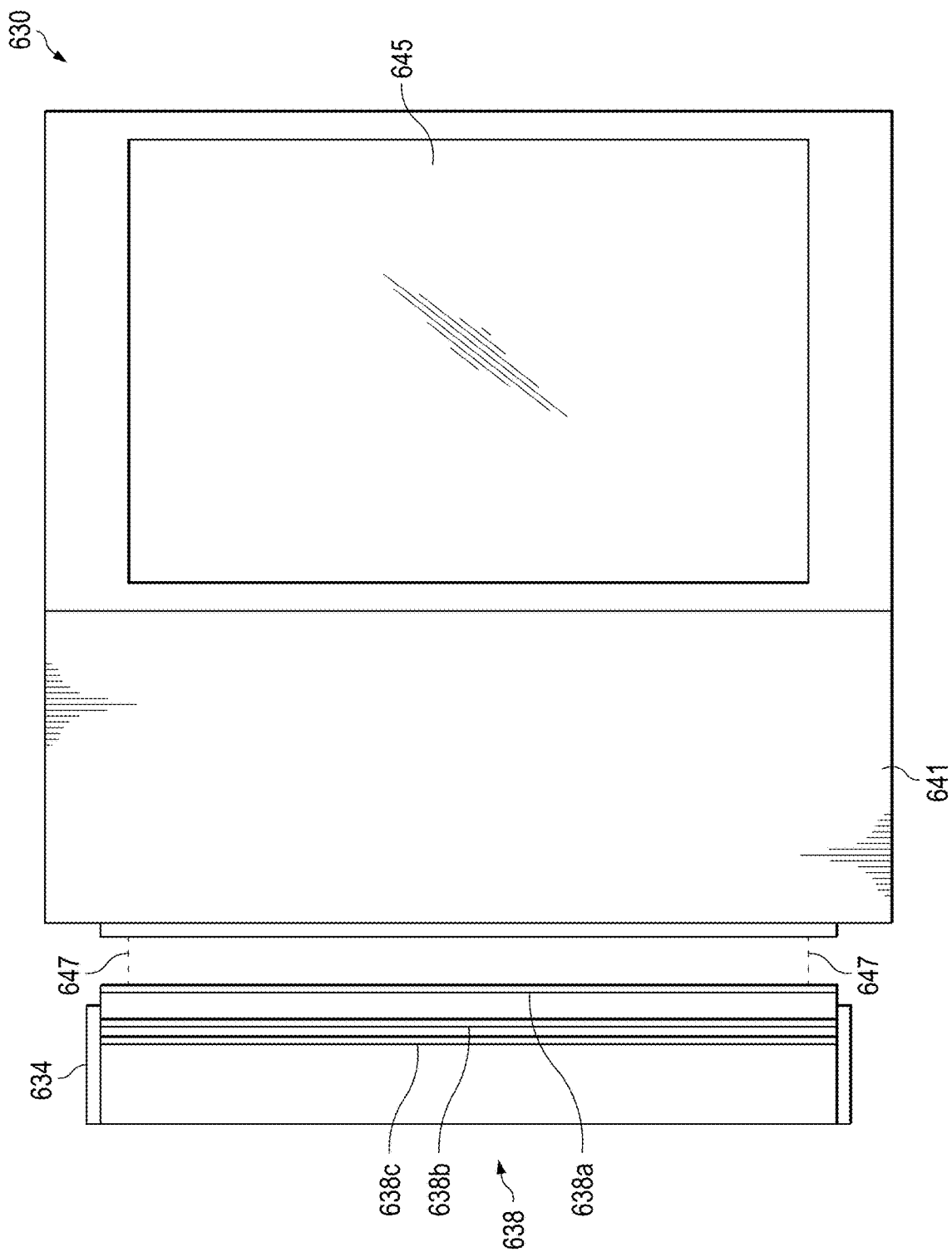

In some implementations, e.g., as discussed with further details in FIG. 6E-6G, the coupling device includes: a prism element between the illuminator 140 and the optical diffractive device and configured to receive the plurality of different colors of light from an input surface of the prism element; one or more expansion gratings adjacent an exit surface of the prism element, each of the one or more expansion gratings configured to expand a beam profile of a different corresponding color of light by a factor in at least one dimension; and one or more reflectors downstream of the one or more expansion gratings, each of the one or more reflectors being configured to reflect a respective color of light into the optically diffractive device, where a tilt angle of each of the one or more reflectors is independently adjustable to cause a uniformity of diffraction from the optical diffractive device to the display 150.

In some implementations, the optically diffractive device (e.g., the field grating structure) is positioned facing a display surface of the display 150 along a perpendicular direction to the display surface. In some implementations, the coupling device is configured to couple the plurality of different colors of light into the optically diffractive device (e.g., the field grating structure) from a bottom surface or a top surface of the coupling device, e.g., as discussed with further details in section 4.2 and FIG. 6A. In some implementations, the coupling device is configured to couple the plurality of different colors of light into the optically diffractive structure (e.g., the field grating structure) from a side surface of the coupling device, e.g., as discussed with further details in section 4.3 and FIGS. 6B-6G.

Figure 6H:
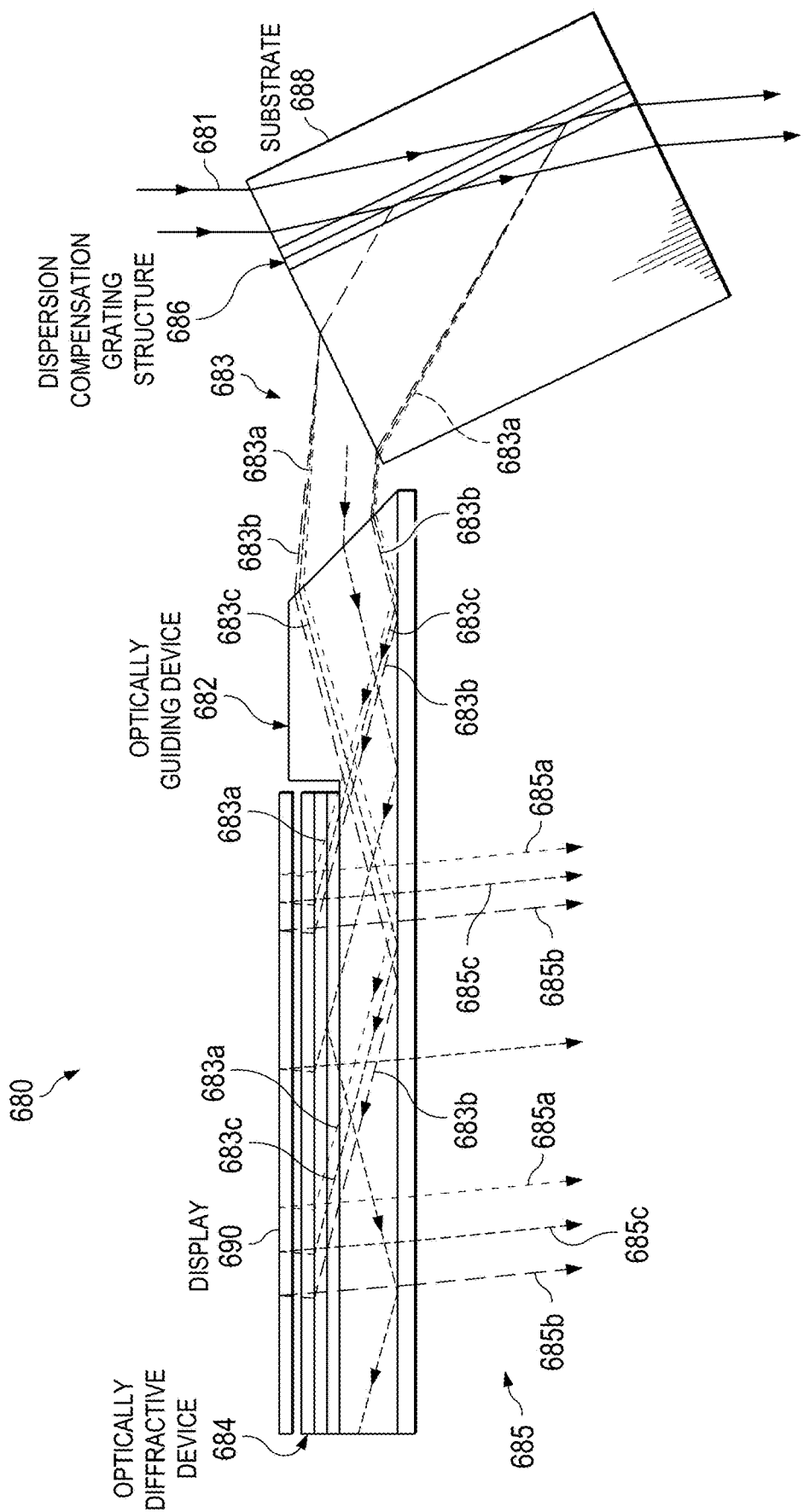
FIG. 6H illustrates an example of dispersion compensation in a system for 3D display

In some implementations, e.g., as discussed with further details in section 4.4 and FIG. 6H, a plurality of optical components arranged between the illuminator 140 and the display 150 can be configured for dispersion compensation. For example, at least one first optical component (e.g., a diffraction grating) is configured to cause a positive optical dispersion for light incident on the display, and at least one second optical component (e.g., another diffraction grating)

can be configured to cause a negative optical dispersion for the light, the light having a spectral bandwidth with a peak wavelength. The positive optical dispersion and the negative optical dispersion can be compensated with each other, such that a holographic scene reconstructed from the light has no or little light dispersion.

2.5 Example System for 3D Display

Figure 1B:
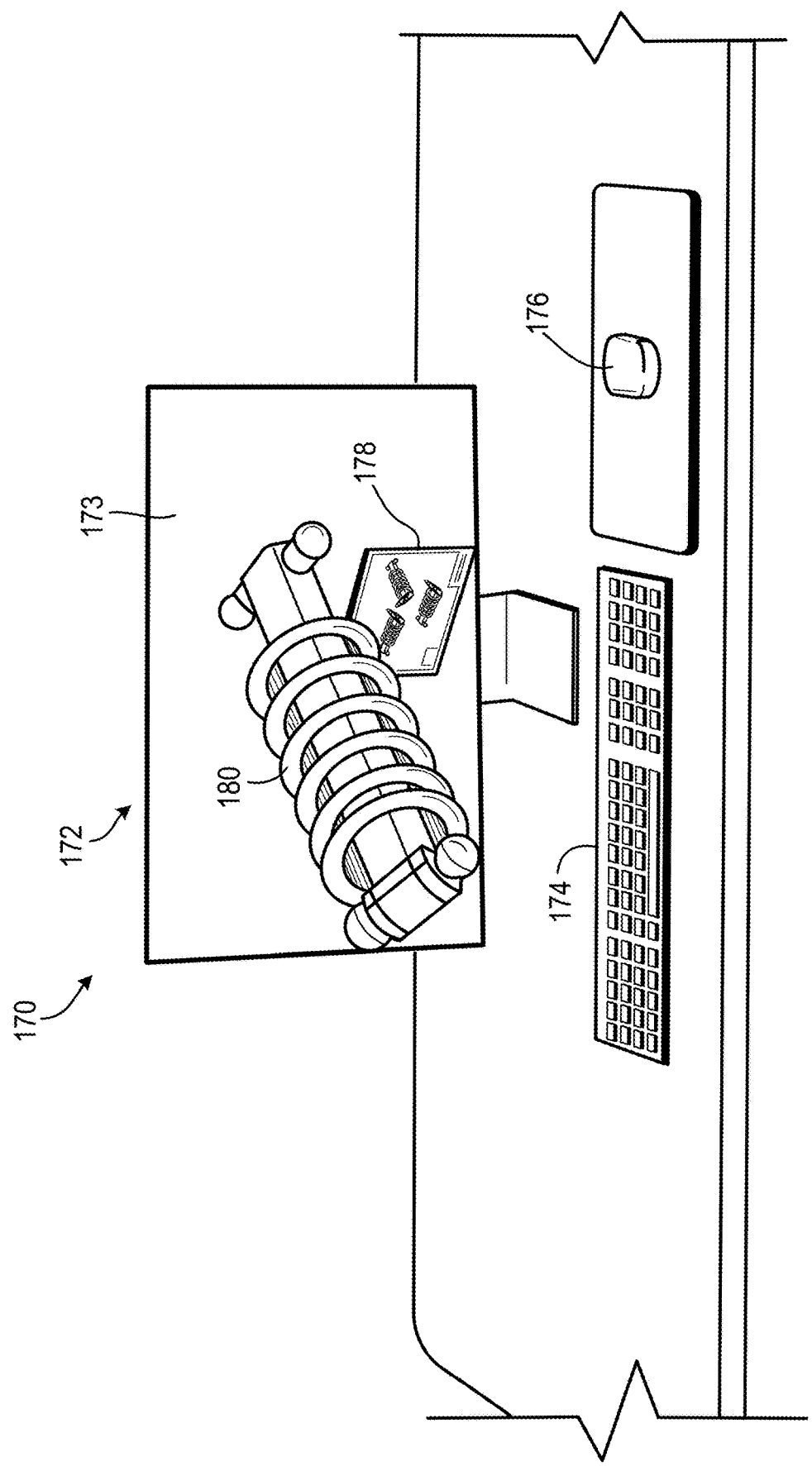
FIG. 1B illustrates an example system for 3D display.

FIG. 1B illustrates an example system 170 for 3D display, e.g., displaying objects in a 3D space. The system 170 can include a computing device, e.g., the host device 110 of FIG. 1A optionally with the processing device 120 of FIG. 1A, and a holographic display device 172, e.g., the holographic display 150 of FIG. 1A optionally with the processing device 120 of FIG. 1A and/or the driving device 130 of FIG. 1A. A user can use an input device, e.g., a keyboard 174 and/or a mouse 176, to operate the system 170. For example, the user can create a CG model for a 2D object 178 and a 3D object 180 through the computing device. The computing device or the holographic display device 172 can include a holographic renderer, e.g., implemented by the processing device 120 of FIG. 1A, to render the CG model to generate corresponding graphic data for the 2D object 178 and the 3D object 180. The graphic data can include respective primitive data for a list of primitives corresponding to the objects 178 and 180.

The holographic display device 172 can include a processing device (e.g., the processing device 120 of FIG. 1A), a driving device (e.g., the driving device 130 of FIG. 1A), and a display 173 (e.g., the display 150 of FIG. 1A). The processing device can compute a respective sum of EM field contributions from the primitives to each display element of the display 173 and generate control signals for modulating each display element based on the respective sum of EM field contributions. The holographic display device 172 can further include an illuminator (e.g., the illuminator 140 of FIG. 1A). The driving device can generate a timing control signal to activate the illuminator. When light from the illuminator illuminates a surface of the display 173, the modulated display elements can cause the light to propagate in the 3D space to form a volumetric light field corresponding to a holographic reconstruction for the 2D views of object 178 and a holographic reconstruction for the 3D object 180. Thus, the 2D views of object 178 and the 3D holographic reconstruction of the object 180 are displayed as respective holographic reconstructions floating in the 3D space in front of, behind, or straddling the display 173.

In some implementations, the computing device transmits non-primitive based data, e.g., a recorded light field video, to the holographic display device 172. The holographic display device 172 can compute and generate corresponding holograms, e.g., a series of sequential holograms, to display as corresponding holographic reconstructions in the 3D space. In some implementations, the computing device transmits a CG holographic content simultaneously with live holographic content to the holographic display device 172. The holographic display device 172 can also compute and generate corresponding holograms to display the contents as corresponding holographic reconstructions in the 3D space.

3. Electromagnetic (EM) Computations 3.1 EM Field Contributions for Primitives

Figure 2:
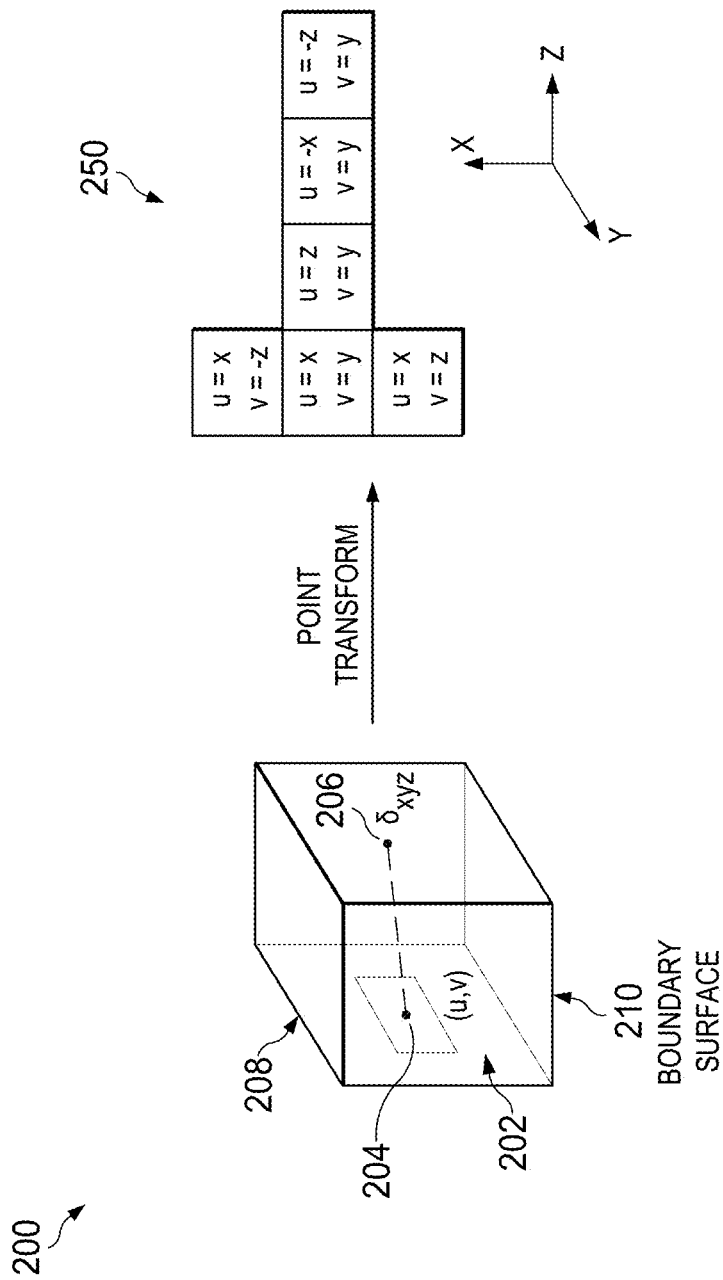
FIG. 2 illustrates an example configuration for electromagnetic (EM) field calculation.

FIG. 2 illustrates an example configuration 200 for electromagnetic (EM) field calculation. A display 202, e.g., an LCOS device, including an array of display elements 204 and a list of primitives including a point primitive 206 are in a 3D space 208. The 3D space 208 includes boundary surfaces 210. In a 3D coordinate system XYZ, the point primitive 206 has coordinate information (x, y, z). Each display element 204 lies in a flat plane with respect to other display elements 204 and has a 2D position (u, v). The display element 204 also has a location in the 3D space. By a mathematical point transformation, the 2D position (u, v) can be transferred into six coordinates 250 in the 3D coordinate system. That is, a surface of the display 202 forms a portion of the boundary surfaces 210. Thus, EM field contributions from the list of primitives to a display element computed by defining a boundary condition at the surface of the display 202 represent a portion of the total EM field contributions from the primitives to the display element. A scale factor, e.g., six, can be multiplied to a sum of the EM field contributions for each of the display elements to obtain a scaled sum of the field contributions, and the display element can be modulated based on the scaled sum of the field contributions.

Primitives can be used for computer graphics rendering. Each type of primitive in computer graphics corresponds in the formulation of the technologies disclosed herein to a discrete mathematical function that defines a single holographic primitive for a graphical element added to a hologram. Each type of primitive can correspond to an expression for calculating an EM field contribution to a display element. A primitive can be a point primitive, a line primitive, or a polygon primitive (e.g., a triangle primitive). As illustrated below, an analytic expression can be derived by calculating EM field propagation from a corresponding primitive to a display element of a display.

3.2 Computations for Primitives

FIG. 3A illustrates an example EM propagation from a point primitive 304 to a display element 302 of a display 300. In a 3D coordinate system XYZ, it is assumed that z coordinate is 0 across the display 300, which means negative z values are behind the display 300 and positive z values are in front of the display 300. The point primitive 304 has a coordinate (x, y, z), and the display element 302 has a coordinate (u, v, 0). A distance $d_{uv}$ between the point primitive 304 and the display element 302 can be determined based on their coordinates.

The point primitive 304 can be considered as a point charge with time varying amplitude. According to electromagnetic theory, an electric field E generated by such a point charge can be expressed as:

$$|E| \propto \frac{\exp(i2\pi d/\lambda)}{d^2},$$

where $\lambda$ represents a wavelength of an EM wave, and d represents a distance from the point charge.

Thus, the electric field $E_{u,v}$ at the display element (u,v) can be expressed as:

$$|E_{u,v}| \propto \frac{1}{d_{uv}^2} \exp(i2\pi d_{uv}/\lambda),$$

where I represents a relative intensity of the holographic primitive electric field at the display element contributed from the point primitive 304.

As discussed above with respect to FIG. 2, a surface of the display 300 forms only a portion of a boundary surface for the EM field. A scale factor $\delta$ can be applied to the electric field $E_{u,v}$ to get a scaled electric field $E_\varphi(u, v)$ at the display element that adjusts for the partial boundary as follows:

$$E_\varphi(u, v) \propto \frac{\delta I}{d_{uv}^2} \exp(i2\pi d_{uv}/\lambda),$$

where $\delta \cong [6 + \varepsilon], 0 < \varepsilon \leq 1$.

FIG. 3B illustrates an example of EM propagation from a line primitive 306 to the display element 302 of the display 300 in the 3D coordinate system XYZ. As noted above, the display element 302 can have a coordinate (u, v, 0), where z=0. The line primitive 306 has two endpoints $P_0$ with coordinate $(x_0, y_0, z_0)$ and $P_1$ with coordinate $(x_1, y_1, z_1)$. A distance do between the endpoint $P_0$ and the display element can be determined based on their coordinates. Similarly, a distance $d_1$ between the endpoint $P_1$ and the display element can be determined based on their coordinates. A distance $d_{01}$ between the two endpoints $P_0$ and $P_1$ can be also determined, e.g., $d_{01}=d_1-d_0$.

As discussed above, a line primitive can be treated as a superposition or a linear deformation, and a corresponding analytic expression for the line primitive as a linear aperture can be obtained as a distributed delta function in space. This analytic expression can be a closed expression for continuous 3D line segments as holograms.

Figure 3C:
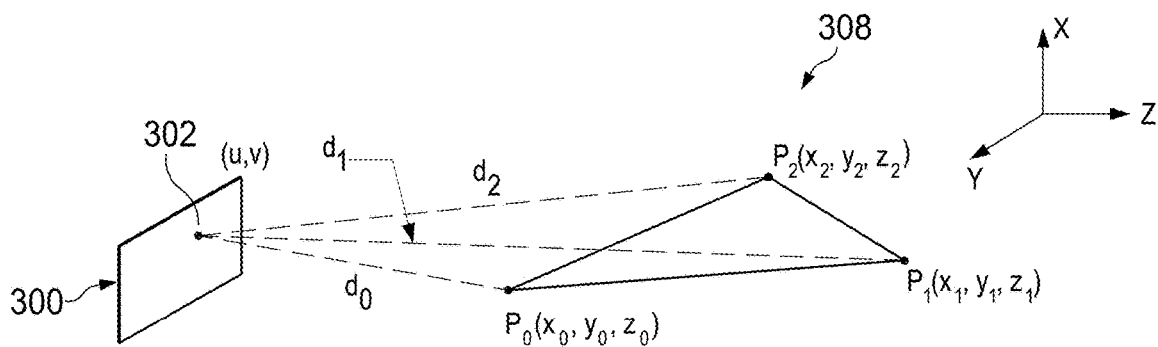
FIG. 3C illustrates an example EM propagation for a triangle primitive relative to a display element of a display.

FIG. 3C illustrates an example EM propagation from a triangle primitive 308 to the display element 302 of the display 300 in the 3D coordinate system XYZ. As noted above, the display element 302 can have a coordinate (u, v, 0), where z=0. The triangle primitive 308 has three endpoints: $P_0 (x_0, y_0, z_0)$, $P_1 (x_1, y_1, z_1)$, and $P_2 (x_2, y_2, z_2)$. Distance $d_0$, $d_1$, and $d_2$ between the display element and the endpoints $P_0$, $P_1$, and $P_2$ can be respectively determined based on their coordinates.

Similar to the line primitive in FIG. 3B, the triangle primitive can be treated as a continuous aperture in space and an analytical expression for the EM field contribution of the triangle primitive to the display element can be obtained by integration. This can be simplified to obtain an expression for efficient computation.

As discussed above, a processing device, e.g., the processing device 120 of FIG. 1A, can compute an EM field contribution from a primitive to a display element based on an analytical expression that can be determined as shown above. As an example, the EM field contribution for a line primitive is computed as below.

Each display element in a display has a physical location in space, and each display element lies in a flat plane with respect to other display elements. Assuming that the display elements and their controllers are laid out as is customary in display and memory devices, a simple mathematical point transformation can be used to transform a logical location of a given display element based on a logical memory address for the display element in a processor to an actual physical location of the display element in the space. Therefore, as the logical memory addresses of the display elements are looped over in a logical memory space of the processor, corresponding actual physical locations in the space across the surface of the display can be identified.

As an example, if the display has a 5 μm pitch in both x and y, each logical address increment can move 5 μm in the x direction, and when an x resolution limit of the display is reached, the next increment will move back to the initial x physical location and increment the y physical location by 5 μm. The third spatial coordinate z can be assumed to be zero across the display surface, which means that the negative z values are behind the display, and the positive z values are in front of the display.

To begin the line calculation, a type of scaled physical distance between the current display element and each of the two points of the line primitive can be determined to be $d_0$ and $d_1$. As a matter of fact, $d_0$ and $d_1$ can be calculated once per primitive, as every subsequent calculation of the distances across display elements is a small perturbation of an initial value. In this way, this computation is performed in one dimension.

The computation process can be orders of magnitude simpler and faster than the most efficient line drawing routines in conventional 2D display technology. Moreover, this computation algorithm scales linearly with the number of display elements. Thus, scaling computing units of the controller as a 2D networked processing system can keep up with computation needs of an increasing surface area of the display.

3.3 Computation Implementations

A Maxwell holographic phasel computing unit (PPU), e.g., the processing device 120 of FIG. 1A, can compute an EM field contribution from a primitive to a display element based on an analytical expression that can be determined as shown above. The PPU can be implemented in, for example, an ASIC, an FPGA, or GPU, or any combination thereof.

In a modern GPU or PPU pipeline, a GPU or PPU takes descriptions of geometric figures as well as vertex and fragment shader programs to produce color and depth pixel outputs to one or more output image surfaces (called render targets). The process involves an explosive fan-out of information where geometry is expanded into shading fragments, followed by a visibility test to select whether work needs to be done on each of these fragments. A fragment is a record that contains all the information involved to shade that sample point, e.g., barycentric coordinates on the triangle, interpolated values like colors or texture coordinates, surface derivatives, etc. The process of creating these records then rejecting those that do not contribute to the final image is the visibility test. Fragments that pass the visibility test can be packed into work groups called wavefronts or warps that are executed in parallel by the shader engines. These produce output values that are written back to memory as pixel values, ready for display, or for use as input textures for later rendering passes.

In MAXWELL HOLOGRAPHY®, the rendering process can be greatly simplified. In Maxwell holographic calculations, every primitive can contribute to every display element. There is no need to expand geometry into pixels and no need to apply visibility tests before packing wavefronts. This can also remove the need for decision making or communication between Maxwell holographic pipelines and allow computation to become a parallel issue with a number of possible solutions each one tuned to speed, cost, size or energy optimization. The graphics pipeline is significantly shorter with fewer intermediate steps, no data copying or movement, and fewer decisions leading to lower latency between initiating a draw and the result being ready for display. This can allow Maxwell holographic rendering to create extremely low latency displays. As discussed below, this can allow Maxwell holographic calculations to increase accuracy, for example, by using fixed point numbers or using updated floating point number system in the Maxwell holographic pipeline, and to optimize computation speed, for example, by optimizing mathematical functions.

3.3.1 Using Fixed Point Numbers

When calculating an EM contribution from each primitive at each display element (or "phasel"), intermediate calculations involve producing very large numbers. These large numbers involve special handling as they also need to retain the fractional parts during the calculation.

For floating point values, they are most accurate close to the origin (zero on the number line) and may lose one bit of accuracy every power-of-two when moving away from the origin. For numbers close in the range [−1,1], the accuracy of floating point values can be exquisite, but once reaching numbers in the tens of millions, e.g., reaching the point where single-precision 32-bit IEEE-754 floating point values have no fractional digits remaining, the entire significand (a.k.a mantissa) is used to represent the integer part of the value. However, it is the fractional part of large numbers that MAXWELL HOLOGRAPHY® is particularly interested in retaining.

In some cases, a mathematical function is calculated using at least one of fixed point number representations or floating point number representations. In some cases, fixed point numbers are used in the Maxwell holographic calculations. Fixed point number representations are numbers where the decimal point does not change on a case-by-case basis. By choosing the correct numbers of bits for the integer and fractional parts of a number, the same number of fractional bits can be obtained regardless of the magnitude of the number. Fixed point numbers are represented as integers with an implicit scale factor, e.g., 14.375 can be represented as the number 3680 (0000111001100000 base-2) in a 16-bit fixed point value with 8 fractional bits. This can be also represented as an "unsigned 16.8" fixed point number, or u16.8 for short. Negative numbers can have one additional sign bit and are stored in "2s compliment" format. In such a way, the accuracy of the calculation can be greatly improved.

3.3.2 Using Updated Floating Point Number System

In the holographic phase calculation, a "normal size" number is divided by a very small value, which creates a huge value. On the GPU or PPU in floating point, this result is large enough to force the number representation to start losing fractional bits—as a number representation floats have a fixed budget of bits to represent the value. As a number increases in size, fewer bits get allocated to the fractional parts until eventually zero bits are assigned to values below the decimal point.

In some implementations, an updated floating point number system can be performed with more accurate and better performance than both regular floating point numbers and fixed point numbers. Under the updated floating point number system, immediately after the large-value calculation, sine/cosine of the large value is taken. To achieve this, all integer multiples of Pi before continuing leaving only a fractional value are removed. This process is called "range reduction". In actuality, sin(pi*x) is calculated as a function sin pi(x) and the angle "x" is formulated so that it arrives pre-multiplied by pi. This turns the range reduction into simply dropping the integer part of a number and keeping only the fractional part below the decimal point. For example, sin pi(256824.456029) can be calculated a function of sin pi(0.465029).

Using fixed point values where the number of decimal digits never changes, requires hauling around a lot of redundant bits. Using "digit recurrence" formulations of the math operations allows to generate fractional bits on demand. The algorithms for division and square roots are inherently floating point algorithms.

Under the updated floating point number system, the techniques of "Application Specific Arithmetic" can be implemented to skip unpacking and repacking of IEEE-754 floats between mathematical operations, instead, exchanging the parts of a number along with explicit flags describing what the number represents. The following table illustrates a comparison between floating-point unit (FPU) centric algorithm and application specific arithmetic algorithm.

| FPU centric algorithm | Application Specific Arithmetic |
| --- | --- |
| ADD(a,b) | unpack(a), unpack(b), unpack(d) |
| unpack(a), unpack(b) | ADD(a,b) |
| sum | Sum |
| normalize | normalize -> c |
| pack(c) | MULTIPLY(c,d) |
| MULTIPLY(c,d) | multiply(c,d) |
| unpack(c), unpack(d) | normalize -> e |
| multiply | SQRT(e) |
| normalize | sqrt(e) -> f |
| pack(e) | pack(f) |
| SQRT(e) | |
| unpack(e) | |
| sqrt | |
| pack(f) | |

3.3.3 Optimization to Mathematical Functions

As shown above, Maxwell holographic calculations involve the use of transcendental mathematical functions, e.g., sine, cosine, arc tangent, etc. In a CPU, these functions are implemented as floating point library functions that can use specialized CPU instructions, or on a PPU or GPU as floating point units in the PPU or GPU. These functions are written to take arguments as a floating point number and the results are returned in the same floating point representation. These functions are built for the general case, to be accurate where floats are accurate, to be correctly rounded and to cope with every edge case in the floating point number representation (+/−Infinity, NaN, signed zero, and denormal floats).

In Maxwell holographic calculations, with the fixed point representation, there is no need to use denormal floats for gradual underflow, no need to handle NaN results from operations like division by zero, no need to alter the floating point rounding modes, and no need to raise floating point exceptions to the operating system. All of these allow simplifying (and/or optimizing) the transcendental mathematical functions, for example, as discussed below.

In some cases, optimizations can be made to take arguments in one fixed point format and return the value to a different level of accuracy, e.g., input s28.12 and output s15.14. This can be especially desirable when calculating the sine of large values in the 10s of millions, the input argument can be large but the output can only need to represent the value range [−1,1], or arctangent which takes in any value but return values in the range [−π/2, π/2].

In some cases, optimization can be made to freely implement the transcendental functions as fully enumerated look-up tables, as interpolated tables, as semi-table based polynomial functions, or as semi-table based full minimax polynomials, depending on the input range involved. It also allows to apply specialized range reduction methods that cope with large inputs, which the general purpose GPU pipeline calculation can skip for speed.

In some cases, another optimization can be transforming trigonometric calculations from the range [−π, π] into a signed 2's compliment representation in the range [−1,1] which has the advantage of not requiring expensive modulo 2π division operations.

3.3.4 Example Process

FIG. 4E is a flowchart of an example process 450 of calculating EM field contributions from primitives to display elements. The process can be performed by a processing device, e.g., the processing device 120 of FIG. 1A.

At step 452, the processing device obtains information of a plurality of primitives corresponding to at least one object, where the information comprises respective primitive identifiers of the plurality of primitives. At step 454, the processing device obtains primitive data of the plurality of primitives based on the information of the plurality of primitives.

In some implementations, the processing device receives a command from a computing device (e.g., the host device 110 of FIG. 1A). The command includes the information of the plurality of primitives, without the primitive data of the plurality of primitives. The command can include an instruction for drawing the plurality of primitives based on the information of the plurality of primitives. The processing device can receive the primitive data of the plurality of primitives from the computing device, where the primitive data and the respective primitive identifiers of the plurality of primitives are associated and stored in the computing device, e.g., table 410 in FIG. 4A.

Each primitive of the plurality of primitives includes one or more vertices, and the primitive data of the primitive can include vertex data of the one or more vertices. The information of the plurality of primitives can include: for each of the plurality of primitives, one or more vertex identifiers of the one or more vertices, and an association between a primitive identifier of the primitive and the one or more vertex identifiers of the one or more vertices of the primitive, e.g., as shown in the index table 422 of FIG. 4B.

The plurality of primitives include a plurality of vertices. The processing device can retrieve the primitive data of the plurality of primitives from a memory (e.g., the memory 118 of FIG. 1A) based on vertex identifiers of the plurality of vertices of the plurality of primitives. The primitive data can include respective vertex data of each of the plurality of vertices, and the memory stores vertex data of the plurality of vertices associated with the vertex identifiers of the plurality of vertices, e.g., table 400 of FIG. 4A.

In some implementations, the respective vertex data of the vertex includes at least one of: a vertex identifier of the vertex, coordinate information of the vertex in a 3D coordinate system, color information associated with the vertex, texture coordinate information associated with the vertex, viewpoint dependent shading information associated with the vertex, or occlusion information associated with the vertex.

At step 456, for each primitive of the plurality of primitives, the processing device determines an electromagnetic (EM) field contribution to each of a plurality of display elements of a display (e.g., the display 150 of FIG. 1A) based on primitive data of the primitive. At step 458, for each of the plurality of display elements of the display, the processing device generates a sum of the EM field contributions of the plurality of primitives to the display element.

In some implementations, the plurality of primitives include first and second primitives that are adjacent to each other. The first primitive and the second primitive have at least one shared vertex. The processing device can determine a first EM field contribution of the first primitive to a display element of the display based on primitive data of the first primitive and determining a second EM field contribution of the second primitive to the display element of the display based on the first EM field contribution and primitive data of the second primitive.

In some implementations, the processing device adjusts vertex data associated with at least one of the first primitive or the second primitive to generate a gap between the first primitive and the second primitive, such that there is no shared vertex between the first primitive and the second primitive. The gap can be identical to or greater than a predetermined diffraction limit of the display. The processing device can determine the EM field contribution of the at least one of the first primitive or the second primitive based on the adjusted vertex data associated with the at least one of the first primitive or the second primitive.

In some implementations, for each primitive of the plurality of primitives, the processing device determines, in a three-dimensional (3D) coordinate system, at least one distance between the display element and the primitive based on coordinate information of the display element and coordinate information of the primitive, and determines the EM field contribution of the primitive to the display element based on a predetermined expression for the primitive and the at least one distance. The predetermined expression can be determined based on at least one of: analytically calculating an EM field propagation from the primitive to the display element, a solution of Maxwell's equations with a boundary condition defined by the display, or at least one function from a group of functions including a sine function, a cosine function, and an exponential function, where determining the EM field contribution includes identifying a value of the at least one function in a table stored in a memory.

In some implementations, the processing device determines first respective EM field contributions from a first primitive of the plurality of primitives to each display element of the plurality of display elements; determines second respective EM field contributions from a second primitive of the plurality of primitives to each display element of the plurality of display elements; and accumulates the EM field contributions for each display element of the plurality of display elements by adding the first and second respective EM field contributions corresponding to the display element. Determining the first respective EM field contributions from the first primitive to each display element of the plurality of display elements can be performed in parallel with determining the second respective EM field contributions from the second primitive to each display element of the plurality of display elements.

In some implementations, for each primitive of the plurality of primitives, the processing device determines the electromagnetic (EM) field contribution to each of the plurality of display elements of the display based on the primitive data of the display by at least one of: determining a first EM field contribution of a first primitive to a first display element in parallel with determining a second EM field contribution of a second primitive to the first display element, determining a first EM field contribution of a first primitive to a first display element in parallel with determining a second EM field contribution of a second primitive to a second display element, or determining a first EM field contribution of a first primitive to a first display element in parallel with determining a second EM field contribution from the first primitive to a second display element.

In some implementations, the processing device obtains sums of EM field contributions for the plurality of display elements of the display by pipeline processing of determining the EM field contributions of each of the plurality of primitives to each of the plurality of display elements and generating the sum of the EM field contribution from the plurality of primitives to each of the plurality of display elements, e.g., as illustrated in FIG. 4D.

In some implementations, the processing device generates a hologram corresponding to the object, and the hologram includes sums of EM field contributions for the plurality of display elements of the display. The hologram can be a complex-valued hologram. In some implementations, the processing device converts the complex-valued hologram to a phase-only hologram. In some implementations, the hologram is a phase hologram or an amplitude hologram. The processing device can store the hologram in a storage device and/or transmit the hologram to a driving device (e.g., the driving device 130 of FIG. 1A) for the display.

In some implementations, the processing device changes the hologram by adjusting a respective phase for each of the plurality of display elements, e.g., by adding a corresponding phase to the respective phase for each of the plurality of display elements.

In some implementations, the processing device is configured to: after obtaining the primitive data of the plurality of primitives, adjust the primitive data of the plurality of primitives, where the adjusted primitive data of the plurality of primitives corresponds to a virtual object moved with respect to the display in a global 3D coordinate system. For each primitive of the plurality of primitives, the processing device can determine the EM field contribution of the primitive to each of the plurality of display elements of the display based on the adjusted primitive data of the primitive in the 3D coordinate system. In some implementations, the adjusted primitive data of the plurality of primitives corresponds to the virtual object rotated with an angle with respect to the display in the global 3D coordinate system. The angle corresponds to a redirecting angle of an optically redirecting device configured to redirect light from the display, such that modulated light by the plurality of display elements forms a holographic scene, while display zero order light from the display is redirected away from the holographic scene.

In some implementations, the adjusted primitive data of the plurality of primitives corresponds to the virtual object moved, with respect to the display, in the global 3D coordinate system, along a direction perpendicular to the display with a distance, and the distance corresponds to a focal length of an optically diverging component configured to diverge light from the display, such that modulated light by the plurality of display elements forms a holographic scene without divergence, while display zero order light from the display is diverged and suppressed in the holographic scene.

In some implementations, the processing device calculates one or more mathematical functions using at least one of fixed point number representations or floating point number representations, e.g., as discussed with details in section 3.3.

In some implementations, the processing device obtains information of the display, where the information of the display includes coordinate information of a plurality of points corresponding to the plurality of display elements. For each primitive of the plurality of primitives, the processing device calculates, in a three-dimensional (3D) coordinate system, EM propagation from the primitive to the display based on coordinate information of the primitive and coordinate information of a point corresponding to the display element.

4. Holographic Display Systems
4.1 Example System Setups

Figure 5A:
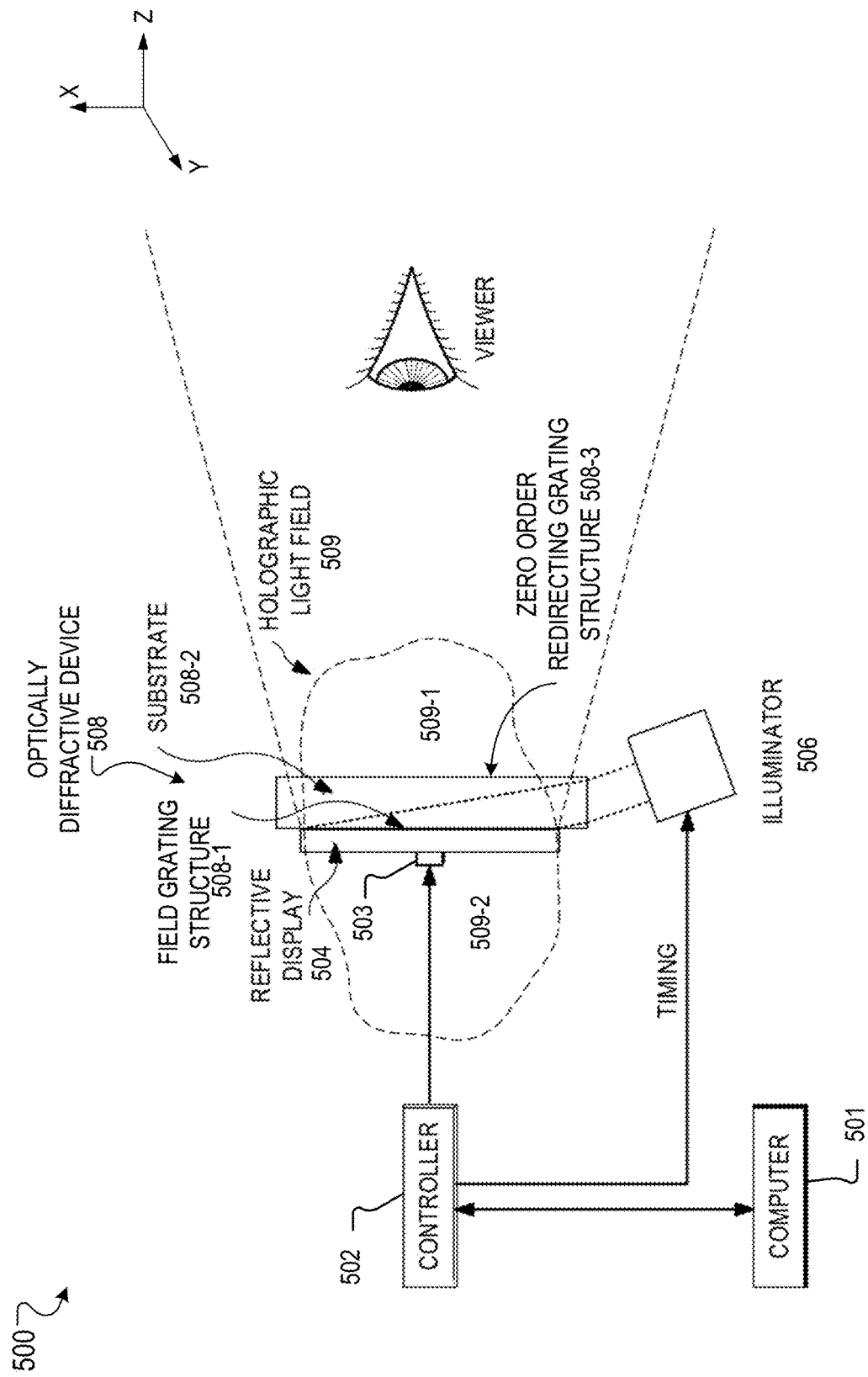
FIG. 5A illustrates an example system for 3D display including a reflective display with optically diffractive illumination.
Figure 5B:
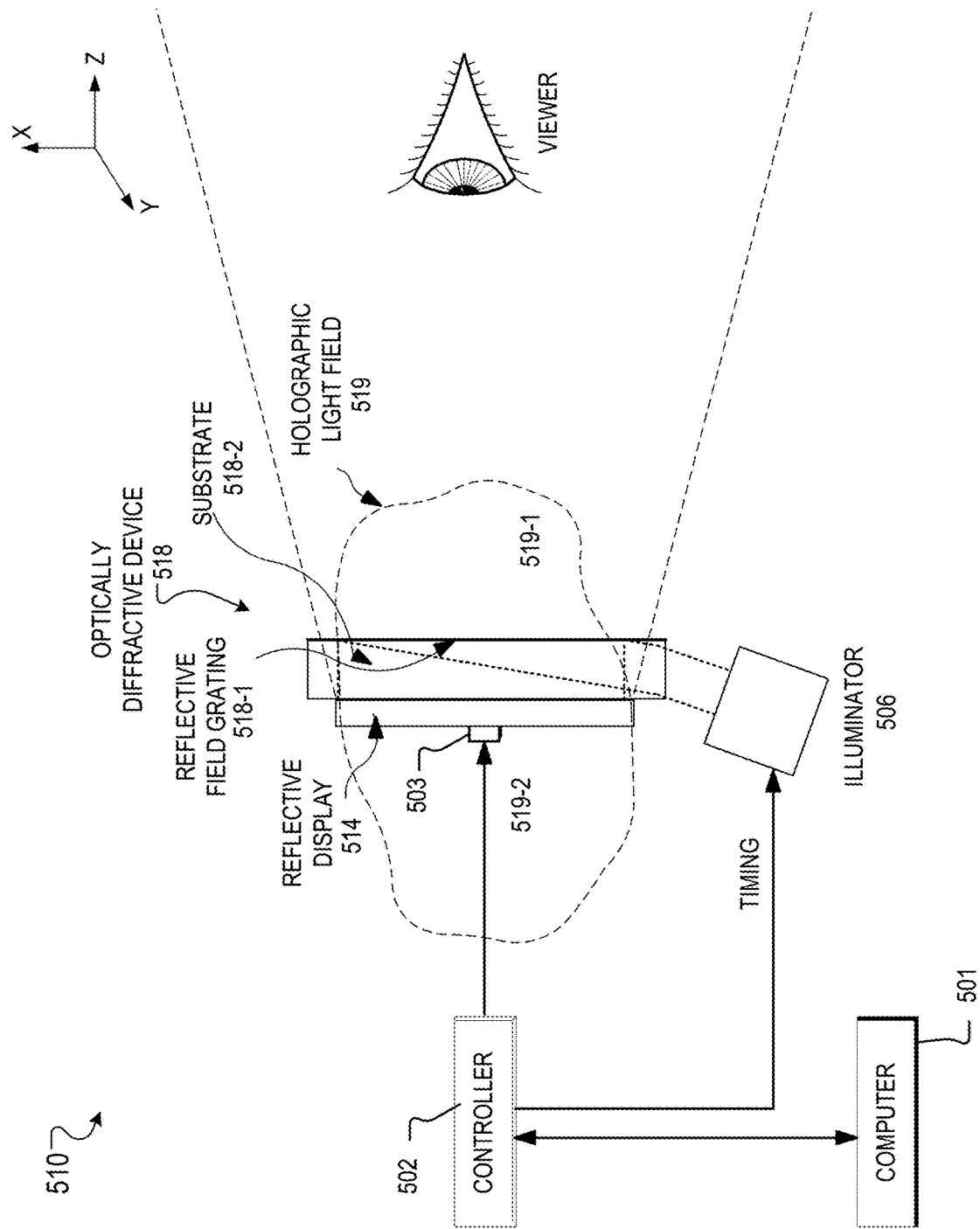
FIG. 5B illustrates another example system for 3D display including a reflective display with optically diffractive illumination.
Figure 5C:
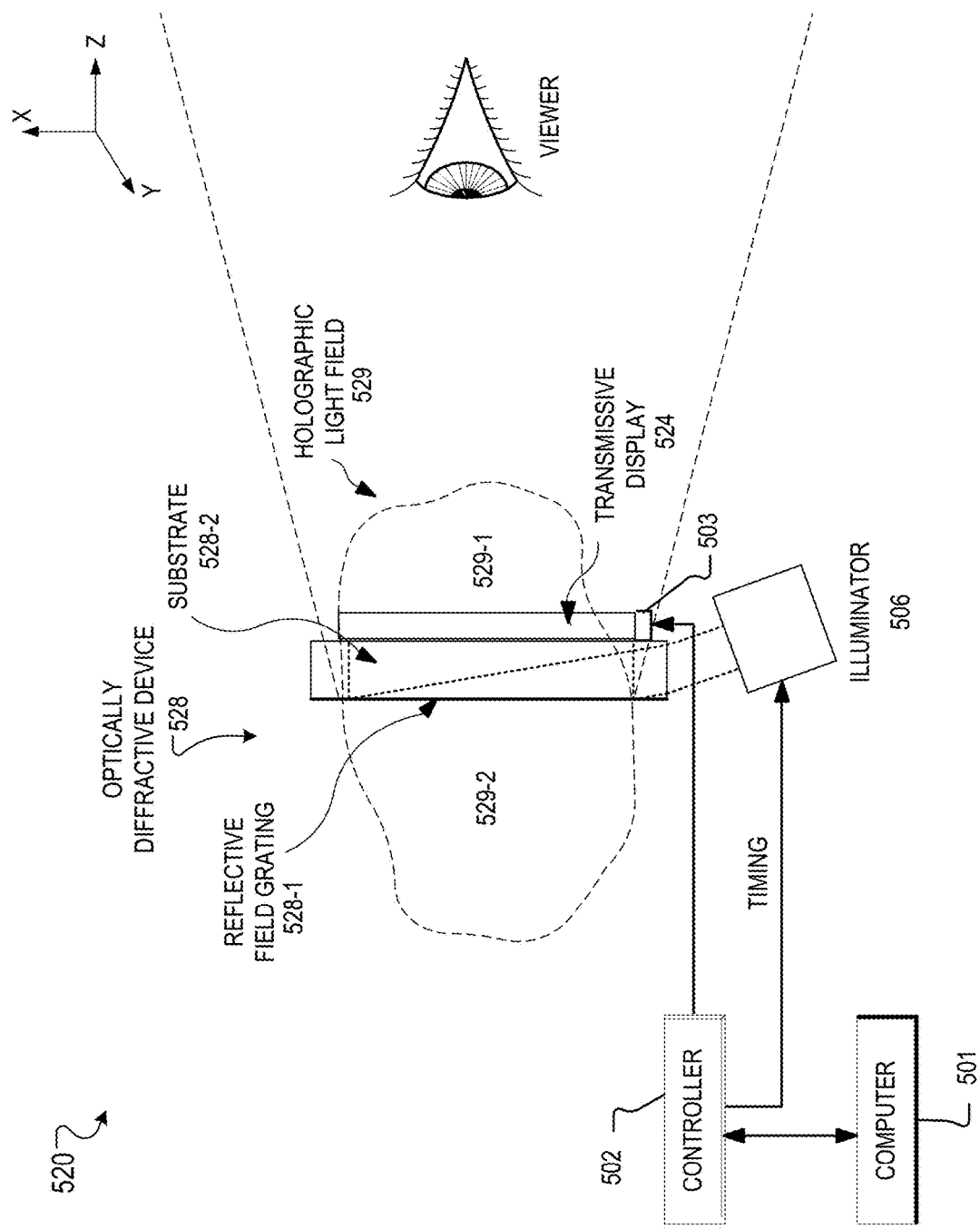
FIG. 5C illustrates another example system for 3D display including a transmissive display with optically diffractive illumination.
Figure 5D:
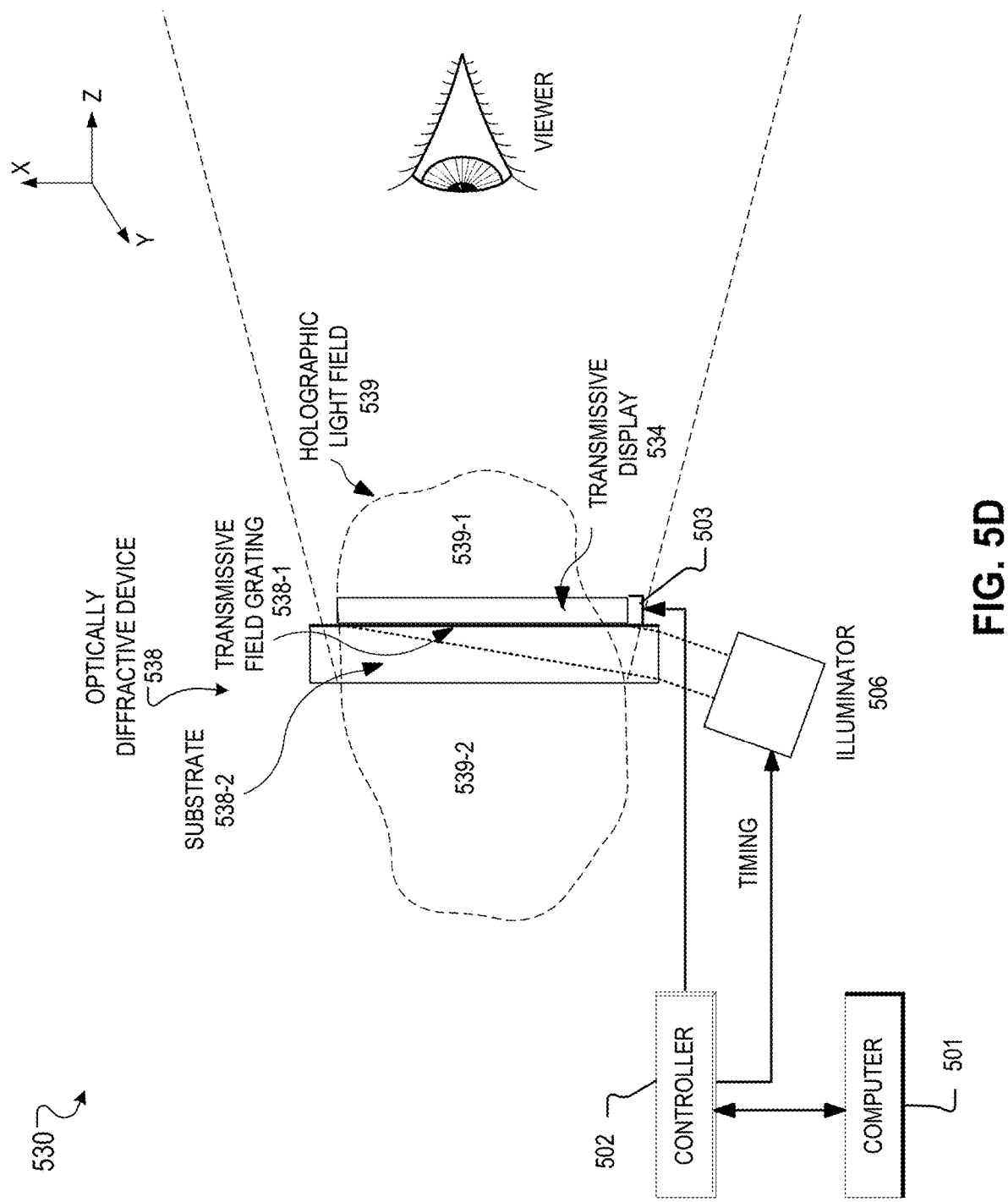
FIG. 5D illustrates another example system for 3D display including a transmissive display with optically diffractive illumination.

A system for 3D display can have a reflective display or transmissive display with front illumination, back illumination, waveguide illumination, or optically diffractive illumination. For illustration, FIGS. 5A-5D show implementations of example systems for 3D displays with optically diffractive illumination. Any one of the systems can correspond to, for example, the system 100 of FIG. 1A. FIGS. 5A and 5B show example systems having reflective displays with optically diffractive illumination using a transmissive grating structure (FIG. 5A) and a reflective grating structure (FIG. 5B). FIGS. 5C and 5D show example systems having transmissive displays with optically diffractive illumination using a reflective grating structure (FIG. 5C) and a transmissive grating structure (FIG. 5D).

FIG. 5A illustrates a system 500 for 3D display including a reflective display 504 with optically diffractive illumination, e.g., using an optically diffractive device 508. The optically diffractive device 508 can be considered as a lightguide (or a waveguide) device for guiding light. The optically diffractive device 508 can be a transmissive field grating based structure that can include one or more transmissive holographic gratings. The reflective display 504 can be the display 150 of FIG. 1A. In some examples, the reflective display 504 is a reflective LCOS device.

A controller 502 can be configured to receive graphic data corresponding to one or more objects from a computer 501 (e.g., the host device 110 of FIG. 1A), perform computation on the graphic data, and/or generate and transmit control signals for modulation to the display 504 through a memory buffer 503 (e.g., the memory 132 of FIG. 1A). The controller 502 can be also coupled to an illuminator 506 (e.g., the illuminator 140 of FIG. 1A) and be configured to provide a timing signal to activate the illuminator 506 to provide light. In some implementations, the controller 502 includes a processing device (e.g., the processing device 120 of FIG. 1A) and a driving device (e.g., the driving device 130 of FIG. 1A). In some implementations, the controller 502 includes the driving device, and the processing device is integrated in the computer 501.

The light is diffracted by the optically diffractive device 508 to be incident on the display 504 and then diffracted by the display 504 to form a holographic light field 509 corresponding to the one or more objects. The display 504 can include a back mirror on the back of the display 504 and can reflect the light towards the viewer. The optically diffractive device 508 can be optically transparent. The illuminator 506 can be positioned below the display 504, which can allow the illuminator 506 to be mounted or housed with other components of the system 500 and to be below an eyeline of the viewer.

Bragg selectivity allows off-axis illumination light to be diffracted from the optically diffractive device 508 towards the display 504 while the returning light diffracted from the display 504 can be close to on axis and hence be off-Bragg to the gratings in the optically diffractive device 508 and hence can pass through the optically diffractive device 508 almost perfectly to the viewer without being diffracted again by the gratings in the optically diffractive device 508. In some implementations, the light from the illuminator 506 can be incident on the optically diffractive device 508 with a large incident angle from a side of the display 504, such that the illuminator 506 does not block the viewer's view and is not intrusive into the holographic light field 509. The incident angle can be a positive angle or a negative angle with respect to a normal line of the display 504. For illustration, the incident angle is presented as a positive angle. For example, the incident angle can be in a range from 70 degrees to 90 degrees, e.g., in a range from 80 degrees to 90 degrees. In a particular example, the incident angle is 84 degrees. The diffracted light from the optically diffractive device 508 can be diffracted at close to normal incidence into the display 504, such that the light can uniformly illuminate the display 504 and can be diffracted back near-normally through the optically diffractive device 508 to the viewer's eyes with minimized power loss due to undesired reflections, diffractions, and/or scatterings within or at the surfaces of the optically diffractive device 508. In some examples, the diffracted angle from the optically diffractive device 508 to the reflective display 504 can be in a range of −10° (or 10 degrees) to 10° (or 10 degrees), e.g., from −7° to 7°, or from 5° to 7°. In a particular example, the diffracted angle is 6°. In another example, the diffracted angle is 0°.

In some implementations, as illustrated in FIG. 5A, the optically diffractive device 508 is arranged in front of the reflective display 504, e.g., along the Z direction towards the viewer. The optically diffractive device 508 can include a field grating structure 508-1 positioned on a substrate 508-2. A back surface of the field grating structure 508-1 faces a front surface of the reflective display 504, and a front surface of the field grating structure 508-1 is attached to the substrate 508-2. The light from the illuminator 506 can be incident on the front surface of the field grating structure 508-1 through the substrate 508-2, e.g., from a side surface of the substrate 508-2. For example, the substrate 508-2 can have a wedged side surface, such that the light at a large incident angle can have less reflection loss.

If a diffraction efficiency of a diffractive structure, e.g., a holographic grating, is less than 100%, light incident at an incident angle can be diffracted by the diffractive structure into zero and first orders. Light of first order (or first order light) is diffracted by the diffractive structure at a diffracted angle towards the display to therein diffract again to reconstruct a holographic light field 509. The first order can be also called first diffraction order. Light in the zero order (or zero order light, or undiffracted light, or the undiffracted order) is undiffracted (or undeflected) by the diffractive structure and transmitted by the diffractive structure at an angle corresponding to the incident angle. The zero order light may cause an undesired effect such as a ghost image, e.g., when the zero order light is incident upon the reflective display 508-1 directly or subsequent to reflection off surfaces within the optically diffractive device 508.

To eliminate the undesired effect, the field grating structure 508-1 can be spaced from the display 504. In some implementations, a back surface of the field grating structure 508-1 is spaced from a front surface of the display 504 by a gap. The gap can have any suitable distance, e.g., 1 mm. The gap can be filled with air or any lower-refractive-index material to satisfy total internal reflection (TIR) on an interface. For example, air has a refractive index (e.g., n≈1.0) which is much smaller than that of a back layer of the field grating structure 508-1 (e.g., n≈1.5), and hence any residual light at the incident angle (e.g., >70°) can be totally internally reflected by the back surface of the field grating structure 508-1 when the incident angle is larger than a critical angle (e.g., ≈41.8° for n≈1.5). That is, the residual light at the incident angle cannot reach the reflective display 504 to cause the undesired effect. In some examples, at least one of the front surface of the reflective display 504 or the back surface of the field grating structure 508-1 is treated with an anti-reflection coating, which can substantially reduce a part of the holographic light field reflected from the reflective display 504 back towards the reflective display 504 from the back of the field grating structure 508-1 which otherwise could cause further ghost images. In some examples, the back surface of the field grating structure 508-1 can be protected by an additional layer, e.g., a glass layer.

In some implementations, instead of being spaced with a gap, the back surface of the field grating structure 508-1 can be attached to the front surface of the reflective display 504 using an intermediate layer. The intermediate layer can be an optically clear adhesive (OCA) layer with a refractive index substantially lower than that of the back layer of the field grating structure 508-1, such that total internal reflection (TIR) can occur and the residual zero order light can be totally reflected at the interface between the intermediate layer and the back layer of the field grating structure 508-1 back into the optically diffractive structure 508.

In some implementations, the field grating structure 508-1 and the display 504 can be separated with a gap so that any residual light cannot reach the display 504. The gap can be filled with any suitable transparent material, index-matching fluid, or OCA. In some implementations, the field grating structure 508-1 can be formed in a cover layer (e.g., a cover glass) of the display 504.

In some cases, to illuminate a whole surface of the reflective display 504 by light diffracted from an active area of the field grating structure 508-1, the active area of the field grating structure 508-1 can be no smaller than an area of the whole surface of the reflective display 504. In some implementations, the field grating structure 508-1 and the reflective display 504 have a rectangular shape with a height along the X direction and a width along the Y direction. The active area of the field grating structure 508-1 can have a height no smaller than a height of the reflective display 504 and a width no smaller than a width of the reflective display 504. If there is a substantial gap between the field grating structure 508-1 and the reflective display 504, the field grating structure 508-1 and the substrate 508-2 can be enlarged further so that an expanding cone (or frustrum) of light from the reflective display 504, e.g., the holographic light field 509, can be seen through the front of the optically diffractive device 508 over an entire vertical and horizontal field of view (around the +Z axis) of the holographic light field 509. The substrate 508-2 can be a little wider and higher than the field grating structure 508-1.

As light is incident on the field grating structure 508-1 at a substantially off-axis angle in a dimension, e.g., the Z direction, the light can be narrower by the cosine of the incidence angle in that dimension. The light from the illuminator 506 can have a narrow rectangular shape incident into the field grating structure 508-1 which can then expand the light to a large rectangular shape incident into the reflective display 504. One or more optical components, e.g., mirrors, prisms, optical slabs, and/or optical fillers, can be arranged between and within the illuminator 506, the optically diffractive structure 508, and the reflective display 504 to further expand the light and to filter its bandwidth. In some examples, the expanded light can have a beam area somewhat smaller than the active area of the reflective display 504, such that the edges and surrounding area of the illuminated area of the reflective display 504 are not noticeable in reflection or scatter towards the viewer. In some examples, the expanded light can have a beam area somewhat larger than the active area of the reflective display 504, such that the edges of the illuminated area of the reflective display 504 are fully illuminated even if the edges of the expanded light are not uniform, e.g., because of diffraction off masking edges.

In some implementations, the controller 502 can obtain graphic data including respective primitive data for a plurality of primitives corresponding to an object in a three-dimensional space, determine, for each of the plurality of primitives, an electromagnetic (EM) field contribution to each of a plurality of display elements of the reflective display 504, generate, for each of the plurality of display elements, a sum of the EM field contributions from the plurality of primitives to the display element, and generate, for each of the plurality of display elements, the respective control signal based on the sum of the EM field contributions to the display element.

In some implementations, the illuminator 506 can include one or more color light emitting elements, e.g., red, blue, or green color lasers (or LEDs), configured to emit light of corresponding colors. The optically diffractive device 508 can be configured to diffract a plurality of different colors of light at respective diffracted angles that are substantially identical to each other. Each of the respective diffracted angles can be in a range of 0° to ±10°, e.g., substantially identical to 0°, + or −1°, + or −2°, + or −3°, + or −4°, + or −5°, + or −6°, + or −7°, + or −8°, + or −9°, or + or −10°.

In some implementations, the controller 502 is configured to sequentially modulate the display 504 with information associated with a plurality of colors of light in a series of time periods. For example, the information can include a series of color holograms or color images. The controller 502 can control the illuminator 506 to sequentially emit each of the plurality of colors of light to the optically diffractive device 508 during a respective time period of the series of time periods, such that each of the plurality of colors of light is diffracted by the optically diffractive device 508 to the reflective display 504 and diffracted by modulated display elements of the reflective display 504 to form a respective color three-dimensional holographic light field 509 corresponding to the object during the respective time period. Depending on temporal coherence-of vision effect in an eye of a viewer, the plurality of colors can be combined in the eye to give an appearance of full color. In some cases, the illuminator 506 is switched off among different light emitting elements during a state change of the display image (or holographic reconstruction) such as during black-insertion subframes between color subframes or during blanking or retrace periods of a video source or during LC rise, fall, or DC-balancing inversion transitions, or during system warm-up, or when the intended holographic light field is completely black, or during a calibration procedure, and is switched on when a valid image (or holographic reconstruction) is presented for a period of time. This can also rely on persistence of vision to make the image (or holographic reconstruction) appear stable and flicker-free.

If a part of the holographic light field 509 appears in front of the display 504, as illustrated by a light field 509-1 in FIG. 5A, that part of the holographic light field 509 is a real part of the reconstructed image or holographic reconstruction (also called a real image or a real holographic reconstruction). When a viewer sees a point of light in front of the display 504, there really is light being reflected from the display 504 to that point. If a part of the holographic light field 509 appears to the viewer to be behind (or inside) the display 504, as illustrated by a light field 509-2 in FIG. 5A, that part of the holographic light field 509 is a virtual part of the reconstructed image or holographic reconstruction (also called a virtual image or a virtual holographic reconstruction). When the viewer sees a point of light which appears to be behind or inside the display 504, there is actually no light being diffracted from the display 504 to that virtual point: rather, part of the light diffracted from the display 504 appears to be originated at that virtual point.

The computer 501 and/or the controller 502 can be configured to adjust a computation (e.g., by equations) of the information (e.g., a two-dimensional hologram, image, or pattern) to be modulated in the display 504 to move the reconstructed holographic light field 509 back and forth along a direction (e.g., the Z direction) normal to the display 504. The computation can be based on a holographic rendering process. In some cases, the holographic light field 509 can be fully in front of the display 504. In some cases, the holographic light field 509 can appear to be all behind the display 504. In some cases, as illustrated in FIG. 5A, the holographic light field can have one part in front of the display 504, e.g., the real part 509-1, and another part appearing to be behind the display, e.g., the virtual part 509-2. That is, the holographic light field 509 can appear to straddle a surface of the display 504, which can be called image planning.

The optically diffractive device 508 can be implemented in different configurations. In some implementations, the optically diffractive device 508 includes a holographic grating, e.g., a Bragg grating, for a particular color, and the holographic light field 509 can correspond to the particular color. In some implementations, the optically diffractive device 508 includes multiple holographic gratings for different colors in a single recording layer.

In some implementations, the field grating structure 508-1 of the optically diffractive device 508 includes multiple holographic gratings for different colors in different recording layers. A grating for a particular color can diffract not only light of the particular color, but also light of other colors, which can cause crosstalk among the different colors. In some examples, the field grating structure 508-1 of the optically diffractive device 508 can include multiple holographic gratings with one or more color-selective polarizers to suppress (e.g., eliminate or minimize) color crosstalk. In some examples, the field grating structure 508-1 of the optically diffractive device 508 can include multiple holographic gratings with one or more reflective layers for light of different colors incident at respective incident angles to suppress color crosstalk and zero order light. In some examples, the field grating structure 508-1 of the optically diffractive device 508 can include multiple holographic gratings with one or more color-selective polarizers, and one or more reflective layers to suppress color crosstalk and zero order diffraction. Each of the color-selective polarizers can be configured for a single color or multiple colors. Each of the reflective layers can be configured for a single color or multiple colors. In some implementations, example field grating structures are configured and performed as described in international application PCT/US2021/50271 entitled "DISPLAYING THREE-DIMENSIONAL OBJECTS" and filed on Sep. 14, 2021, which is commonly-owned and fully incorporated herein by reference.

To improve an effect of a reconstructed holographic scene and thus a performance of a display system, it is desirable to suppress (or even eliminate) display zero order light in the reconstructed holographic scene. The display zero order light can include any unwanted light from the display, e.g., light reflected/diffracted at gaps between display elements, reflected light from the display elements, or reflected light from a display cover on the display. In some implementations, the optically diffractive device 508 is configured to suppress display zero order light by at least one of: zero order light deviation, zero order light blocking, or zero order light redirection. In some implementations, example optically diffractive device 508 are configured and performed as described in international application PCT/US2021/50275 entitled "RECONSTRUCTING OBJECTS WITH DISPLAY ZERO ORDER LIGHT SUPPRESSION" and filed on Sep. 14, 2021, which is commonly-owned and fully incorporated herein by reference.

In some examples, for zero order light deviation, the field grating structure 508-1 of the optically diffractive device 508 can be configured to couple input light to illuminate the display 504 at an incident angle larger than a half of a viewing angle of a reconstructed cone that forms the holographic scene. The display zero order light propagates away from the display 504 at a reflected angle identical to the incident angle. A hologram corresponding to the holographic scene can be preconfigured such that diffracted first order light propagates away from the display to form the reconstruction cone in a same way as that when the incident angle is 0°. Thus, the display zero order light is deviated from the reconstruction cone and accordingly the holographic scene.

In some examples, for zero order light blocking, display zero order light can be first deviated away from diffracted first order light according to the zero order light deviation and then blocked (or absorbed) by an optically blocking component (e.g., a metamaterial layer or an anisotropic optical element such as a louver film). The optically blocking component is configured to transmit a light beam having an angle smaller than a predetermined angle and block a light beam having an angle larger than the predetermined angle. The predetermined angle can be smaller than the incident angle of the input light and larger than a half of the viewing angle of the reconstruction cone. The optically blocking component can be formed on a side of the optically diffractive device 508 that is opposite to the field grating structure 508-1.

In some examples, for zero order light redirection, display zero order light can be first deviated away from diffracted first order light according to the zero order light deviation and then redirected even further away from the diffracted first order light by a redirecting grating structure 508-3 in the optically diffractive device 508. When the input light includes different colors of light simultaneously or sequentially, the optically diffractive component can include one or more corresponding diffractive gratings that are configured to diffract the different colors of light towards different directions in a plane or in space to reduce color crosstalk among the different colors of light. The redirecting grating structure 508-3 can be formed on a side of the substrate 508-2 that is opposite to the field grating structure 508-1.

FIG. 5B illustrates another system 510 for 3D display including a reflective display 514 with optically diffractive illumination, e.g., using an optically diffractive device 518. The reflective display 514 can be similar to, or same as, the reflective display 504 of FIG. 5A. Different from the optically diffractive device 508 of the system 500 of FIG. 5A, the optically diffractive device 518 of the system 510 can have a reflective field grating based structure that can include a reflective field grating structure 518-1 and a substrate 518-2. The substrate 518-2 can be a glass substrate. The reflective field grating structure 518-1 can include one or more reflective holographic gratings for one or more different colors. The reflective field grating structure 518-1 is arranged on a front surface of the substrate 518-2, e.g., along Z direction. An illuminator 506 is arranged behind the reflective field grating structure 518-1 and configured to illuminate light on the reflective field grating structure 518-1 at a large incident angle. The light is diffracted back (along −Z direction) to the reflective display 514 that further diffracts the light back through the optically diffractive device 518 to form a holographic light field 519. The holographic light field 519 can be similar to, or same as, the holographic light field 509 of FIG. 5A, and can include a real holographic reconstruction 519-1 (e.g., 509-1 of FIG. 5A) and a virtual holographic reconstruction 519-2 (e.g., 509-2 of FIG. 5A). In some implementations, the optically diffractive device 518 also includes a redirecting grating structure (e.g., redirecting grating structure 508-3 of FIG. 5A) for display zero order suppression. For example, the redirecting grating structure can be formed on a side of the field grating structure 518-1 that is away from the reflective display 514, e.g., by attaching the redirecting grating structure to the field grating structure 518-1 using an adhesive material with a low refractive index, such that: i) light diffracted by the field grating structure 518-1 is reflected back by an interface between the field grating structure 518-1 and the adhesive material to the reflective display 514, and ii) light diffracted by the reflective display 514 is transmitted through the adhesive material to the redirecting grating structure.

FIG. 5C illustrates another system 520 for 3D display including a transmissive display 524 with optically diffractive illumination, e.g., using an optically diffractive device 528. Similar to the optically diffractive structure 518 of FIG. 5B, the optically diffractive structure 528 can be a reflective field grating based structure that can include a reflective field grating structure 528-1 and a substrate 528-2. The substrate 528-2 can be a glass substrate. The reflective field grating structure 528-1 can include one or more reflective holographic gratings for one or more different colors. Different from the optically diffractive structure 518 of FIG. 5B, the reflective field grating structure 528-1 in the optically diffractive structure 528 is arranged on a back surface of the substrate 528-2. An illuminator 506 is arranged before the reflective field grating structure 528-1 and configured to illuminate light on the reflective field grating structure 528-1 at a large incident angle. The light is diffracted back (along −Z direction) to the transmissive display 524 that further diffracts the light to form a holographic light field 529. The holographic light field 529 can be similar to, or same as, the holographic light field 509 of FIG. 5A, and can include a real holographic reconstruction 529-1 (e.g., 509-1 of FIG. 5A) and a virtual holographic reconstruction 529-2 (e.g., 509-2 of FIG. 5A). In some implementations, the optically diffractive device 528 also includes a redirecting grating structure (e.g., redirecting grating structure 508-3 of FIG. 5A) for display zero order suppression.

FIG. 5D illustrates another system 530 for 3D display including a transmissive display 534 with optically diffractive illumination, e.g., using an optically diffractive device 538. The transmissive display 534 can be the same as the transmissive display 524 of FIG. 5C. Similar to the optically diffractive structure 508 of FIG. 5A, the optically diffractive structure 538 can be a transmissive field grating based structure that can include a transmissive field grating structure 538-1 and a substrate 538-2. The substrate 538-2 can be a glass substrate. The transmissive field grating structure 538-1 can include one or more transmissive holographic gratings for one or more different colors. Different from the optically diffractive structure 508 of FIG. 5A, the transmissive field grating structure 538-1 in the optically diffractive structure 538 is arranged on a front surface of the substrate 538-2. An illuminator 506 is arranged behind the transmissive field grating structure 538-1 and configured to illuminate light on the transmissive field grating structure 538-1 at a large incident angle. The light is diffracted forward (along +Z direction) to the transmissive display 534 that further diffracts the light to form a holographic light field 539. The holographic light field 539 can be similar to, or same as, the holographic light field 509 of FIG. 5A, and can include a real holographic reconstruction 539-1 (e.g., 509-1 of FIG. 5A) and a virtual holographic reconstruction 539-2 (e.g., 509-2 of FIG. 5A). In some implementations, the optically diffractive device 538 also includes a redirecting grating structure (e.g., redirecting grating structure 508-3 of FIG. 5A) for display zero order suppression.

As discussed above, FIGS. 5A to 5D show different combinations of reflective/transmissive displays and reflective/transmissive field grating based optically diffractive devices. In some cases, placing an optically diffractive device on a rear side of a display can provide better protection for photopolymers if the photopolymers have not already been protected by their inherent structures or by additional glass layers. In some cases, a transmissive grating can be mechanically and optically closer to a display, and light from the transmissive grating to the display can travel a shorter distance, than from a reflective grating, which can reduce alignment, coverage, dispersion, and/or scatter issues. In some cases, transmissive gratings can have a greater wavelength tolerance and a lesser angular tolerance than reflective gratings. In some cases, transmissive grating can be less likely to mirror ambient illumination towards a viewer, e.g., ceiling lights and illuminated keyboards. In some cases, with a transmissive display, a viewer can get closer to the display, and the holographic light field may be projected closer to the display. In some cases, for a transmissive display, a glass substrate for the transmissive display can have a proven manufacturing capability up to >100" diagonal with near-seamless tiling for cinema and architectural sizes. In some cases, reflective and transflective displays can embed a controller, e.g., MAXWELL HOLOGRAPHY® circuitry, or the processing device 120 and/or the driving device 130 of FIG. 1A, behind display elements, and transmissive displays can incorporate the controller or circuitry behind inter-pixel (or inter-phasel) gaps. In some cases, reflective and transflective displays can enable light to double-pass display elements (e.g., liquid crystal material) and can have twice the refractive index change of transmissive displays that uses a single-pass through the liquid crystal material. A transflective display can represent a display with an optical layer that reflects transmitted light.

As discussed above, light can be directed to a display with different illumination methods. For optically diffractive illumination, the light can be directed to the display by bottom illumination (as shown in FIG. 6A) or by side illumination (e.g., as illustrated in FIGS. 6B-6G).

4.2 Bottom Illumination

FIG. 6A illustrates an example system 600 for 3D display with bottom illumination. The system 600 can be similar to, or same as, the system 100 of FIG. 1A, 170 of FIG. 1B, 500 of FIG. 5A, 510 of FIG. 5B, 520 of FIG. 5C, or 530 of FIG. 5D. The system 600 includes an optically coupling device 602, an optically diffractive device 604, and a display 606.

The optically coupling device 602 is configured to couple input light 601 to the optically diffractive device 604. The input light 601 can include a plurality of different colors of light (e.g., red 601a, green 601b, and blue 601c). In some examples, the optically coupling device 602 includes an optical waveguide. The optically diffractive device 604 can be similar to, or same as, the optically diffractive device 508 of FIG. 5A, 518 of FIG. 5B, 528 of FIG. 5C, or 538 of FIG. 5D. The optically diffractive device 604 can include a field grating structure (e.g., the field grating structure 508-1 of FIG. 5A, 518-1 of FIG. 5B, 528-1 of FIG. 5C, or 538-1 of FIG. 5D). The field grating structure can include multiple diffraction gratings respectively for different colors of light (e.g., red, blue, green). The optically diffractive device 604 is configured to diffract the light to the display 606 that diffracts the light to form a holographic light field 603 (e.g., the holographic light field 160 of FIG. 1A or the holographic light field 509 of FIG. 5A, 519 of FIG. 5B, 529 of FIG. 5C, or 539 of FIG. 5D) that is viewable by a viewer.

In some implementations, e.g., as illustrated in FIG. 6A, the display 606 is a reflective display (e.g., the reflective display 504 of FIG. 5A or 514 of FIG. 5B). The optically diffractive device 604 can be positioned adjacent to a front side of the display 606. The optically coupling device 602 can be positioned adjacent to the optically diffractive device 604. The optically coupling device 602 is configured to couple the light into the optically diffractive structure 604 from a bottom surface or a top surface of the optically coupling device 602, which can be considered as bottom illumination.

In some implementations, example bottom illumination setups are configured as described with respect to FIGS. 35A to 36C in international application PCT/US2021/50271 entitled "DISPLAYING THREE-DIMENSIONAL OBJECTS" and filed on Sep. 14, 2021, which is commonly-owned and fully incorporated herein by reference.

4.3 Side Illumination

FIGS. 6B-6D show various views of an example system 610 for 3D display with side illumination. The system 610 can be similar to, or same as, the system 100 of FIG. 1A, 170 of FIG. 1B, 500 of FIG. 5A, 510 of FIG. 5B, 520 of FIG. 5C, or 530 of FIG. 5D. As illustrated, similar to the system 600 of FIG. 6A, the system 610 can include an optically coupling device 612, an optically diffractive device 614, and a display 616. Similar to (or same as) the display 606 of FIG. 6A, the display 616 is a reflective display (e.g., the reflective display 504 of FIG. 5A or 514 of FIG. 5B).

As illustrated in FIG. 6C, the system 610 can further include an illuminator 620 (e.g., the illuminator 140 of FIG. 1A or 506 of FIGS. 5A-5D) that can include a plurality of light emitting elements (e.g., 3) each configured to emit a corresponding color of light (e.g., blue, red, green). Light emitted from each of the light emitting elements can be reflected by a corresponding pair of reflectors (e.g., reflection mirrors or dichroic mirrors) 622 and 624 for a corresponding color of light to form input light 611 that is coupled into the optically coupling device 612. The input light 611 can include a plurality of different colors of light, e.g., red 611a, green 611b, and blue 611c.

The optically diffractive device 614 can be similar to, or same as, the optically diffractive device 508 of FIG. 5A, 518 of FIG. 5B, 528 of FIG. 5C, or 538 of FIG. 5D. The optically diffractive device 614 can include a field grating structure (e.g., the field grating structure 508-1 of FIG. 5A, 518-1 of FIG. 5B, 528-1 of FIG. 5C, or 538-1 of FIG. 5D). The field grating structure can include multiple diffraction gratings respectively for different colors of light (e.g., red, blue, green). The optically diffractive device 614 is configured to diffract the light to the display 616 that diffracts the light to form a holographic light field 613 (e.g., the holographic light field 160 of FIG. 1A or the holographic light field 509 of FIG. 5A, 519 of FIG. 5B, 529 of FIG. 5C, or 539 of FIG. 5D) that is viewable by a viewer.

In some implementations, e.g., as illustrated in FIGS. 6B-6D, the optically diffractive device 614 can be positioned adjacent to a front side of the display 616, e.g., spaced by air or a spacer. The optically diffractive device 614 can be positioned on the optically coupling device 612. The optically coupling device 612 is configured to couple the input light 611 into the optically diffractive structure 614 from a side surface 612S (e.g., as illustrated in FIG. 6D) of the optically coupling device 612, which can be considered as side illumination. In some examples, as illustrated in FIGS. 6B-6D, the optically coupling device 612 can be a shaped device having a recess sized to hold the optically diffractive device 614, and the side surface 612S of the optically coupling device 612 can have a slope surface that is angled with respect to a bottom surface of the optically coupling device 612.

FIGS. 6E-6G illustrate an example system 630 for 3D display with side illumination, e.g., with three colors of light (e.g., red, green, blue) propagating through the system 630. The system 630 can be similar to, or same as, the system 610 of FIGS. 6B-6D.

A rectangular section of substantially-coaxial elliptical beams of input light 631 (as illustrated in FIG. 6E) from an illuminator 631S (e.g., made of three laser diodes for three different colors such as red, green, and blue) is reflected off a mirror 632 and then refracted into a first surface 633a of a prism element 634. A reflective coating 650 can be formed on a top side of the first face 633a. The beams of the input light 631 have a width defined between an upper beam and a lower beam, as illustrated in FIG. 6E. The different colors of light beams (e.g., red 631a, green 631b, blue 631c) refracted into the prism element 634 can be stacked together along a first direction (e.g., as illustrated in FIG. 6E) and spaced from (or overlapping with) one another along a second direction (e.g., as illustrated in FIG. 6F). A second surface 633b of the prism element 634 reflects the beams of input light 631 to a third surface 636 of the prism element 634 on which one or more transmissive expansion gratings 637 are optically stacked (generally, one grating per color). Each expansion grating is illuminated by its corresponding color at a relatively high angle of incidence within the prism element 634, for example 68°, and is configured to diffract a portion of its illuminating light out towards a series of reflective elements 638 (e.g., reflector 638a for red color of light, reflector 638b for green color of light, and 638c for blue color of light). In effect, the expansion gratings 637 expand the original rectangular section of beams of input light 631 from the laser diodes by a substantial factor (e.g., a factor of approximately 6) in one dimension (e.g., in width as illustrated in FIG. 6E). Light beams reflected by the third surface 636 and/or the expansion gratings 637 and/or a cover layer 649 applied to the expansion gratings 637, back into the prism element 634 can be absorbed by an absorptive layer 634A applied to a surface of the prism element 634 (e.g., as illustrated in FIG. 6E).

Because the light incident upon the expansion gratings 637 is incident at a high angle, the depth of prism element 634 (e.g., the length of second surface 633b, part of which at least is reflective) can be comparatively small. The incidence angle can exceed criticality if the light is incident from air (refractive index ~1.0) upon the expansion gratings 637 at such a large angle, causing all of the incident light to reflect away from the gratings. In the system 630, the light is incident from the prism element 634 that can be made of, for example, glass or acrylic with a high refractive index (e.g., ~1.5), and thus, the incident angle does not exceed the critical angle.

In some embodiments, the reflective elements 638 can include three dichroic reflectors, one per color, or two dichroics and a mirror for one color, or one dichroic reflector for two colors and a mirror for one color, that are arranged in the beam (all three colors) 639 diffracted out by expansion gratings 637, to reflect each color into a cover plate 640 attached to a shaped substrate 641. Each color of light is incident on the cover plate 640 at a different angle and over a different region of the cover plate 640, and is refracted into the cover plate 640 (and thereafter into the shaped substrate 641) at such angles that the colors of light subsequently are reflected off, for example, a low-index layer formed on the front face 642 of the shaped substrate 641, then diffracted out of three stacked field gratings 643 (one per color) attached to the back face 644 of the shaped substrate 641. All three colors of light are incident on a reflective display device 645 at substantially the same angle for each color and with each color illuminating substantially the entirety of the reflective area formed by the reflective display device 645. The reflective display device 645 reflects and diffract each color back through the field gratings 643, through the shaped substrate 641, and into a stack of three stacked display (e.g., LCoS) Zero-order Suppression (LZOS) redirection gratings 646 (one per color) (elsewhere herein referred to as redirection gratings, e.g., redirection gratings 508-3 of FIG. 5A) attached to the front face 642 of the substrate 641.

A proportion of each color incident on the reflective display device 645 is reflected into a display zero-order beam 651, and a proportion of each color which is incident upon each display device (e.g., LCoS) is diffracted by each display device into a corresponding holographic light field 652, e.g., the holographic light field 160 of FIG. 1A, 509 of FIG. 5A, 519 of FIG. 5B, 529 of FIG. 5C, or 539 of FIG. 5D, which may be seen by a viewer. As discussed elsewhere herein, the display zero-order suppression gratings (or redirection gratings) 646 are angle-selective transmission gratings which substantially diffract light incident upon them at the display zero-order angle but substantially transmit light incident upon them at greater or lesser angles, separating the reflected display zero-order light from the diffracted holographic light field. The rejected display zero-order light 653 may exit from the front of the redirection gratings at a substantial angle as shown in FIG. 6F, or may be reflected back into the shaped substrate 641 by TIR or by reflection gratings as described elsewhere herein.

In some embodiments, the tilt angle of the reflective elements 638 can be adjusted to achieve greater uniformity of diffraction from the transmissive field gratings 643 (e.g., by causing the transmissive field gratings 643 to be illuminated at or close to their replay Bragg angles), and/or to achieve greater brightness of diffraction from the transmissive field gratings 643 (e.g., by causing the transmissive field gratings 643 to be illuminated at or close to their replay Bragg angles). Such adjustments can be made substantially independently for each color by adjusting the tilt angle of a respective one of the reflective elements 638.

In some embodiments, the adjustments can be made as a one-off adjustment during manufacture or assembly. Optionally, the adjustments can be made by the user or installer in the field. In certain embodiments, the adjustments can be performed automatically, for example as part of a feedback loop utilizing color and/or brightness sensors to detect and optimize optical properties of the holographic light field, e.g., brightness, uniformity, color uniformity, or white-point. In some cases, the tilt angles of the reflective elements 638 are adjusted to optimize the performance of the display system 630. These approaches can be combined as appropriate.

In some cases, tilt adjustments of the reflective elements 638 can be used to correct for changes or errors in alignment of the components of the display system caused by factors, e.g., manufacturing and assembly tolerances, shipping, storage, and in-use vibration and shock, thermal expansion and contraction, aging of the gratings, laser-diodes or other wavelength-dependent components, and wavelength shifts of the laser-diodes due to aging, operating temperature, operating duty cycle, and/or part-to-part variations.

In some cases, substantially larger or substantially smaller tilt adjustments of the reflective elements 638 can be used to maintain alignment even if the angle between the expansion prism element 634 and the shaped substrate 641 is changed substantially from 90° (as shown in FIG. 6F) for example by tilting or rotating the shaped substrate 641 backwards or forwards to tilt the holographic light field respectively upwards or downwards.

To achieve relatively uniform illumination on the reflective display device 645, the centers of the beams from the laser diodes can be offset, which can also maintain color uniformity in the holographic light field. Small differences in the path travelled by each color to and from the reflective display devices 645 (in general, primarily due to chromatic dispersion of the beams), for example at their entry into prism element 634, can otherwise slightly misalign the concentrations of the three colors. This can also be corrected for by adjusting the diffraction efficiency of the reflective display devices 645 in a spatially variant manner (e.g., in one or two dimensions). Such adjustment can be made on-the-fly as the diffraction efficiency is a function of computer generated holograms (CGHs), or by utilizing elements before or after the reflective display devices 645 with constant or adjustable spatially varying transmissivities or absorbances (e.g., in one or two dimensions).

In some cases, input light 647 (e.g., as illustrated in FIG. 6F) into the substrate 641 can be p-polarized at the edge surface of the substrate 641 where the input light 647 enters the substrate 641 (or the cover glass plate 640 if used) to reduce Fresnel losses at the surface, or the surface can be tilted or anti-reflection coated to reduce such Fresnel losses. The input light 647 can include a plurality of different colors of light, e.g., red 647a, green 647b, blue 647c, as illustrated in FIG. 6F. A broad-wavelength-band halfwave retarder affixed to the surface or subsequent to the surface can convert such p-polarization to s-polarization if s-polarization light is the required or desired polarization for the transmissive field grating 643.

In some cases, a broad-wavelength-band retarder positioned between the transmissive field grating 643 and the reflective display devices 645 can be used to further adjust the polarization of illumination light upon the reflective display device 645 to provide the required or desired or optimal polarization state for the reflective display devices 645. Such a retarder can be affixed to the exit face of the field grating 643, or to the outer surface of the reflective display devices 645, or to both, and can be a halfwave plate to provide p-polarization or s-polarization or can be a quarter-wave plate to provide circular polarization or can have a retardance of another value, which can also vary spatially and/or temporally and/or by wavelength, to provide optimal polarization at every point on the reflective display devices 645 for each color. In so far as such a waveplate provides a polarization state, for the reflected holographic light field from the reflective display devices 645, which may be not the desired or optimal polarization state for subsequent polarization-dependent elements, e.g., redirection gratings 646. In some cases, one or more further waveplates can be provided prior to such an element or elements with fixed or with spatially or temporally or chromatically varying retardances to further adjust the polarization to satisfy the element or elements.

In some cases, an optical distance between the substrate 641 and the coupling reflective elements 638 can be proportionately large to allow the three colors of light to be separated further at their reflections of the reflective elements 638 so that each color can be reflected by a corresponding reflective element without having to be transmitted through one or two other reflective elements, or even made so large that the three colors of light separate enough to be reflected using three mirrors with no transmissions through other reflective elements.

In certain embodiments, the coupling reflective elements 638 can be positioned and tilted such that the illumination of each of the reflective elements 638 comes from a substantially different direction rather than from substantially optically-coaxial laser beams. This may allow the illuminator 631S to be split into two or three separate illuminators each providing one or two of the three illumination colors, which can be cheaper and/or more efficient than using optics within the illuminator 631S to combine the light from three laser diodes into a combined white input light which provide input light 631.

In some embodiments, the shaped substrate 641 can be formed monolithically, e.g., by computer numerical control (CNC) machined from a larger block of material, can be formed by optically bonding or indexing two or more simpler (and hence more manufacturable) shapes, or can be formed by additive or subtractive manufacturing techniques.

In certain embodiments, the reflective display device 645 (or an array of reflective display devices 645) with a greater vertical extent can be illuminated by increasing the height of the input light 647, which is subject to the input light 647 actually entering the cover glass plate 640 (which may be omitted) at the tip of the shaped substrate 641 that forms a first lower cutoff for display illumination, and subject to the input light 647 missing a corner 648 of the shaped substrate 641 that forms an upper cutoff and a second lower cutoff for display illumination.

In some embodiments, the illumination of the reflective display device 645 is at an angle of approximately 6°, which can be changed to approximately 0° because the transmissive field grating 643 can also act as a zero-order suppression element, similar to the redirection gratings 646. In such embodiments, the field grating 643 can reflect rather than transmit, entrapping specularly-reflected zero-order light from the reflective display device 645 within the shaped substrate 641, where TIR can guide it up and out of the top of the shaped substrate 641 or into an absorber 654 formed thereupon. Using the field grating 643 at or near 0° in combination with the redirection gratings 646 can reduce residual display zero-order to a very high degree, e.g., less than 2% residual display zero-order light or even <1%.

In certain embodiments, when one-dimensional suppression gratings are used, the display zero-order suppression appears as a dark band across the reflective display device 645, not a point, with the zero-order of each illumination color just visible as a point of that color within this dark band. If the viewer is more likely to look into the reflective display device 645 from above the normal to the reflective display device 645, as is commonly the case for a desk or table display, then the system can be configured to arrange the band to be above (but, in angular-space, close to) the holographic light field, where it is less likely to be noticed or objectionable, rather than below or on either side of the holographic light field. Similarly, if the viewer is more likely to look into the display from below the normal to the reflective display device 645, then the system can be configured to arrange the band to be below the holographic light field. If most viewers look into the display using two eyes distributed predominantly horizontally, then the band can be arranged at up or below, instead of left or right, of the holographic light field.

In some embodiments in which the illuminator 631S derives from light sources with spectral bandwidths on an order of a few nm or a few tens of nm, diffraction in expansion gratings 635 and the expansion gratings 637, e.g., field gratings, can spectrally disperse the illumination light incident upon the reflective display device 645. The illumination light can then exhibit spectral diversity (from the spectral bandwidths of the laser diodes) and spatial diversity (from the dispersion of light from the laser diodes by these gratings, and, to a lesser extent, from the source size of the laser diodes). These multiple orthogonal degrees of diversity can cause significant reduction in visible laser speckle in the holographic light field, compared to those provided just by the spectral and spatial diversity of the laser diodes themselves.

In some embodiments, expansion gratings 635 can be formed with an optical power such that the expansion gratings 635 can fully or partially collimate the input light 631 in one or two transverse directions, reducing or eliminating the need for laser-diode collimation in the illuminator 631S.

The incidence angles of the input light 647 upon the cover plate 640 may be selected such that two or more such incidence angles are substantially equal, and in this case the number of reflective elements 638 may be reduced since a single such reflective element may suffice to reflect two or more colors. Further, the final reflective element in 638 may be provided as a reflective coating upon a surface of, or within the substrate of, the previous reflective element, which substrate may be wedged to provide a different reflection angle for this final reflector.

4.4 Dispersion Compensation

Optical components, e.g., diffraction gratings such as field gratings, can have larger dispersions, deriving from $\lambda \propto \sin \theta$, where $\lambda$ is a wavelength of light and $\theta$ is an incident angle on an optical component. As an example, if $\lambda$ changes by $\pm 1$ nm, $\theta$ can be changed by tenths of a degree if $\theta$ is about 70° to 80° for field gratings at visible wavelengths.

If two optical components (e.g., two diffractive components) have an identical magnitude of dispersion with opposite directions (e.g., positive dispersion and negative dispersion), their dispersions can be cancelled out with each other. In some cases, a direction of dispersion for a refractive component (e.g., a prism) is opposite to a direction of dispersion for a diffractive component (e.g., a diffraction grating). Thus, it is possible to use one or more refractive components to compensate dispersion of one or more diffractive components.

A system for 3D display (e.g., the system 100 of FIG. 1A, 170 of FIG. 1B, 500 of FIG. 5A, 510 of FIG. 5B, 520 of FIG. 5C, or 530 of FIG. 5D) can include a plurality of optical components. Light incident on the optical components can have a spectral bandwidth with a peak wavelength. To suppress or eliminate an effect of dispersion of the light in the system, at least one first optical component can be configured to cause a positive optical dispersion for light incident on the display, and at least one second optical component can be configured to cause a negative optical dispersion for the light. The positive optical dispersion and the negative optical dispersion can be compensated with each other, such that a holographic scene reconstructed from the light has no or little light dispersion. The at least one first optical component can include a first diffraction grating, and the at least one second optical component can include a second diffraction grating. The first diffraction grating and the second diffraction grating can be configured to cause a same magnitude of dispersion for the light, but with opposite dispersion directions.

As a reflection can flip a direction of dispersion, two identical diffraction gratings with the same dispersion (same magnitude and same direction) can be combined together for dispersion compensation if there is an odd number of reflections between these two diffraction gratings. Thus, if the system is configured to cause the light with an odd number of reflections between the first diffraction grating and the second diffraction grating, the first diffraction grating and the second diffraction grating can be configured to cause a same dispersion for the light. If the system is configured to cause the light with an even number of reflections between the first diffraction grating and the second diffraction grating, the first diffraction grating and the second diffraction grating can be configured to cause opposite dispersions having a same magnitude for the light.

The positive optical dispersion caused by the first diffraction grating has a first magnitude of dispersion, and the negative optical dispersion caused by the second diffraction grating has a second magnitude of dispersion. A magnitude ratio of the first magnitude of dispersion over the second magnitude of dispersion can be different from 1.

In the system, the second diffraction grating can be arranged downstream of the first diffraction grating along a light path of the light to be incident on the display. The light incident upon the display can be expanded (or compressed) by a width factor X (e.g., 5) in one dimension between the first and second diffraction gratings. This may geometrically dilute (or increase) the strength of the dispersion of the first diffraction grating. To compensate the dispersion between the first and second diffraction gratings, the first magnitude of dispersion of the first diffraction grating can be X times of the first magnitude of dispersion of the second diffraction grating. That is, the magnitude ratio can be configured to be identical to the width factor. Alternatively, to compensate the dispersion between the first and second diffraction gratings, the width factor can be configured to be identical to the magnitude ratio.

In some cases, the system is configured to change the beam width of the light from the first diffraction grating to the second diffraction grating by a first width factor in a first dimension and by a second width factor in a second dimension different from the first dimension, and each of the first width factor and the second width factor can be identical to the magnitude ratio. In some cases, the first dispersion of first diffraction grating and second dispersion of the second diffraction grating can be configured to have a first magnitude ratio (for the first dispersion over the second dispersion) along the first dimension and a second magnitude ratio (for the first dispersion over the second dispersion) along the second dimension. The first magnitude ratio can be identical to the first width factor, and the second magnitude ratio can be identical to the second width factor.

In the system, the plurality of optical components include at least one third optical component (e.g., the display) configured to cause an optical dispersion for the light. The at least one first optical component, the at least one second optical component, and the at least one third optical component can be configured to compensate respective caused optical dispersions for the light. For example, the magnitude of the first dispersion for the first diffraction grating can be more or less than that of the second diffraction grating to compensate for the additional additive or subtractive dispersion caused by the at least third optical component.

In some implementations, the plurality of optical components include: first optical components configured for optical dispersion compensation for a first color of light, and second optical component configured for optical dispersion compensation for a second color of light, the second color of light being different from the first color of light.

In some implementations, the plurality of optical components include: a first group of optical components each configured to cause a first optical dispersion for a respective color of light of a plurality of colors of light, and a second group of optical components each configured to cause a second optical dispersion for a respective color of light of the plurality of colors of light, where the first group of optical components and the second group of optical components are configured to compensate optical dispersion for each of the plurality of colors of light. For example, a first stack of holographic gratings (e.g., the field grating structure 508-1 of FIG. 5A for three different colors of light) can be for dispersion compensation with a second stack of holographic gratings, where the holographic gratings in these two stacks for individual colors are used to compensate dispersion of the individual colors.

In some implementations, at least one of the first group of optical components and the second group of optical components includes a series of holographic gratings made of a same material. In some implementations, the plurality of optical components are configured to compensate optical dispersion for a first color of light with a first spectral width, without compensation for a second color of light with a second spectral width that is narrower than the first spectral width. For example, dispersion compensation can be applied for one or more substantially different colors but not for one or more other substantially different colors, because these other colors may not need the benefits of dispersion compensation, either because their bandwidth is much narrower (e.g., using a single-line laser like a diode-pumped solid-state laser (DPSSL) at 532 nm rather than a laser diode with a full width at half maximum (FWHM) of a few nm) or because dispersive broadening is visually acceptable at that color (e.g., because blue hardly matters visually).

For illustration, FIG. 6H shows an example of dispersion compensation in a system 680 for 3D display. The system 680 can be similar to, or same as, the system 100 of FIG. 1A, 170 of FIG. 1B, 500 of FIG. 5A, 510 of FIG. 5B, 520 of FIG. 5C, or 530 of FIG. 5D, the system 600 of FIG. 6A, the system 610 of FIGS. 6B-6D, or the system 630 of FIGS. 6E-6G.

The system 680 includes an optically coupling device 682 (e.g., the optically coupling device 612 of FIGS. 6B-6D or the shaped substrate 641 of FIGS. 6E-6G), an optically diffractive device 684 (e.g., the optically diffractive device 614 of FIGS. 6B-6D), and a display 690 (e.g., the display 616 of FIGS. 6B-6D or the reflective display device 645 of FIGS. 6E-6G). Input light 683 is coupled into the optically guiding device 682 and directed into the optically diffractive device 684. The optically diffractive device 684 can include a plurality of holographic gratings configured to diffract the input light 683. The diffracted light is incident on the display 690 and diffracted to form a holographic light field 685 (e.g., the holographic light field 160 of FIG. 1A, 509 of FIG. 5A, 519 of FIG. 5B, 529 of FIG. 5C, or 539 of FIG. 5D, 603 of FIG. 6A, 613 of FIG. 6B-6D, or 652 of FIGS. 6E-6G).

The optically diffractive device 684 can cause light dispersion. To compensate the dispersion, the system 680 includes a dispersion compensation grating structure 686 arranged in a substrate 688. The dispersion compensation grating structure 686 can include one or more gratings (e.g., a pair of gratings) that diffract initial light 681 to propagate through the substrate 688 to the optically coupling device 682. In some examples, the optically diffractive device 684 and the dispersion compensation grating structure 686 are configured to compensate with each other for a green color of light with a wavelength of 520 nm. The green color of light can be dispersive, e.g., in a range of wavelength from a shorter wavelength 519 nm to a longer wavelength 523 nm. As illustrated in FIG. 6H, after the dispersion compensation grating structure 686, the dispersion of the input light 683 is shown, e.g., by rays 683*a* representing the shorter wavelength (such as blue), rays 683*b* representing the longer wavelength (such as red), and/or ray 683*c* representing a middle wavelength between the shorter wavelength and the longer wavelength (such as green). For the light of the holographic light field 685, the dispersion is shown, e.g., by rays 685*a* representing the shorter wavelength (such as blue), rays 685*b* representing the longer wavelength (such as red), and/or ray 685*c* representing a middle wavelength between the shorter wavelength and the longer wavelength (such as green). Thus, the dispersion of the green color of light can be compensated by the optically diffractive device 684 and the dispersion compensation grating structure 686, e.g., at least to a certain degree. Note that a beam of the input light 683 may be expanded along the propagation path.

In some cases, the dispersion compensation grating structure 686 is configured to also be expansion gratings, expanding the light beam (in either X or Y direction). Accordingly, the corresponding dispersion compensation of the dispersion compensation grating structure 686 in respective X or Y direction can be correspondingly greater, as discussed above.

4.5 Field Gratings with Low Diffraction Efficiency

In systems for 3D display as disclosed herein (e.g., the system 100 of FIG. 1A, 170 of FIG. 1B, 500 of FIG. 5A, 510 of FIG. 5B, 520 of FIG. 5C, or 530 of FIG. 5D), one or more field gratings (e.g., the field grating structure 508-1 of FIG. 5A, 518-1 of FIG. 5B, 528-1 of FIG. 5C, or 538-1 of FIG. 5D) diffract light from an illuminator (e.g., the illuminator 140 of FIG. 1A or 506 of FIGS. 5A-5D) onto a display (e.g., the display 150 of FIG. 1A, 504 of FIG. 5A, 514 of FIG. 5B, 524 of FIG. 5C, or 534 of FIG. 5D). The display diffracts light back through a field grating, and/or reflects light back through the field grating. The returning light has to pass through the field grating to get to an observer's eye.

If the field grating has a high diffraction efficiency for bending light from a light coupling (or guiding) device (e.g., a waveguide) through a certain angle towards the display, then the field grating can also have substantially the same high diffraction efficiency for bending the returning light incident on the field gratings from the display at substantially the same angle and hence diffract some portion of the light back through the light coupling device towards the illuminator (e.g., lasers) instead of allowing the light through to the observer's eye. This causes a dark band across the reconstructed holographic scene or light field (e.g., a holographic image).

If the exit angle of light from the field grating towards the display is normal to the light coupling device, and reflected light from the reflective component of the display returns along the illumination direction (e.g., if the display is parallel to the light coupling device), then this "absorption" band can be centered on the zero-order. If the illumination angle onto the display is different from the angle of reflected light back from the display, then the "absorption" band is displaced from the zero order. And the width of the "absorption" band for each color depends on the angular bandwidth of the field grating for that color. For example, if the diffraction efficiency of the field grating for a particular color at a particular angle is 80%, then there's an 80% attenuation in the returned light from the display at the same wavelength and angle, and hence the holographic scene seen within this band is only 20% as bright as the holographic scene outside of this band.

In some implementations, the field grating is made with a low diffraction efficiency, and the "absorption" effect can be reduced. For example, if the diffraction efficiency of the field grating is only 10%, then the holographic scene in the band is 90% as bright as the holographic scene outside the band, and if the angular bandwidth of the field grating is broad (corresponding to a low Bragg selectivity, which is easier to achieve if the diffraction efficiency is lower), then this 10% dark band can also be angularly broad and hence less visible. For example, switching from a field grating (e.g., for green, blue, or red color) with an ~80% diffraction efficiency to one with a ~15% diffraction efficiency, the dark band can change from being unacceptable to being unnoticeable.

In some implementations, a holographic material (e.g., silver halide) is used to achieve low diffraction efficiency, which can reduce the exposure energy. In some implementations, a beam ratio between a recording object beam and a recording reference beam is increased, so that the recording reference beam is much brighter than the recording object beam, or vice versa.

In some implementations, both the recording reference beam and the recording object beam can be strong (e.g., even being of equal power), both being S polarized or both being P polarized, one being S or P polarized and the other being an intermediate polarization, which can reduce the fringe contrast resulting from their interference and hence reduce the achieved diffraction efficiency. High inter-beam angles (e.g., about 75° to 80°) can be used, and the coupling between two P polarized beams can be very weak. So a field grating with a low diffraction efficiency can be achieved by adjusting either or both beams from S towards P by different amounts.

The polarization-mismatch technique can also be combined with adjusting a beam ratio, to produce uniform low diffraction efficiency field gratings (e.g., down to under 10%). Other methods of reducing diffraction efficiency can also be combined with the polarization-mismatch technique, e.g., deliberately inducing a small amount of motion in one or other beam during recording. For example, polarization mismatching (e.g., with one beam S and the other rotated to within a few degrees of P) in combination with moderate beam ratios (e.g., between 1 and 30) can be a much easier and more repeatable technique.

A further benefit of using weak field gratings (with low diffraction efficiency) is that other artifacts recorded in the field gratings, such as glints from the edges of, or dirt on, or damage to, optical components in the recording beams, and extra gratings to, for example, Fresnel reflected beams during recording, can be also recorded with lower DE and may hence be less visible.

When using low diffraction efficiency field gratings in the system, to achieve visually comfortable image brightness, replay beams can be attenuated with a smaller level. For example, a replay beam is normally attenuated factors of 10 to 100. If the diffraction efficiency of the field gratings (Des) is lowered to $\frac{1}{10}$th, the replay beams can be attenuated by 1 to 10×.

In some implementations, to reduce the strength of these dark bands in the reconstructed holographic scene, the returning light from the display back through the light coupling device can be changed to be a different polarization, e.g., P polarized if the illumination light from the light coupling device to the display is S polarized. The field gratings, because they are diffracting through large angles, have significantly lower DE for P polarized light. By this means, bright illumination of the display with field gratings is retained by receiving S polarization for which the field gratings have high diffraction efficiency, and a bright holographic scene back from the display in P-polarization can be obtained, because the returned light passes back through the field grating in P-polarization for which the field gratings have low diffraction efficiency, and hence the strength of the dark band is reduced. In some implementations, a polarizer (e.g., a Faraday rotator or a linear or circular polarizer) can be positioned between the field grating and the display and configured to rotate the polarization of light passing through the polarizer differently from rotating the polarization of light passing back through the polarizer.

A method for fabricating a diffraction grating with a low diffraction efficiency can be implemented as below. The diffraction grating can be used as a field grating in the system described above. The method can include: forming a recording material on a substrate and illuminating an object beam and a reference beam into the recording material to record a diffraction grating in the recording material. The object beam and the reference beam have mismatched polarization states. The term "mismatched polarization states" indicates different polarization states.

In some examples, the diffraction grating has a diffraction efficiency lower than a predetermined threshold, e.g., 10%, 15% or 20%. In some examples, one of the object beam and the reference beam has one of S polarization state and P polarization state, and the other one of the object beam and the reference beam has an intermediate polarization state between S polarization state and P polarization state. In some examples, one of the object beam and the reference beam has a first intermediate polarization state between S polarization state and P polarization state, and the other one of the object beam and the reference beam have a second intermediate polarization state between S polarization state and P polarization state, and the second intermediate polarization state is different from the first intermediate polarization state. In some examples, each of the object beam and the reference beam has P polarization state.

The method can further include: measuring a diffraction efficiency of the diffraction grating and adjusting a polarization state of at least one of the object beam or the reference beam based on the measured diffraction efficiency. For example, in response to determining that the measured diffraction efficiency is higher than a predetermined threshold, the polarization state of the at least one of the object beam and the reference beam can be adjusted to increase a mismatch between the polarization states of the object beam and the reference beam. In some implementations, the polarization state of the at least one of the object beam and the reference beam can be adjusted closer to P polarization state than to S polarization state.

In some examples, an inter-beam angle between the object beam and the reference beam is in a range from 70° to 80°. A beam ratio between the object beam and the reference beam can be in a range from 1 to 30. The method can further include: measuring a diffraction efficiency of the diffraction grating and adjusting a beam ratio between the object beam and the reference beam based on the measured diffraction efficiency. For example, in response to determining that the measured diffraction efficiency is higher than a predetermined threshold, the beam ratio between the object beam and the reference beam can be increased. In some implementations, a motion can be induced in at least one of the object beam and the reference beam during recording the diffraction grating. In some examples, the recording material comprises a photopolymer material or a silver halide material.

η

4.6 Multi-Extraction Illumination

Figure 7A:
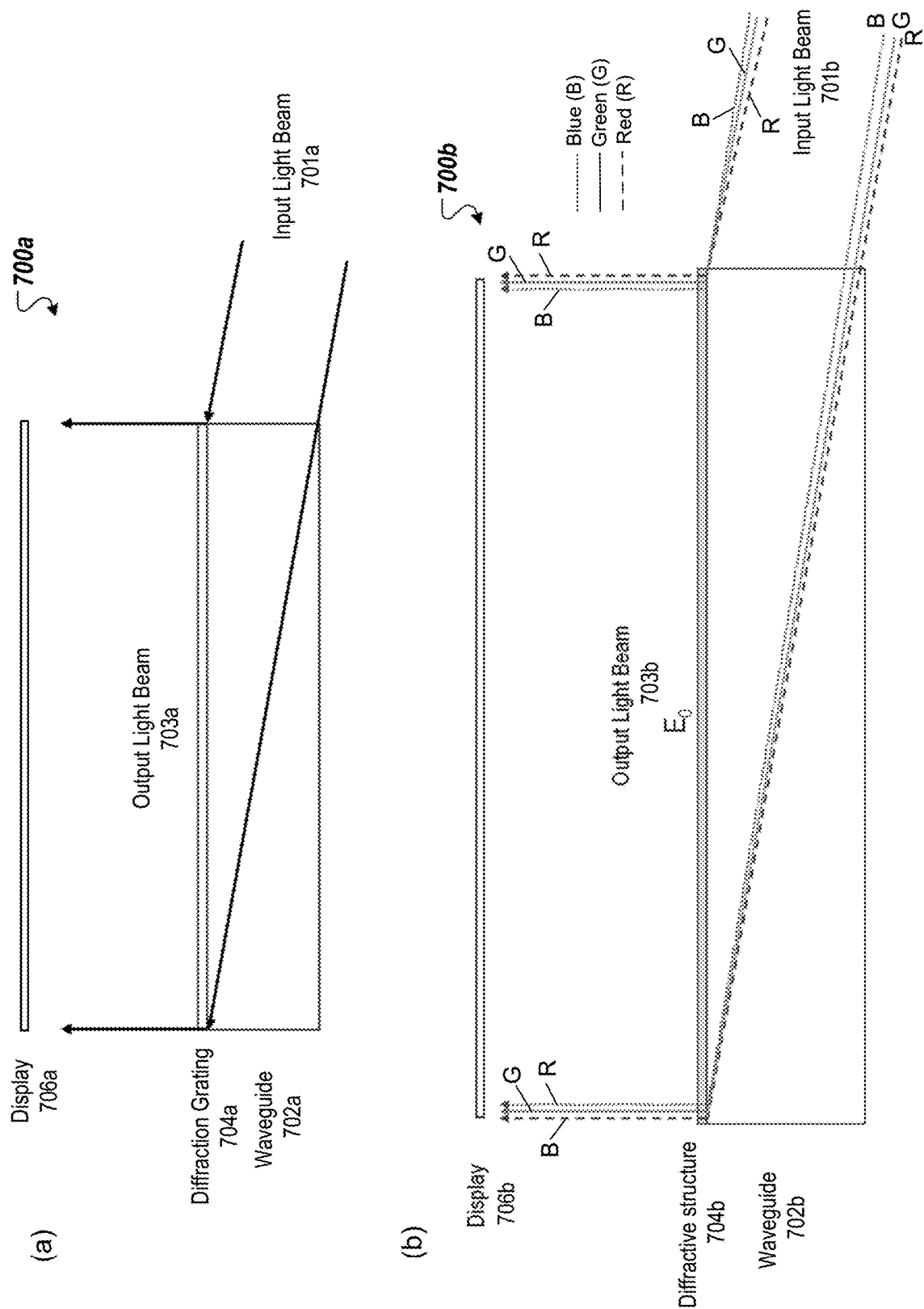
FIG. 7A illustrates examples of optically diffractive illumination with single extraction.

An optical device can be configured to diffract light to a display with single-extraction illumination, e.g., as discussed with respect to FIG. 7A. When the display has a larger size, the optical device with single-extraction illumination may become thicker to be able to illuminate a whole active area of the display, which can make a system larger and cumbersome. To address this issue, optical devices with multi-extraction illumination are implemented in the present disclosure, in combination with dispersion compensation, e.g., as discussed with further details in FIGS. 7B to 7G, which can make the system simpler and more compact and enable to illuminate a display with a very large area (ideally extending infinitely in a plane) with high performance.

FIG. 7A illustrates examples $700a$, $700b$ of optically diffractive illumination with single extraction. As illustrated in diagram (a) of FIG. 7A, in a single-color single-extraction holographic waveguide for illumination of a reflection display $706a$ (e.g., LCoS), a broad input light beam $701a$ of one narrow-bandwidth color (e.g., red, green, or blue) enters a waveguide $702a$ (e.g., from one side, edge, or face of the waveguide $702a$). By total-internal-reflection (TIR), the input light beam $701a$ takes no bounce or one or more bounces at a large angle of incidence (e.g., larger than 60°) within the waveguide $702a$, substantially maintaining its total power, and encounters a single region of a holographic layer that can include a holographic grating $704a$ for the single color. The holographic layer can be operated in transmission, reflection, or transflection mode to defeat TIR over that region. For illustration, the holographic grating $704a$ is operated in a transmission mode in FIG. 7A. The holographic grating $704a$ diffractively outcouples a fraction of the input light beam $701a$ from within the waveguide $702a$ at a suitable angle (e.g., at- or near-normal to a first exit face of the waveguide $702a$) to obtain an output light beam $703a$ to illuminate substantially the entire active area of the display $706a$. As described above, each pixel or phasel of the display $706a$ can be modulated by a control signal (e.g., based on a hologram) to then modify a local phase or phase and intensity of light incident upon it, causing a fraction of the modified light to diffract back, re-entering the waveguide $702a$ through the first exit face at a range of angles, and at least in part passing through the waveguide $702a$ to exit at a second exit face of the waveguide $702a$ towards a viewer (or an observer) looking through the waveguide $702a$ towards the display $706a$.

As described above in section 4.5, the diffraction efficiency of a holographic grating $704a$ (e.g., an extraction grating) can be configured such that only a small percentage of the light entering the waveguide $702a$ is extracted towards the display $706a$, while remaining unextracted light may remain within the waveguide $702a$, possibly undergoing further TIR, until the light either exits the waveguide $702a$ or is absorbed. By the reversibility of light, such part of the light is diffractively extracted from the waveguide $702a$ and then returned from the display $706a$ at angles which cause it to be significantly Bragg coupled by the holographic grating $704a$ back towards the input of the waveguide $702a$. The part of the light can thus be small enough that the viewer does not see a dark band, spot, or cross around such angles within the wavefront from the display $706a$ where the part of the light passes back through this final extraction region.

Diagram (b) of FIG. 7A illustrates an example $700b$ of optically diffractive illumination with single extraction. Compared to the example $700a$ of diagram (b), display $706b$ has a larger size (e.g., an area). Thus, to be able to illuminate the whole active area of the display $706b$, a width of input light beam $701b$ becomes larger than a width of the input light beam $701a$. Waveguide $702b$ also becomes wider and thicker to accommodate the wider input light beam $701b$. Diffractive structure $704b$ also has a larger size than the diffraction grating $704a$, such that the diffractive structure $704b$ can diffract the input light beam $701b$ with a larger size to generate an output light beam $703b$ with a larger illumination area on the display $706b$ than the output light beam $703a$.

For illustrations on different color operation, e.g., as illustrated in diagram (b) of FIG. 7A, light beams of three colors (e.g., red, green, blue) $701b$ enter the waveguide $702b$, one for each color, and each at the same or different angles and/or polarizations, and each one of these three beams encounters in the diffractive structure $704b$. The diffractive structure $704b$ can include three separate color-specific and/or polarization specific holographic layers in a stack of substantially parallel layers, one upon another within or upon a surface of the waveguide $702b$, such that each color or polarization is diffracted by primarily only the holographic layer which matches its color and/or polarization and is substantially unaffected by the other two layers because its particular color and/or polarization is well Bragg matched to only this one holographic layer. The diffractive structure $704b$ can also include a single holographic layer in which multiple Bragg gratings are present, one per color and/or polarization or spatially modulated by color and/or polarization, at such angles and polarizations that each color is diffracted substantially by only one of these multiple Bragg gratings.

The spectral bandwidth of the light source(s) may cause the light beams of different colors to refract and diffract into, within, and out of the waveguide $702b$ at a slight range of angles and, due to being thus slightly off Bragg, with potentially substantial differences in diffraction efficiency within the bandwidth, which effect can be corrected for by pre-dispersing the input light by (in angle space) a corresponding but opposite amount, e.g., as discussed above in section 4.4. In some cases, if this dispersion compensation is achieved using a grating of substantially higher spectral dispersion, the input light beam may also be expanded between the pre-dispersion grating and the grating on the waveguide, allowing a smaller pre-dispersion grating to be used which itself may be illuminated by a smaller input beam than would otherwise be required.

Figure 7B:
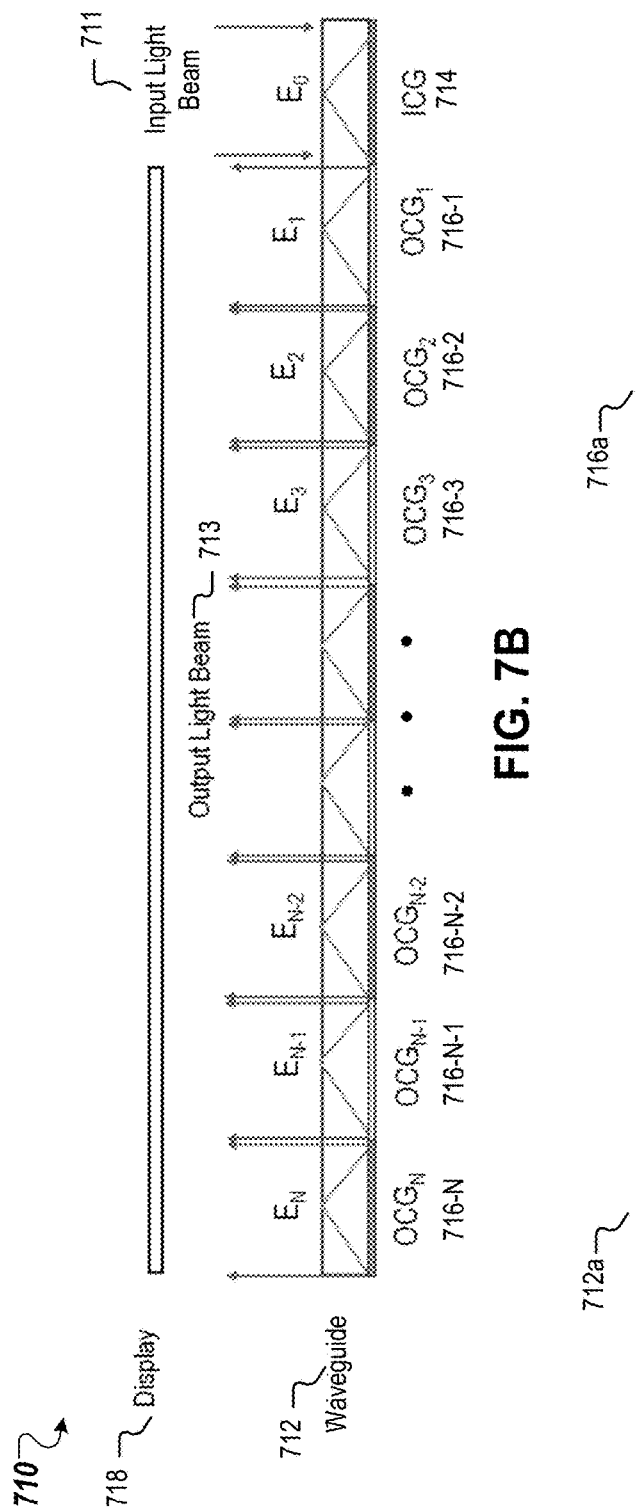
FIG. 7B illustrates an example of optically diffractive illumination with multi extraction in one dimension.

FIG. 7B illustrates an example system 710 of optically diffractive illumination with multi extraction in one dimension. As discussed with details below, the multi-extraction illumination enables to use an input light beam 711 to be diffracted by an in-coupling grating (ICG) 714 into an optical guiding device 712 (e.g., an optical waveguide) to travel via total internal reflection (TIR) to be sequentially incident on a plurality of out-coupling gratings (OCGs) 716-1, 716-2, 716-3, . . . , 716-N–2, 716-N–1, 716-N (referred to generally as out-coupling gratings 716 and individually as out-coupling grating 716), where N is an integer. Each of the plurality of OCGs 716 can diffract light out of the optical guiding device 712 to illuminate a corresponding portion of a target device, e.g., a display 718. In such a way, output light beams 713 diffracted from the plurality of OCGs 716 through the multi-extraction illumination can illuminate the whole active area of the display 718. Accordingly, a width of the input light beam 711 can be reduced. Moreover, the in-coupling grating 714 and each of the plurality of out-coupling gratings 716 can be configured to have opposite dispersions to compensate with each other, such that light diffracted out of the optical guiding device 712 to the display 716 has no or little dispersion.

In some implementations, in a single-color multiple-extraction (or "multi-bounce") holographic waveguide (e.g., the waveguide 712) for illumination and viewing of a reflection display (e.g., the display 718), a (e.g., narrower) beam of light of one narrow-bandwidth color (e.g., red, blue, or green) enters the waveguide from one side, edge, or face of the waveguide, by total-internal-reflection (TIR) takes zero or more bounces at a large angle of incidence (e.g., greater than 60°) within the waveguide, substantially maintaining its total power, and encounters a first narrow region (or "strip") of a single holographic layer. The single holographic layer can include an out-coupling grating 716 that operates in transmission, reflection, or transflection mode to defeat TIR over this first narrow region, which such first narrow region diffractively outcouples a first fraction of the light from within the waveguide at a suitable angle (e.g., at- or near-normal to this first exit face of the waveguide) to illuminate a corresponding strip of an active area of the display. For illustration, the holographic layer includes a reflection grating, e.g., the OCG 716 as illustrated in FIG. 7B. The plurality of OCGs 716 can be included in the single holographic layer.

At the corresponding strip of the display, each pixel or phasel of the display is illuminated and then is modulated with a control signal (e.g., based on a hologram) to modify a local phase or phase and intensity of the light incident upon the pixel or phasel, causing a fraction of this modified light to diffract back, re-entering the waveguide through the first exit face at a range of angles, and at least in part passing through the waveguide to exit at a second exit face of the waveguide towards a viewer (e.g., an observer) looking through the waveguide towards the display.

In the multiple-extraction embodiment, e.g., as illustrated in FIG. 7B, only a small fraction of the light within the waveguide is extracted from the first narrow region (e.g., $OCG_1$ 716-1) of the holographic layer, and the remainder (or remaining fraction) of the light is total internal reflected to remain entrapped within the waveguide, where the remainder subsequently encounters a second narrow region (e.g., $OCG_2$ 716-2) of the holographic layer. Such second narrow region diffractively outcouples a second small fraction of this entrapped light substantially parallel to the first extracted fraction, and without any substantially-visible spatial gap or overlap between extractions. Again, the undiffracted remainder is total internal reflected within the waveguide to encounter a third (and subsequently potentially a fourth and so forth) such narrow region of the holographic layer, each of which extracts a further fraction of the light without substantial gaps or overlaps.

The diffraction efficiency of each such narrow region (e.g., the OCG 716-1, 716-2, . . . , 716-N) is controlled such that the total optical power extracted at each region is substantially constant. The number and widths of such regions are chosen such that substantially the entire active area of the display is illuminated with a substantially uniform power. This uniformity may be achieved by increasing the diffraction efficiency of each subsequent extraction region in an approximately exponential manner, such that at each such region the product of the diffraction efficiency of that region and the power remaining within the waveguide at that region remains substantially constant for each such region, if allowance is made for any small absorptive, scattering, or other losses encountered during the passage of the unextracted light as it takes multiple TIR bounces and diffractive extractions along the waveguide. The diffraction efficiency of the final (most efficient) extraction region (e.g., $OCG_N$ 716-N) may be set such that even for that final region only a small percentage of the light entering the waveguide is extracted towards the display. In some examples, the diffraction efficiencies of the OCGs 716 in the extraction regions can vary from a smallest value, e.g., 5% for $OCG_1$ 716-1, to a largest value, e.g., 20% for $OCG_N$ 716-N. Remaining unextracted light may remain within the waveguide, possibly undergoing further TIR, until it either exits the waveguide or is absorbed. By the reversibility of light, such part of the light, which is diffractively extracted from this final region of the waveguide and then returned from the display at angles which cause it to be significantly Bragg coupled by the extraction grating in this final region back towards the input of the waveguide, can thus be small enough that the viewer does not see a dark band, spot, or cross around such angles within the wavefront from the display where it passes back through this final extraction region.

Similarly, for different colors (e.g., RGB) operation, three such beams enter the waveguide, one for each color, and each at the same or different angles and/or polarizations, and each one of these three beams encounters a narrow region of a diffractive structure. In some implementations, the diffractive structure includes, for each color, a separate color-specific and/or polarization specific holographic layer in a stack of substantially parallel such holographic layers, one upon another within or upon a surface of the waveguide, such that each color or polarization is diffracted by primarily only the holographic layer which matches its color and/or polarization and is substantially unaffected by the other two layers, because its particular color and/or polarization is well Bragg matched to only this one holographic layer. Each holographic layer can include a holographic grating. In some cases, the diffractive structure includes a single holographic layer in which multiple holographic gratings (e.g., Bragg gratings) are present, one per color and/or polarization or spatially modulated by color and/or polarization, at such angles and polarizations that each color is diffracted substantially by only one of these multiple holographic gratings.

Such an N-extraction waveguide (e.g., waveguide 712) can advantageously be approximately N times thinner than a corresponding single-extraction waveguide (e.g., the waveguide 702a or 702b of FIG. 7A), or can use a shallower TIR angle within the waveguide and still be considerably thinner than a corresponding single-extraction waveguide. The thickness of the single-extraction waveguide can be limited by a need to illuminate an entire width and height of the display with a single extraction and by the need to reduce Fresnel reflections from internal refractive-index differences between adjacent materials within the waveguide. In contrast, in a multi-bounce waveguide using a shallower internal angle, such Fresnel reflections can be weaker. Such a thin waveguide can even be incorporated within or be optically attached to or in contact with a cover glass of the display or an extension thereof.

The spectral bandwidth of an optical source or sources can cause light beams to refract and diffract into, within, and out of the waveguide at a slight range of angles and, due to being thus slightly off Bragg, with potentially substantial differences in diffraction efficiency within the spectral bandwidth. The dispersion effect can be corrected for by pre-dispersing the input light by (in angle space) a corresponding but opposite amount. Since the input beam to the waveguide can in effect be expanded by multiple extractions, a width of each extracted output beam can be comparable to a width of the input beam, and for N extractions approximately N times narrower than an active width or height of the display. In some implementations, a pre-dispersion grating (e.g., the ICG 714) with a narrow width comparable to the width of each extraction grating (e.g., the OCG 716) can be used without substantial expansion between the pre-dispersion grating and the extraction grating in the waveguide, allowing a smaller pre-dispersion grating to be used which itself may be illuminated by a smaller input beam than would otherwise be required. Such a smaller pre-dispersion grating can be incorporated within the waveguide itself (or optically attached thereto) as an additional diffractive region of stacked or co-located gratings used as a diffractive in-coupler and arranged to have opposite dispersion to that of the multiple diffractive outcoupling regions.

Figure 7C:
FIG. 7C illustrates example fringe patterns of (a) in-coupling grating and (b) out-coupling grating for dispersion compensation.

FIG. 7C illustrates example fringe patterns of (a) in-coupling grating and (b) out-coupling grating for dispersion compensation. The in-coupling grating (e.g., ICG 714 of FIG. 7B) and the out-coupling grating (e.g., OCG 716 of FIG. 7B) can be configured to compensate with each other for light having a spectral bandwidth with a peak wavelength.

In a single-bounce illumination with substantial expansion, an in-coupling grating used as the compensating grating has to be much more dispersive than an out-coupling grating and hence has more extreme fringes. In contrast, in a multi-extraction illumination, expansion is achieved by using multiple extractions, so each out-coupling grating can have the same width as the in-coupling grating. The in-coupling grating and the out-coupling grating can be configured to cause opposite dispersions having a same magnitude for the light. The fringe structures of the in-coupling grating and the out-coupling grating can be substantially identical, but mirrored, because there is no net expansion between the in-coupling grating and each one of the out-coupling gratings. For example, as illustrated in diagram (a) of FIG. 7C, the in-coupling grating can have first fringe planes with a first fringe tilt angle, and, as illustrated in diagram (b) of FIG. 7C, the second diffraction grating has second fringe planes with a second fringe tilt angle. The first fringe tilt angle and the second fringe tilt angle can have a same value with opposite directions.

In some implementations, the in-coupling grating has a first fringe spacing perpendicular to the first fringe planes, and the out-coupling grating has a second fringe spacing perpendicular to the second fringe planes. The first fringe spacing can be identical to the second fringe spacing.

As noted above, the in-coupling grating is configured to have a large diffraction efficiency (e.g., more than 80%) such that a large amount of an input light beam can be diffracted into a waveguide to propagate via TIR to be sequentially incident on a series of out-coupling gratings. In contrast, each out-coupling grating is configured to have a low diffraction efficiency (e.g., no more than 20%), such that: i) undiffracted remainder light can travel to following out-coupling gratings; ii) reflected light from the display can be weaker (or diffracted less strongly) to avoid dark bands, dots, crosses, etc.

For example, for light having a spectral width of 2 nm with a peak wavelength at 516.0 nm, an in-coupling grating can be configured to have a Bragg matching for 516 nm at a Bragg angle (e.g., 76.36°). The in-coupling grating can be slightly off Bragg for light at 515 nm or 517 nm, and hence can have a diffraction efficiency of only about 80% of the diffraction efficiency for light at 516 nm. Incident light at 515 nm can see the fringes as being in proportion slightly larger than for 516 nm, so the fringes can diffract 515 nm most efficiently at a slightly lesser angle than the 76.36° for 516 nm. Correspondingly, light at 517 nm would be most strongly diffracted at a slightly larger angle than 76.36°.

At the out-coupling grating, light at 516 nm can be incident at 76.36° and be diffracted out at 0.0°. Light at 515 nm can be incident at a slightly lesser angle. Again, the out-coupling grating also has fringes made for light at 516 nm, so the fringes look a little too large for light at 515 nm and hence can diffract 515 nm through a slightly lesser angle, exactly compensating for the dispersion of the in-coupling grating and hence diffracting the light at 515 nm out also at 0.0°. Similarly, light at 517 nm would travel via TIR within the waveguide at a slightly larger angle than 76.36° but can also be diffracted out by the out-coupling grating at 0.0°.

As described above, for each bounce up along the waveguide, a portion of light has already been extracted, so, among a series of out-coupling grating, the first out-coupling grating (e.g., $OCG_1$ 716-1) closest to the in-coupling grating can have a much lower diffraction efficiency that the last out-coupling grating (e.g., $OCG_N$ 716-N) farthest from the in-coupling grating. Hence, the desired refractive index variation ($\Delta n$) of the first out-coupling grating can be much lower than the desired $\Delta n$ of the final out-coupling grating, while the fringe tilt and fringe spacing can be the same for each out-coupling grating. Note that the fringe tilt and fringe spacing define determine angles of diffraction, whereas the fringe tilt, fringe spacing, and $\Delta n$ defines determine the diffraction efficiency. The tilt and spacing for the in-coupling grating can be the same (but mirrored as above), compared to that of the out-coupling grating. The $\Delta n$ of the in-coupling grating can be much higher than the $\Delta n$ of even the final extraction grating, since ideally 100% of the input light can be diffracted by the in-coupling grating, whereas at most e.g., 20%, of light incident upon the final out-coupling grating can be extracted.

Figure 7D:
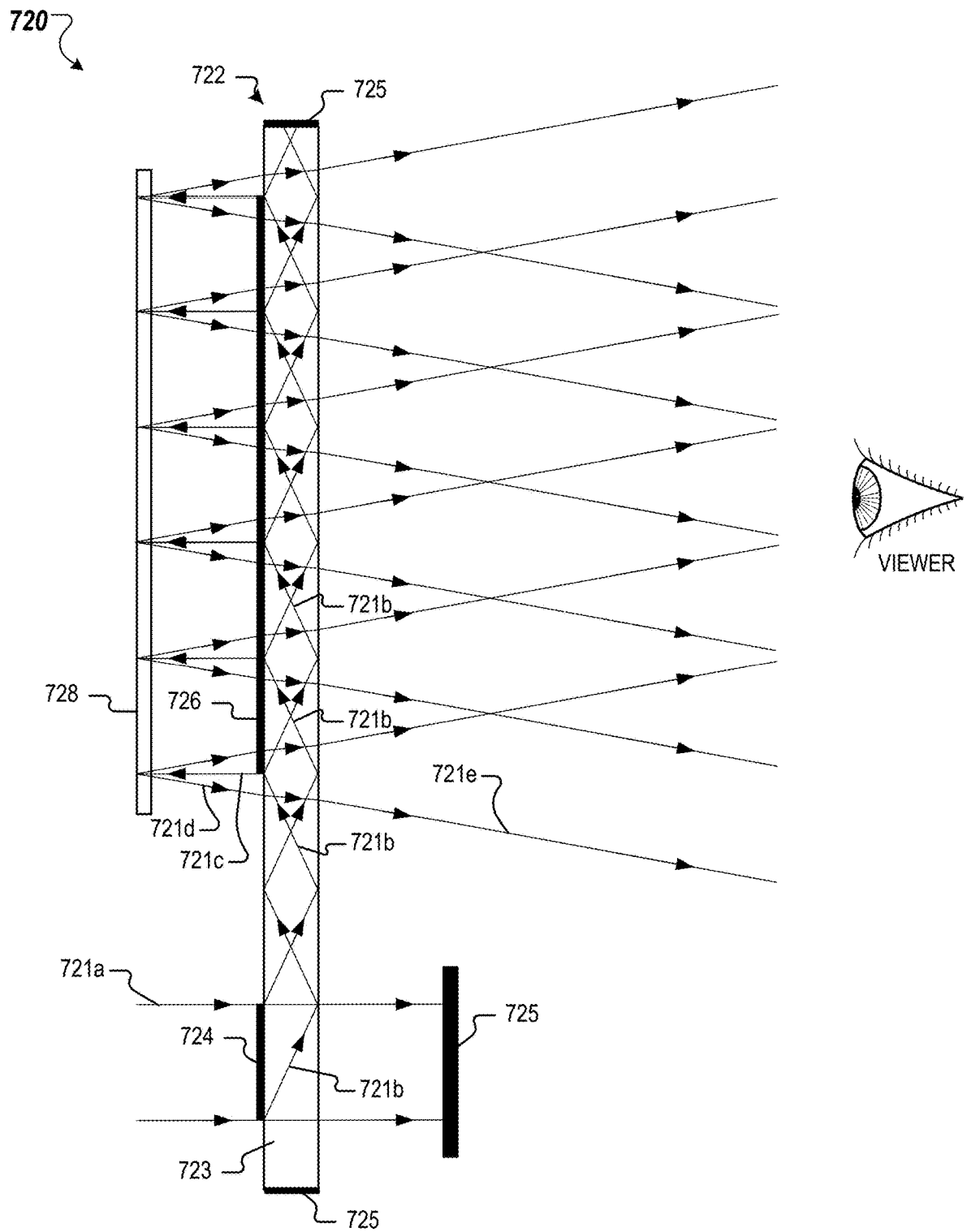
FIG. 7D illustrates an example system with single-color multi-extraction illumination.
Figures 2, 7D:
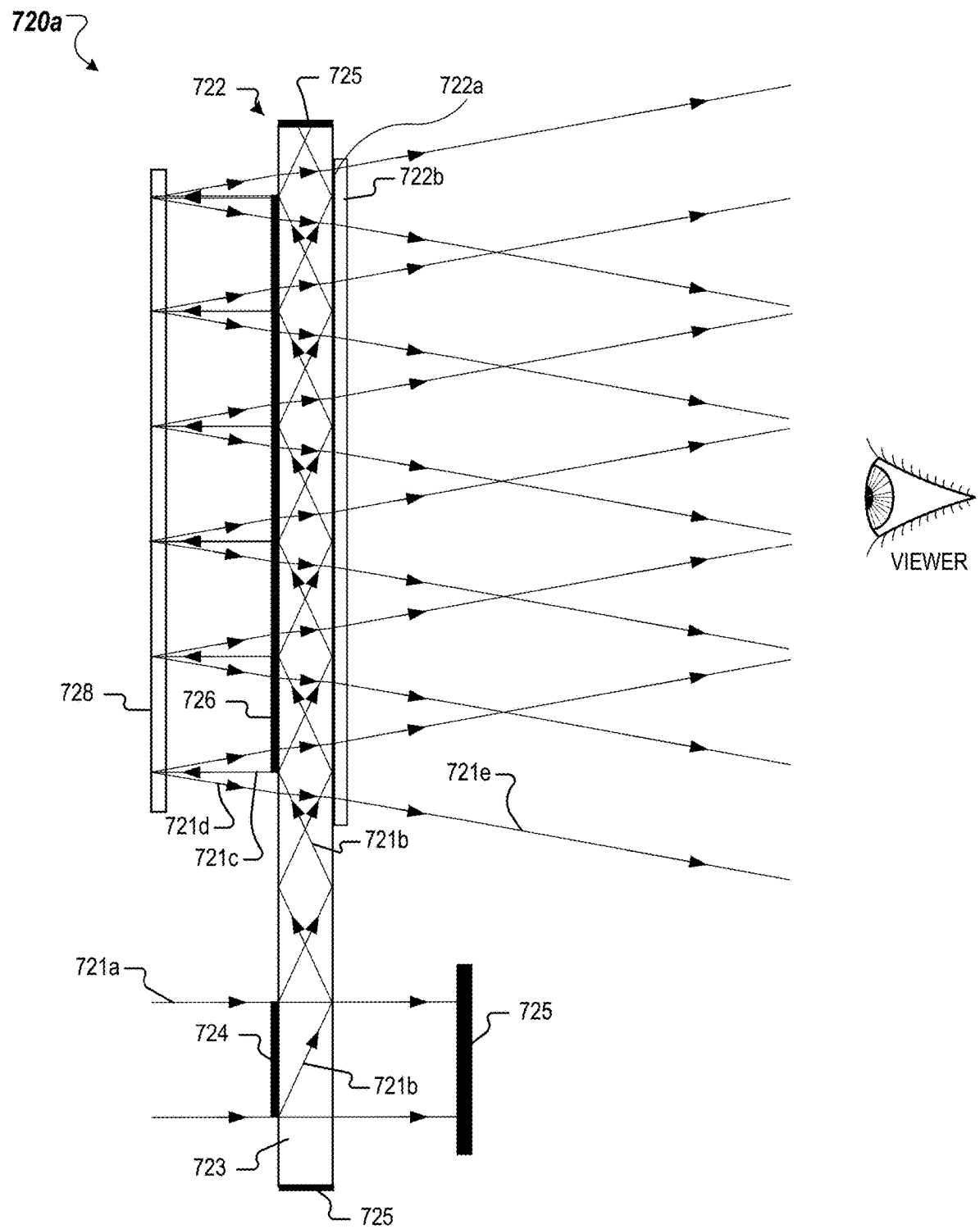

FIG. 7D illustrates an example system 720 with single-color multi-extraction illumination. The system 720 includes an optical device 722 and a display 728. The optical device 722 is configured to diffract light to the display 728, and the display 728 is configured to deflect light, e.g., to form a holographic light field. The system 720 can be similar to, or the same as, the system 710 of FIG. 7B.

The display 728 can be a regular display having a plurality of display elements that form a regular pattern. The display 728 can also be an irregular display having a plurality of display elements that form an irregular pattern. The display 728 can be the display 150 of FIG. 1A, 172 of FIG. 1B, 504 of FIG. 5A, 514 of FIG. 5B, 524 of FIG. 5C, 534 of FIG. 5D, 606 of FIG. 6A, 616 of FIG. 6B, 6C, or 6D, 645 of FIG. 6E, 6F, 6G, or 690 of FIG. 6H, or 900 of FIG. 9A, 930 of FIG. 9B, 1000 of FIG. 10A, or 1050 of FIG. 10B. For illustration, in FIG. 7D, the display 728 is a reflective display.

In some implementations, the optical device 722 includes an optical guiding device 723, an in-coupling diffractive structure 724, and a plurality of out-coupling diffractive structure 726. The optical guiding device 723 can be configured to guide light to propagate along a first direction within the optical guiding device 723, e.g., via total internal reflection (TIR). The optical guiding device 723 can be a waveguide or lightguide, e.g., the waveguide 712 of FIG. 7B. The optical guiding device 723 can be transparent or semi-transparent. The in-coupling diffractive structure 724 can be configured to diffract the light to propagate in the optical guiding device 723. The plurality of out-coupling diffractive structures 726 are arranged downstream of the in-coupling diffractive structure 724 along the first direction and configured to diffract at least part of the light out of the optical guiding device 723 along a second direction different from the first direction.

For example, as illustrated in FIG. 7D, along a light path, input light 721a is incident on the in-coupling diffractive structure 724 (e.g., at about 0 degree), and is diffracted into the optical guiding device 723 (e.g., at a large diffracted angle such as 76 degrees) with a large diffraction efficiency (e.g., no smaller than 80%). Diffracted light 721b from the in-coupling diffractive structure 724 travels in the optical guiding device 723 via total internal reflection (TIR) with one or more bounces to be incident on a first out-coupling diffractive structure 726. The first out-coupling diffractive structure 726 diffracts a portion of the diffracted light 721b to obtain extracted light 721c to be incident on the display 728. A portion of an active area of the display 728 is illuminated by the extracted light 721c and modulated by control signals (e.g., based on hologram data) to deflect the extracted light 721c to become deflected light 721d that propagates through the optical device 722 to form a corresponding holographic light field 721e, e.g., a light cone as noted above. The remainder of the diffracted light 721b that is undiffracted by the first out-coupling diffractive structure 726 continues to travel via TIR in the optical guiding device 723 to be incident on following out-coupling diffractive structures 726 sequentially. In such a way, the multi-extraction illumination can cover the whole active area of the display 728 to form a large holographic light field 721e to a viewer. The system 720 can include an optical absorber (or blocker) 725 on ends of the optical guiding device 723 or facing the optical guiding device 723 to block transmitted light from the in-coupling diffractive structure 724.

In some implementations, light into the optical device 722 has a spectral bandwidth with a peak wavelength. As described above, the in-coupling diffractive structure 724 can be configured to cause a first optical dispersion for the light, and each out-coupling diffractive structure 726 can be configured to cause a second optical dispersion for the light. The first optical dispersion and the second optical dispersion can be compensated with each other, such that light diffracted out of the optical guiding device 723 towards the display 728 has no or little optical dispersion.

In some implementations, the in-coupling diffractive structure 724 includes a first diffraction grating, e.g., ICG 714 of FIG. 7B, and each out-coupling diffractive structure includes a second diffraction grating, e.g., OCG 716 of FIG. 7B. The first diffraction grating and the second diffraction grating can be configured to cause the first optical dispersion and the second optical dispersion to be opposite dispersions having a same magnitude for the light.

In some implementations, e.g., as illustrated in FIG. 7C, the first diffraction grating has first fringe planes with a first fringe tilt angle, and the second diffraction grating has second fringe planes with a second fringe tilt angle, and the first fringe tilt angle and the second fringe tilt angle have a same value with opposite directions. The first diffraction grating has a first fringe spacing perpendicular to the first fringe planes, and the second diffraction grating has a second fringe spacing perpendicular to the second fringe planes, and the first fringe spacing can be identical to the second fringe spacing. In some implementations, light diffracted by the first diffraction grating has a first beam width, and light diffracted by the second diffraction grating has a second beam width, and the first beam width and the second beam width can be identical.

In some implementations, e.g., as described above, a first diffraction efficiency of the first diffraction grating (as in-coupling grating) for light with the peak wavelength is greater than a second diffraction efficiency of the second diffraction grating (as out-coupling grating or extraction grating) for the light with the peak wavelength. In some examples, the first diffraction efficiency is no smaller than 80%, and the second diffraction efficiency is no greater than 20%.

The first diffraction grating can be a reflection grating, a transmission grating, or a transflection grating. The second diffraction grating can be a reflection grating or a transmission grating. In some implementations, the first diffraction grating and the second diffraction grating can be both a reflection grating, e.g., as illustrated in FIG. 7B. In some implementations, the first diffraction grating and the second diffraction grating can be both a transmission grating, e.g., as illustrated in FIG. 7D.

As illustrated in FIG. 7D, the in-coupling diffractive structure 724 can be arranged in or on the optical guiding device 723, and the plurality of out-coupling diffractive structures 726 are arranged in or on the optical guiding device along the first direction. In some implementations, the in-coupling diffractive structure and the plurality of out-coupling diffractive structures are arranged on a same side of the optical guiding device, e.g., as illustrated in FIG. 7D. In some implementations, the in-coupling diffractive structure and the plurality of out-coupling diffractive structures are arranged on opposite sides of the optical guiding device.

In some implementations, the plurality of out-coupling diffractive structures 726 are in contact with or overlap with one another along the first direction, such that light diffracted from the out-coupling diffractive structures 726 can cover the active area of the display 728 without gaps. In some implementations, e.g., as illustrated in FIG. 7D, the in-coupling diffractive structure 724 is spaced from the plurality of out-coupling diffractive structures 726. In such a way, the active area of the display 728 is not obstructed by the in-coupling diffractive structure 724, and the light can also be incident on the in-coupling diffractive structure 724, without obstruction from the display 728 (e.g., including both the active area and a peripheral area).

In some implementations, as described above, the in-coupling diffractive structure 724 and each of the plurality of out-coupling diffractive structures 726 have opposite dispersions with a same magnitude. There can be no light expansion between the in-coupling diffractive structure 724 and each of the plurality of out-coupling diffractive structures 726. Thus, along the first direction, a width of the in-coupling diffractive structure 724 can be identical to a width of each of the plurality of out-coupling diffractive structures 726. Each of the plurality of out-coupling diffractive structures 726 are configured to cause a same dispersion having a same magnitude and a same direction for the light.

In some implementations, the plurality of out-coupling diffractive structures 726 include a first out-coupling diffractive structure (e.g., OCG 716-1 of FIG. 7B) and a second output-coupling diffractive structure (e.g., OCG 716-2 or OCG 716-3 of FIG. 7B) that is arranged farther away from the in-coupling diffractive structure 714 than the first out-coupling diffractive structure. The second output-coupling diffractive structure can have a higher diffraction efficiency for light with the peak wavelength than the first output-coupling diffractive structure, e.g., as described above. The first out-coupling diffractive structure can be configured to diffract a first portion of the light incident on the first out-coupling diffractive structure out of the optical guiding device, the diffracted first portion of the light having a first optical power. The second out-coupling diffractive structure is configured to diffract a second portion of the light incident on the second out-coupling diffractive structure out of the optical guiding device, the diffracted second portion of the light having a second optical power. The first portion of the light has a higher optical power than the second portion of the light, and the first out-coupling structure and the second out-coupling structure can be configured such that the second optical power is identical to the first optical power.

In some implementations, e.g., as illustrated in FIG. 7D, the diffracted light from the in-coupling diffractive structure 724 propagates via total internal reflection in the optical guiding device 723 along the first direction to be sequentially incident on each of the plurality of out-coupling diffractive structures 726 along the first direction. The plurality of out-coupling diffractive structures 726 can be configured to have gradually increased diffraction efficiencies for the light along the first direction, such that diffracted light by each of the plurality of out-coupling diffractive structures 726 out of the optical guiding device 723 towards the display 728 has a same optical power.

In some implementations, the diffracted light from the in-coupling diffractive structure 724 is incident on each of the plurality of out-coupling diffractive structures 726 with a same incident angle, and each of the plurality of out-coupling diffractive structures 726 is configured such that the diffracted light by each of the plurality of out-coupling diffractive structures 726 has a same diffraction angle.

In some implementations, the in-coupling diffractive structure 724 is configured to receive the light at a first incident angle and diffract the light at a first diffraction angle. The first incident angle for the in-coupling diffractive structure 724 is identical to the same diffraction angle for each of the plurality of out-coupling diffractive structures 726, and the first diffraction angle for the in-coupling diffractive structure 724 is identical to the same incident angle for each of the plurality of out-coupling diffractive structures 726. In some examples, the incident angle is no smaller than 60°, and wherein the diffraction angle is about 0°.

A grating for a particular color can diffract not only light of the particular color, but also light of other colors, which can cause crosstalk among the different colors. In some implementations, the optical device 722 includes a field grating structure (e.g., the field grating structure 508-1 of FIG. 5A) configured to suppress color crosstalk between different colors of light incident on the display 728. In some implementations, the field grating structure can include multiple holographic gratings with one or more color-selective polarizers to suppress (e.g., eliminate or minimize) color crosstalk. In some implementations, the field grating structure can include multiple holographic gratings with one or more reflective layers for light of different colors incident at respective incident angles to suppress color crosstalk and zero order light. In some examples, the field grating structure can include multiple holographic gratings with one or more color-selective polarizers, and one or more reflective layers to suppress color crosstalk and zero order diffraction. Each of the color-selective polarizers can be configured for a single color or multiple colors. Each of the reflective layers can be configured for a single color or multiple colors. In some implementations, example field grating structures are configured and performed as described in international application PCT/US2021/50271 entitled "DISPLAYING THREE-DIMENSIONAL OBJECTS" and filed on Sep. 14, 2021, which is commonly-owned and fully incorporated herein by reference. In some implementations, an out-coupling diffractive structure 726 is implemented as the field grating structure and configured to suppress color crosstalk.

To improve an effect of a reconstructed holographic scene and thus a performance of a display system, it is desirable to suppress (or even eliminate) display zero order light in the reconstructed holographic scene. The display zero order light can include any unwanted light from the display, e.g., light reflected/diffracted at gaps between display elements, reflected light from the display elements, or reflected light from a display cover on the display. In some implementations, the optical device 722 is configured to suppress display zero order light by at least one of: zero order light deviation, zero order light blocking, or zero order light redirection. In some implementations, example optical devices 722 are configured and performed as described in international application PCT/US2021/50275 entitled "RECONSTRUCTING OBJECTS WITH DISPLAY ZERO ORDER LIGHT SUPPRESSION" and filed on Sep. 14, 2021, which is commonly-owned and fully incorporated herein by reference.

In some examples, for zero order light deviation, the field grating structure can be configured to couple input light to illuminate the display 728 at an incident angle larger than a half of a viewing angle of a reconstructed cone that forms the holographic scene. The display zero order light propagates away from the display 728 at a reflected angle identical to the incident angle. A hologram corresponding to the holographic scene can be preconfigured such that diffracted first order light propagates away from the display to form the reconstruction cone in a same way as that when the incident angle is 0°. Thus, the display zero order light is deviated from the reconstruction cone and accordingly the holographic scene.

In some examples, for zero order light blocking, display zero order light can be first deviated away from diffracted first order light according to the zero order light deviation and then blocked (or absorbed) by an optically blocking component (e.g., a metamaterial layer or an anisotropic optical element such as a louver film). The optically blocking component is configured to transmit a light beam having an angle smaller than a predetermined angle and block a light beam having an angle larger than the predetermined angle. The predetermined angle can be smaller than the incident angle of the input light and larger than a half of the viewing angle of the reconstruction cone. The optically blocking component can be formed on a side of the optical device 722 that is opposite to the field grating structure.

In some examples, for zero order light redirection, display zero order light can be first deviated away from diffracted first order light according to the zero order light deviation and then redirected even further away from the diffracted first order light by a redirecting grating structure (e.g., zero order redirecting grating 508-3 of FIG. 5A) in the optical device 722. When the input light includes different colors of light simultaneously or sequentially, the redirecting grating structure can include one or more corresponding diffractive gratings that are configured to diffract the different colors of light towards different directions in a plane or in space to reduce color crosstalk among the different colors of light. The redirecting grating structure can be formed on a side of the optical guiding device 723 that is opposite to the field grating structure 508-1.

For illustration, FIG. 7D-2 illustrates an example system 720a with single-color multi-extraction illumination with display zero order suppression and/or color crosstalk suppression. Compared to the system 720a of FIG. 7D-1, the system 720a includes an optical device 722a that includes a redirecting grating structure 722a that can be covered by a transparent protective substrate (e.g., glass) 722b. The redirecting grating structure 722a can be, e.g., zero order redirecting grating 508-3 of FIG. 5A.

The system 720a, 720b with multi-extraction illumination can be also applied to other target devices, besides the display, e.g., a light sensor or a camera. As described above, the multi-extraction illumination can be also implemented for light with multiple colors.

Figure 7E:
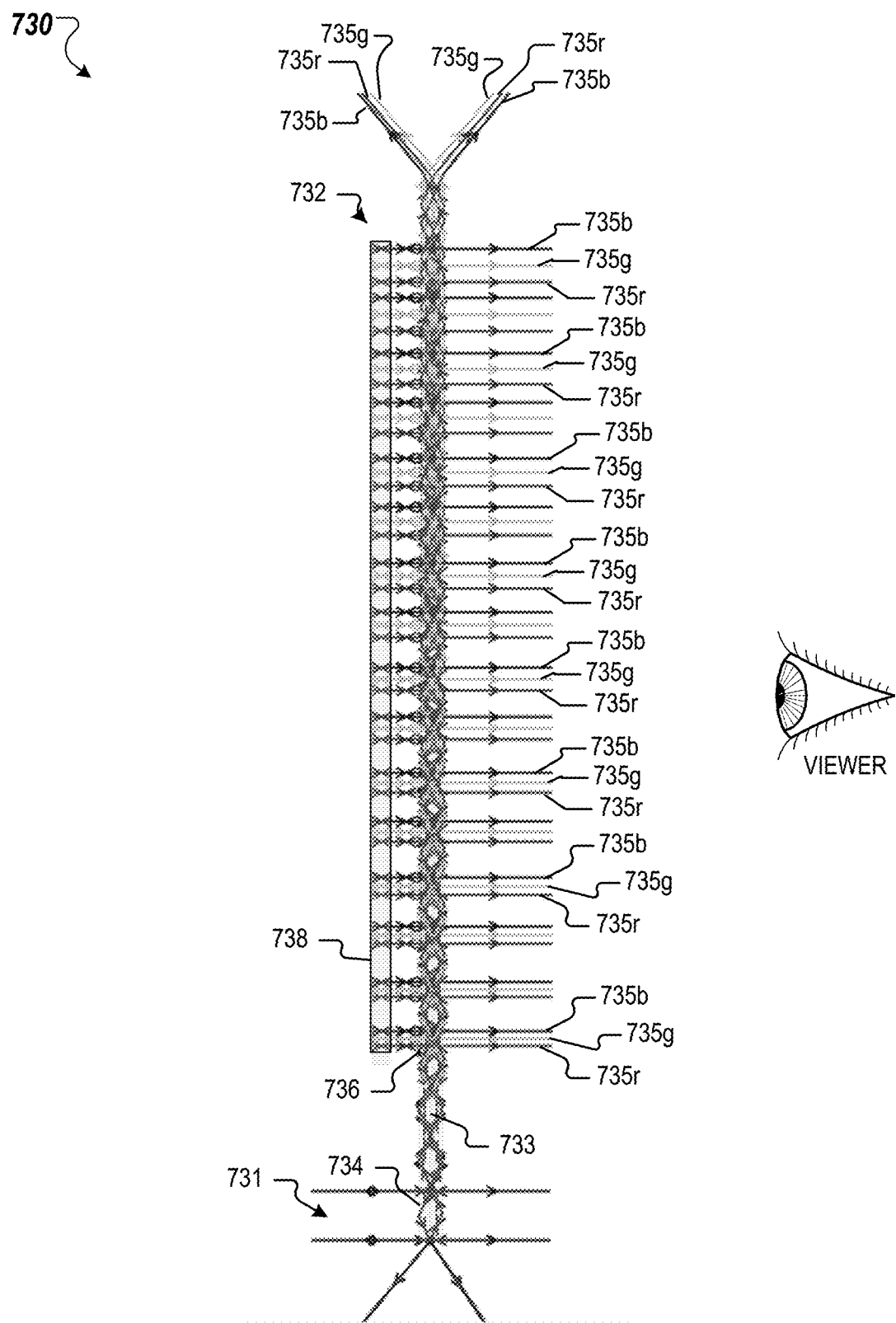
FIG. 7E illustrates an example system with multi-color multi-extraction illumination.

FIG. 7E illustrates an example system 730 with multi-color multi-extraction illumination. For illustration, three colors (red—R, blue—B, green—G) are illustrated in FIG. 7E. Similar to the system 720 of FIG. 7D, the system 730 includes an optical device 732 and a display 738 (e.g., the display 728 of FIG. 7D).

The optical device 732 can be similar to the optical device 722 of FIG. 7D. The optical device 732 can include an optical guiding device 733 (e.g., the optical guiding device 723 of FIG. 7D), an in-coupling diffractive structure 734, and a plurality of out-coupling diffractive structures 736. The in-coupling diffractive structure 734 and the plurality of out-coupling diffractive structures 736 can be arranged on or in the optical guiding device 733 along a direction.

Different from the in-coupling diffractive structure 724 of FIG. 7B, the in-coupling diffractive structure 734 includes a first corresponding diffraction grating for light with each of the different colors (R, G, B). Different from the out-coupling diffractive structure 726 of FIG. 7B, each out-coupling diffractive structure 736 includes a second corresponding diffraction grating for the light with each of the different colors. In some cases, the first corresponding diffraction gratings for the light with the different colors are recorded in a same first recording medium. In some cases, the second corresponding diffraction gratings for the light with the different colors are recorded in a same second recording medium. In some cases, each of the first corresponding diffraction gratings for the light with the different colors is recorded in a respective first recording medium. In some cases, each of the second corresponding diffraction gratings for the light with the different colors is recorded in a respective second recording medium.

A first corresponding diffraction grating for light with a single color (as an in-coupling diffraction grating) can be configured to compensate optical dispersion for the light with the single color with a second corresponding diffraction grating for the light with the single color (as an out-coupling diffraction grating). As discussed above, the first and second corresponding diffraction gratings can have opposite dispersions with a same magnitude.

For example, as illustrated in FIG. 7E, along a light path, input light 731 (including input beams of three colors RGB) is incident on the in-coupling diffractive structure 734 (e.g., at about 0 degrees), and is diffracted into the optical guiding device 733 (e.g., at a large diffracted angle such as within 60 to 80 degrees) with a large diffraction efficiency (e.g., no smaller than 80%). Diffracted light from the in-coupling diffractive structure 734 travels in the optical guiding device 733 via total internal reflection (TIR) with one or more bounces to be incident on a first out-coupling diffractive structure 736. The first out-coupling diffractive structure 736 diffracts a portion of the diffracted light to obtain extracted light to be incident on the display 738. A portion of an active area of the display 738 is illuminated by the extracted light and modulated by control signals (e.g., based on hologram data) to deflect the extracted light to become deflected light that propagates through the optical device 732 to form a corresponding holographic light field 735b for blue color, 735g for green color, and 735r for red color. The remainder of the diffracted light that is undiffracted by the first out-coupling diffractive structure 736 continues to travel via TIR in the optical guiding device 723 to be incident on following out-coupling diffractive structures 726 sequentially. In such a way, the multi-extraction illumination can cover the whole active area of the display 738 to form holographic light fields with different colors to a viewer.

In the system 720 of FIG. 7D or the system 730 of FIG. 7E, the multi-extraction illumination is along a direction. To cover the whole active area of the display (e.g., 728 or 738), the out-coupling diffractive structures (e.g., 726 or 736) are configured such that the diffracted light by each out-coupling diffractive structure propagates to illuminate a respective stripe of the display. A sum of the respective portions of the display can be no smaller than an area of the display. The respective stripe of the display has a width along the first direction and a length along a second direction perpendicular to the first direction. The length can be a length of the display, which can be much greater than the width of the respective stripe. The illumination output beam from each out-coupling diffractive structure has the same size as the display. As the in-coupling diffractive structure has a same magnitude of dispersion (with opposite directions), the input light beam also has a same size as the respective stripe of the display. Thus, light from a light source needs to be adjusted, e.g., by a beam expander or adjuster, to have such a beam size same as the respective stripe of the display.

Figure 7F:
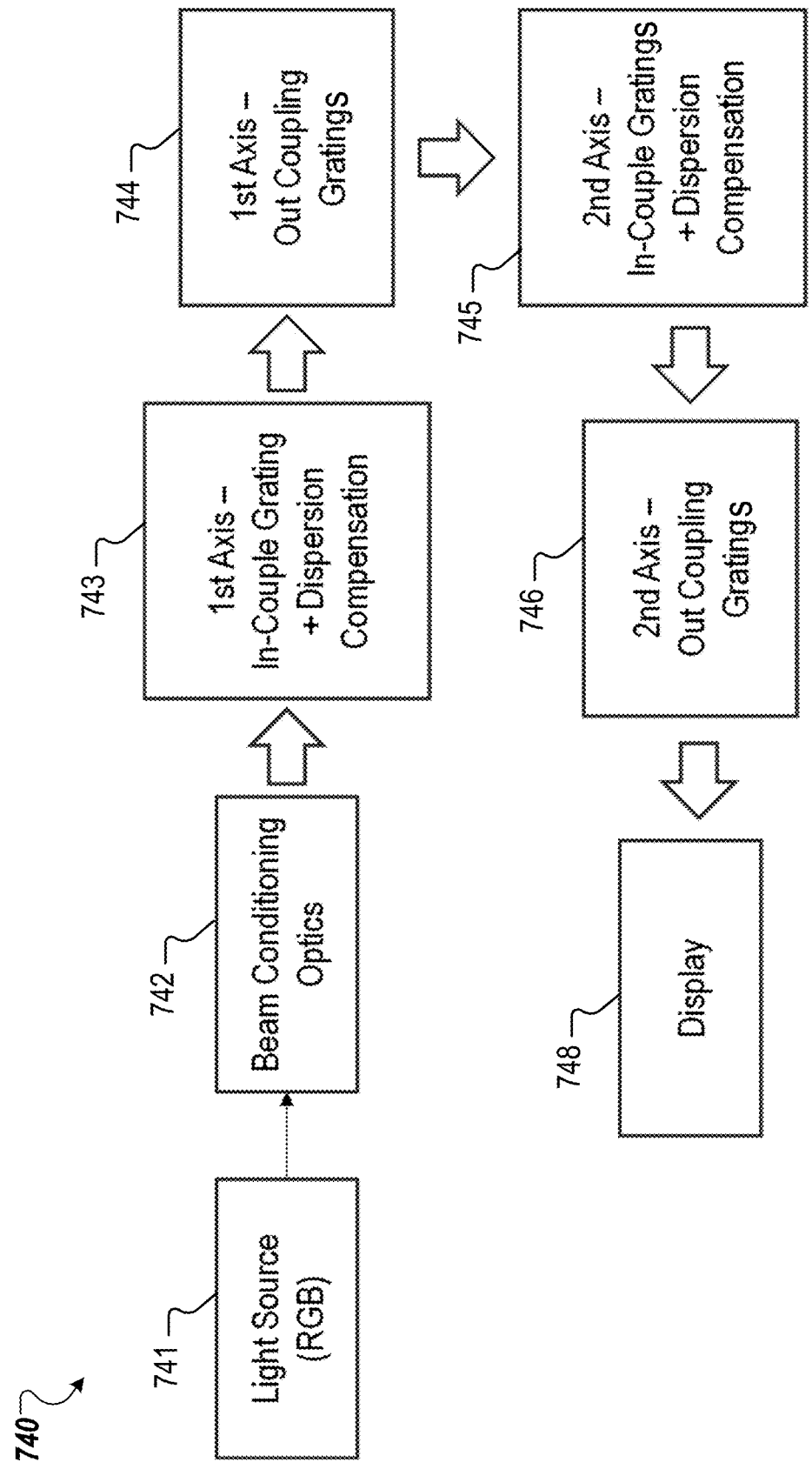
FIG. 7F illustrates an example system with multi-extraction illumination in two dimensions.
Figure 7G:
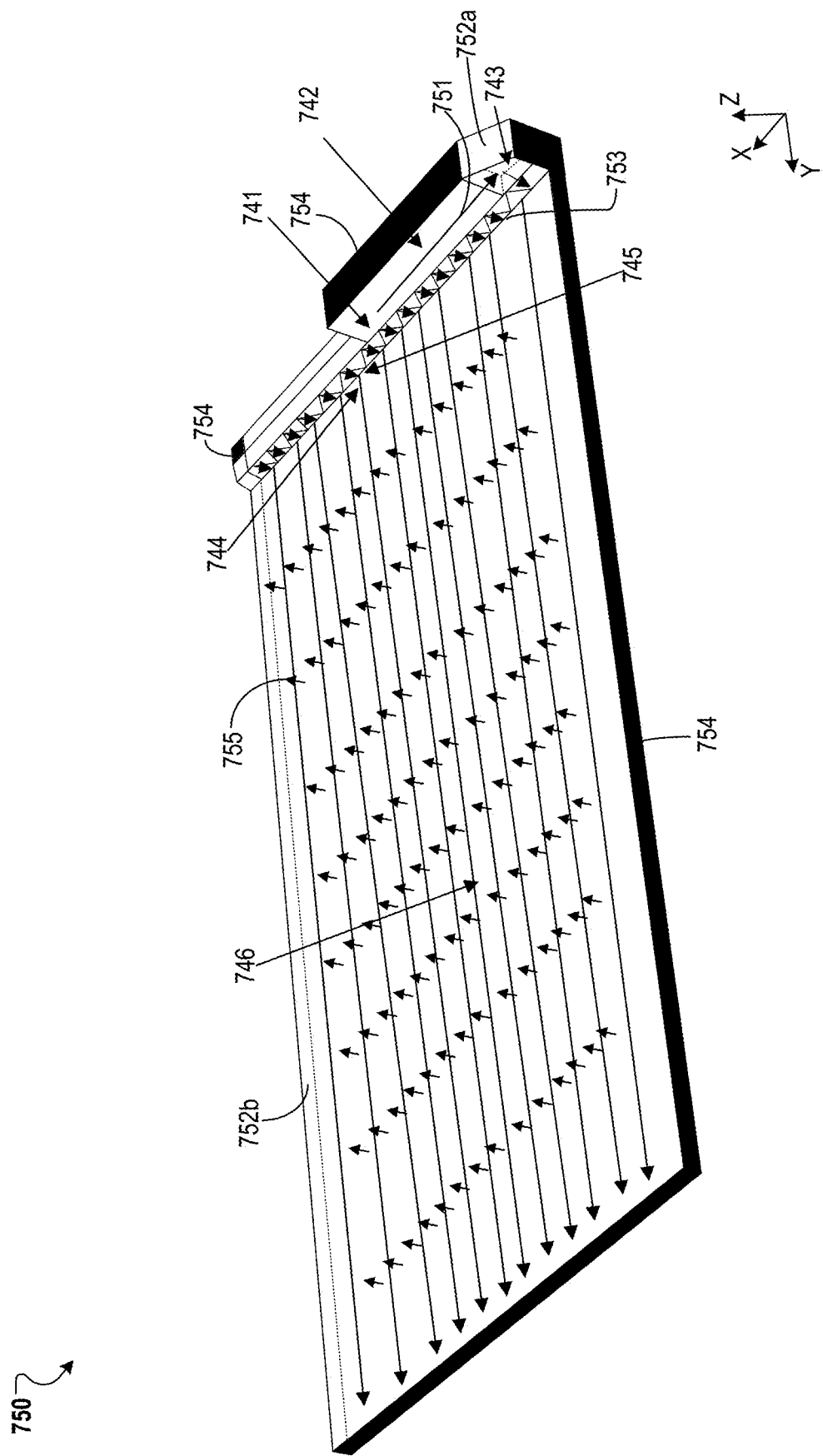
FIG. 7G illustrates an example of the system of FIG. 7F with light path.

In some implementations, e.g., as illustrated in FIGS. 7F-7G, multi-extraction illumination can be implemented in two dimensions, which can reduce the requirement for the size of the input light beam and can be accommodated for a very large display.

FIG. 7F illustrates an example system 740 with multi-extraction illumination in two dimensions. FIG. 7G illustrates an example setup 750 of the system 740 of FIG. 7F with light path. The system 740 includes a display 748. The display 728 can be a regular display having a plurality of display elements that form a regular pattern. The display 728 can also be an irregular display having a plurality of display elements that form an irregular pattern. The display 728 can be the display 150 of FIG. 1A, 172 of FIG. 1B, 504 of FIG. 5A, 514 of FIG. 5B, 524 of FIG. 5C, 534 of FIG. 5D, 606 of FIG. 6A, 616 of FIG. 6B, 6C, or 6D, 645 of FIG. 6E, 6F, 6G, or 690 of FIG. 6H, or 718 of FIG. 7B, 728 of FIG. 7D, 738 of FIG. 7E, or 900 of FIG. 9A, 930 of FIG. 9B, 1000 of FIG. 10A, or 1050 of FIG. 10B. For illustration, in FIG. 7D, the display 728 is a reflective display.

As illustrated in FIGS. 7F, 7G, the system 740 includes a light source 741 (that can be a single-color source or multi-color source), a beam conditioning device 742 (e.g., a beam expander like lens, and/or a beam polarizer such as optical films configured to orient the polarization of the light), a first in-coupling diffractive structure 743 (e.g., the in-coupling diffractive structure 714 of FIG. 7B, 724 of FIG.

7D, or 734 of FIG. 7E), a plurality of first out-coupling diffractive structure 744 (e.g., the out-coupling diffractive structure 716 of FIG. 7B. 726 of FIG. 7D, or 736 of FIG. 7E), a plurality of second in-coupling diffractive structures 745, and multiple groups of second out-coupling diffractive structures 746.

As described above, each of the diffractive structures 743, 744, 745, 746 can include a diffraction grating for a single color, or multiple diffraction gratings respectively for multiple colors that can be recorded in a same recording medium or in multiple recording mediums.

As illustrated in FIG. 7G, along a light path, light 751 from the light source 741 is first adjusted by the beam conditioning device 742 that can expand a beam size of the light 751 to a size suitable for the multi-extraction illumination in two dimensions. For example, the beam size can have a circle shape, a square shape, or an elliptical shape, or a rectangular shape. Then, the light 751 is diffracted by the first in-coupling diffractive structure 743 to propagate in a first optical guiding device 752a that can be configured to guide light to propagate along a first direction (e.g., X direction) within the first optical guiding device 752a via total internal reflection. The first plurality of out-coupling diffractive structures 744 can be arranged downstream of the first in-coupling diffractive structure 743 along the first direction and configured to diffract at least part of the light 751 out of the first optical guiding device 752a along a second direction (e.g., negative Z direction) that is different from the first direction.

The plurality of second in-coupling diffractive structures 745 are arranged in or on a second optical guiding device 752b along the first direction. Each group of second out-coupling diffractive structures 746 is arranged in or on the second optical guiding device along the third direction (e.g., Y direction). The second optical guiding device 752b extends along the first direction and a third direction (e.g., Y direction) perpendicular to the first direction (e.g., X direction) and the second direction (e.g., Z direction). The second optical guiding device 752b can have an area identical to or larger than an area of the display 748. The first optical guiding device 752a and the second optical guiding device 752b can be a single piece, or can be two pieces, or can be integrated together as a single piece.

As illustrated in FIG. 7G, for each of the plurality of second in-coupling diffractive structures 745, the second in-coupling diffractive structure 745 is configured to receive first light 753 diffracted from a respective first out-coupling diffractive structure 744 and diffract the first light 753 to propagate in the second optical guiding device 752b via total internal reflection along the third direction (e.g., Y direction) to be sequentially incident on a corresponding group of second out-coupling diffractive structures 746. Each of the corresponding group of second out-coupling diffractive structures 746 can be configured to receive second light reflected from the second optical guiding device 752b and diffract the second light 755 out of the second optical guiding device 752b along the second direction (e.g., positive Z direction) towards the display 748.

In some implementations, the first in-coupling diffractive structure 743 is configured to cause a first optical dispersion for the light, and each of the plurality of first out-coupling diffractive structures 744 is configured to cause a second optical dispersion for the light, and the first optical dispersion and the second optical dispersion are compensated with each other, such that light 753 diffracted out of the first optical guiding device 752a has no or little optical dispersion. In some implementations, the second in-coupling diffractive structure 745 and each of the corresponding group of second out-coupling diffractive structures 746 are configured to cause opposite dispersions to compensate with each other, such that light 755 diffracted out of the second optical guiding device 752b has no or little optical dispersion.

In some implementations, the second in-coupling diffractive structure 744 has a higher diffraction efficiency than the respective first out-coupling diffractive structure 745 and each of the corresponding group of second out-coupling diffractive structures 746. The second in-coupling diffractive structure 744 can include a first diffraction grating, and each of the corresponding group of second out-coupling diffractive structures 745 can include a respective second diffraction grating. The first diffraction grating and the respective second diffraction grating are configured to cause opposite dispersions having a same magnitude for the light.

In some implementations, the corresponding group of second out-coupling diffractive structures 746 are configured to have gradually increased diffraction efficiencies for the light along the third direction (e.g., Y direction), such that diffracted light 755 by each of the corresponding group of second out-coupling diffractive structures 746 out of the optical guiding device 752b towards the display 748 has a same optical power.

In some implementations, the first in-coupling diffractive structure 743, the plurality of first out-coupling diffractive structures 744, the plurality of second in-coupling diffractive structures 745, and the multiple groups of second out-coupling diffractive structures 746 are configured such that diffracted light from each of the multiple groups of second out-coupling diffractive structures along the second direction towards has a uniform optical power.

In some implementations, the multiple groups of second out-coupling diffractive structures 746 are configured such that the diffracted light 755 by each of the multiple groups of second out-coupling diffractive structures 746 propagates to illuminate a respective portion of the display 748, a sum of the respective portions of the display 748 being no smaller than an area of the display 748. The respective portion of the display 748 can have a same size along the first direction (e.g., X direction) and the third direction (e.g., Y direction). The respective portion can have a circle shape, a square shape, an elliptical shape, or a rectangular shape.

In some implementations, the system 740 further includes one or more absorbers 754 arranged in or on end surfaces of the first optical guiding device 752a and the second optical guiding device 752b and configured to absorb light that propagates out of the first and second optical guiding device 752a, 752b.

In some implementations, the display 748 includes a backplane having a plurality of circuits and a plurality of display elements arranged on the backplane. The plurality of display elements can form an irregular pattern. Each of the plurality of display elements can be coupled to a respective circuit of the plurality of circuits. The system 740 can include a controller coupled to the display 748 and the light source 741. The controller can be, e.g., the controller 502 of FIG. 5A. The controller can include at least one of a processing device (e.g., the processing device 120 of FIG. 1A) or a driving device (e.g., the driving device 130 of FIG. 1A). The controller is configured to: transmit at least one control signal to at least one display element of the display for modulating at least one property of the at least one display element, sequentially modulate the display with information associated with a first color during a first time period and modulate the display with information associated with a second color during a second, sequential time period; and control the light source 741 to sequentially turn on a first light emitting element to emit light with the first color during the first time period and a second light emitting element to emit light with the second color during the second, sequential time period.

4.7 Ambient Light Blocking

When a viewer looks at close-to-normal incident at a display implemented in the present disclosure, the viewer may see his/her own eyeball and surrounding skin reflected back from the display due to the existence of ambient light. More generally, any ambient light is reflected, and the display looks like a mirror from essentially all angles.

As described with further details below, e.g., with respect to FIGS. 7I and 7J, ambient light (e.g., from a light bulb) can be blocked by a combination of a linear polarizer and an optical retarder (e.g., a quarter-wave plate) configured to control polarization of the ambient light among different polarization states, e.g., random polarization state (R), S polarization state (S), P polarization state (P), and/or circular polarization state (C). A diffraction efficiency of a holographic grating (e.g., Bragg grating) depends on parameters, e.g., incident angle, polarization state, and reflection/transmission mode.

Figure 7H:
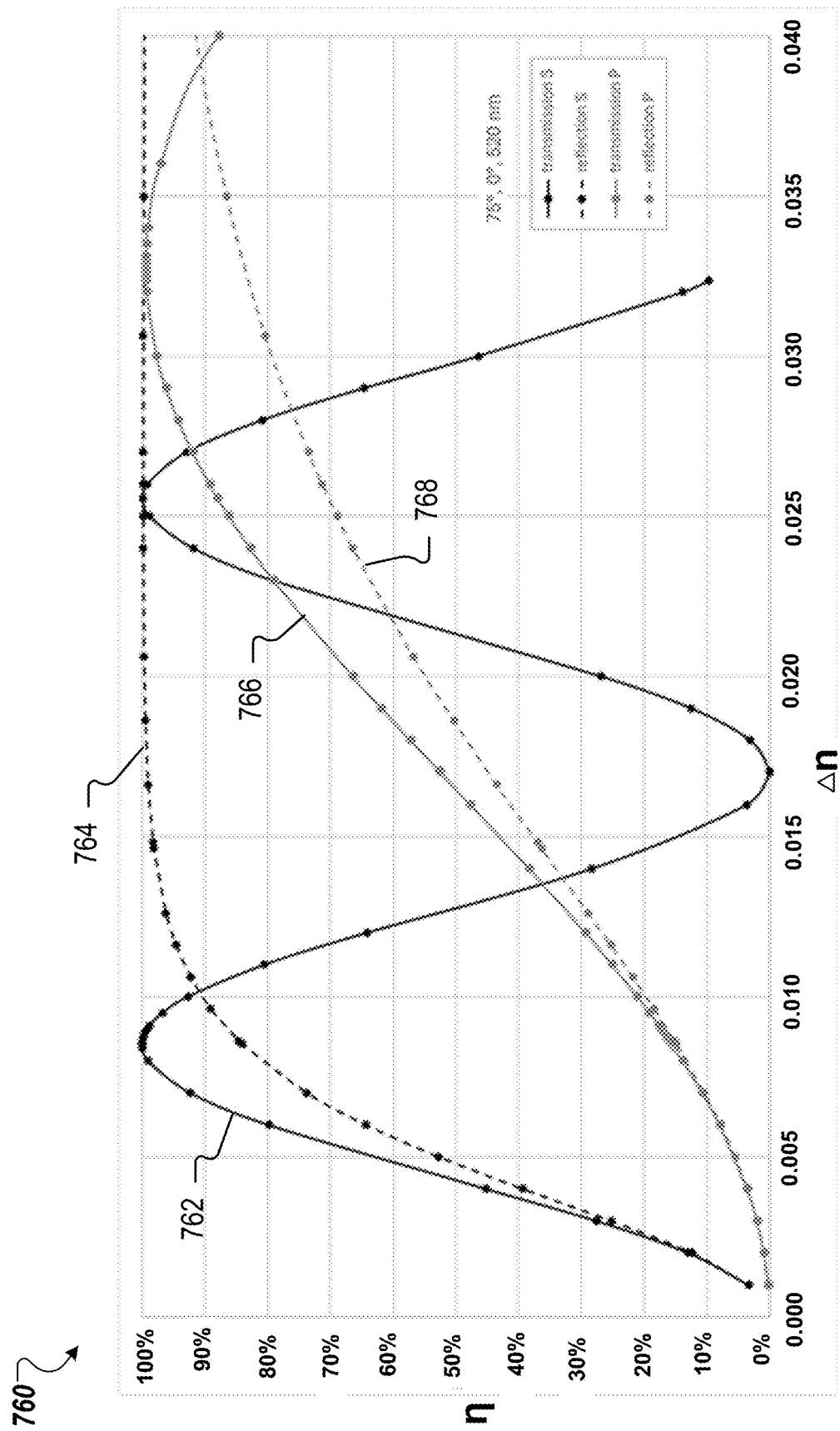
FIG. 7H illustrates example plots of a diffraction efficiency of a holographic grating for different polarization modes.

FIG. 7H illustrates an example 760 of plots 762, 764, 766, 768 of a diffraction efficiency of a holographic grating for different polarization modes. As an example, the grating is made to diffract light at 520 nm from 75° (an incident angle) to 0° (a diffracted angle or output angle) for P vs S polarization and for reflection mode vs transmission mode. For example, plot 762 shows a diffraction efficiency of the holographic grating for S polarization under transmission mode (transmission S), plot 764 shows a diffraction efficiency of the holographic grating for S polarization under reflection mode (reflection S), plot 766 shows a diffraction efficiency of the holographic grating for P polarization under transmission mode (transmission P), plot 768 shows a diffraction efficiency of a holographic grating for P polarization under reflection mode (reflection P). Note that there are ranges of Δn (index modulation, primarily increased by increasing the exposure energy while recording the grating) for which the grating has high efficiency for S-polarization but low for P. There are also ranges of Δn where the efficiency is high for P and low for S. The grating can be configured to strongly diffract one polarization state while substantially ignoring the opposite polarization state. Circular polarization has approximately the average of these two diffraction efficiencies for P-polarization and S-polarization.

Figure 7I:
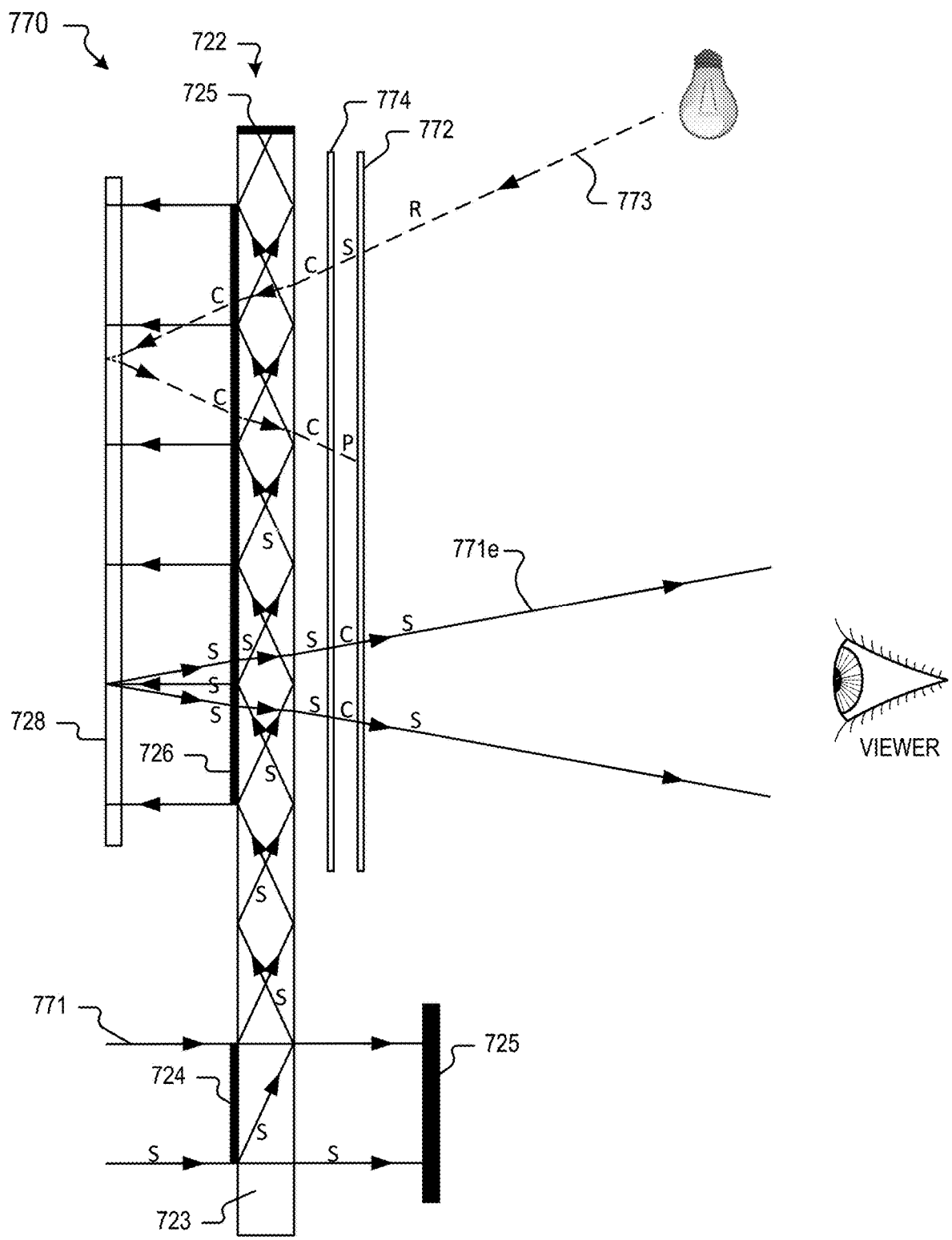
FIG. 7I illustrates an example system for ambient light blocking.

FIG. 7I illustrates an example system 770 for ambient light blocking. FIG. 7J illustrates another example system 780 for ambient light blocking. For illustration, each of the system 770 and the system 780 is formed based on the system 720 of FIG. 7D. Besides the components of the system 720, each of the system 770 and the system 780 further includes a linear polarizer 772 and an optical retarder 774. The difference between the system 770 and the system 780 is a position change for the optical retarder 774. In the system 770, the optical retarder 774 is positioned between the linear polarizer 772 and the optical device 722, while, in the system 780, the optical retarder 774 is positioned between the optical device 722 and the display 728. As illustrated in FIGS. 7I and 7J, the position change of the optical retarder 724 causes target light and ambient light to experience different light paths with different polarization properties.

The linear polarizer 772 is configured to transmit light with a linear polarization state (e.g., S polarization or P polarization). The linear polarizer 772 can have a transmission angle, along which light can be transmitted through the linear polarizer 772. Light with a polarization state opposite to the linear polarization state of the linear polarizer 772 can be blocked by the linear polarizer 772.

The optical retarder 774 is configured to alter a polarization state of light passing through the optical retarder 774. The optical retarder 774 can be a quarter-wave plate (QWP). The quarter-wave plate can be oriented at 450 to the transmission angle of the linear polarizer 772. The optical retarder can be configured to: alter linearly polarized light passing through the optical retarder into circular polarized light, and alter circular polarized light passing through the optical retarder into linearly polarized light.

The display 728 is configured to deflect target light 771, without altering a polarization state of the target light 771, and deflect ambient light 773, without altering a polarization state of the ambient light 773. The display 728 can be a reflective display.

In either the system 770 or the system 780, the linear polarizer 772 and the optical retarder 774 are configured to cause the ambient light 773 coming from a first side of the linear polarizer 772 to pass through the linear polarizer 772 and the optical retarder 774 to be incident on the display 728 and deflected back from the display 728 to pass through the optical retarder 774 to be blocked from a second side of the linear polarizer 772 by the linear polarizer 772, the second side of the linear polarizer 772 being opposite to the first side of the linear polarizer 772.

The optical device 722, the linear polarizer 772, and the optical retarder 774 are configured to cause the target light 771 to be incident on the display 728 and deflected back from the display 728 to transmit from the second side of the linear polarizer 772 through the linear polarizer 772. An intensity of the target light 771 transmitted from the linear polarizer is about a half of an intensity of the target light 771 deflected from the display 728.

Figure 7J:
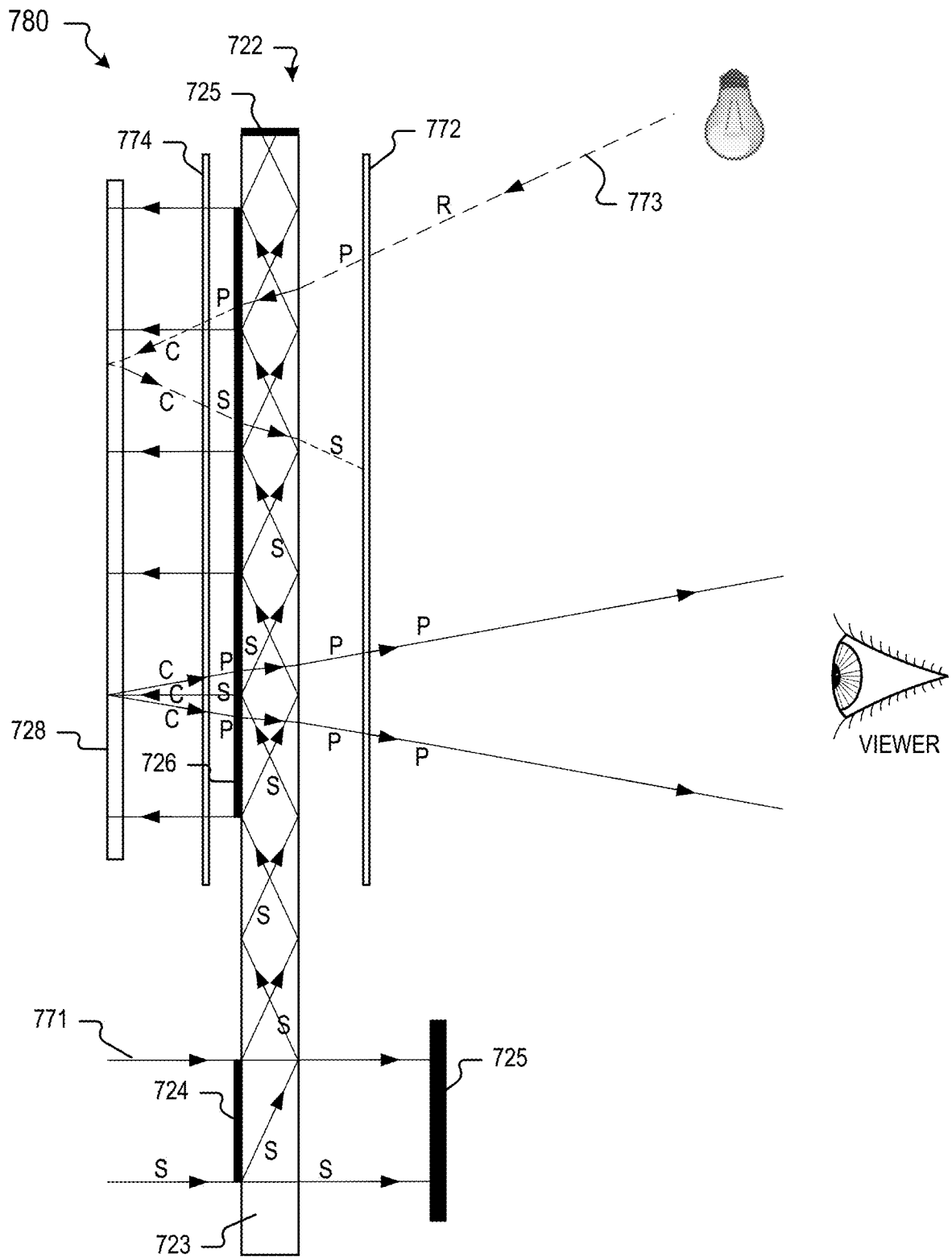
FIG. 7J illustrates another example system for ambient light blocking.

As illustrated in FIG. 7I or 7J, the optical device 722 is configured to guide the target light 771 along a first direction and diffract to the display 728 along a second direction different from the first direction, without passing through the linear polarizer 772 from the first side of the linear polarizer 772.

In some implementations, e.g., as illustrated in FIG. 7I or 7J, the linear polarizer 772 and the optical retarder 774 are configured to cause the ambient light to pass through the linear polarizer 772 once and the optical retarder 774 twice sequentially. The optical device 722, the linear polarizer 772, and the optical retarder 774 are configured to cause the target light 771 to pass through the optical retarder 774 twice and the linear polarizer 772 once sequentially.

In some implementations, e.g., as illustrated in FIG. 7I or 7J, the linear polarizer 772 and the optical retarder 774 are configured to cause the ambient light 773 incident on the second side of the linear polarizer 772 having an opposite polarization state than the ambient light 773 transmitted out from the first side of the linear polarizer 772.

As illustrated in FIG. 7I, in the system 770, the linear polarizer 772 and the optical retarder 774 are arranged on a first side of the optical device 722, and the display 728 is arranged on a second side of the optical device 722 that is opposite to the first side of the optical device 722. The optical retarder 774 is between the linear polarizer 772 and the optical device 722.

The optical device 722 is configured to deflect the target light 771 towards the display 728. The target light 711 is linearly polarized, e.g., S polarized or P polarized. For illustration in FIG. 7I, the target light 711 has S polarization state.

As illustrated in FIG. 7I, along a light path of the target light 771, the target light 771 is deflected by the optical device 722 with a first polarization state (e.g., S polarization state) that is same as the linear polarization state (e.g., S polarization state) of the linear polarizer 772. The target light 771 is incident on the display 728 with the first polarization state, and deflected back from the display 728 with the first polarization state. The target light 771 then is incident on the optical retarder 774 that converts the first polarization state of the target light 771 to a circular polarization state. Thus, the target light 771 is incident on the linear polarizer 772 from the second side of the linear polarizer 772 with the circular polarization state, and is transmitted through the linear polarizer 772 with a half of the optical power.

In contrast, as illustrated in FIG. 7I, the linear polarizer 772 converts the ambient light 773 from a random polarization state to the linear polarization state (e.g., S polarization state). The ambient light 773 can be incident on a first side of the optical retarder 774 with the linear polarization state, and the optical retarder 774 converts the linear polarization state of the ambient light into a circular polarization state. The ambient light is deflected back from the display 728 with the circular polarization state to a second side of the optical retarder 774 opposite to the first side of the optical retarder 774. The optical retarder 774 converts the circular polarization state of the ambient light 773 to a second linear polarization state (e.g., P polarization state) that is opposite to the linear polarization state of the linear polarizer 772. Thus, the ambient light with the second linear polarization state is blocked by the linear polarizer 772. Note that the first linear polarization state is one of S polarization state and P polarization state, and the second linear polarization state is the other one of S polarization stat and P polarization state. In some cases, e.g., as illustrated in FIG. 7I, the first linear polarization state is S polarization state, and the second linear polarization state is P polarization state.

In some implementations, e.g., as illustrated in FIG. 7J, the linear polarizer 772 is arranged on a first side of the optical device 722, and the display 728 is arranged on a second side of the optical device 722 that is opposite to the first side of the optical device 722. The optical retarder 774 is arranged on the second side of the optical device 722 and between the optical device 722 and the display 728.

In some implementations, e.g., as illustrated in FIG. 7J, the linear polarizer 772 is configured to pass light with a first linear polarization state (e.g., P polarization state). Along a light path of the target light 771, the target light 771 is deflected by the optical device 722 with a second linear polarization state (e.g., S polarization state) to be incident on a first side of the optical retarder 774. The second linear polarization state is opposite to the first linear polarization state. The optical retarder 774 converts the second linear polarization state of the target light 771 into a circular polarization state. The target light 771 is incident on the display 728 with the circular polarization state, and is deflected back from the display 728 with the circular polarization state to a second side of the optical retarder 774 that is opposite to the first side of the optical retarder 774. The optical retarder 774 converts the circular polarization state of the target light 771 into the first linear polarization state (e.g., P polarization state), and thus the optical power of the target light 771 is halved by the optical retarder 774. The target light 771 is incident on the second side of the linear polarizer 772 with the first linear polarization state (e.g., P polarization state) and transmitted through the linear polarizer 772.

In contrast, e.g., as illustrated in FIG. 7J, along a light path of the ambient light 773, the linear polarizer 772 converts the ambient light 773 from a random polarization state to the first linear polarization state (e.g., P polarization state). The ambient light 773 is incident on a first side of the optical retarder 774 with the first linear polarization state (e.g., P polarization state), and the optical retarder 774 converts the first linear polarization state of the ambient light 771 into a circular polarization state. The ambient light 771 is deflected back from the display 728 with the circular polarization state to the optical retarder 774. The optical retarder 774 converts the circular polarization state of the ambient light 773 to a second linear polarization state (e.g., S polarization state) that is opposite to the first linear polarization state (e.g., P polarization state). The ambient light 773 is incident on the second side of the linear polarizer 772 with the second linear polarization state and is blocked by the linear polarizer 772.

In the system 780, the first linear polarization state can be one of S polarization state and P polarization state, and the second linear polarization state can be the other one of S polarization state and P polarization state. In some cases, e.g., as illustrated in FIG. 7J, the first linear polarization state is P polarization state, and the second linear polarization state is S polarization state.

In some implementations, in the system 780, the target light 771 diffracted back by the display 728 is P polarized when the target light 771 re-encounters a diffractive structure in the optical device 722 (e.g., the out-coupling diffractive structure 726). As described above in FIG. 7H, the target light 771 with P polarization state can be less influenced by the diffractive structure as the target light 771 exits to the reviewer. In comparison, in the system 770, the target light 771 is still S polarized when the target light 771 re-encounters the diffractive structure, and hence can be coupled back into the optical guiding device 723 with the same diffraction efficiency as what the diffractive structure has for coupling the target light 771 out of the optical guiding device 723 towards the display 728, which may cause dark-band, spot, or cross issues if the diffraction efficiency is more than about 20%.

In the system 780, the initial diffraction towards the display 728 is S polarized illumination light, and the target light 771 becomes circular polarized after the optical retarder 774 and then P polarization upon diffraction from the display 728. As noted above, the diffractive structure can be substantially less efficient for the target light 771 with P polarization state than for with S polarization state. The diffractive structure can be configured such that the S diffraction efficiency of the diffractive structure is increased from, e.g., about 20%, to the maximum achievable (e.g., greater than 60%, 70%, 80%, 90%, or 95% depending on wavelength and exposure parameters), or at least until the diffraction efficiency of the diffractive structure for P polarization state can reach the same value (e.g., approximately 20%). In some implementations, compared to the system 770, the system 780 enables to achieve an increase in image brightness, e.g., allowing much weaker and hence cheaper illumination sources.

In some implementations, in the system 770 or the system 780, the linear polarizer 772 and the optical retarder 774 are formed adjacent to, on, or within the optical device 722. In some implementations, the linear polarizer 772 and the optical retarder 774 are formed on a same side of the optical device 722. In some implementations, the linear polarizer 772 and the optical retarder 774 are formed on opposite sides of the optical device 722. The system 770 or 780 can further include an anti-reflection (AR) coating formed on the first side of the linear polarizer 772 or on both sides of the linear polarizer 772. The system 770 or 780 can further include an anti-reflection (AR) coating formed on the first side of the optical retarder 774 or on both sides of the optical retarder 774. The system 770 or 780 can further include an anti-reflection (AR) coating formed on the first side of the optical device 722 or on both sides of the optical device 722. The system 770 or 780 can further include an anti-reflection (AR) coating formed on the first side of the display 728.

The techniques of ambient light blocking implemented in the present disclosure can be applied to other target devices, beside a display. For example, the target device can be also a light sensor, a camera, or any suitable device.

Ambient light blocking can be implemented in other ways. For example. In some implementations, a system includes an absorptive filter that can be arranged on or in a waveguide. The absorptive filter can have three narrow pass-bands, one for each of narrow-band illumination colors (e.g., red, blue, green). This enables to let the diffracted light out, but block ambient light from entering except at our three narrow-band colors. Ambient light in these three bands represents only a small percentage of the total ambient light.

In some implementations, a system includes a linear polarizer (LP) and a neutral density (ND) filter that can be arranged on or in a waveguide. Since target light is linearly polarized, so the LP has negligible absorption for the target light. The target light passes once through the ND, and so is attenuated by the absorptivity of the ND. Ambient light is generally substantially depolarized, so the LP halves its intensity. And the ambient light passes through the ND twice, one inbound, once outbound from the display, and hence is attenuated by the square of the ND's absorptivity. For example, an ND 1.0 passes 10%, so the target light is reduced to 10% of its original brightness (which might be acceptable), but the ambient light is reduced to 10%^2=1% and is halved by the LP. So the contrast gain is about 20 times. An ND 0.3 passes 50%, and the contrast improvement is a factor of 4. Film LPs and NDs can be very cheap, so this is a reasonable way to gain an improvement (e.g., 4×) in ambient contrast at a cost of needing twice as much source power.

5. Display Implementations

As noted above, a display in MAXWELL HOLOGRAPHY® (e.g., the display 150 of FIG. 1A) can be a phase modulating device. A phase element of the display (or a display element or a pixel) can be represented as a phasel. For illustration only, a liquid crystal on silicon (LCOS) device is discussed below to function as the phase modulating device. The LCOS device is a display using a liquid crystal (LC) layer on top of a silicon backplane. The LCOS device can be optimized to achieve minimum possible phasel pitch, minimum cross-talk between phasels, and/or a large available phase modulation or retardance (e.g., at least $2\pi$).

A list of parameters can be controlled to optimize the performance of the LCOS device, including a birefringence of LC mixture ($\Delta n$), a cell gap (d), a dielectric anisotropy of the LC mixture ($\Delta \varepsilon$), a rotational viscosity of the LC mixture ($\eta$), and the maximum applied voltage between the silicon backplane and a common electrode on top of the LC layer (V).

There can be a fundamental trade-off that exists between parameters of the liquid crystal material and structure. For example, a fundamental bounding parameter is the available phase modulation or retardance (Re), which can be expressed as:

$$Re = 4\pi \cdot \Delta n \cdot d / \lambda,$$

where $\lambda$ is the wavelength of an input light. If the retardance Re needs to be at least $2\pi$ for a red light with a wavelength of about 0.633 μm, then $$\Delta n \cdot d \geq 0.317 \text{ μm}.$$

The above expression implies that there is a direct trade-off between cell gap (d) and birefringence ($\Delta n$) of the LC mixture for any given wavelength ($\lambda$).

Another bounding parameter is the switching speed, or the switching time (T) it takes for the liquid crystal (LC) molecules in an LC layer to reach the desired orientation after a voltage is applied. For example, for real-time video (~60 Hz) using a 3-color field sequential color system, a minimum of 180 Hz modulation of the LC layer is involved, which puts an upper bound on the LC switching speed of 5.6 milliseconds (ms). Switching time (T) is related to a number of parameters including the liquid crystal mixture, the cell gap, the operating temperature, and the applied voltage. First, T is proportional to $d^2$. As the cell gap d is decreased, the switching time decreases as the square. Second, the switching time is also related to the dielectric anisotropy ($\Delta \varepsilon$) of the liquid crystal (LC) mixture, with a higher dielectric anisotropy resulting in a shorter switching time and a lower viscosity (which may be temperature dependent) also resulting in a shorter switching time.

A third bounding parameter can be the fringing field. Due to the high electron mobility of crystalline silicon, an LCOS device can be fabricated with a very small phasel size (e.g., less than 10 μm) and with submicron inter-phasel gaps. When the adjacent phasels are operated at different voltages, the LC directors near the phasel edges are distorted by the lateral component of the fringing field, which significantly degrades the electro-optic performance of the device. In addition, as the phasel gap becomes comparable to the incident light wavelength, diffraction effects can cause severe light loss. The phasel gap may need to be kept at less than or equal to a phasel pitch to keep phase noise within an acceptable level.

In some examples, the LCOS device is designed to have a phasel pitch of 2 μm and a cell gap of approximately 2 μm if the fringe field bounding condition is observed. According to the above expression $\Delta n \cdot d \geq 0.317$ μm, hence $\Delta n$ needs to be equal to 0.1585 or greater, which is achievable using current liquid crystal technology. Once the minimum birefringence for a given phasel pitch is determined, the LC can be optimized for switching speed, e.g., by increasing the dielectric anisotropy and/or decreasing the rotational viscosity.

FIG. 8A illustrate an example display 800 with display elements or phasels. The display 800 can be an LCOS device and can include an array of phasels 802. For example, an LCOS device can have 1024×768 (or 4096×2160) phasels. The phasels 802 can have uniform shapes. For illustration purposes only, the phasel 802 in FIG. 8A has a square shape. However, the phasels 802 can also have a different shape (e.g., a rectangular shape or a hexagon shape). The phasels 802 can also have respective shapes or sizes that are different from one another, e.g., as discussed with further details in FIGS. 9A to 11F.

As illustrated in FIG. 8A, the display 800 can have a width w along a horizontal direction and a height h along a vertical direction in a display area. The width w is identical to the height h if the display 800 has a square shape or area. A phasel period along the horizontal direction, e.g., a distance between center points of adjacent phasels 802 along the horizontal direction, is presented as Λx. A phasel period along the vertical direction, e.g., center points of adjacent phasels 802 along the vertical direction, is represented as Λy. Λx can be identical to Λy or different from Λy.

Figure 8B:
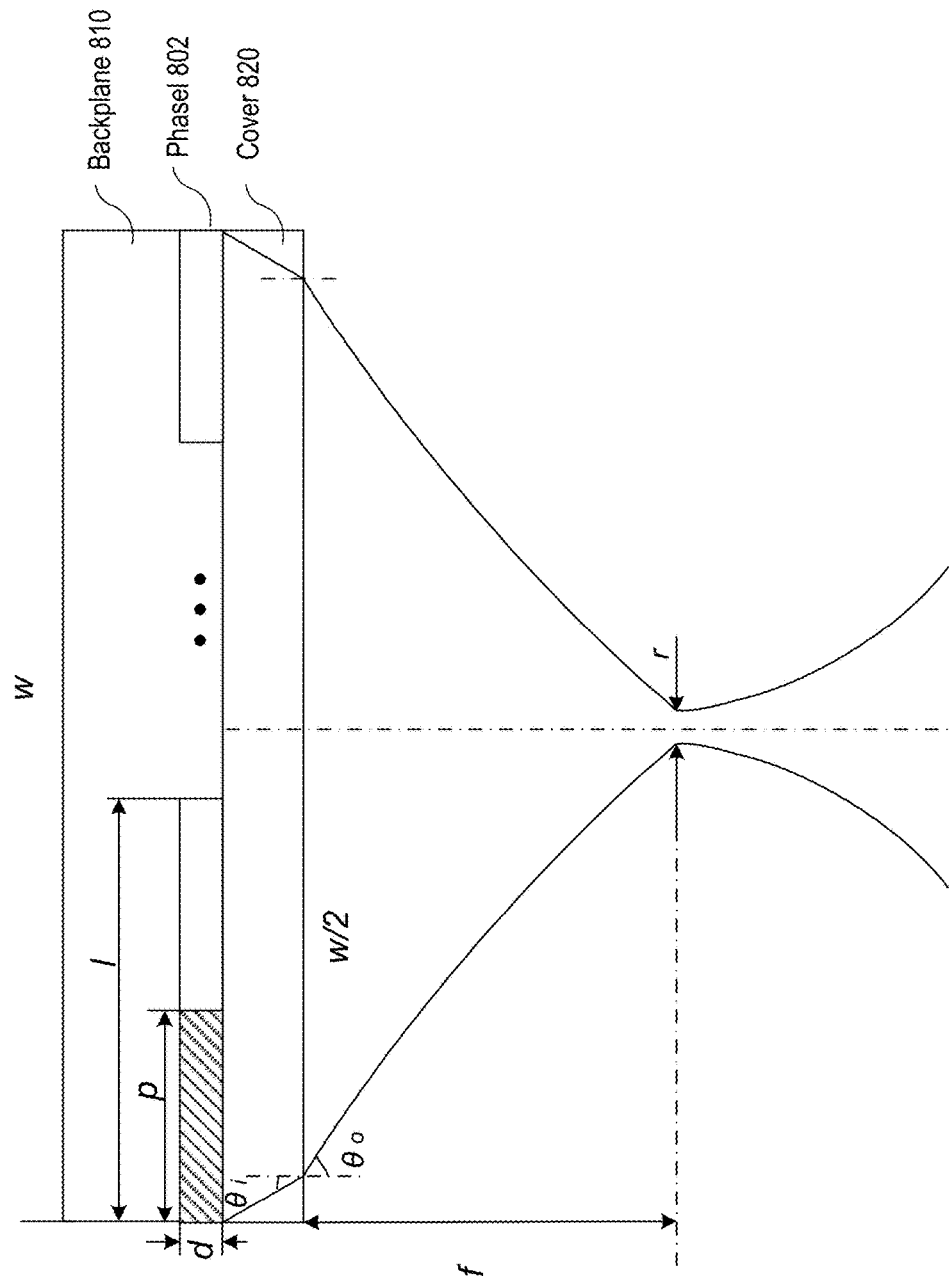
FIG. 8B illustrates an example of calculating a diffraction limit of phasels of a display.

As illustrated in FIG. 8B, the phasel layer of the display 800 has a cell gap d, a phasel active width p, and a phasel length l. The phasel length l can be identical to twice of the phase active width p, e.g., l=2p. The phasels 802 can be designed to have a specified spatial frequency and size that satisfies a desired spatial resolution.

In the display 800, a backplane 810 can be a circuit chip, e.g., a complementary metal-oxide-semiconductor (CMOS) chip or equivalent, controls the voltage on reflective metal electrodes buried below the chip surface, each controlling one phasel. A common electrode for all the phasels 802 is supplied by a transparent conductive layer made of indium tin oxide (ITO) on a cover 820 that can be made of glass material. In the array of phasels 802 in the display 800, to select a specific phasel, e.g., as illustrated in FIG. 8A, a first voltage is applied to a word line 701 connecting a row of phasels 802 including the specific phasel and a second voltage is applied to a bit line 803 connecting a column of phasels 802 including the specific phasel.

In Maxwell holographic calculations, each phasel receives a control signal (e.g., a voltage signal) corresponding to a sum of EM contributions from each primitive and is relatively independent from each other. As noted above, when light is incident on phasels modulated with control signals, the light is diffracted by the phasels to form a volumetric light field corresponding to primitives that correspond to one or more objects. A diffraction limit of a display (or phasels of the display) can indicate a capability of the display for resolving objects, e.g., primitives representing an object, in a three-dimensional (3D) space.

FIG. 8B illustrates an example of calculating a diffraction limit of phasels according to the Raileigh Criterion (RC). The Rayleigh Criterion is a criterion for calculating a minimum resolvable size or a diffraction-limited resolution. The resolution also refers to be a minimum spatial resolution available from a diffractive power of the display.

Assuming that a resolution of the phasels is r, the resolution can include a horizontal resolution $r_h$ along the horizontal direction and a vertical resolution $r_v$ along the vertical direction. According to the Raileigh criterion, the horizontal resolution $r_h$ and the vertical resolution $r_v$ can be expresses as below:

$$r_h = 1.22 \frac{\lambda f_h}{w}, f_h = \frac{w/2}{\tan\theta_o};$$

$$r_v = 1.22 \frac{\lambda f_v}{h}, f_v = \frac{h/2}{\tan\theta_o};$$

$$r_h = r_v = \frac{0.61\lambda}{\tan\theta_o}$$

where $f_h$ represents a minimum focal length along the horizontal direction, $f_v$ represents a minimum focal length along the vertical direction, λ represents a wavelength of light in air, $\theta_o$ represents an angle out of the display 800 (e.g., out of the cover 820). Thus, the resolution of the phasels r is same along the horizontal direction and the vertical direction.

The angle $\theta_o$ can be determined by an angle $\theta_i$ out of the phasel 802 based on Snell's law, and the angle $\theta_i$ can be determined based on diffraction grating equation. For example, the angles $\theta_i$ and $\theta_o$ can be expressed as:

$$\theta_i = a\sin(\lambda_i/\Lambda),$$

$$\theta_o = a\sin(n_c \sin\theta_i/n_o),$$

where Λ represents a phasel period, which is Λx along the horizontal direction or Λy along the vertical direction, $\lambda_i$ represents a wavelength of light in the cover 820, $n_c$ represents a refractive index of the cover 820, and $n_o$ represents a refractive index of air. In some examples, $n_o$=1, $n_c$=1.5 when the cover 820 is made of glass.

In one example, three different colors of light (green, blue, and red) have different wavelengths (e.g., 450 nm, 520 nm, and 633 nm). The angles $\theta_i$ out of the phasel 802 for the green light, the blue light, and the red light are 3.4490 degrees, 3.9863 degrees, 4.8545 degrees, respectively. Accordingly, the angles $\theta_o$ out of the display 800 for the green light, the blue light, and the red light are 5.1775 degrees, 5.9856 degrees, 7.2927 degrees, respectively. The resolution of the phasels r for the green light, the blue light, and the red light are 3.029 μm, 3.025 μm, 3.017 μm, respectively. That is, the resolution r of the phasels for three different colors of light can be substantially same, e.g., 3 μm.

6. Primitive Tessellations

When light illuminates a display modulated with EM contributions from a list of primitives of a 3D object, the modulated display causes the light to propagate in different directions to form a volumetric light field corresponding to the primitives. The volume light field can be referred to be a holographic reconstruction. Issues may need to be considered during the reconstruction, including resolvable issue, stitching issue, and/or seamless issue. For example, a stitching issue may raise, where the light intensity of a shared side between two adjacent primitives can be doubled due to the reconstructions of the two adjacent primitives separately. Seamless issue may raise if there is a perceptible light gap that are visible between adjacent primitives in an appearance of the reconstructed 3D object. This may affect the appearance of the reconstructed 3D object.

Conventional CG primitives are guaranteed to tile with no gaps as they are drawn to adjacent pixels on the display. In MAXWELL HOLOGRAPHY®, holographic CG primitives can be fully 3D, continuous primitives (e.g., triangle primitives) that can appear anywhere in space, and therefore do not guarantee perfect tilling (or tessellations) on a surface.

In some implementations, holographic CG-model tessellation is based on a diffraction limit of a display (e.g., an LCOS panel) with a specific spatial frequency and size (e.g., width and height). The primitives can be calculated so that there is a specific spacing between every two adjacent primitives (e.g., triangles) to ensure that reconstructed holographic scene appears to be continuous, e.g., just as on 2D displays and requiring no modifications from conventional display paradigms. In the following, a triangle primitive is described as an example of a primitive.

Figure 8C:
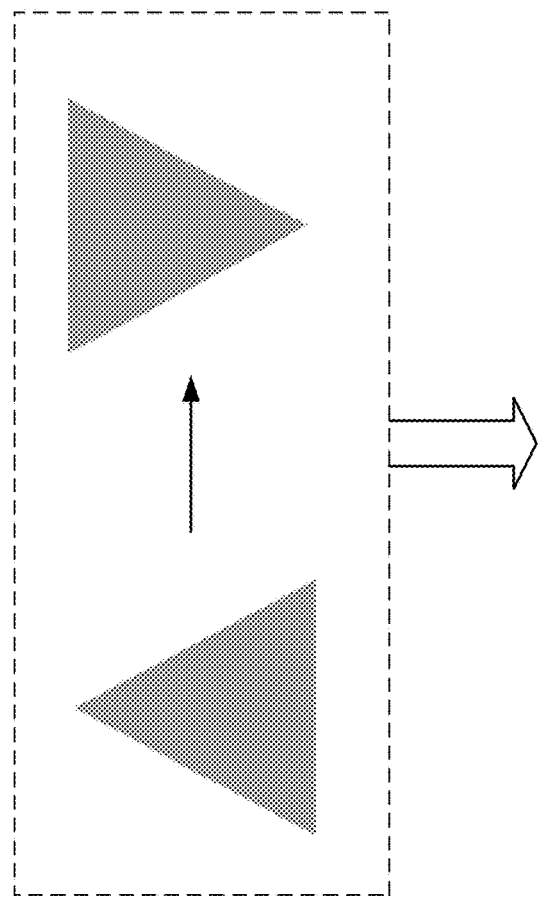
FIG. 8C illustrates different implementations of tessellation of primitives, including perfect kiss (a), air kiss (b), and French kiss (c).
Figure 8C:
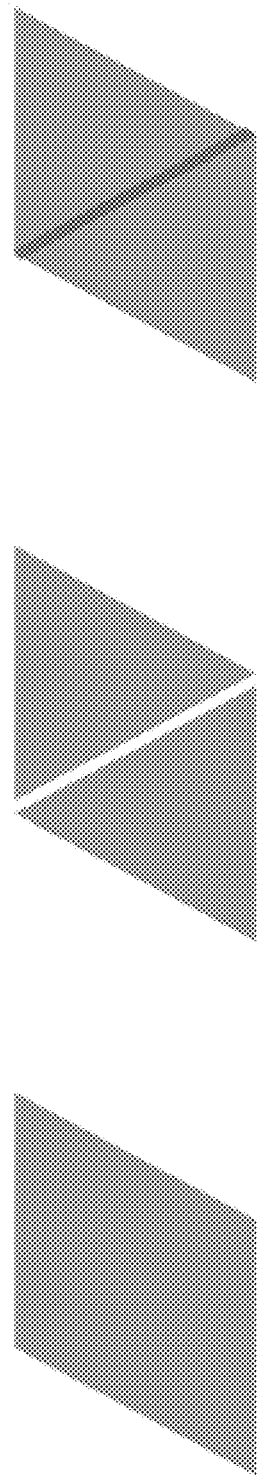

FIG. 8C illustrates different implementations of tessellation of triangle primitives, including perfect kiss (a), air kiss (b), and French kiss (c), when two triangle primitives are tiling together. As shown in FIG. 8C, perfect kiss indicates that the two primitives touch with no overlap and no gap between them, air kiss indicates that there is a gap between the two primitives, and French kiss indicates that the two primitives overlap with each other.

To achieve a perfect kiss in the appearance of holographic reconstruction, gaps between adjacent primitives (e.g., triangular apertures) can be configured to be small enough to make the reconstructed adjacent primitives appear seamless and great enough to make no overlap between the reconstructed adjacent primitives. As an example, the gaps can meet at exactly the minimum spatial resolution available from a diffractive power of the display, e.g., 3 μm. The gaps can be no smaller than the minimum spatial resolution but no greater than a threshold where seamless issue may raise. In some examples, the threshold can be 1 to 10 times of the spatial resolution of the display, e.g., 3 to 5 times.

6.1 Primitive Kissing

To address the stitching issue in the appearance of a reconstructed 3D object, primitive data of adjacent primitives corresponding to the object can be adjusted to generate a gap (or an offset) between the adjacent primitives before the primitive data is used to compute EM contributions from the adjacent primitives to display elements of a display for reconstructing the object. The adjacent primitives can be in contact and have at least one shared edge (or two vertices).

As noted above, to guarantee perfect kissing, the gap can be configured to be small enough to make the reconstructed adjacent primitives appear seamless and great enough to make no overlap between the reconstructed adjacent primitives. The adjustment can be determined based on information of the display and/or of a viewer. In some implementations, the gap can be identical to or greater than a predetermined diffraction limit of the display in accordance with Rayleigh Criterion. A ratio between the gap and the predetermined diffraction limit can be in a range, e.g., 1 to 10 or 3 to 5. In the case of a part of a primitive appearing entirely or partially behind the display, the adjustment can be determined based on a minimum distance from the viewer to that part of the primitive.

Figure 9B:
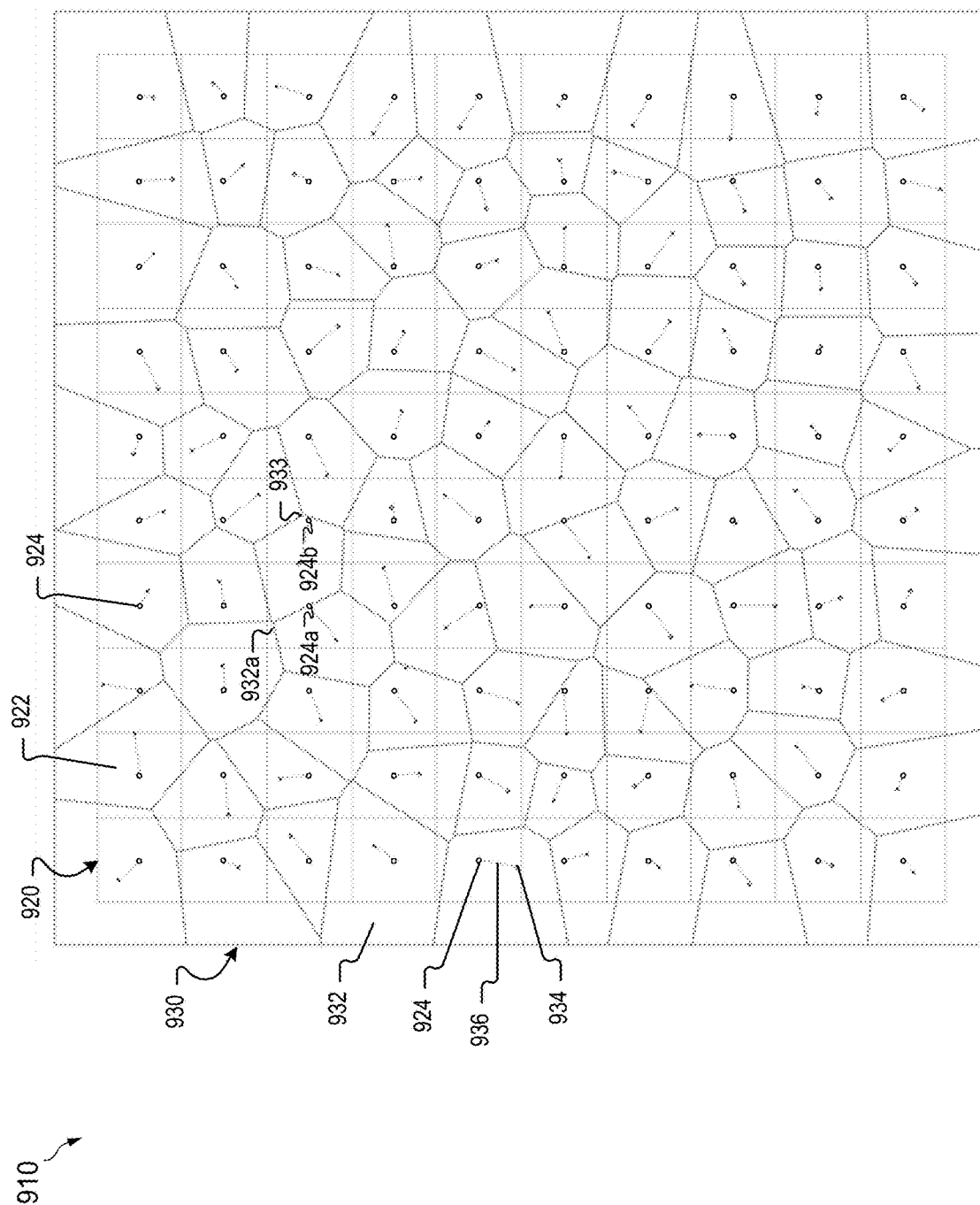
FIG. 9B illustrates an example of designing an irregular display.
Figure 9C:
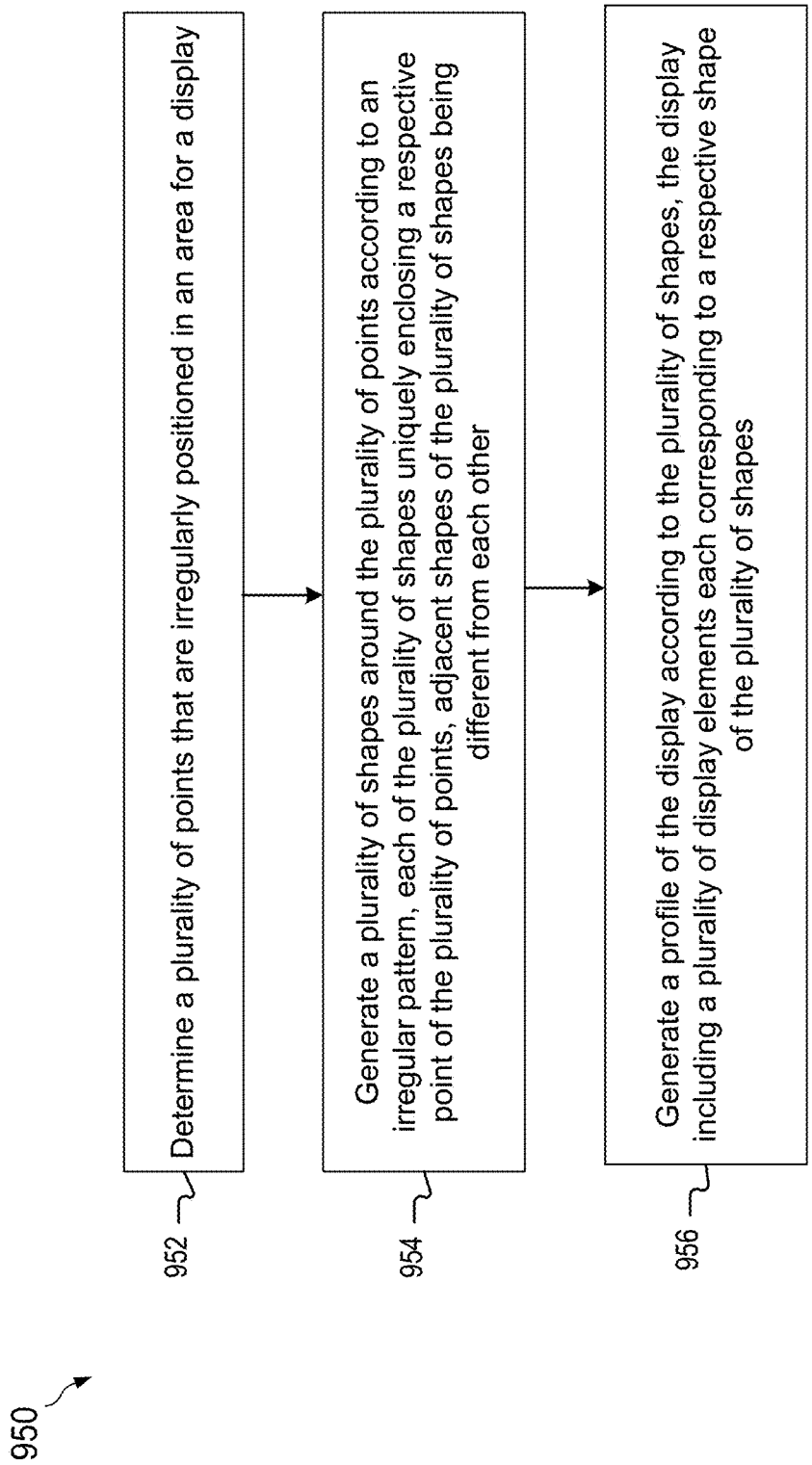
FIG. 9C is a flowchart of an example process of designing an irregular display.
Figures 1, 9D:
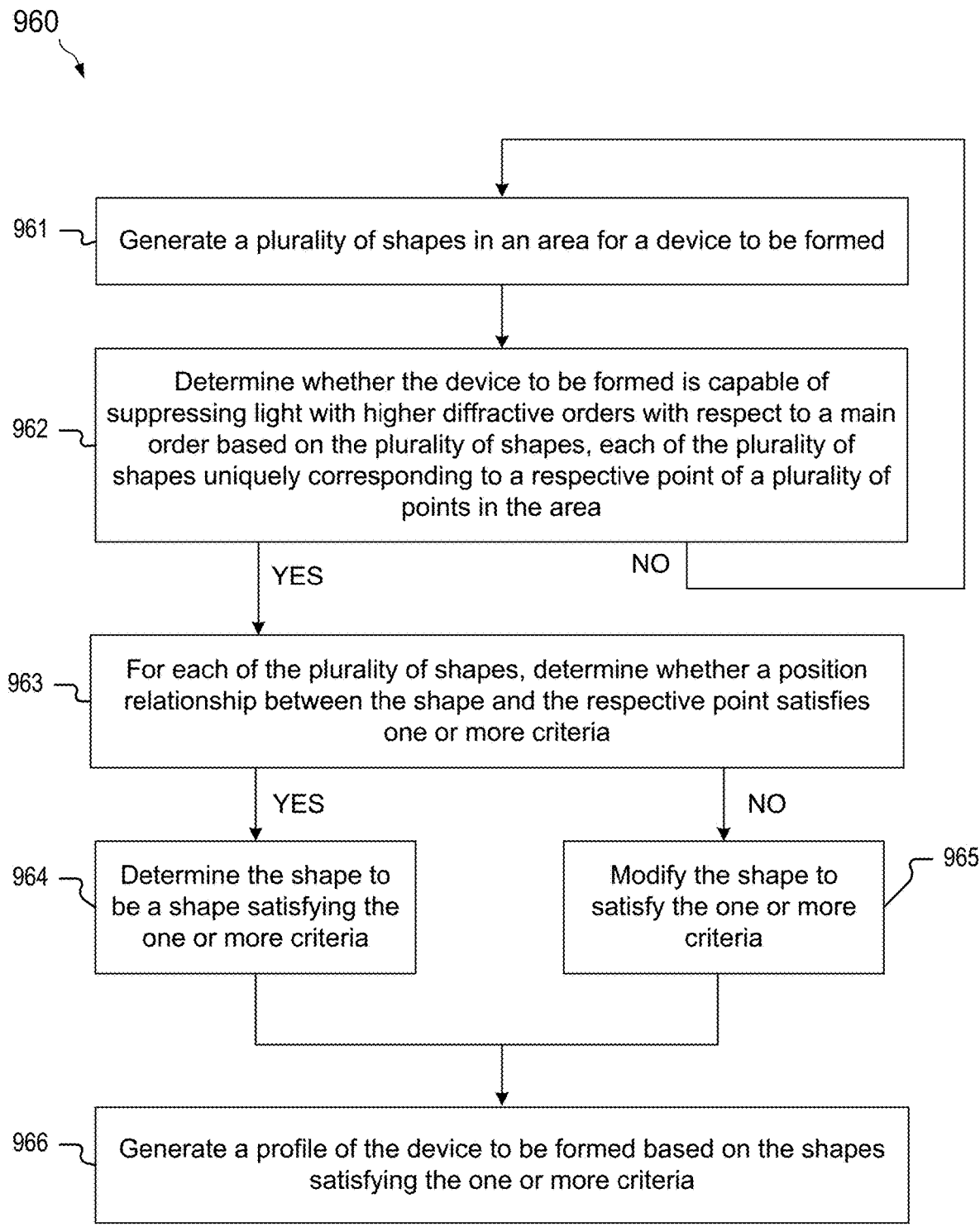
Figures 2, 9D:
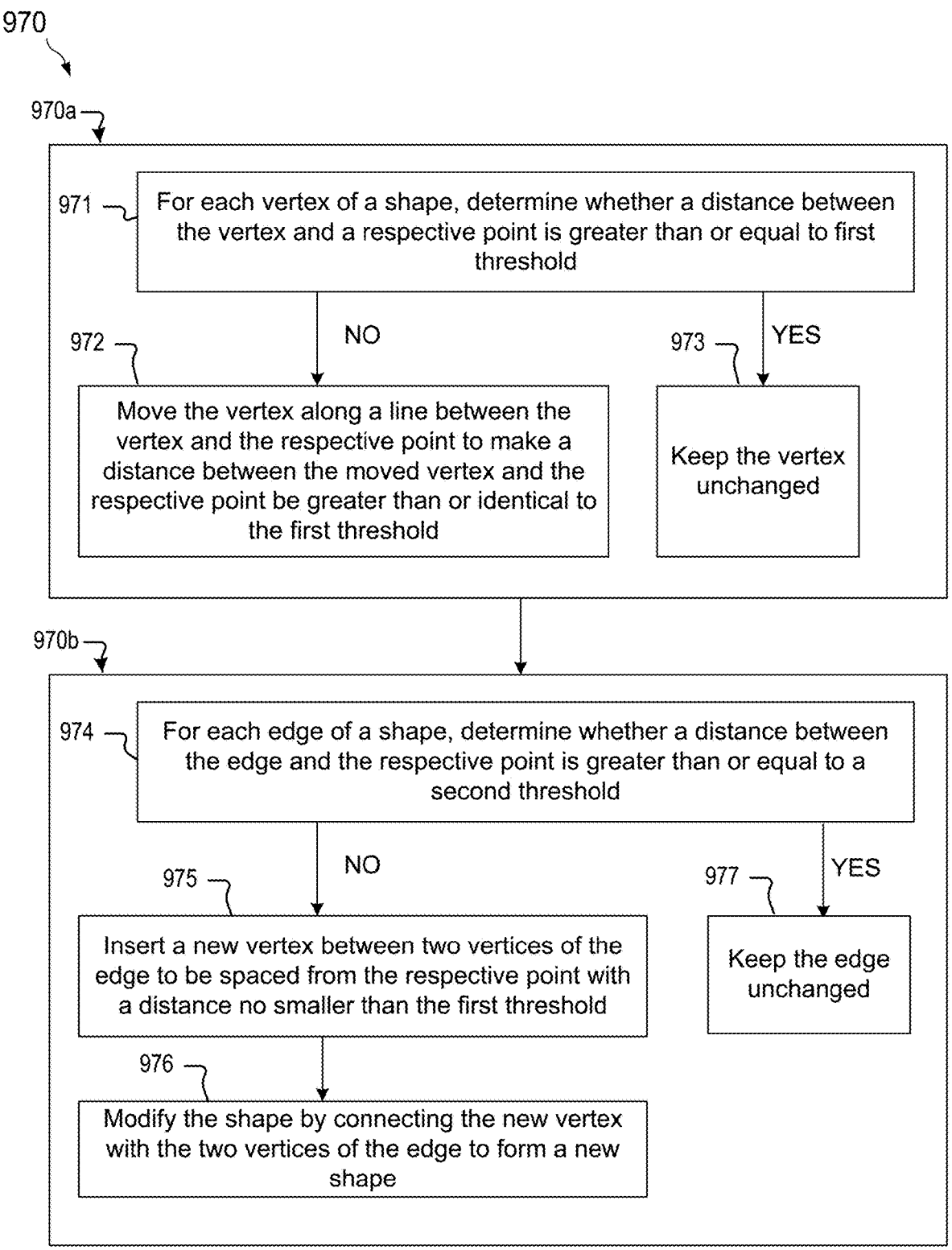

FIG. 8D-1 illustrates an example implementation of managing tessellation of adjacent primitives for primitive kissing. Both of the two adjacent primitives can be scaled down, e.g., by a predetermined factor, so that a gap g is formed between the adjacent primitives (or two opposite edges of the adjacent primitives).

As illustrated in FIG. 8D-1, for each primitive of the adjacent primitives, the primitive is shrunk by an offset (e.g., a half of the gap) towards a center of the primitive, $O_1$, $O_2$. Coordinate data of the centers of the primitives ($O_1$, $O_2$) in a 3D coordinate system remains unchanged. In some implementations, a perpendicular distance between an edge of the primitive and the center of the primitive is decreased by the offset (e.g., the half of the gap). In some implementations, coordinate data of vertices defining the primitive are adapted with respect to the center of the primitive to create the gap. All the primitives of the object can be shrunk in the same way (e.g., offsetting by half of the gap), such that an overall object model may not change at all.

FIG. 8D-2 illustrates another example implementation of managing tessellation of adjacent primitives for primitive kissing. Instead of scaling down the two adjacent primitives, only one primitive or a part of the primitive is scaled down. This implementation can be applied to cases where a primitive has only one primitive neighbor, e.g., at an edge of the object, and only one side touching the primitive neighbor may be shrunk or adjusted.

For example, as illustrated in FIG. 8D-2, two adjacent lines of a triangle primitive can be scaled down to separate from another triangle primitive. Coordinate data of the center of the triangle primitive $O_1$ may be changed, e.g., to a new center $O_1'$, while the center ($O_2$) of another triangle primitive can remain unchanged. In some cases, the scaling can include scaling different parts of a primitive with different predetermined factors.

A user (e.g., a 3D graphics designer) can model the object according to a same way, and the MAXWELL HOLOGRAPHY® technique implemented herein can generate the gap without changing a size or location of the object model. The adjustment can be performed by an API (e.g., the API 114 of FIG. 1A) and/or by a processing device (e.g., the processing device 120 of FIG. 1A). In some cases, the user can be provided with an option for adjusting a gap between adjacent primitives. The user can choose to add a gap between adjacent primitives for perfect kiss or even creating an air gap for artistic purposes. The user can choose not to add the gap or even create a French kiss for overlapping adjacent primitives, e.g., for artistic purposes.

6.2 Primitive Overlapping

FIG. 8E-1 illustrates an example implementation of managing tessellation of adjacent primitives for overlapping effect. Compared to FIG. 8D-1 where both of the adjacent primitives are scaled down to create the gap between the adjacent primitives, both of the adjacent primitives can be scaled up with a same predetermined factor to create an overlap. Similar to FIG. 8D-1, coordinate data of the centers of the primitives ($O_1$, $O_2$) in a 3D coordinate system remains unchanged. In some implementations, a perpendicular distance between an edge of the primitive and the center of the primitive is increased by an offset (e.g., a half of the overlap). In some implementations, coordinate data of vertices defining the primitive are adapted with respect to the center of the primitive to create the gap. All the primitives of the object can be scaled up in the same way (e.g., increasing by the half of the overlap), such that an overall object model may not change at all.

FIG. 8E-2 illustrates another example implementation of managing tessellation of adjacent primitives for overlapping effect. Instead of scaling up both of the adjacent primitives, a first primitive is moved relative to a second primitive adjacent to the first primitive to generate an overlap, e.g., moving the center of the first primitive $O_1$ towards the center of the second primitive $O_2$. Thus, a distance between the center $O_2$ of the second primitive and a new center $O_1'$ of the first primitive becomes smaller than a distance between the center $O_2$ of the second primitive and the original center $O_1$ of the first primitive.

6.3 Example Processes

FIG. 8F is a flowchart of an example process 850 of managing tessellation of primitives for 3D displaying. The process 850 can be performed an API in a computing device, e.g., the API 114 of FIG. 1A, and/or a processing device, e.g., the processing device 120 of FIG. 1A, and/or any other suitable device like a driving device 130 of FIG. 1A.

At step 852, primitive data of a plurality of primitives corresponding to an object is obtained. The primitive data can be adjusted to: i) create a gap between adjacent primitives at step 854, e.g., as illustrated in FIG. 8D-1 or 8D-2, or ii) create an overlap between adjacent primitives at step 856, e.g., as illustrated in FIG. 8E-1 or 8E-2.

In some implementations, step 854 of the process 850 is performed by the API. A 3D simulation application running on the computing device, e.g., the application 112 of FIG. 1A can generate scene data of the object. The API can generate the primitive data of the plurality of primitives based on the scene data of the object. Before the adjusting, the adjacent primitives are in contact and have at least one shared edge.

In some implementations, step 854 of the process 850 is performed by the processing device. The processing device can be configured to: obtain primitive data of the plurality of primitives corresponding to the object (e.g., from the API through an interface), and adjust the primitive data of the plurality of primitives to generate a gap between adjacent primitives of the plurality of primitives. The gap is configured to make reconstructed adjacent primitives be resolvable from each other.

In some examples, for at least one pair of adjacent primitives, the gap is no smaller than a predetermined value, for example, a minimum spatial resolution available from a diffractive power of the display, e.g., 3 μm. In some examples, at least one of the plurality of primitives includes a triangle primitive or a polygon primitive. Primitive data of a primitive can include at least one of: texture information of the primitive, viewpoint dependent shading information for the primitive, color information of the primitive, or coordinate information of the primitive in a 3D coordinate system.

In some implementations, e.g., as illustrated in FIG. 8D-1, adjusting the primitive data of the plurality of primitives corresponding to the object to generate the gap between the adjacent primitives of the plurality of primitives includes: for each primitive of the adjacent primitives, shrinking the primitive by a half of the gap towards a center of the primitive. Coordinate information of the center of the primitive in a three-dimensional (3D) coordinate system can remain unchanged. A perpendicular distance between an edge of the primitive and the center of the primitive can be decreased by the half of the gap. Coordinate data of vertices defining the primitive can be adapted with respect to the center of the primitive to create the gap.

In some implementations, e.g., as illustrated in FIG. 8D-2, adjusting the primitive data of the plurality of primitives corresponding to the object to generate the gap between the adjacent primitives of the plurality of primitives includes: scaling a shared edge of a first primitive adjacent to a second primitive; and updating the respective primitive data for the first primitive based on a result of the scaling. Scaling the shared edge of the first primitive adjacent to the second primitive can include: moving two vertices of the shared edge of the first primitive towards at least one adjacent vertex of the first primitive. The first primitive can have only one neighboring primitive that is the second primitive, and one or more other edges of the first primitive remain unscaled.

In some implementations, the process 850 further includes: receiving an input (e.g., from a user of the computing device) to generate the gap among the plurality of primitives, and the API adjusts the primitive data of the plurality of primitives corresponding to the object to generate the gap between the adjacent primitives of the plurality of primitives is in response to receiving the input.

In some implementations, after the API performs step 854, the process 850 is further performed by the processing device. The processing device can be configured to: obtain the primitive data of the plurality of primitives corresponding to the object (e.g., from the API). The primitive data indicates a gap between adjacent primitives of the plurality of primitives, e.g., by the API adjusting the primitive data of the adjacent primitives.

The processing device can be configured to: for each of the plurality of primitives, determine an electromagnetic (EM) field contribution to each of a plurality of display elements (e.g., the phasels 802 of FIGS. 8A-8B) of a display (e.g., the display 150 of FIG. 1A, the display 800 of FIGS. 8A-8B) by computing, in a three-dimensional (3D) coordinate system, EM field propagation from the primitive to the display element using primitive data of the primitive and coordinate data of the display element; and for each of the plurality of display elements, generating a sum of the EM field contributions from each of the plurality of primitives to the display element.

The process 850 can be further performed by the driving device (e.g., the driving device 130 of FIG. 1A). The driving device can generate and transmit a respective control signal to each of the plurality of display elements of the display to modulate at least one property of the display element based on the sum of EM field contributions to the display element. The driving device can also generate and transmit an illumination control signal to an illuminator (e.g., the illuminator 140 of FIG. 1A) to illuminate light on modulated display elements of the display to form a volumetric light field in a three-dimensional (3D) space, the volumetric light field corresponding to a reconstruction of the object, where the reconstruction of the object includes reconstructed adjacent primitives corresponding to the adjacent primitives with the gap.

The gap can be configured to make the reconstructed adjacent primitives be resolvable from each other. The gap can be also configured to be small enough to make the reconstructed adjacent primitives appear seamless. In some implementations, the gap is configured such that there is no overlap between the reconstructed adjacent primitives. In some examples, the gap is configured to be identical to or greater than a predetermined diffraction limit of the display. In some examples, a ratio between the gap and the predetermined diffraction limit of the display is in a range from 1 to 10. In some implementations, the ratio is in a range from 3 to 5.

In some implementations, the predetermined diffraction limit of the display is in accordance with Rayleigh Criterion. In some implementations, the predetermined diffraction limit of the display is based on a size of a display element of the display and a wavelength of light to be incident on the display. The predetermined diffraction limit of the display can be expressed as:

$$res = 0.61\lambda/\tan\theta_o,$$

where res represents the predetermined diffraction limit of the display, $\lambda$ represents a wavelength of light in air, and $\theta o$ represents an output angle from a surface of the display.

In some implementations, the display includes a cover (e.g., the cover 820 of FIG. 8B) on top of the plurality of display elements of the display, and the output angle $\theta_o$ is expressed as:

$$\theta_o = a\sin\left(\frac{n_i}{n_o} * \sin\theta_i\right), \text{ and}$$

$$\theta_i = a\sin(\lambda_i/\Lambda),$$

where $\theta_i$ represents an incident angle on an interface between the cover and a surrounding medium, $n_i$ and $n_o$ represent a refractive index of a material of the cover and a refractive index of the surrounding medium, $\lambda_i$ represents a wavelength of light in the material of the cover, and $\Lambda$ represents a display element period of the display. The display element period of the display can be a period along a first direction of the display element of the display (e.g., $\Lambda x$), or a period along a second direction of the display element of the display that is perpendicular to the first direction (e.g., $\Lambda y$).

In some implementation, step 856 of the process 850 is performed by the API or the processing device. Adjusting the primitive data of the plurality of primitives to generate the overlap between the adjacent primitives can include: for each primitive of the adjacent primitives, scaling up the primitive away from a center of the primitive. In some implementations, coordinate data of the center of the primitive in a 3D coordinate system remain unchanged, and coordinate data of vertices defining the primitive are adapted with respect to the center of the primitive to create the overlap. In some implementations, adjusting the primitive data of the plurality of primitives to generate the overlap between the adjacent primitives includes: for each primitive of the adjacent primitives, moving a first primitive relative to a second primitive adjacent to the first primitive to generate the overlap.

The process 850 can further include: receiving an input to generate the overlap among the plurality of primitives, where adjusting the primitive data of the plurality of primitives to generate the overlap between the adjacent primitives of the plurality of primitives is in response to receiving the input.

7. Irregular Displays

In a display (e.g., an LCOS device), a circuit chip, e.g., a complementary metal-oxide-semiconductor (CMOS) chip or equivalent, controls the voltage on reflective metal electrodes buried below the chip surface, each controlling one phasel (or a phase modulated display element). A common electrode for all the phasels (e.g., the phasels 802 of FIGS. 8A-8B) is supplied by a transparent conductive layer made of indium tin oxide (ITO) on the cover glass. In some implementations, a chip can have 1024×768 plates, each with an independently addressable voltage. The phasels can have identical sizes and same shape (e.g., square such as the phasels 802 of FIGS. 8A-8B). As noted above, when the phasel gap becomes comparable to the incident light wavelength, diffraction effect can appear in the periodic structure of the display (e.g., the display 800 of FIGS. 8A-8B), which may cause severe light loss.

In Maxwell holographic calculations, each phasel receives a sum of EM contributions from each primitive and is relatively independent from each other. Thus, the phasels of the display device in MAXWELL HOLOGRAPHY® can be designed to be different from each other. For example, as illustrated in FIG. 9A, a display 900 includes a number of nonuniform (or irregular) phasels 902. The nonuniform shapes of the phasels 902 can greatly reduce or eliminate diffractive aberrations, among other effects and thus improve image quality.

The plurality of phasels 902 can form an irregular pattern. In some implementations, the irregular pattern includes a Voronoi pattern. In some implementations, the irregular pattern includes a HOLOCHROME® (or HOLO-CHROME™) pattern. At least two phasels 902 in the display 900 have different shapes. For example, adjacent phasels 902 can have different shapes. In some examples, at least one phasel 902 has an irregular polygon shape.

In some cases, a gap between adjacent phasels of the display 900 is smaller than a wavelength of an incident light, which may mitigate light loss between the adjacent phasels. In some examples, the wavelength of the incident light is about 450 nm (e.g., for blue color), about 530 nm (e.g., for green color of light), or about 630 nm (e.g., for red color of light), while the gap can be about 200 nm. In some cases, a size distribution of the plurality of phasels 902 of the display 900 can be around a value that is identical to a spatial frequency response of the display 900, e.g., 3 µm. A size of a phasel can be referred to a maximum width of the phasel.

In some implementations, each phasel 902 encloses a corresponding spaced point 904. As illustrated in FIG. 9A, the corresponding spaced point 904 can be in a random position within a shape of the phasel 902, e.g., at a center or at an edge of the phasel 902. As discussed with further details below, the phasels 902 can be designed and/or fabrication based on the spaced points 904. In some implementations, the based points 904 form an irregular pattern. The irregular pattern of the spaced points 904 can be same as or different from the irregular pattern of the phasels 902.

In some implementations, although shapes and/or areas of the phasels 902 form an irregular pattern, the spaced points 904 can form a regular shape, e.g., a square shape. A distance between centers of adjacent based points 904 can be identical among the spaced points 904. For example, the spaced points 904 can be center points of phasels of a regular display (e.g., the display 800 of FIG. 8A) or center points of conductive vias coupled to the phasels 902. In such a way, the display 900 can be fabricated using a same backplane for the regular display, e.g., as discussed with details below. In some implementations, the spaced points 904 are regularly spaced with a first spacing period in a first region and with a second spacing period in a second region of the display 900. The second spacing period can be different from the first spacing period. In some embodiments, the spaced points 904 correspond to locations of conductive vias (e.g., vias 1014 of FIG. 10A or 1054a, 1054b of FIG. 10B as described below) that are electrically connected to a phasel driving circuitry (e.g., phasel driving circuitry 1002 of FIG. 10A or 1052 of FIG. 10B as described below).

As described herein, an irregular display (e.g., the display 900 of FIG. 9A, the display 930 of FIG. 9B, the display 1000 of FIG. 10A or the display 1050 of FIG. 10B) can be used as a display (e.g., the display 150 of FIG. 1A, the holographic display device 172 of FIG. 1B, the reflective display 504 of FIG. 5A, the reflective display 514 of FIG. 5B, the transmissive display 524 of FIG. 5C, the transmissive display 534 of FIG. 5D, the display 606 of FIG. 6A, the display 616 of FIG. 6B, 6C, or 6D, the reflective display device 645 of FIGS. 6E, 6F, 6G, or the display 690 of FIG. 6H). The irregular display can be used in a system for 3D display (e.g., the system 100 of FIG. 1A, the system 500 of FIG. 5A, the system 510 of FIG. 5B, the system 520 of FIG. 5C, the system 530 of FIG. 5D, the system 600 of FIG. 6A, the system 610 of FIGS. 6B-6D, the system 630 of FIGS. 6E-6G, or the system 680 of FIG. 6H). The irregular display can be configured to reduce or eliminate diffraction effects, diffractive aberrations, aliasing, or among other effects, and thus improve the quality of reconstructed images, objects, or scenes.

In some implementations, an irregular display or irregular phasels as described herein can be also used for image or video capturing (or sensing). For example, a device with an array of irregular pixels (e.g., irregular phasels 902 of FIG.

9A) (e.g., a camera or an image sensor) can be configured to capture interference patterns, images, or videos. The array of irregular pixels can form a photodiode array. The device can also include one or more other components, e.g., driving circuitry, optical lens, or color filters.

The irregular pixels can form an irregular pattern, e.g., a Voronoi pattern. The device with irregular pixels can reduce or eliminate a number of potential issues. For example, aliasing is a phenomenon where a digital camera has trouble translating an intricate pattern, which can be caused when digital information is broken down into pixels and bits and can result in a number of odd visual artifacts in images (or photos) or videos. A camera with irregular pixels can be configured to remove such aliasing issues (e.g., moiré or glitch problems/effects) in captured images or videos. Additionally or alternatively, the irregular pattern of the irregular pixels of the camera can get rid of unwanted regular diffraction that may appear due to regular pixels.

7.1 Designing Irregular Displays

FIG. 9B illustrates an example 910 of designing an irregular display 930 based on a regular display 920. As illustrated, the regular display 920 can be similar to, or the same as, the display 800 of FIGS. 7A and 7B. The regular display 920 includes an array of phasels 922 each having a center point 924 (shown as "o" symbol in FIG. 9B). The regular display 920 can have a square shape, and each phasel 922 can also have a square shape. The center points 924 can also form a square grid, such as with a pitch of 3 to 4 µm (e.g., 3.74 or 3.80 µm).

In comparison, the irregular display 930 can be similar to, or same as, the irregular display 900 of FIG. 9A. The irregular display 930 includes a plurality of phasels 932 (e.g., the phasels 902 of FIG. 9A). Each phasel 932 has a respective point 934 (shown as solid dot "•" symbol in FIG. 9B) within the phasel 932. As discussed with further details with reference to FIG. 9C, a shape of the phasel 932 can be generated based on the respective point 934 according to an irregular pattern (e.g., a Voronoi or HOLOCHROME® pattern). The respective point 934 can be referred to as a seed point (or seed center) of the phasel 932. In some examples, the phasel 932 has a polygon shape, and the respective point 934 is a polygon centroid of the phasel 932. In some examples, the respective point 934 is different from a polygon centroid of the phasel 932.

A number of the phasels 922 of the regular display 920 is identical to a number of the phasels 932 of the irregular display 930. Each phasel 932 can also enclose a corresponding center point 924 of the regular display 920 that has an offset 936 from the respective point 934 of the phasel 932. The offsets 936 for the phasels 932 can be different from each other, e.g., as illustrated in FIG. 9B. The respective points 934 of the phasels 932 can be irregularly positioned within an area of the irregular display 930. The irregular display 930 can have a larger area than the regular display 920. An outline of the irregular display 930 can be a regular shape, e.g., a rectangular or square shape.

FIG. 9C is a flowchart of an example process 950 of designing an irregular display. The process 950 can be performed by a computing device including at least one processor. The irregular display can be the irregular display 930 of FIG. 9B. The process 950 is described using the irregular display 930 as an example of the irregular display. The irregular display 930 can be designed based on information of the regular display 920 or information of conductive vias coupled to the irregular display 930.

At step 952, a plurality of points that are irregularly positioned in an area for the irregular display is determined. For example, the plurality of points can be the respective points 934 of the irregular display 930. In some implementations, a plurality of spaced points (e.g., the spaced points 904 of FIG. 9A or the center points 924 of FIG. 9B) are determined in the area for the irregular display, and different offsets (e.g., the offsets 936 of FIG. 9B) are added to the plurality of spaced points to generate the plurality of points that are irregularly positioned in the area for the irregular display. The plurality of spaced points can define a regularly spaced pattern. The plurality of spaced points can be center points of phasels of a regular display (e.g., the regular display 920) or center points of conductive vias (e.g., vias 1014 of FIG. 10A, vias 1054a, 1054b of FIG. 10B, or vias 1106 of FIGS. 11A-11F) on a backplane for the display to be designed.

In some implementations, determining the plurality of points can include, for each center point of the center points 924, generating a random offset within a ring defined by an inner radius $R_i$ and an outer radius $R_o$ away from the center point. In other words, each point of the determined plurality of points lies within an annulus having the inner and outer radii $R_i$ and $R_o$ centered around a respective center point 924. In some implementations, the inner radius $R_i$ is zero. The outer radius $R_o$ can depend on the pitch between the vias, e.g., 70% of 3.4 µm.

In some implementations, imposing additional design criteria on the determined plurality of points can result in different types of distributions. For example, different offsets can yield a particular type of a distribution. In some implementations, first spaced points in a first region of the area have a first spacing period, and second spaced points in a second region of the area have a second spacing period that can be different from the first spacing period.

The distribution can be a noise distribution, e.g., a Poisson noise distribution, a Blue noise point distribution, or a similar noise distribution. In some examples, the plurality of points are determined using "Poisson Disk Sampling" to generate an approximation to a Blue noise point distribution, while keeping a single uniquely addressable connection to each phasel. In some implementations, once the points are randomly generated within the inner and outer radii, one or more additional constraints can be imposed. In some examples, an additional constraint is a threshold distance between adjacent (or neighboring) determined points. If one of the determined points does not satisfy this constraint, the point is regenerated and this constraint is imposed again. In some examples, at least one offset of the different offset is no smaller than a half of a distance of adjacent spaced points.

The term "blue noise" can refer to the offsets originally having "white noise," e.g., randomly generated Voronoi points within the inner and outer radius, with a blue bandpass filter applied, e.g., only allowing Voronoi points with a minimum distance therebetween. In some implementations, the minimum distance can depend on the pitch of the underlying vias, e.g., 45% of the pitch. Using respective points 914 corresponding to blue noise as opposed to white noise can result in devices that are easier to fabricate, e.g., the underlying vias can remain a regular grid as opposed to having a similar, more random pattern as the respective points 914.

At step 954, a plurality of shapes are generated based on the plurality of points according to an irregular pattern, each of the plurality of shapes uniquely enclosing a respective point of the plurality of points. The irregular pattern can include a Voronoi pattern. The plurality of shapes can be automatically generated based on the plurality of points according to the Voronoi pattern. The plurality of shapes can be, e.g., like the shapes of the phasels 932 illustrated in FIG. 9B. Accordingly, a centroid of each of the plurality of shapes can be generated based on a property of the shape. The centroid can be a geometric center of the shape (e.g., a polygon). For two-dimensional cases, a location of a centroid of a shape can be computed by calculating an average location of the shape in each of the two dimensions. The centroids of the plurality of shapes can also from an irregular pattern.

At step 956, a profile of the irregular display is generated according to the plurality of shapes. The irregular display includes a plurality of phasels (or display elements) each corresponding to a respective shape of the plurality of shapes. The phasels can be similar to, or same as, the phasels 902 of FIG. 9A or the phasels 932 of FIG. 9B. The profile can include information of the irregular display, e.g., the plurality of shapes, the plurality of spaced points, the different offsets for the plurality of spaced points, the plurality of points of the plurality of shapes, and/or the centroids of the plurality of shapes. In some implementations, an offset between each space point of the plurality of spaced points and a centroid of a respective shape of the plurality of shapes is determined. Different offsets between the plurality of spaced points and the centroids of the plurality of shapes can be determined and included in the profile of the irregular display.

In some implementations, the process 950 further includes: storing the different offsets in a repository and associating each of the different offsets with a corresponding spaced point of the plurality of spaced points in the repository. In some implementations, the profile of the irregular display is also stored in the repository. The corresponding spaced point can be used as an evaluation point for calculating a holographic phase function, and the offset representing a distance from the corresponding spaced point to a seed point or centroid (or center point) of the phasel (or an underlying phasel via) is stored as a table to be used during hologram calculation, e.g., by the processing device 120 of FIG. 1A.

As discussed with further details in FIGS. 10A-10B and 11A-11F, the irregular display can be fabricated based on the profile of the irregular display generated using the process 950.

The fabricated irregular display can be implemented as a display (e.g., the display 150 of FIG. 1A) in a system for 3D display (e.g., the system 100 of FIG. 1A). The irregular display includes a plurality of display elements that form an irregular pattern. The display elements can be similar to, or same as, the phasels 902 of FIG. 9A or the phasels 932 of FIG. 9B. Information of the different offsets (e.g., the offsets 936 of FIG. 9B), information of the plurality of spaced points (e.g., the center points 924 of FIG. 9B), information of the plurality of points (e.g., the respective point 934 of FIG. 9B) for the irregular display, and/or information of centroids of the plurality of shapes can be stored and used in the system for holographic reconstruction.

The system can include a processing device (e.g., the processing device 120 of FIG. 1A). The processing device can be configured to: for each of a plurality of primitives corresponding to at least one object, determine an electromagnetic (EM) field contribution to each of the plurality of display elements of the irregular display by computing, in a three-dimensional (3D) coordinate system, EM field propagation from the primitive to the display element; and for each of the plurality of display elements, generate a sum of EM field contributions from each of the plurality of primitives to the display element.

In some implementations, the information of the plurality of spaced points and the information of the different offsets (e.g., with respect to seed points or centroids of the plurality of shapes) are provided to the processing device by an API such as the API 114 of FIG. 1A. The API can be preconfigured for the irregular display. In some implementations, the information of the plurality of spaced points and the information of the different offsets are pre-stored in the processing device. The processing device can be preconfigured for the irregular display.

The processing device can be configured to: for each of the plurality of display elements, obtain a position of the respective spaced point and the respective offset associated with the respective spaced point and compute the EM field propagation from the primitive to the display element based on the position of the respective spaced point and the respective offset associated with the respective spaced point. The respective offset represents a distance between the respective spaced point and a seed point of the display element. A shape of the display element can be generated based on the seed point or centroid of the display element and an irregular pattern. The plurality of spaced points can be the center points (e.g., the center points 924 of FIG. 9B) of a plurality of display elements (e.g., the phasels 922 of FIG. 9B) of a regular display (e.g., the regular display 920 of FIG. 9B) or center points of underlying conductive vias on a backplane of the display.

The system can further include a driving device (e.g., the driving device 130 of FIG. 1A). The driving device can generate and transmit at least one control signal to at least one display element of the irregular display for modulating at least one property of the at least one display element. The at least one control signal corresponds to a corresponding sum of EM field contributions from each of the plurality of primitives to the at least one display element.

7.2 Designing Irregular Devices with Fabrication Tolerances

Figure 9E:
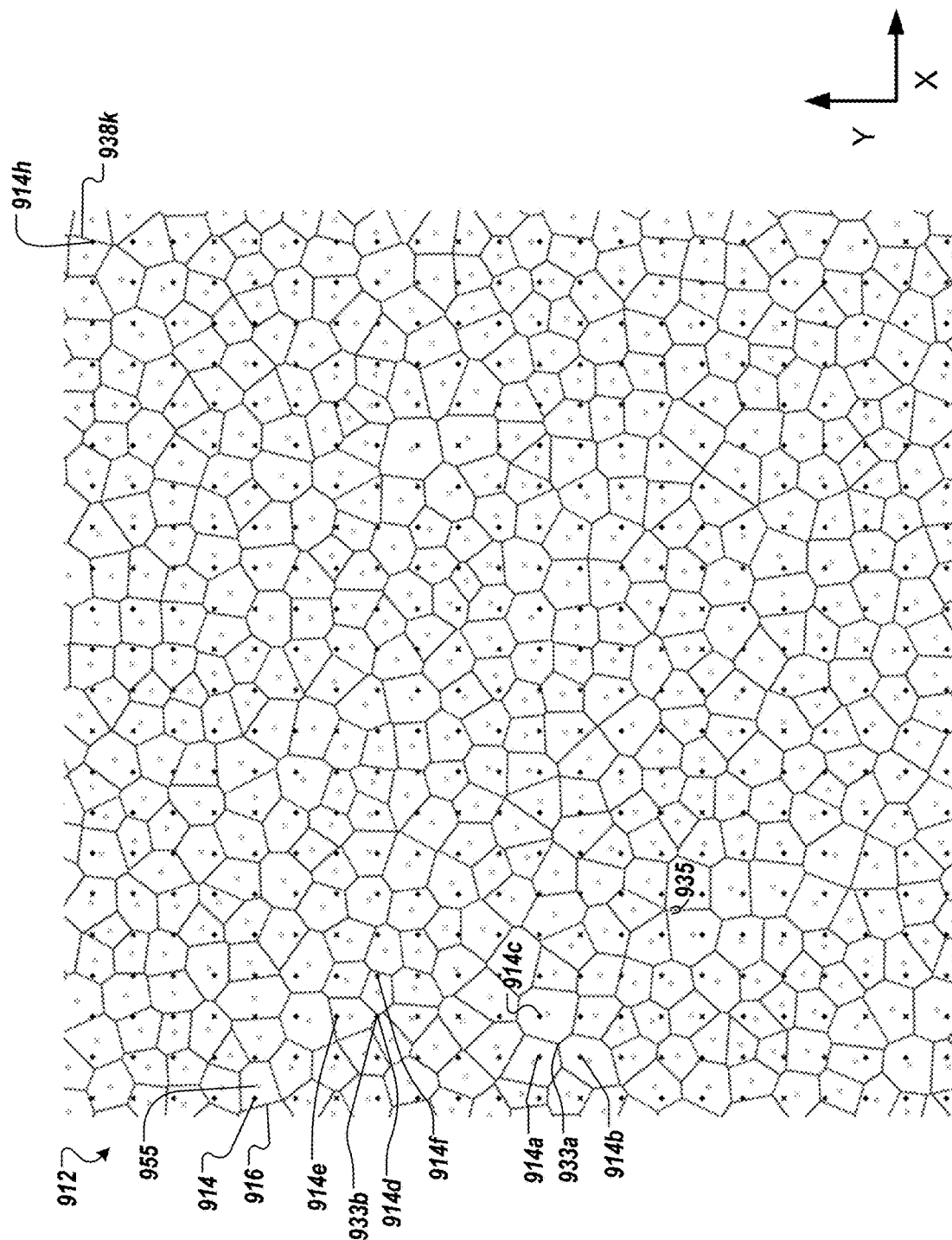
FIG. 9E illustrates an example of a designed plurality of shapes for an irregular display.
Figure 9G:
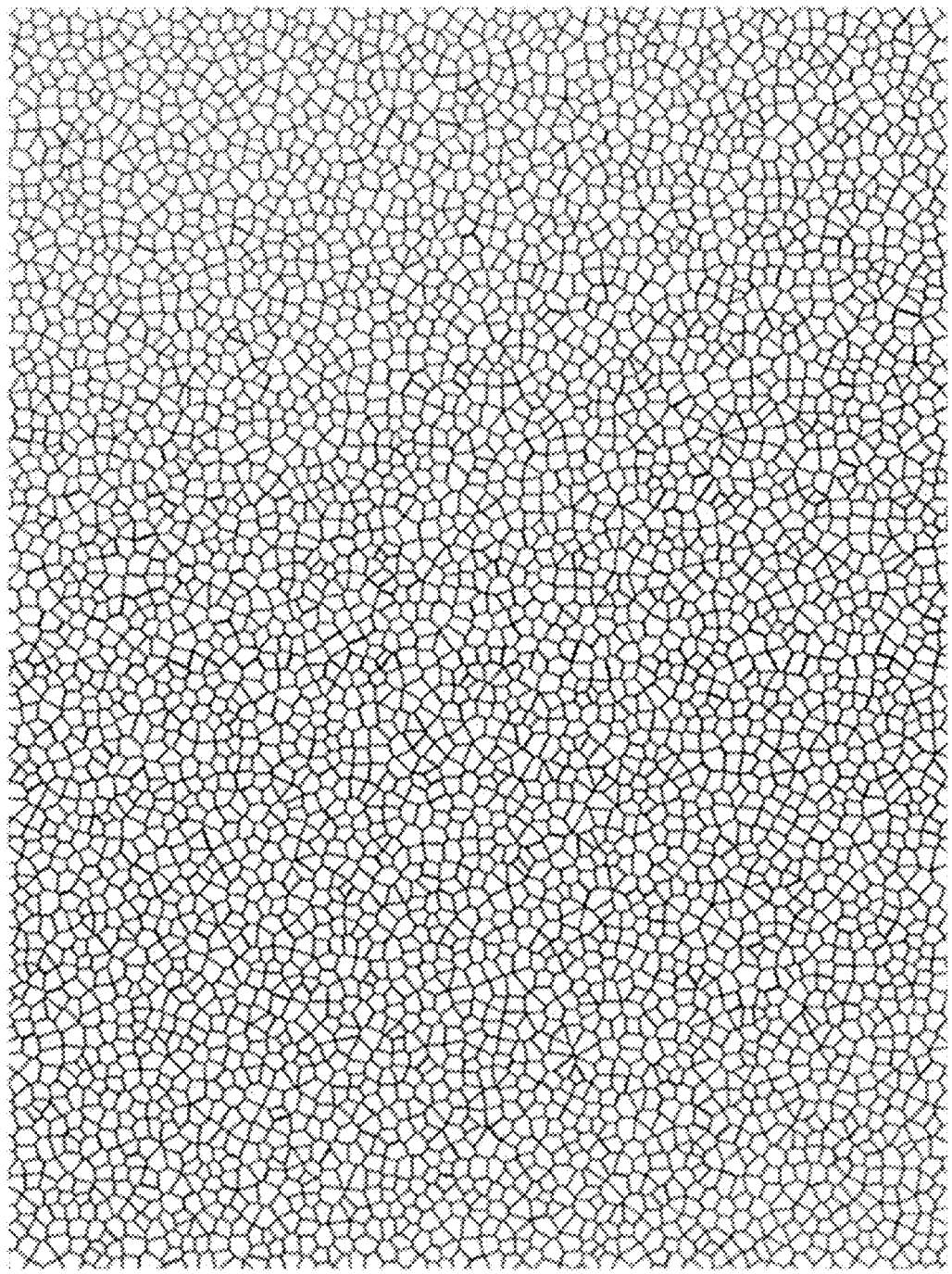
FIG. 9G shows an image of a sample fabricated according to the designed plurality of shapes of FIG. 9E.
Figure 9H:
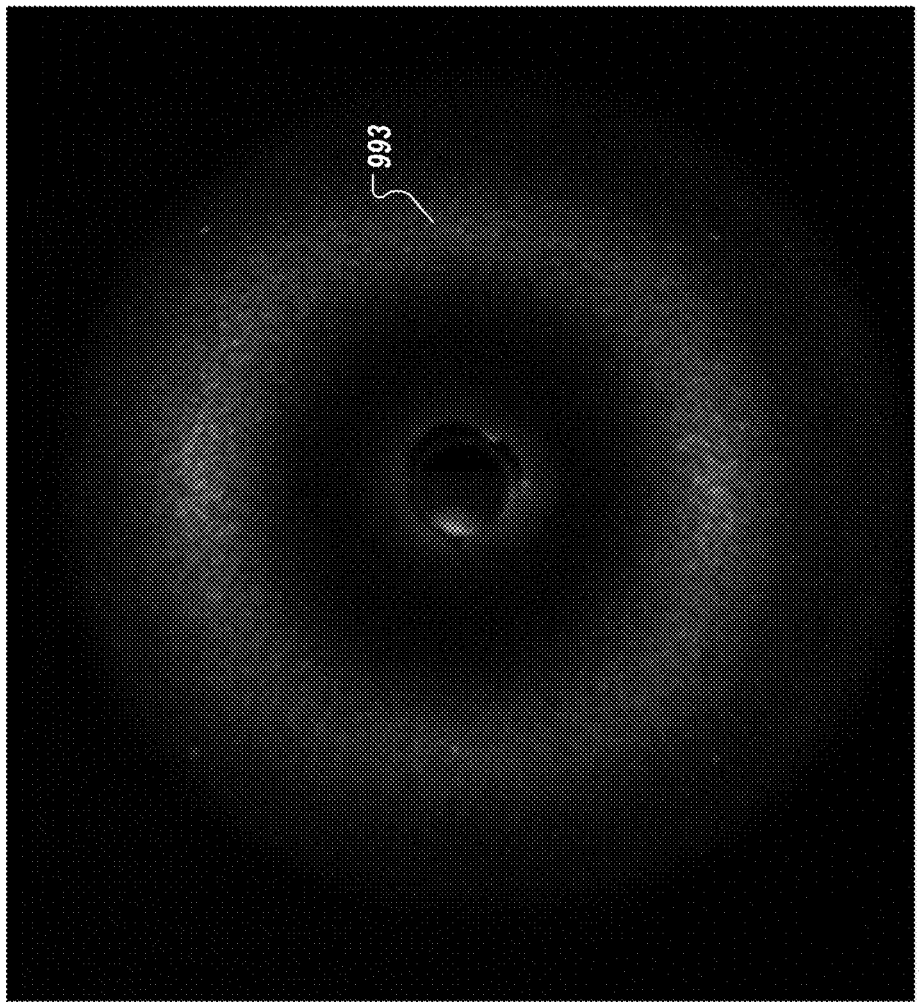
FIG. 9H illustrates a measured diffraction pattern of the sample of FIG. 9G.
Figure 9I:
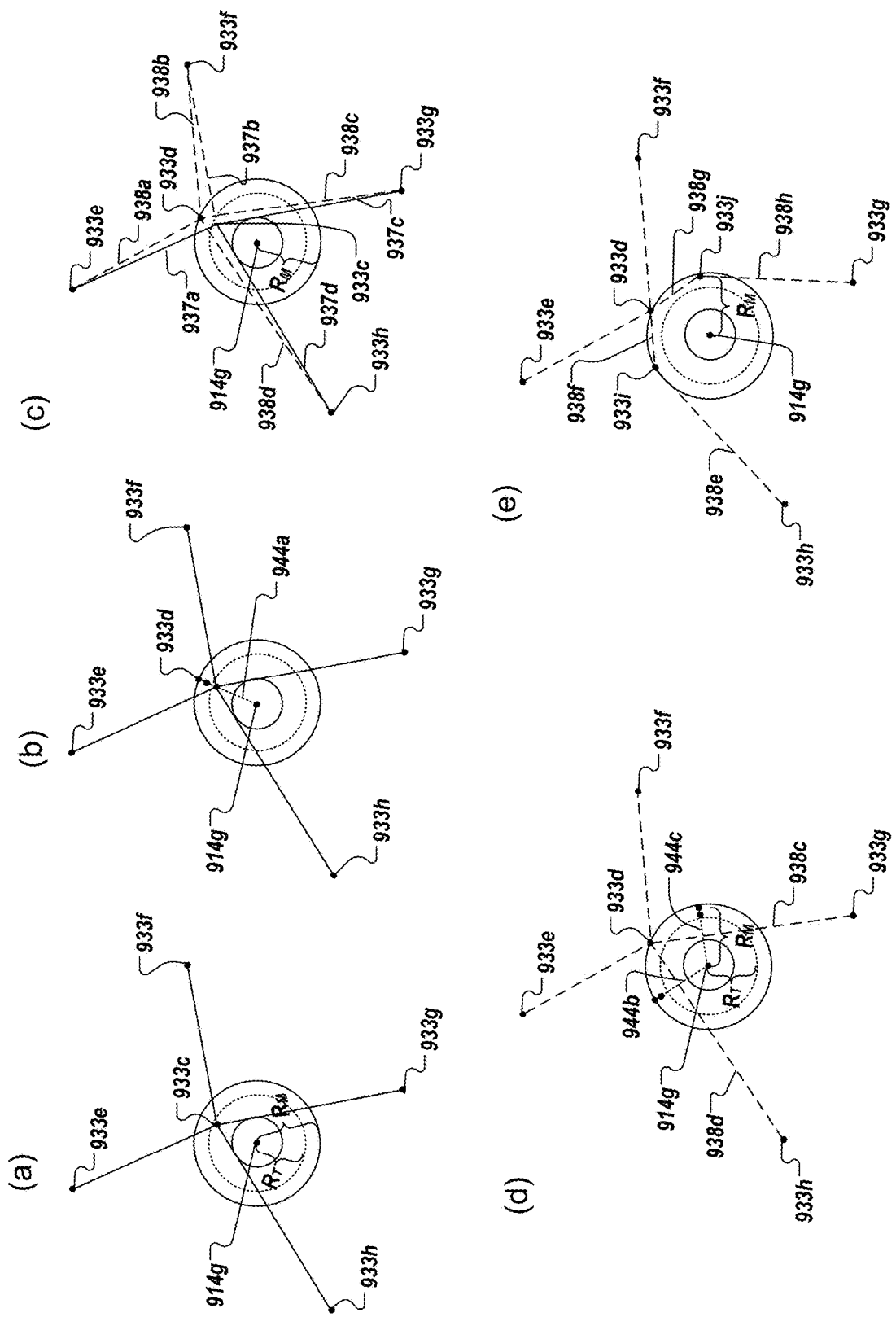
FIG. 9I illustrates a process of modifying vertices and edges of a plurality of shapes.
Figure 9J:
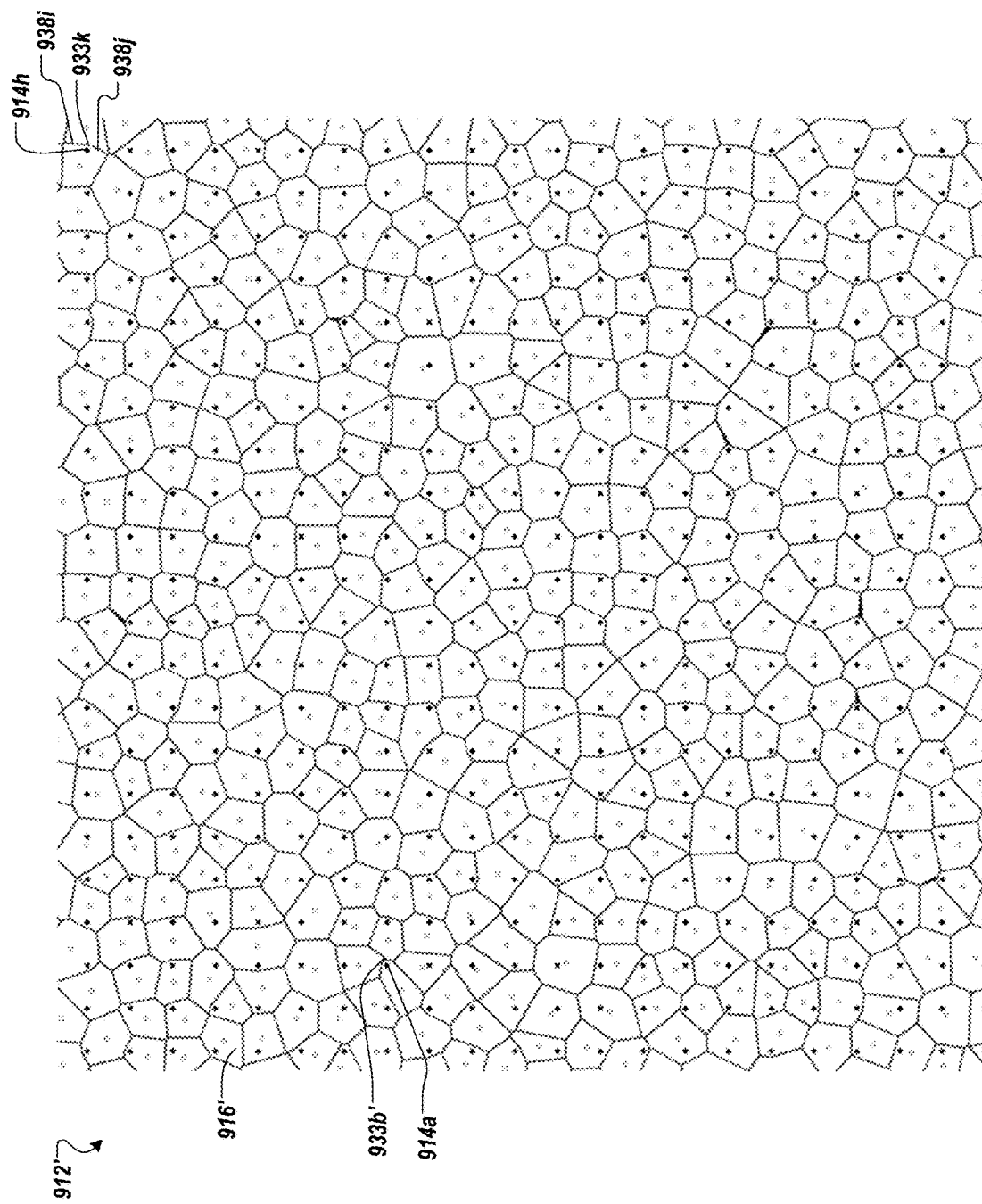
FIG. 9J illustrates an area including a plurality of shapes after modification.
Figures 9L, 9M:
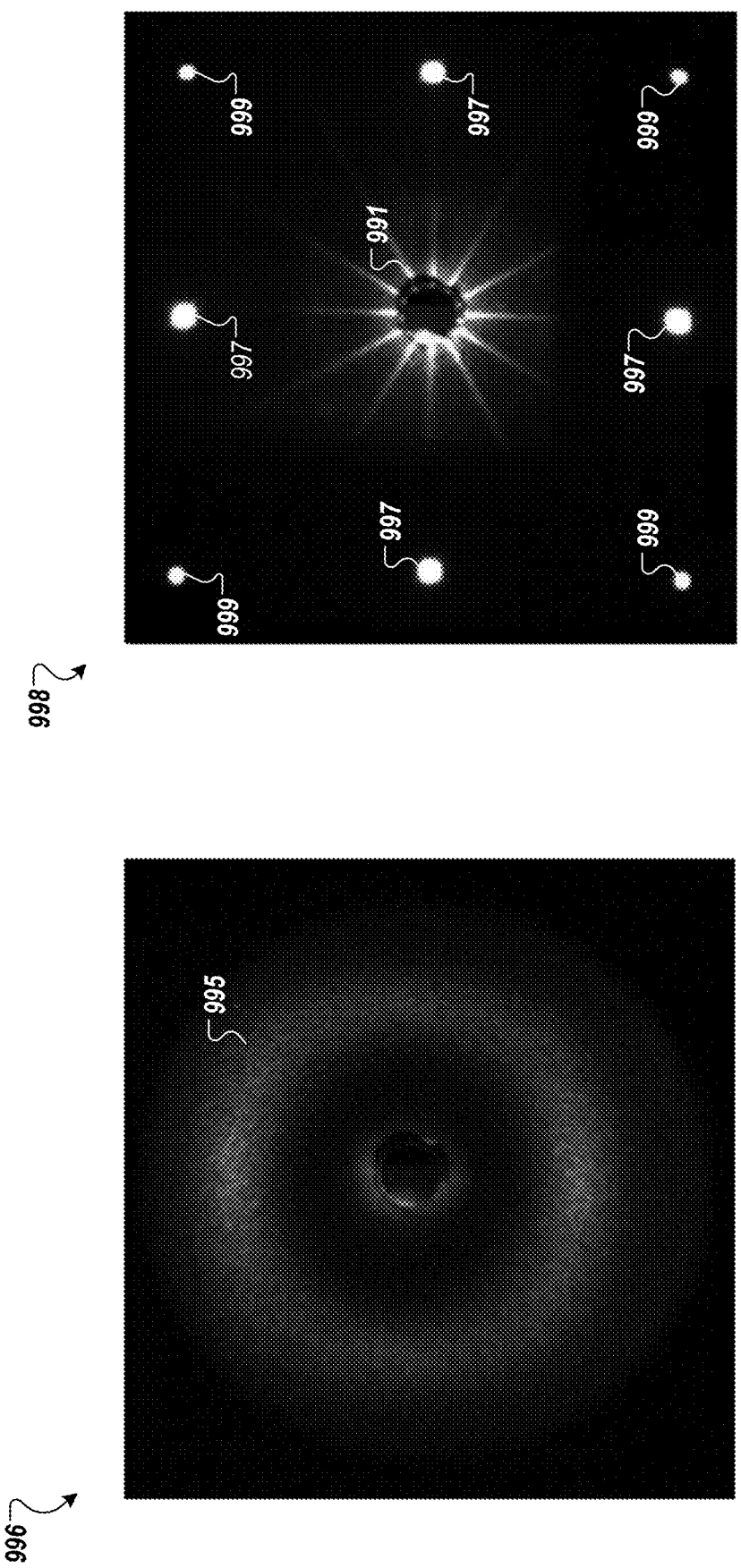
FIG. 9L illustrates a measured diffraction pattern of a sample fabricated according to the plurality of shapes of FIG. 9J.
FIG. 9M illustrates a measured diffraction pattern of a sample fabricated according to a plurality of regular shapes.

As noted above, regular phasels (e.g., the regular phasels 922 of FIG. 9B), while straight-forward to fabricate, can produce light with unwanted higher diffractive orders when used for display purposes, e.g., as illustrated with further details in FIG. 9M. In an effort to create an equally dense and space filling set of phasels without the associated periodicity induced problems, an irregular phasel pattern (e.g., a blue-noise based Voronoi tile phasel pattern) can be generated, e.g., as described above in FIGS. 9B-9C. However, the requirement that the generated phasels needs to be in electrical contact with an underlying periodic array of vertical conductive vias can force the new set of phasels to retain a large degree of periodicity, which may still cause light with unwanted higher diffractive orders.

Implementations of the present disclosure provide methods for adjusting shapes of a random set of phasels (e.g., with Voronoi pattern) to fit the underling via grid without returning unwanted higher order diffractive behavior. In some implementations, conductive vias have a fixed radius. To be considered to be reliably in electrical contact with a metallic electrode of a phasel, a corresponding conductive via can be fully enclosed by the metallic electrode and to be further from any edge or vertex of any neighboring metallic electrode by a distance, e.g., set by a fabrication tolerance.

As noted above, if a phasel set is selected such that every phasel meet a requirement, the set of phasels may be still unacceptably periodic. Also, if a phasel set that does not meet these requirements is selected, there is a high probability that some phasels will be unconnected and/or some vias may short together multiple phasels. For example, although the irregular display 930 of FIG. 9B having a certain degree of irregularity advantageously reduces higher-order diffractive effects, it may be difficult to manufacture, e.g., due to fabrication tolerances, alignment problems, or problems posed while operating, e.g., shorts between neighboring phasels. In some cases, the irregular phasels 932 contact an underlying periodic array of vias, which can impose certain fabrication constraints on the irregular phasels 932. For example, the points 934 being truly randomly located within an annulus defined by the inner and outer radii of the regular points 924 can result in some points being too close, e.g., less than a threshold distance, from a phasel edge or vertex, which can lead to instability during fabrication. As an example, an edge of a phasel 932*a* coincides with a center point 924*a*. As another example, a center point 924*b* is relatively close to a vertex 933 where three phasels 932 meet.

In some implementations, to address the above issues, a set of phasels using one or more requirements is first selected. The one or more requirements can include: a center point of a conductive via and a small circle around the center point are fully enclosed in a single irregular phasel (e.g., a Voronoi polygon). A radius of the circle can be related to but not necessarily the same as the via's physical radius. As a post-hoc step, the shape of each phasel is locally adjusted to ensure that the via is enclosed in the phasel shape with adequate fabrication tolerance. The techniques enable to suppress higher order diffractive behavior while at the same time allowing the phasels to be reliably fabricated in electrical contact with one and only one via.

In some implementations, a method can be algorithmically described in the following two steps. First, a set of shapes (e.g., Voronoi polygons) for a phasel set is generated using chosen vias with an inclusion radius Ri. For example, search parameters for designing the phasel set can be varied to produce the set of shapes with improved higher order diffraction results (e.g., suppressed intensity). A discrete Fourier transform (DFT) can be performed on centroids of the set of shapes to determine the regularity of the generated set of shapes. The result of the DFT simulation can be checked by fabricating a sample according to the set of the shapes, e.g., by etching the shape pattern into an aluminum coated silicon wafer and then testing the actual (or real world) diffraction result of the sample using a diffractive system. Once an acceptable shape set is found, the method proceeds to step 2.

Second, each shape (e.g., polygon) is sequentially checked for the following conditions:
- a). Is there a vertex of the shape within a tolerance distance Rt of a corresponding via? If the vertex is within the tolerance distance Rt of the via, the vertex is moved along a line between the via and the vertex to a distance known as a modification radius Rm from the center of the via. Edge connectivity for the vertex is retained. If the vertex is out of the tolerance distance of the via, the method moves to a next shape. If at the end of the set of shapes, the method proceeds to return to the start and sequentially check each shape for the following condition.
- b). Is there an edge of the shape that is within a threshold distance (e.g., 90% of Rt) from the center the via? If the edge is within the threshold distance from the center of the via, the edge is broken by inserting a new vertex Rm from the center of the via along the line connecting the via center and the point of closest approach to the edge. If the edge is on or out of the threshold distance from the center of the via, the method moves on to check the next shape. If at the end of the set of shapes, the method returns to the start and begin the vertex checking again.
- c). The above steps a) and b) can be iterated until no vertex or edge of the set of shapes fails these conditions.

After modifying the designed shape set according to the method above, the modified shape set can be further experimentally checked and verified for higher order diffractive effect. A sample can be fabricated according to the modified shape set and tested for higher order diffractive effect. If the measured diffraction pattern of the sample indicates that the suppression of the higher diffractive orders is acceptable, e.g., an intensity ratio of a main order and a sum of higher diffractive order is greater than a predetermined threshold, the modified shape set can be further used to fabricate a device, e.g., an irregular display like the display 1000 of FIG. 10A or 1050 of FIG. 10B. If the measured diffraction pattern of the sample indicates that the suppression of the higher diffractive orders is unacceptable, the modified shape set can be further adjusted according to the method above. In such a way, the techniques can ensure that for a periodic array of vias one and only one via can be enclosed within one and only one phasel (e.g., Voronoi polygon), such that the via falls inside the boundary of the phasel at a distance greater than or equal to the fabrication tolerances, while achieving acceptable suppression of higher diffractive orders.

To illustrate the above method, FIGS. 9D-1 and 9D-2 are further described, with respect to FIGS. 9E to 9M.

FIG. 9D-1 is a flowchart of an example process 960 of designing an irregular device (e.g., an irregular display) based on fabrication tolerances. FIG. 9D-2 is a flowchart of an example process 970 depicting optional substeps of the process 960 of FIG. 9D-1. In some implementations, the process 960 can be used instead of the process 950 of FIG. 9C to generate a profile of a device to be formed. The device to be formed can be the irregular display 1000 of FIG. 10A or the irregular display 1050 of FIG. 10B.

At step 961, a plurality of shapes in an area for the device to be formed is generated. The step 961 can be implemented by steps 952 and 954 of FIG. 9C. For example, the plurality of shapes can be generated by generating an irregular pattern according to a plurality of irregularly-spaced points in the area. The irregularly-spaced points can be seed points (e.g., Voronoi points) for the plurality of shapes, and corresponding shapes (e.g., polygons) enclosing the irregularly-spaced points can be generated according to the irregular pattern (e.g., a Voronoi pattern). The irregularly-spaced points can be generated based on a plurality of points that are regularly spaced in the area, e.g., as illustrated in step 952 of FIG. 9C. Each point of the plurality of points can correspond to an underlying via (e.g., via 1014 of FIG. 10A) for connecting to an element of the device to be formed, e.g., the plurality of points can be center points of underlying vias. The plurality of points 914 can form a regular grid, e.g., a square grid.

FIG. 9E illustrates an area 912 with a plurality of shapes 916 generated according to step 961. For example, a phasel has a shape 916 of an irregular pentagon. Points 914 represent the plurality of points that are regularly spaced in the area 912. The points 914 are indicated by filled black circles. Centroid locations 955 of the plurality of shapes 916 are indicated by hollow circles. Each of the plurality of shapes 916 uniquely corresponds to a respective point 914 of the plurality of points 914 in the area 912. The respective points 914 form a regular grid, e.g., a square grid. For illustration, in the following, at least some steps of the process 960 of FIG. 9D-1 and process 970 of FIG. 9D-2 are described with respect to FIG. 9E.

At step 962, whether the device to be formed is capable of suppressing light with higher-diffractive orders with respect to a main order is determined based on the plurality of shapes. As discussed with further details below, determining whether the device to be formed is capable of suppressing light with higher-diffractive orders can include i) performing simulations of light incident on the plurality of shapes, ii) experimentally measuring light incident on a structure fabricated according to the plurality of shapes, or both.

In some implementations, determining whether the device to be formed is capable of suppressing light with higher diffractive orders based on the plurality of shapes in the area for the device to be formed includes: performing a discrete Fourier transform (DFT) on centroids of the plurality of shapes, and determining whether the device to be formed is capable of suppressing light with higher diffractive orders based on a result of the discrete Fourier transform. For example, a first intensity of light with the main order and a second intensity with the higher diffractive orders can be determined based on the result of the discrete Fourier transform, and a ratio of the first intensity of light with the main order and the second intensity with the higher diffractive orders is greater than a predetermined threshold (e.g., more than two orders of magnitude). The predetermined threshold can be based on a perceptual threshold, e.g., the ratio at which a human can no longer perceive the higher-order diffractive effects.

For example, FIG. 9F depicts a simulation plot 980 of radial power of intensity of diffracted light versus frequency (in reciprocal space) for the plurality of shapes 916 generated according to step 961. Plot 980 is generated by calculating discrete Fourier transform (DFT) of centroids of the plurality of shapes 916. As shown in FIG. 9F, various peaks, e.g., main order peak 981, first order peak 982, first diagonal order peak 983, second order peak 984, and second diagonal order peak 985, appear in the radial power distribution of the plot 980. The main order peak 981, which has a "frequency" difference of zero compared to the frequency of incident light, is the strongest peak, with the Y axis of the plot 980 not extending far enough to display the peak. Whether the device is capable of suppressing light with higher-diffractive orders, e.g., orders besides the main order, can be determined by computing a ratio of the intensity of the higher-diffractive order peaks to the intensity of the main order and comparing the ratio to the predetermined threshold. For example, when the ratio of the intensity of the main order peak 981 to a sum of the intensities of the higher-diffractive order peaks, e.g., the high order peaks 982, 983, 984, 985, is at least 100, e.g., at least 1000, 10,000 or even higher, the device can be determined to be capable of suppressing the light with higher diffractive orders.

If the device to be formed is determined to be not capable of suppressing light with higher-diffractive orders based on the result of the discrete Fourier transform on the centroids of the plurality of shapes, the process 960 starts over with step 961 to generate a new set of shapes in the area 912 for the device to be formed. Generating a plurality of new shapes in the area for the device to be formed can include adjusting one or more parameters, e.g., the inner and outer radii $R_i$ and $R_o$ centered around center points 914 in the area 912. If the device to be formed is determined to be capable of suppressing light with higher-diffractive orders based on the result of the discrete Fourier transform, the process 960 can continue to step 963.

In some implementations, if the device to be formed is determined to be capable of suppressing light with higher diffractive orders based on the result of the discrete Fourier transform, before the process 960 proceeds to step 963, the process 960 includes a further verification by experimentally measuring light incident on a structure fabricated according to the plurality of shapes.

In some implementations, after determining that the device to be formed is capable of suppressing light with higher diffractive orders based on the result of the discrete Fourier transform, the process 960 including fabricating a sample on a substrate according to the plurality of shapes, e.g., by etching a metal-coated substrate according to the plurality of shapes. FIG. 9G is a light microscope image 990 of a sample fabricated using an aluminum coated silicon wafer according to the designed plurality of shapes 916 of FIG. 9E.

A light diffraction pattern of the sample can be then measured. The process 960 can proceed to determine whether the sample is capable of suppressing light with higher diffractive orders based on the measured diffraction pattern of the sample. For example, similar to the simulation result, the process 960 can determine whether the sample is capable of suppressing light with higher-diffractive orders, e.g., orders besides the main order, can be determined by computing a ratio of the intensity of the higher-diffractive orders to the intensity of the main order in the measured diffraction pattern and comparing the ratio to a predetermined threshold, e.g., 100, 1000, 10,000, or more. If the sample is capable of suppressing light with higher diffractive orders based on the measured diffraction pattern of the sample, the device to be formed can be determined to be capable of suppressing light with higher diffractive orders. If the sample is uncapable of suppressing light with higher diffractive orders based on the measured diffraction pattern of the sample, the device to be formed can be determined to be uncapable of suppressing light with higher diffractive orders.

For example, FIG. 9H illustrates an image 994 of a measured diffraction pattern of the sample of FIG. 9G. The measured diffraction pattern can correspond to the result of DFT as illustrated in FIG. 9F, where the signals at different radial frequencies in FIG. 9F correspond to a radial value in FIG. 9H. It is shown that in image 994, there is a relatively faint signal 993 that represents higher-order diffractive effects. Compared to the image 998 of the diffraction pattern of a sample fabricated according to regular shapes (as shown in FIG. 9M), the sample fabricated according to the designed plurality of shapes of FIG. 9E can significantly suppress light with higher diffractive orders.

Referring back to FIG. 9D-1, after determining that the device to be formed is capable of suppressing light with higher-diffractive orders based on the designed plurality of shapes, e.g., using at least one of a DFT simulation result (e.g., as illustrated in FIG. 9F) or experimentally measured diffraction pattern (e.g., as illustrated in FIG. 9H), the process 960 proceeds to step 963.

At step 963, the process 960 includes, for each of the plurality of shapes 916, determining whether a position relationship between the shape 916 and the respective point 914 satisfies one or more criteria. If the position relationship between the shape and the respective point satisfies the one or more criteria, the process 960 proceeds to step 964, where the shape is determined to be a shape satisfying the one or more criteria. In contrast, if the position relationship between the shape and the respective point fails to satisfy the one or more criteria, the process 960 proceeds to step 965, where the shape is modified to make a position relationship between the modified shape and the respective point satisfy the one or more criteria.

The determination of whether position relationships between the shapes 916 and the respective points 914 are satisfied with the one or more criteria, can be performed sequentially for each shape 916 (e.g., a polygon) with respect to the respective point 914 for the shape 916. In some implementations, as noted above, determining whether a shape satisfying the one or more criteria includes at least one of: a) determining whether a distance between each vertex of the shape and a respective point being no smaller than a first threshold, or b) determining whether a distance between each edge of the shape and the respective point is no smaller a second threshold.

In some implementations, the first threshold depends on one or more parameters of the device to be formed and fabrication tolerances. For example, the first threshold can be a sum of a radius of a via (e.g., 100 nm to 300 nm), fabrication tolerances (e.g., how accurately an electron beam can draw the features, such as about 200 nm to 300 nm), and a half of an inter-phasel gap 935 (e.g., about 100 nm). The sum can be about 400 to 800 nm (e.g., 500 nm). In some implementations, the radius of the via depends on a pitch of vias. In some implementations, the second threshold is determined based on the first threshold, e.g., a percentage of the first threshold. For example, the percentage can be 60%, 65%, 70%, 75%, 80%, 85%, 90%, 95%, or any suitable value.

In some implementations, both criteria a) and b) need to be satisfied for the shapes. That is, a shape satisfied the one or more criteria if a distance between each vertex of the shape and a respective point being no smaller than the first threshold, and a distance between each edge of the shape and the respective point is no smaller than the second threshold. Otherwise, if a shape fails to satisfy any one of the criteria a) and b), the shape needs to be modified at step 965.

More details regarding steps 963, 964, 965 can be described with reference to the process 970 of FIG. 9D-2, which includes steps 970a and 970b that can be iteratively repeated until shapes in the modified shape set satisfy the one or more criteria.

At step 971, for each of the plurality of shapes, the process 970 includes: for each vertex of the shape, determining whether a distance between the vertex and a respective point is greater than or equal to the first threshold. If the distance between the vertex and the respective point is equal to or greater than the first threshold, the vertex is kept unchanged with respect to the respective point at step 973. For example, e.g., as illustrated in FIG. 9E, for a vertex 933a, a respective point 914a is further away than the vertex 933a, and a distance between the vertex 933a and the respective point 914a is greater than the first threshold, accordingly, the location of the vertex 933b is kept unchanged with respect to the respective point 914a.

As the vertex 933a can be an intersection of three shapes enclosing three respective points 914a, 914b, 914c, the vertex 933a can be further checked to see whether a distance between the vertex 933a and each of other two respective points 914b, 914c is greater than or equal to the first threshold. If all the distances between the vertex 933a and the three respective points 914a, 914b, 914c are greater than or equal to the first threshold, the vertex 933a is kept unchanged and the process 970 moves to check a next vertex. If any one of the distances is smaller than the first threshold, the vertex 933a can be moved with respect to the corresponding point 914a, 914b, or 914c according to step 972, while keeping the other two distances greater than or equal to the first threshold. In some implementations, distances between the vertex 933a and the three respective points 914a, 914b, 914c can be first determined and compared with the first threshold. If just one of the distances is smaller than the first threshold, the vertex 933a can be moved with respect to the corresponding point, while keeping the other two distances greater than the first threshold. If two of the distance are smaller than the first threshold, the vertex 933a can be moved with respect to the corresponding two points (simultaneously or sequentially), while keeping the other one or two distances greater than the first threshold.

If the distance between the vertex and the respective point is smaller than the first threshold, the process 970 proceeds to step 972, where the vertex is adjusted, e.g., be moved along a line between the vertex and the respective point to make a distance between the moved vertex and the respective point be greater than or identical to the first threshold. For example, e.g., as illustrated in FIG. 9E, vertex 933b is an intersection of three shapes enclosing three respective points 914d, 914e, 914f. A distance between each of the respective points 914e, 914f and the vertex 933b is greater than the first threshold, while a distance between the respective point 914d and the vertex 933b is smaller than the first threshold. Thus, the vertex 933b can be moved with respect to the respective point 914d, while keeping the distances from the other two points 914e, 914f greater than the first threshold.

For example, e.g., as illustrated in diagram (a) of FIG. 9I, a vertex 933c is within a threshold distance $R_T$ (as the first threshold) of a respective point 914g of a shape 916. The vertex 933c can be moved along a line 944a between the vertex 933c and the respective point 914g to make a distance $D_1$ between the moved vertex 933d and the respective point 914g greater than or identical to the threshold distance $R_T$.

As illustrated in diagram (b) of FIG. 9I, the vertex 933c is in the process of moving along the line 944a that connects the respective point 914g to the vertex 933c in a direction away from the respective point 914g. In some implementations, there is a predetermined modification distance $R_M$, which can be a final distance between the respective point 914g and the moved vertex 933d. In other words, the vertex 933c travels a distance $(R_M-R_T)$ away from the respective point 914g, where $R_M > R_T$. The modification distance $R_M$ can be determined based on a distance of two adjacent respective points 914, e.g., a pitch of regular points 914.

As illustrated in diagram (c) of FIG. 9I, the moved vertex 933d is in the final position, with a distance, e.g., $R_M$, greater than the first threshold away from the respective point 914g. Additionally, previous edges 937a, 937b, 937c, 937d of shapes that intersect at the previous vertex 933c are adjusted accordingly to retain edge connectivity. Each previous edge 937a, 937b, 937c, 937d is replaced with a corresponding new edge 938a, 938b, 938c, 938d by drawing a line from the moved vertex 933d to a respective neighboring vertex of the shapes, e.g., vertex 933e, 933f, 933g, 933h.

Although the example in diagrams (a), (b), and (c) of FIG. 9I illustrate a way of moving a single vertex in step 970a, other implementations are possible. For example, two or more vertices that are within threshold distance $R_T$ can be moved simultaneously or sequentially. The vertices can be moved to have a distance greater than the threshold distance $R_T$. In some cases, distances between the moved vertices and the respective points are different, e.g., randomly. In some cases, distances between the moved vertices and the respective points are same, e.g., identical to $R_M$.

In some implementations, step 965 corresponds to step 972 (stages a), b), and c)). In some implementations, when the determination of step 963 is positive, e.g., the position relationship between the shape and the respective point satisfies one or more criteria, continuing to step 964 corresponds to following step 973.

After vertices of the plurality of shapes are checked and/or modified to satisfy the first criterion at step 970a, the process 970 proceeds to step 970b to check whether edges of the plurality of shapes satisfy the second criterion and/or modify the shapes accordingly.

At step 974, for each shape of the plurality of shapes, the process 970 includes: for each edge of the shape, determining whether a distance between the edge and the respective point is greater than or equal to the second threshold. The distance can be the smallest distance between the edge and the respective point, e.g., as measured along line connecting the edge to the respective point, where the connecting line is perpendicular to the edge.

If the distance between the edge and the respective point is greater than or equal to the second threshold, the edge is kept unchanged (step 977). If the distance between the edge and the respective point is smaller than the second threshold, the process 970 modifies the shape, e.g., by inserting a new vertex that is between two vertices of the edge and is spaced from the respective point with a distance no smaller than the second threshold (step 975), and modifying the shape by connecting the new vertex with the two vertices of the edge respectively (step 976). A line connecting the new vertex and the respective points can be perpendicular to the edge. In some cases, distances between new vertices and respective points can be identical to a value greater than or identical to the second threshold. In some cases, distances between at least two new vertices and respective points are different.

For example, with reference to diagram (d) of FIG. 9I, the configuration of vertices 933 and edges 938 is the same as in diagram (c) of FIG. 9I. It can be determined that distance $D_2$ between the respective point 914g and the edge 938d and distance $D_3$ between the respective point 914g and the edge 938c are each smaller than the second threshold (e.g., 90% of the threshold distance $R_T$). As a result, for edges 938c and 938d, the process 970 flows from step 974 to step 975, e.g., modifying the edges 938c and 938d.

The distances $D_2$ and $D_3$ are measured along lines 944b and 944c, respectively, which are perpendicular to edges 938d and 938c, respectively. As shown in diagram (e) of FIG. 9I, new vertices 933i and 933j are respectively inserted between the vertices of the edges 938d and 938c, e.g., new vertex 933i between vertices 933h and 933d of the edge 938d and new vertex 933j between vertices 933g and 933d. The locations of the new vertices 933i and 933j can be a modification distance $R_M$ away from the respective point 914g, as measured along lines 944b and 944c. In some implementations, this modification distance $R_M$ is the same modification distance as used in the moving of vertices as shown in diagram (c) of FIG. 9I. In other implementations, this modification distance $R_M$ is a different from the modification distance used in the moving of vertices. In some implementations, the modification distance $R_M$ can be equal to the tolerance distance $R_T$.

After the insertion of the new vertices 933i and 933j, new edges of the shapes 916 including the new vertices 933i and 933j are drawn. For example, in diagram (d) of FIG. 9I, edge 938d is the line segment connecting vertices 933h and 933d, and edge 938c is the line segment connecting vertices 933g and 933d. After modification, in diagram (e) of FIG. 9I, edge 938d is replaced with new edge 938e (between vertices 933h and 933i) and new edge 938f (between vertices 933d and 933i). Additionally, edge 938c is replaced with new edge 938h (between vertices 933g and 933j) and new edge 938g (between vertices 933j and 933d).

Although in diagram (d) and (e) of FIG. 9I, two edges are found to be within the second threshold from the respective point, and two new vertices are simultaneously inserted, variations are possible. For example, one vertex can be inserted at a time when there are two or more edges within the second threshold distance from the respective point. As another example, only one edge can be within the second threshold from the respective point, and a single new vertex inserted. In some implementations, there are three or more edges found to be within the second threshold from the respective point.

In some implementations, inserting the new vertices and replacing the previous edges with new edges can result in new edges being within the second threshold distance from respective points. Accordingly, after step 976, the process 970 can return to step 974 to check whether the second criterion is still satisfied, and if not, repeat steps 975 and 976. In some cases, the likelihood steps 975 and 976 causing the second criterion to no longer be satisfied can be reduced by choosing a suitably low second threshold, e.g., 70% of $R_T$, 80% of $R_T$, 90% of $R_T$, or 95% of $R_T$. In this case, an iterative process, e.g., repeating step 970b multiple times, can be avoided. The overall process 960 can be relatively fast, e.g., on an order of less than a second.

In some implementations, the edges of the shapes satisfy the second criterion, the process 970 can be performed again, by returning to step 970a. The process 970 can be iteratively repeated to (i) determine whether a distance between each vertex of each shape of the shapes and the respective point is greater than or equal to the predetermined threshold and (ii) determining whether a distance between each edge of each shape of the shapes and the respective point is greater than or equal to the second threshold, until all shapes in the area satisfy the one or more criteria.

FIG. 9J depicts the updated area 912', e.g., as compared to area 912 FIG. 9E, after following steps 963-965 of the process 960 of FIG. 9D-1 and/or the process 970 of FIG. 9D-2. The vertices 933 and edges 938 of the shapes 916 have been modified to satisfy the one or more criteria. For example, shapes 916' meeting at vertex 933b in FIG. 9E have been redrawn in FIG. 9J such that moved vertex 933b' is no longer within the first threshold away from respective point 914a. As another example, new vertex 933k and new edges 938i and 938j are inserted in FIG. 9J compared to FIG. 9E, where respective point 914h was too close to edge 938k. As a result of the modifications in the process 970, a distance between each vertex 933 of the shape 916 and a respective point 914 is no smaller than the first threshold, and a distance between each edge 938 of the shape 916 and the respective point 914 is no smaller than the second threshold.

In some implementations, after determining shapes satisfying the one or more criteria for fabrication tolerances, the process 960 can further determine whether the device to be formed according to the shapes satisfying the one or more criteria (e.g., the shapes 916' in FIG. 9J) is capable of suppressing light with higher diffractive orders, e.g., using at least one of a DFT simulation result or experimentally measured diffraction pattern, as described above.

In some implementations, the process 960 includes: performing a discrete Fourier transform on centroids of the shapes satisfying the one or more criteria and determining whether the device to be formed is capable of suppressing light with higher diffractive orders based on a result of the discrete Fourier transform (DFT).

For example, FIG. 9K illustrates an example result of DFT of the plurality of shapes 916' of FIG. 9J, which shows plot 992 of the radial power versus the frequency of light (in reciprocal space). It can be shown that higher diffractive orders (first diffractive order 992b, 992c, 992d, 992e) have been suppressed with respect to the main order 992a. Compared to plot 980 of FIG. 9F, the radial powers of the higher diffractive orders in plot 992 of FIG. 9K has been slightly reduced, which indicates that the modification of the shapes has a little or minor effect on the suppression of higher diffractive orders, and the process 960, 970 does not cause more higher-order diffractive effects.

In some implementations, the process 960 further includes: if the device to be formed is capable of suppressing light with higher diffractive orders based on the result of the discrete Fourier transform, fabricating a sample on a substrate according to the shapes satisfying the one or more criteria, and measuring a diffractive pattern of the sample. Similar to the sample fabricated according to the pre-modified plurality of shapes, the sample can be fabricated by etching metal-coated silicon wafer. The sample can be similar to the sample shown in FIG. 9G.

FIG. 9L illustrates an image 996 showing a measured diffraction pattern of the sample fabricated according to the plurality of shapes 916' of FIG. 9J after modification, which corresponds to the result of DFT shown in FIG. 9K. Compared to the diffraction pattern of the sample fabricated according to the plurality of shapes 916 of FIG. 9G before modification, the diffraction pattern of the sample fabricated according to the plurality of shapes 916' of FIG. 9J after modification also has a relatively faint signal 995 that corresponds to higher-order diffractive effects, similar to the faint signal 993 shown in FIG. 9H, which indicates that there is no meaningful difference in higher-order diffractive effects as a result of modifying the shapes according to the process 960. Similarly, compared to the diffraction pattern of regular shapes shown in FIG. 9M, the diffraction pattern of irregular shapes designed according to the process 960 in FIG. 9L exhibits much smaller higher-order diffractive effects. That is, the higher diffractive orders have been greatly suppressed by the designed irregular shapes.

For reference, FIG. 9M illustrates an image 998 of a measured diffraction pattern of a sample fabricated according to regular shapes, e.g., a square grid of phasels. The image 998 illustrates higher-order diffractive effects produced by the square grid of phasels. For example, first order signals 997 appear as on-axis bright dots located at order m=(1,0), (0, 1), (−1, 0), and (0, −1) relative to incident light 991. The first order signals 997 correspond to the first order peak 982 of FIG. 9F. First diagonal order signals 999 appear as bright dots, though smaller than the first order signals 997, located along diagonals relative to the incident light 991, e.g., m=(1,1), (−1, 1), (1,−1), and (−1,−1) relative to the incident light 991. The first diagonal order signals 999 correspond to the first diagonal order peak 983 of FIG. 9F. The intensity of the first order signals 997 and first diagonal order signals 999 is proportional to the amplitude of peaks of these orders in the discrete Fourier transforms.

Based on the measured diffractive pattern of the sample, the process 960 can further determine whether the sample is capable of suppressing light with higher diffractive orders, e.g., by comparing an intensity ratio of the main order and a sum of higher diffractive orders to a predetermined threshold. If the intensity ratio is greater than or identical to the predetermined threshold, the sample can be determined to be capable of suppressing light with higher diffractive orders based on the measured diffractive pattern of the sample, and accordingly the device to be formed can be determined to be capable of suppressing light with higher diffractive orders. If the intensity ratio is smaller than the predetermined threshold, the sample can be determined to be incapable of suppressing light with the higher diffractive orders, and accordingly the device to be formed can be determined to be incapable of suppressing light with higher diffractive orders. In response, the process 960 can be performed again, e.g., by checking and modifying the shapes again and/or adjusting one or more parameters to redesign shapes for the device to be formed.

After the shapes have been modified to or determined to already satisfy the one or more criteria and/or been determined that the device to be formed according to the shapes is still capable of suppressing light with higher diffractive orders, the process 960 continues to step 966, which includes generating a profile of the device to be formed based on the shapes satisfying the one or more criteria. Generating the profile of the display in step 966 can be similar to generating the profile of the display in step 956 of FIG. 9C, except that the plurality of shapes may differ.

In some implementations, generating the profile can correspond to writing and/or storing a file indicating the geometry of the shapes of phasels, e.g., the locations of vertices and lengths of edges of each shape.

In some implementations, e.g., as illustrated with further details in FIGS. 10A-10B and 11A-11F, an irregular device (e.g., an irregular display) can be formed according to the profile of the device generated according to the process 960 of FIG. 9D-1 and optionally the process 970 of FIG. 9D-2.

7.3 Example Irregular Displays and Fabrication Processes

Figure 10A:
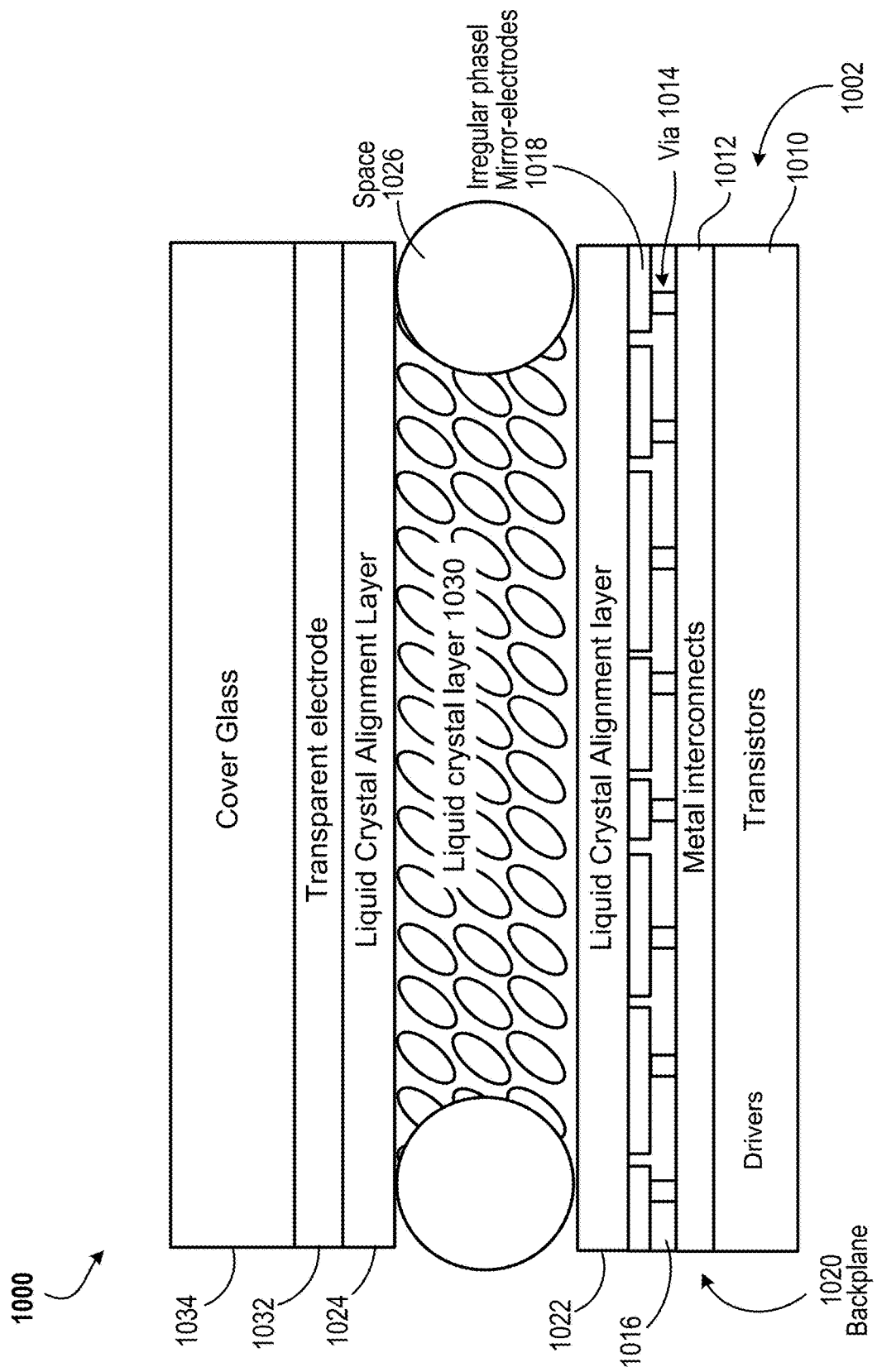
FIG. 10A illustrates a cross sectional view of an example irregular display.

FIG. 10A illustrates a cross sectional view of an example irregular display 1000. The irregular display 1000 can be implemented as the display 150 of FIG. 1A, the display 173 of FIG. 1B, the display 504 of FIG. 5A, the reflective display 514 of FIG. 5B, the transmissive display 524 of FIG. 5C, the transmissive display 534 of FIG. 5D, the display 606 of FIG. 6A, the display 616 of FIG. 6B, 6C, or 6D, the reflective display device 645 of FIGS. 6E, 6F, 6G, or the display 690 of FIG. 6H. The irregular display 1000 can be similar to, or same as, the irregular display 900 of FIG. 9A or 930 of FIG. 9B. The irregular display 1000 can include a plurality of phasels (or display elements) that form an irregular pattern. The phasels can be the phasels 902 of FIG. 9A, the phasels 932 of FIG. 9B, phasels according to the shapes 916 of FIG. 9E, or phasels according to the modified shapes 916' of FIG. 9J.

In some implementations, e.g., as illustrated in FIG. 10A, the display 1000 includes a display backplane 1020. The display backplane 1020 includes phasel driving circuitry 1002 having a respective driving circuit for each of the plurality of phasels. The phasel driving circuitry 1002 can be formed on a substrate (e.g., a semiconductor substrate). In some implementations, the phasel driving circuitry 1002 includes transistors 1010 and metal interconnects 1012 that are sequentially formed on the substrate.

The display backplane 1020 further includes a plurality of metallic electrodes 1018 that are conductively isolated from each other by an isolating material 1016. The isolating material 1016 can be a dielectric material, e.g., silicon oxide (SiOx). Each metallic electrode 1018 can be also configured to be a reflective mirror, e.g., for reflecting light incident on the display 1000 during operation. In some examples, the metallic electrodes 1018 includes a metal material, e.g., aluminum (Al).

The plurality of metallic electrodes 1018 define the plurality of phasels, and each metallic electrode 1018 defines a respective phasel. The plurality of metallic electrode 1018 can form an irregular pattern same as that of the plurality of phasels. Each metallic electrode 1018 can have a shape corresponding to a shape of the respective phasel, e.g., an irregular shape. As discussed above, the shapes of the metallic electrodes 1018 can be determined according to the process 950 of FIG. 9C or the process 960 of FIG. 9D-1 and the process 970 of FIG. 9D-2. The plurality of metallic electrodes 1018 can be fabricated according to the process as described with respect to FIGS. 11A-11F.

Each metallic electrode 1018 is conductively coupled to, e.g., one to one, a respective driving circuit in the phasel driving circuitry 1002 through a respective conductive via 1014. For example, the metallic electrode 1018 can be individually formed on the respective conductive via 1014. In some implementations, the respective conductive via 1014 can underlie at a centroid of the metallic electrode 1018. In some implementations, the respective conductive via 1014 is offset from a centroid of the metallic electrode 1018. The respective conductive vias 1014 for the plurality of metallic electrodes 1018 are formed between the plurality of metallic electrodes 1018 and the phasel driving circuitry 1002. The respective conductive vias 1014 can be conductively isolated by the isolating material 1016. In some implementations, two or more conductive vias are conductively coupled to a corresponding circuit of the plurality of circuits in the backplane. In some implementations, at least one of the plurality of metallic electrodes is conductively coupled to a respective circuit of the plurality of circuits in the backplane via two or more corresponding conductive vias that are conductively coupled to the respective circuit of the plurality of circuits in the backplane. For example, a size of a metallic electrode can be larger than a threshold (e.g., a medium size of the plurality of metallic electrodes), and two or more conductive vias can be conductively coupled to the metallic electrode, e.g., to improve a better conductive connection.

In some implementations, the respective conductive vias 1014 are regularly spaced. In some implementations, first conductive vias in a first region are regularly spaced with a first spacing period, and second conductive vias in a second region are regularly spaced with a second spacing period that is different from the first spacing period. In some implementations, the respective conductive vias 1014 are irregularly spaced.

With respect to FIG. 10A, the display 1000 includes a liquid crystal layer 1030 formed over the display backplane 1020. In some implementations, the display 1000 includes a first alignment layer 1022 underneath the liquid crystal layer 1030 and a second alignment layer 1024 on top of the liquid crystal layer 1030. The first alignment layer 1022 can be formed on top of the plurality of metallic electrodes 1018. The liquid crystal layer 1030 is positioned between the first alignment layer 1022 and the second alignment layer 1024. The display 1000 can further include one or more spacers 1026 between the first alignment layer 1022 and the second alignment layer 1024, e.g., to maintain a thickness of the liquid crystal layer 1030.

In some implementations, the display 1000 includes a transparent conductive layer 1032 on a top side of the liquid crystal layer 1030 (e.g., on top of the second alignment layer 1024) as a common electrode. The transparent conductive layer 1032 can include indium tin oxide (ITO). The display 1000 can further include a cover 1034 on top of the transparent conductive layer 1032. The cover 1034 can be made of glass and configured to protect the display 1000.

A display can include two or more pairs of layers of conductive vias (e.g., 1014 of FIG. 10A) and metallic electrodes (e.g., 1018 of FIG. 10A) that are sequentially stacked between the liquid crystal layer 1030 and the phasel driving circuitry 1002 along a first direction (e.g., a vertical direction), which can be used to further increase the irregularity of the display. In a pair, each conductive via can underlie at a centroid of a corresponding metallic electrode. The conductive vias can be regularly spaced along a second direction (e.g., a horizontal direction) perpendicular to the first direction, and the corresponding metallic electrodes can have irregular sizes/shapes and form an irregular pattern, as discussed above. Adjacent conductive vias in different pairs can be offset from each other, e.g., along the second direction. Adjacent metallic electrodes in different pairs can have different sizes and/or shapes.

Figure 10B:
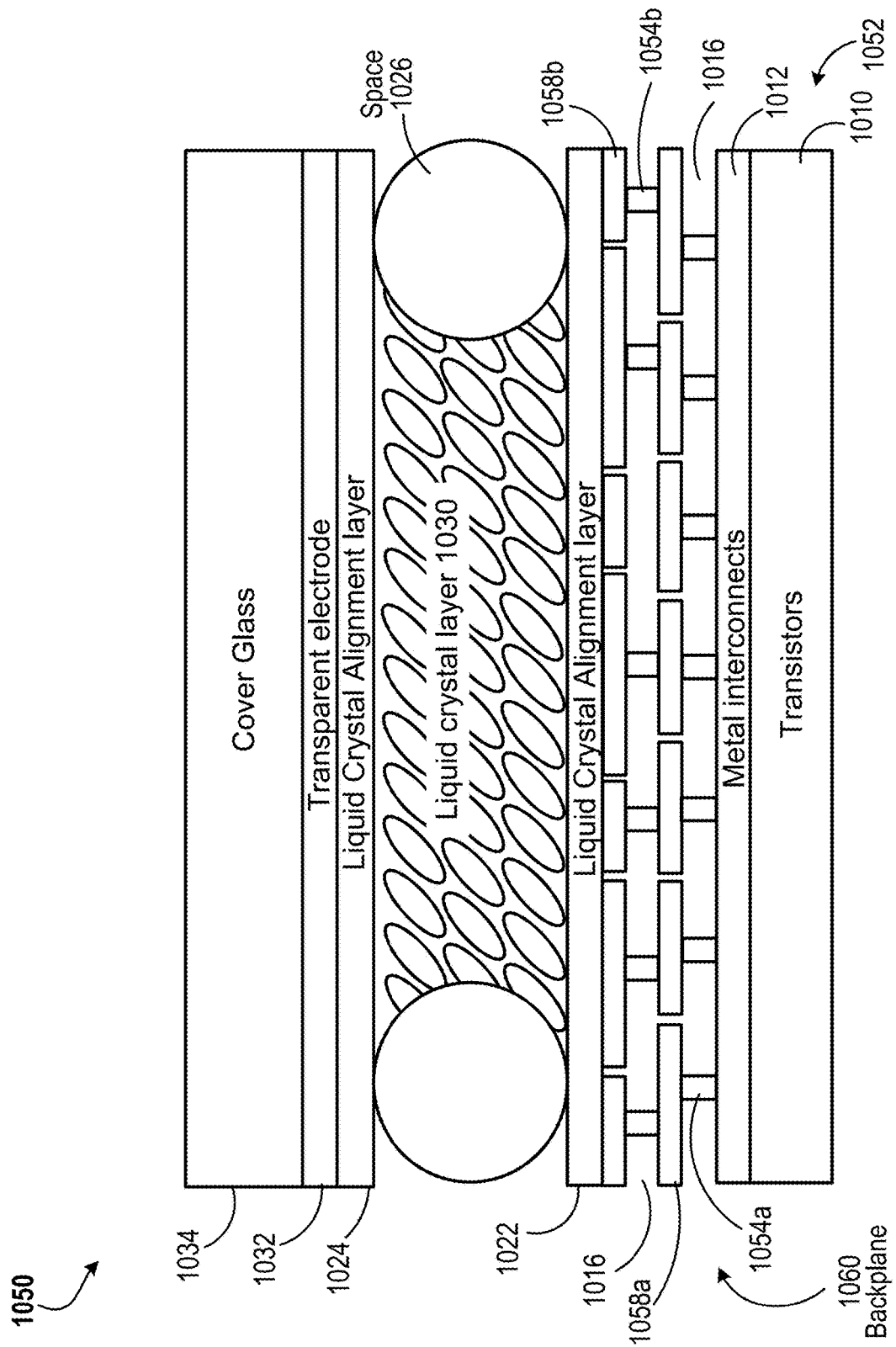
FIG. 10B illustrates a cross sectional view of another example irregular display.

FIG. 10B illustrates a cross sectional view of another example irregular display 1050. The irregular display 1050 can be implemented, for example, as the display 150 of FIG. 1A, the display 173 of FIG. 1B, the display 504 of FIG. 5A, the reflective display 514 of FIG. 5B, the transmissive display 524 of FIG. 5C, the transmissive display 534 of FIG. 5D, the display 606 of FIG. 6A, the display 616 of FIG. 6B, 6C, or 6D, the reflective display device 645 of FIGS. 6E, 6F, 6G, or the display 690 of FIG. 6H. The irregular display 1050 can be similar to, or same as, the irregular display 900 of FIG. 9A or 930 of FIG. 9B. The irregular display 1050 can include a plurality of phasels (or display elements) that form an irregular pattern. The phasels can be the phasels 902 of FIG. 9A, the phasels 932 of FIG. 9B, or phasels according to the modified shapes 916' of FIG. 9J.

Different from the irregular display 1000 including one pair of layers of conductive vias 1014 and metallic electrodes 1018, the irregular display 1050 includes a first pair of layers of conductive vias 1054a and metallic electrodes 1058a, and a second pair of layers of conductive vias 1054b and metallic electrodes 1058b. The two pairs of layers of conductive vias and metallic electrodes can be sequentially stacked between a phasel driving circuitry 1052 of a backplane 1060 and a liquid crystal layer 1030, e.g., along a first direction (like a vertical direction) from the backplane 1060 to the glass cover 1034. In a same layer, the conductive vias are separated and isolated by the isolating material 1016. In a same layer, the metallic electrodes are separated and isolated by the isolating material 1016.

As illustrated in FIG. 10B, the conductive vias 1054a of the first pair can be formed on the metal interconnects 1012, e.g., regularly spaced. The metallic electrodes 1058a of the first pair can be formed on the conductive vias 1054a. The metallic electrodes 1058a can form a first irregular pattern, e.g., same as or similar to the metallic electrodes 1018. For example, the metallic electrodes 1058a can have different sizes and/or shapes. A conductive via 1054a can underlie a corresponding metallic electrode 1058a and at a centroid (or center point) of the corresponding metallic electrode 1058a. Sequentially, the conductive vias 1054b of the second pair can be formed on the metallic electrodes 1058a of the first pair along the first direction. The conductive vias 1054b can be regularly spaced along a second direction (e.g., a horizontal direction) perpendicular to the first direction. Adjacent conductive vias 1054a and 1054b can be offset from each other along the second direction. The metallic electrodes 1058b of the second pair can be formed on the conductive vias 1054b of the second pair. The metallic electrodes 1058b of the second pair can be same as or similar to the metallic electrodes 1018. For example, the metallic electrodes 1058*b* can have different sizes and/or shapes. A conductive via 1054*b* can underlie a corresponding metallic electrode 1058*b* and at a centroid (or center point) of the corresponding metallic electrode 1058*b*. The metallic electrodes 1058*b* of the second pair can form a second irregular pattern. The irregular pattern of the phasels of the irregular display 1050 can be based on the first irregular pattern formed by the metallic electrodes 1058*a* and the second irregular pattern formed by the metallic electrodes 1058*b*, which can increase the irregularity of the irregular display 1050.

While FIG. 10B shows two pairs of layers of conductive vias and metallic electrodes, the present disclosure is not limited in this manner. For example, in some implementations, more than two (e.g., three, four, five, six, seven, eight, nine, ten, or any suitable pairs) can be used, e.g., based on irregularity of a display.

FIGS. 11A-11F illustrate an example process of fabricating an irregular display, e.g., the irregular display 1000 of FIG. 10A. The process can be also used to fabricate the irregular display 1050 of FIG. 10B. The irregular display can be fabricated according to a profile of the irregular display. The profile of the irregular display can be generated, e.g., according to the process 950 of FIG. 9C, or the process 960 of FIG. 9D-1 and the process 970 of FIG. 9D-2. The process can be performed by semiconductor fabrication techniques, including, but not limited to, lithography, pattern transfer, and/or planarization. Each of FIGS. 11A-11F shows a structure after a corresponding processing step.

First, a phasel driving circuitry 1100 is formed on a substrate. The substrate can be a semiconductor substrate (e.g., a silicon wafer). The phasel driving circuitry 1100 includes a plurality of driving circuits for a plurality of phasels in the irregular display. The phasel driving circuitry 1100 can be the phasel driving circuitry 1002 of FIG. 10A, that can include transistors 1102 (e.g., the transistor 1010 of FIG. 10A) and metal interconnects 1104 (e.g., the metal interconnects 1012 of FIG. 10A). The transistors 1102 and the metal interconnects 1104 can be sequentially formed on the substrate, e.g., by semiconductor manufacturing techniques.

Second, a plurality of conductive vias 1106 are formed on top of the phasel driving circuitry 1100 (e.g., on top of the metal interconnects 1104). Each of the plurality of conductive vias 1106 is conductively coupled to a respective driving circuit in the phasel driving circuitry. The plurality of conductive vias 1106 can be regularly spaced. In some implementations, the plurality of conductive vias 1106 are regularly spaced with a first spacing period in a first region and with a second spacing period in a second region of the phasel driving circuitry 1100.

The plurality of conductive vias 1106 can be formed by: 1) depositing an isolating material 1108 (e.g., silicon dioxide) on top of the metal interconnects 1104, 2) depositing photoresist on top of the isolating material 1108, 3) patterning the photoresist and etching to form a plurality of trenches, 4) removing a residue of the photoresist, and 5) depositing a metallic material into the plurality of trenches to form the conductive vias 1106.

Figure 11A:
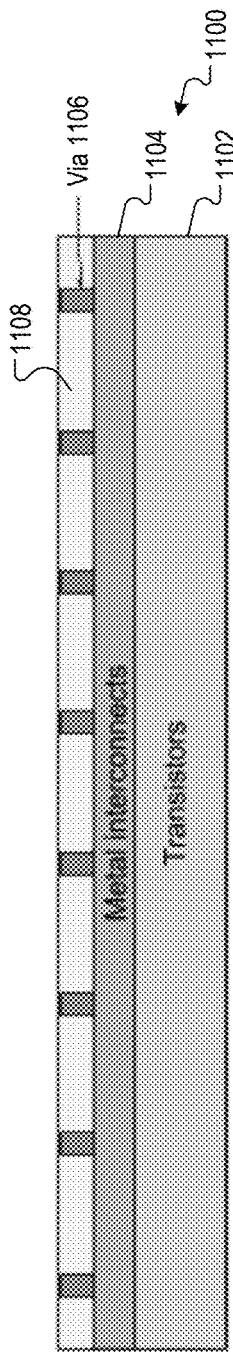
FIGS. 11A-11F illustrate an example process of fabricating an irregular display.

The top of the conductive vias 1106 can then be planarized and polished, e.g., to an optical mirror flatness, using techniques such as Chemical mechanical polishing (CMP) to the level of the isolating material 1108. FIG. 11A shows a structure after the top of the conductive vias 1106 is planarized and polished.

Figure 11B:
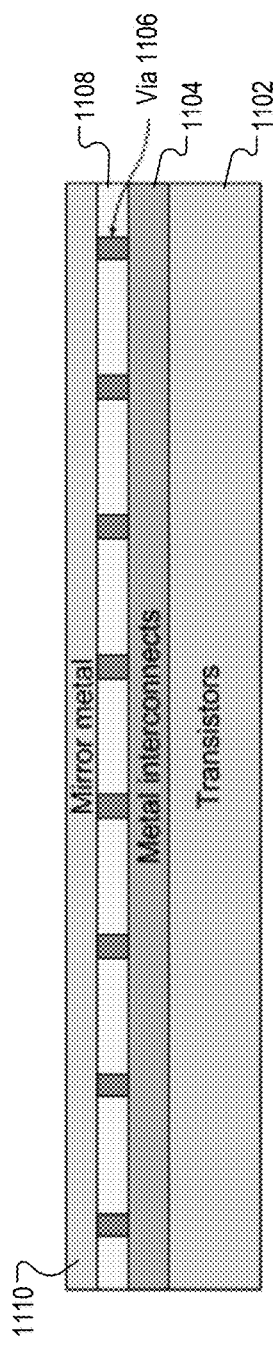

Third, as illustrated in FIG. 11B, a metallic layer 1110 is formed on the structure shown on FIG. 11A, e.g., on top of the conductive vias 1106. The metallic layer 1110 can be configured to be a reflective mirror. In some examples, the metallic layer 1110 is made of aluminum (Al).

Figure 11C:
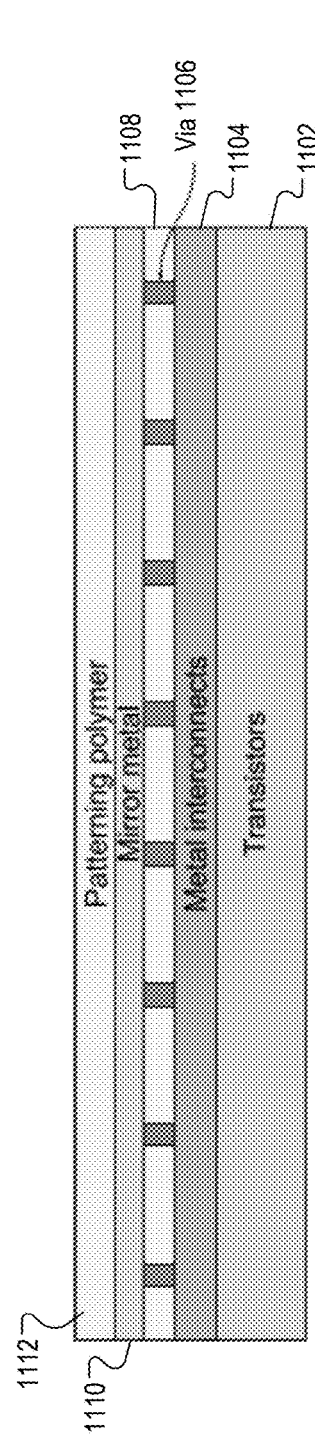

Fourth, as illustrated in FIG. 11C, a polymer layer 1112 is formed on top of the metallic layer 1110, e.g., by spin coating or deposition.

Figure 11D:
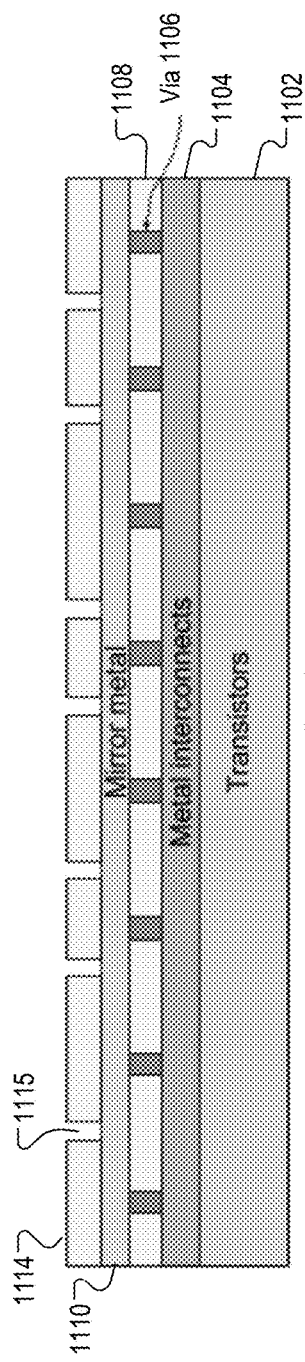

Fifth, as illustrated in FIG. 11D, the polymer layer 1112, e.g., photoresist, is patterned into individual polymer portions 1114 according to the profile for the irregular display. The individual polymer portions 1114 are separated by gaps 1115. The profile of the irregular display includes a plurality of shapes each representing a respective phasel of the irregular display, e.g., as illustrated in FIG. 9J, and can satisfy the one or more disclosed criteria. The plurality of shapes form an irregular pattern (e.g., Voronoi pattern or HOLOCHROME® pattern). Each portion 1114 has a respective shape of the plurality of shapes and corresponds to a respective phasel. The plurality of shapes (or the pattern) can be aligned to the conductive vias 1106, such that each shape one to one corresponds to a respective conductive via 1106 and each individual polymer portion 1114 is formed on top of the respective conductive via 1106. In some implementations, two or more conductive vias 1106 are coupled to a corresponding individual polymer portion 1114 that can have an irregular shape of the plurality of shapes for the irregular display.

The polymer layer 1112 can be patterned into the individual polymer portions 1114 using one or more semiconductor fabrication techniques, such as photolithography (e.g., using a photo-sensitive layer as the polymer layer 1112), Ebeam lithography (e.g., using an Ebeam-sensitive polymer as the polymer layer 1112), or Nano-imprinting lithography (e.g., using a polymer that is UV or heat curable as the polymer layer 1112).

Figure 11E:
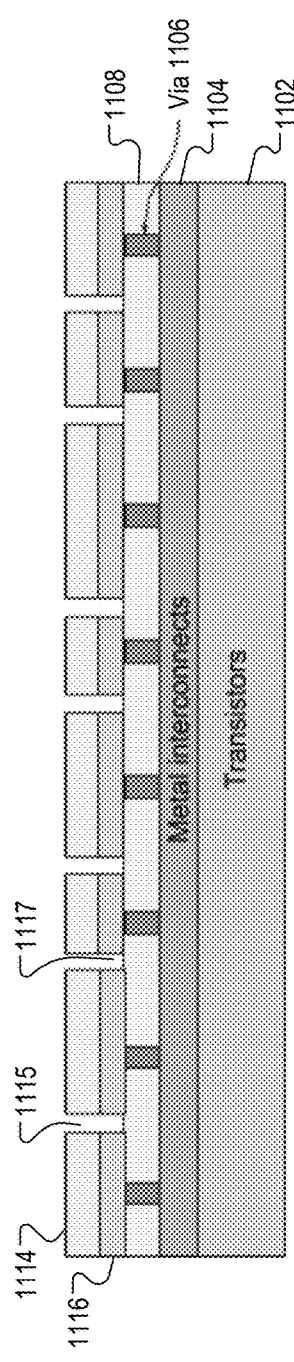

Sixth, the pattern of the individual polymer portions 1114 is transferred from the individual polymer portions 1114 to the metallic layer 1110 to form individual metallic electrodes 1116 that are separated by gaps 1117. Thus, as illustrated in FIG. 11E, each of the individual metallic electrodes 1116 has a same shape as that of a corresponding individual polymer portion 1114 on top of the individual metallic electrode 1116. Accordingly, the metallic electrodes 1116 form a same irregular pattern as the pattern of the individual polymer portions 1114, corresponding to the profile of the irregular display. The pattern transfer can be performed by one or more techniques such as etching, lift-off, or electroplating or electroless plating.

Figure 11F:
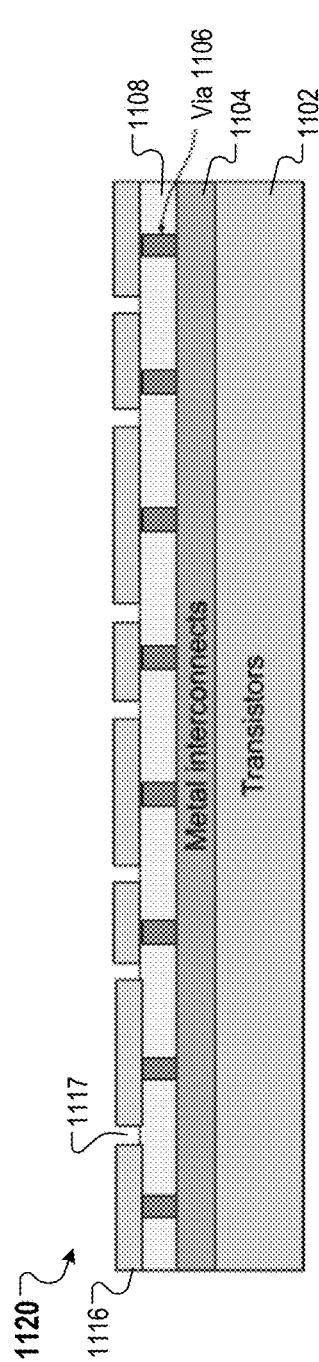

Seventh, the individual polymer portions 1114 are removed from the metallic electrodes 1116, e.g., by plasma cleaning or ashing, which forms a structure 1120 as illustrated in FIG. 11F.

The process for fabricating the irregular display can further include one or more additional steps. For example, the gaps 1117 between the metallic electrodes 1116 can be filled with an isolating material (e.g., the isolating material 1016). In such a way, the structure 1120 with the filled isolating material can be formed as a display backplane for the irregular display (e.g., the display backplane 1020 of FIG. 10A).

In some implementations, the irregular display includes multiple pairs of layers of conductive vias and metallic electrodes. For example, the irregular display includes two pairs of layers of conductive vias and metallic electrodes, e.g., as illustrated in the display 1050 of FIG. 10B, the process can further include: after obtaining the structure 1120, forming a second layer of conductive vias on the metallic electrodes 1116 and forming a second layer of metallic electrodes on the second layer of conductive vias.

To fabricate the irregular display, the process can further include: forming a first alignment layer (e.g., the first alignment layer 1022 of FIG. 10A) on top of the plurality of metallic electrodes 1116; forming separate spacers (e.g., the spacers 1026 of FIG. 10A) on the first alignment layer; forming a liquid crystal layer (e.g., the liquid crystal layer 1030 of FIG. 10A) on the first alignment layer; forming a second alignment layer (e.g., the second alignment layer 1024 of FIG. 10A) on top of the plurality of the liquid crystal layer and the separate spacers; and forming a transparent conductive layer (e.g., the transparent conductive layer 1032 of FIG. 10A) on top of the second alignment layer as a common electrode. A cover (e.g., the cover 1034 of FIG. 10A) can be further formed on top of the transparent conductive layer to form the irregular display.

In some implementations, fabricating relatively large irregular devices, e.g., more than 100 million pixels, is desired. When fabricating relatively large devices, the importance of precise and accurate alignment of multiple panels of phasels increases. For example, the tolerance for a regular display can be 2 microns, while the tolerance for an irregular display as described above can be about 500 nm.

Figure 12A:
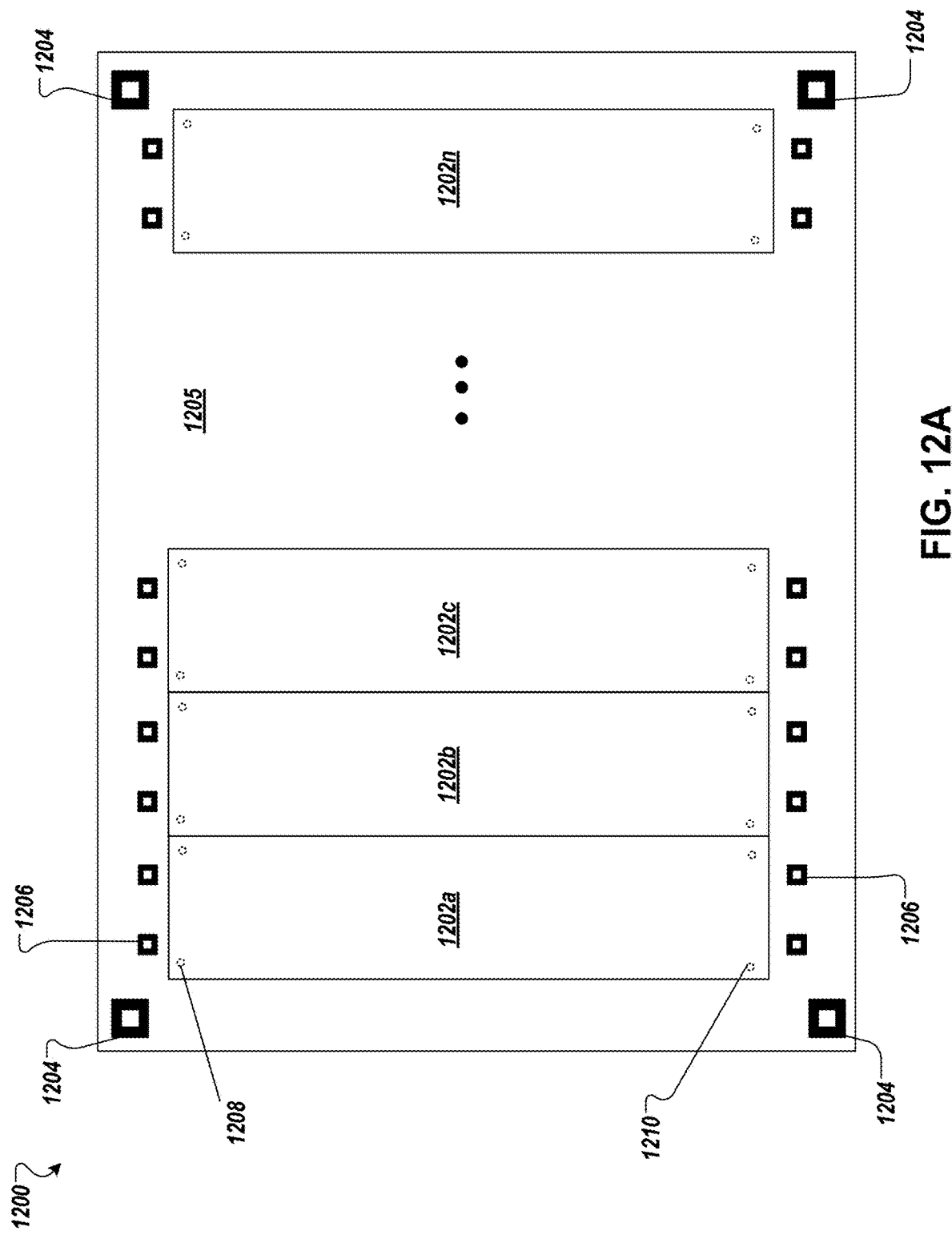
FIG. 12A depicts a chip including a plurality of panels and alignment markers.

FIG. 12A depicts a chip 1200 including a plurality of panels and alignment markers. The chip 1200 can be used for forming a display. As illustrated in FIG. 12A, the chip 1200 includes multiple panels 1202a, 1202b, 1202c, . . . 1202n (referred to generally as panels 1202 and individually as panel 1202) and alignment markers 1204 in the corners, e.g., peripheral to the panels 1202, of the chip 1200. The panels 1202 are adjacently arranged on a backplane 1205 of the chip 1200, and each panel 1202 includes a plurality of elements to be patterned. Each panel 1202 can have four respective alignment markers 1206, e.g., two alignment markers above and two alignment markers below. In some implementations, each panel 1202 is about 5 mm wide.

First alignment beams can be used to align the chip 1200 using the alignment markers 1204, which is on a peripheral area of the elements within the panels 1202. Then, for further accuracy, second alignment beams can be used to align the chip 1200 using the alignment markers 1206 for each panel 1202. The alignment markers 1206 can have a fixed distance relative to centers of conductive vias in the backplane 1205.

With reference to FIGS. 11C and 11D, after a patterning polymer, e.g., a photoresist or electron beam sensitive polymer, has been deposited on vias 1106 and before the polymer has been patterned, a patterning beam, e.g., an electron beam or an optical beam, can be aligned with the positions of vias 1216 on the backplane 1205 using the alignment markers 1204 or 1206, which can be around the periphery of the panels of a polymer layer.

Figure 12B:
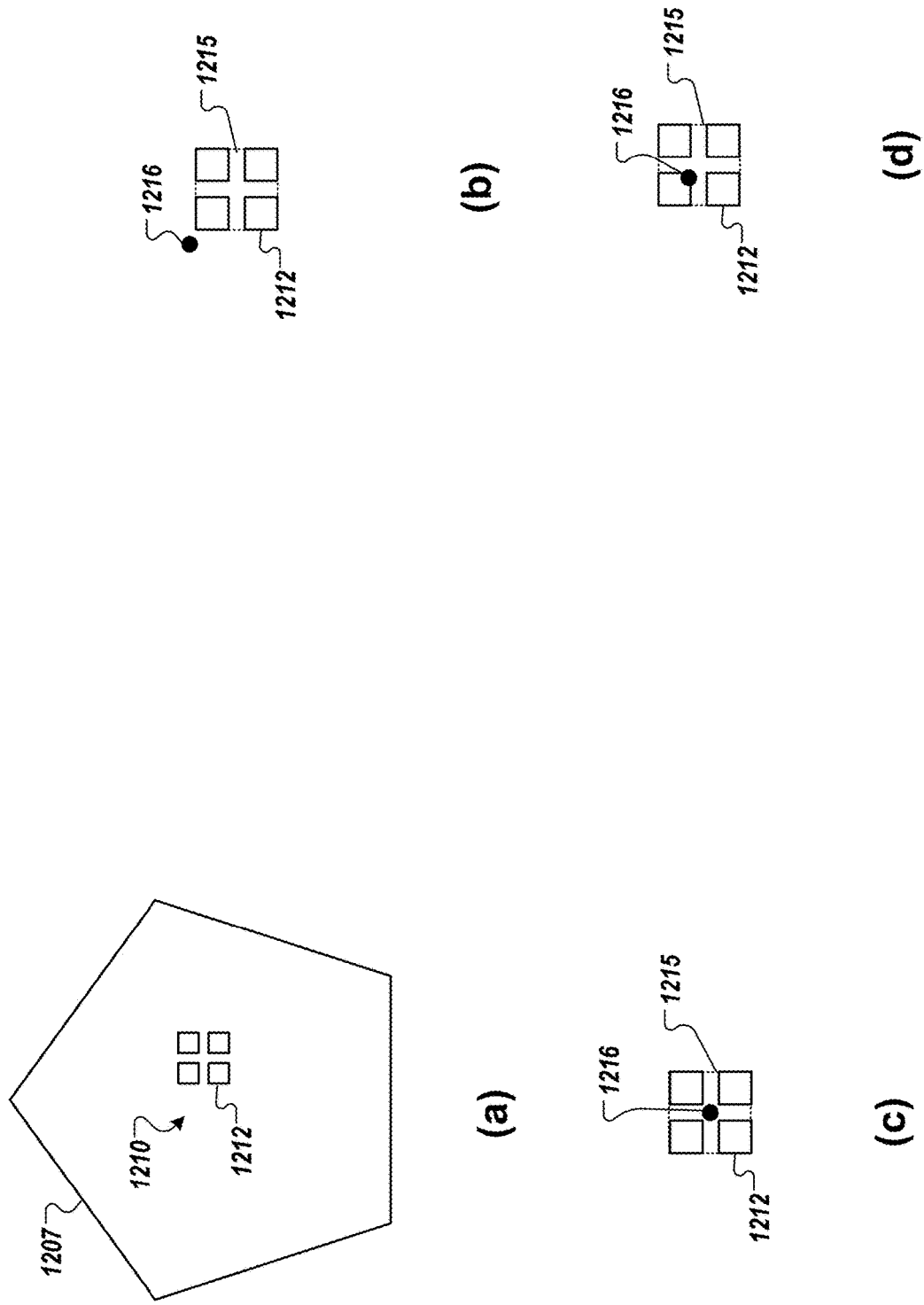
FIG. 12B depicts a testing pattern and examples of alignment using the testing pattern.

After disposing a layer of resist, to ensure alignment of the vias relative to the phasels, each panel 1202 can include testing patterns 1210. FIG. 12B depicts a testing pattern and examples of alignment using the testing pattern. Part (a) depicts a testing pattern 1210 formed in an element 1207, e.g., a phasel, which includes multiple shapes 1212, e.g., four squares arranged in a grid. In some implementations, the testing pattern 1210 is formed in the same manner the shapes of the elements 1207 are, e.g., via electron beam or optical beam patterning, and at the same time as forming the shapes of the elements 1207. The shapes 1212 are arranged within a region 1215, which can have a size determined by a tolerance distance for the vias 1216. For example, the tolerance distance can be based on a radius of the via 1216, e.g., 450 nm to 500 nm, a fabrication tolerance, e.g., precision of an electron or optical beam, a gap between adjacent metallic electrodes, or a combination thereof.

When the location of the via 1216 is within an outline of the region 1215 including the shapes 1212, the via 1216 is determined to be aligned within a tolerance relative to an element, e.g., a phasel. For example, in part (b), the via 1216 is located outside of the region 1215, so the via 1216 is not aligned, and the patterning beam will not be aligned with the position of the via 1216. Rather, alignment using either one or both of alignment markers 1204 and 1206 can repeat.

In part (c), the via 1216, e.g., a target via, is located inside of the region 1215, so the region 1215 is aligned, and the patterning beam can be determined to be aligned with the position of the via 1216. In response to determining that the patterning beam is aligned with the position of the via 1216, the process can continue from FIG. 11C to FIG. 11D, e.g., forming the elements.

In some implementations, forming the elements 1207 includes forming the elements 1207 on the backplane 1205 based on a profile of an irregular device, e.g., an irregular display 1000 of FIG. 10A or 1050 of FIG. 10B. For example, the profile of the irregular device can be design according to FIG. 9C or 9D-1 and include information about a plurality of shapes each corresponding to a respective metallic electrode. In some implementations, a position relationship between a corresponding metallic electrode (not depicted in FIG. 12A) and the corresponding via 1216, e.g., a distance, is determined based on this information.

In some implementations, the elements 1207 can be distributed into panels 1202 that are adjacently arranged on the backplane 1205. Then, for each panel 1202, the patterning beam can aligned with the positions of the vias 1216 in the panel 1202. Then corresponding metal electrodes (not depicted in FIG. 12A) can be formed in the panel 1202, e.g., as illustrated in FIGS. 11D-11F.

In some implementations, the threshold for how well the via 1216 is aligned to continue forming phasels can vary. For example, part (c) depicts perfect alignment, e.g., the via 1216 is located in the center of the region 1215 (between the four shapes 1212). In some cases, slightly imperfect alignment can be also acceptable to proceed with forming the phasels. For example, part (d) depicts imperfect alignment, e.g., the via 1216 is located within the region 1215, but not centered in the region 1215 (partially overlapping with one of the shapes 1212).

8. Integrated Circuit Design

FIGS. 13A and 13B depict examples of displays 1300A and 1300B, respectively. FIG. 13A depicts a display with peripheral row scanners, and FIG. 13B depicts a display with embedded row scanners. Each of displays 1300A and 1300B includes panels 1302, row scanners 1304, analog circuits 1306, e.g., digital to analog converters (DACs) and drivers 1306, and digital circuits 1308. The DACs/Drivers 1306 are arranged in columns. The digital circuits 1308 can be configured to receive and demultiplex digital, mixed signals received from off-chip. In some implementations, these digital signals include information about a phase for a corresponding element within the display 1300. The combination of the DACs/drivers 1306 and the row scanners 1304 can be referred to as a control circuitry 1305 (see dashed box), e.g., a control circuit, of the display 1300A or 1300B. In the present disclosure, a panel refers to an array of elements where each element is connected to the same row scanner and driver.

Each of the panels 1302 can include multiple elements, e.g., phasels or pixels, and can be independently controlled by corresponding digital circuits 1308 and analog circuits 1306. The multiple elements can form an irregular pattern as described above. As discussed with further details below, by implementing the embedded row scanners as shown in FIG. 13B, there is no restriction of row scanners along a horizontal direction, and the panels 1302 can extend towards along a horizontal direction, e.g., ideally infinitely. Accordingly, a number of panels 1302 can be combined together to form a display with a large number of elements. As an example, a display with 330 million phasels can be formed by the cumulative panels 1302 in an area of 50 mm high (along the vertical direction) by 100 mm long (along the horizontal direction). In some implementations, a row of phasels in each panel 1302 can include 1600 phasels. A row 1316 can be divided into subgroups, each subgroup including tens of elements, e.g., 64 phasels. Each subgroup can have at least one DAC, which can enable parallel processing.

To further increase the area of the display, the restriction along the vertical direction by the digital circuits 1308 and the analog circuits 1306 can be further removed, e.g., by arranging the digital circuits 1308 and the analog circuits 1306 vertically under the panels 1302. In such a way, the panels 1302 can extend in both dimensions (horizontal direction and vertical direction), e.g., ideally infinitely, to form an even larger display.

FIG. 13C depicts a multilayer device 1300C with an array of elements. The device 1300C includes a first integrated structure 1330 including a plurality of elements 1313 extending in rows 1316 along a horizontal direction and in columns 1318 along a vertical direction perpendicular to the horizontal direction, e.g., an array 1310 of elements 1313. The device 1300C also includes a second integrated structure 1320 including control circuits 1322 for the plurality of elements 1313. The first integrated structure 1330 and the second integrated structure 1320 can be stacked together along a depth direction perpendicular to the horizontal direction and the vertical direction. In some implementations, the plurality of elements 1313 form an irregular pattern. Although the element 1313 shows a square shape in FIG. 13C, the element 1313 can have an irregular shape, as discussed before. The elements 1313 can have an irregular polygon shape. The elements 1313 can be arranged in an irregular pattern, e.g., a Voronoi pattern. Adjacent elements 1313 can have different shapes, e.g., an irregular polygon and an irregular hexagon.

In some implementations, the first integrated structure 1330 includes a plurality of driving circuits (as described in reference to FIG. 14A), each of the plurality of driving circuits being coupled to a respective element 1313 of the elements in the array 1310. The driving circuit can be a driving circuit as described in FIG. 14B or a driving circuit as described in FIG. 15A. The device 1300C can include a common electrode (e.g., 1032 of FIG. 10A or 10B) and each of the elements 1313 can have a respective metallic electrode.

In some implementations, aspects of the displays 1300A, 1300B, and 1300C can be combined. For example, the control circuits 1322 of device 1300C can include digital circuits configured to receive digital data for modulating the plurality of elements, analog circuits each that can include one or more digital-analog-converter (DAC)s coupled to a corresponding digital circuit and configured to convert corresponding digital data into corresponding analog voltage signals, and one or more drivers coupled to corresponding driving circuits and configured to drive each of the analog voltage signals to a respective driving circuit of the corresponding driving circuits to modulate a corresponding element of the plurality of elements.

In some implementations, the first integrated structure 1330 and the second integrated structure 1320 are integrated together by bonding. For example, the bonding direct bonding, hybrid bonding, or a combination thereof.

Based on the arrangement of the row scanners, the elements 1313 can be organized into panels that extend in both the horizontal and vertical direction, e.g., the panels can be stacked in both the horizontal and vertical direction. As a result, the display size can extend to cover large surface areas. In some implementations, a row 1316 can include 1600 phasels. A row 1316 can be divided into subgroups, each subgroup including tens of elements, e.g., 64 phasels. Each subgroup can have at least one DAC, which can enable parallel processing.

In some implementations, the control circuitry 1305 includes control circuits 1322 that are stacked together with the driving circuits and the row scanners along the depth direction. In such a way, the control circuitry 1305, the driving circuits, and the row scanners can be formed in a single device.

During operation of displays 1300A and 1300B, the digital circuits 1308 receive and demultiplex signals. The signals can be received for each refresh with two successive inversion fields. By being demultiplexed, the signals are directed toward individual columns 1318 of the display. The row scanners 1304 successively select different rows 1316 of each panel 1302.

In display 1300A, the row scanners 1304 and DACs/drivers 1306 are disposed in a peripheral area the panels 1302, e.g., the control circuitry 1305 are arranged opposite sides (along the horizontal direction) in the DACs/drivers 1306 on opposite sides, e.g., above and below (along the vertical direction). The row scanners 1304 being disposed on both sides of the array of panels 1302 and the DACs/drivers 1306 being disposed above and below the array of panels 1302 increases the refresh rate of the display 1300A by reducing the horizontal distance that the row scanners 1304 process. For example, a first control circuit is adjacent to and coupled to first driving circuits in a first panel (an upper panel), and a second control circuit is adjacent to and coupled to the plurality of second driving circuits in a second panel (a lower panel).

Figure 14A:
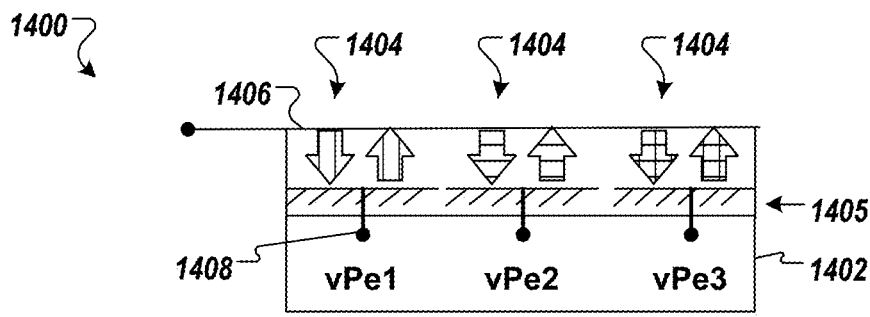
FIG. 14A is a schematic of a phase modulating device.

FIG. 14A is a schematic of a phase modulating device. A device 1400 can have a backplane layer 1402 supporting an array of elements 1404, e.g., phasels. Device 1400 includes a birefringent layer 1405, e.g., liquid crystal, between a common electrode 1406 and element electrodes 1408, e.g., metallic electrodes isolated from each other, which are electrically coupled to respective elements 1404. For example, the common electrode 1406 can be an off-chip (e.g., external to the panels) indium tin oxide (ITO) transparent conductor, and the element electrodes 1408 can include mirrors.

The common electrode 1406 applies a voltage vITO, and the element electrodes can each apply a unique voltage, e.g., vPe1, vPe2, and vPe3. By creating a potential difference within the birefringent layer 1405, the refractive indices in the birefringent layer 1405 are changed via the electro-optic effect, which causes modulation of the phase of light. Accordingly, the phase for each element 1404 is different, as indicated by the different patterns filling the arrows pointing up and down.

Figure 14B:
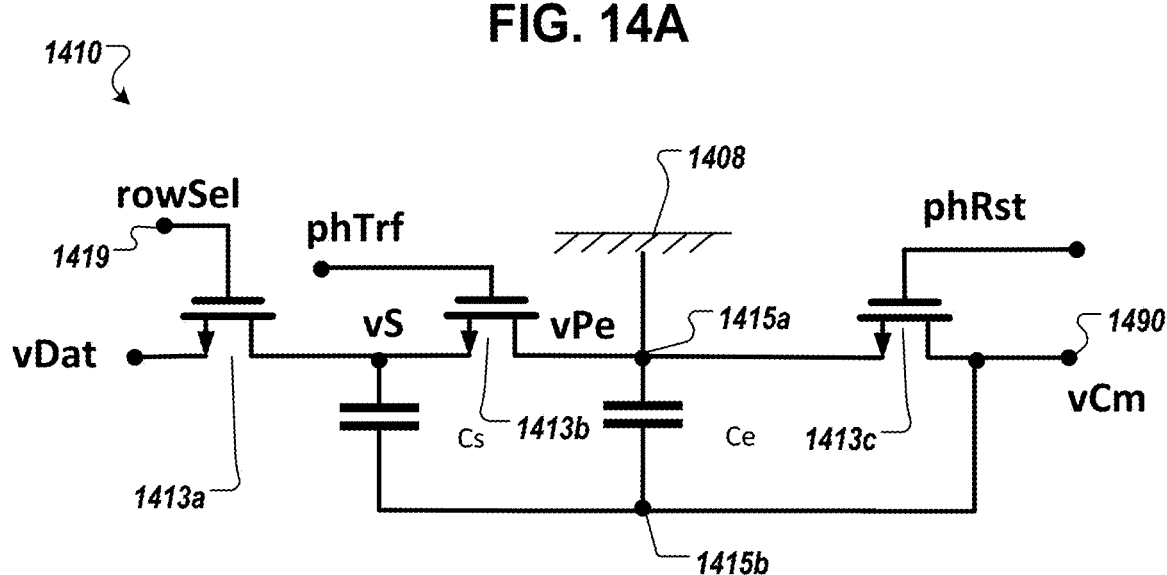
FIG. 14B depicts a driving circuit diagram.

FIG. 14B depicts a driving circuit 1410 coupled to one of the element electrodes 1408. Each element electrode 1408 is coupled to a respective driving circuit 1410. In other words, the output of the driving circuit 1410 determines the voltage vPex, where x=1, 2, 3, . . . , n. The driving circuit 1410 includes a selection switch 1413a, a transfer switch 1413b, and reset switch 1413c, e.g., NMOS or PMOS based switch, coupled in series.

Figure 14C:
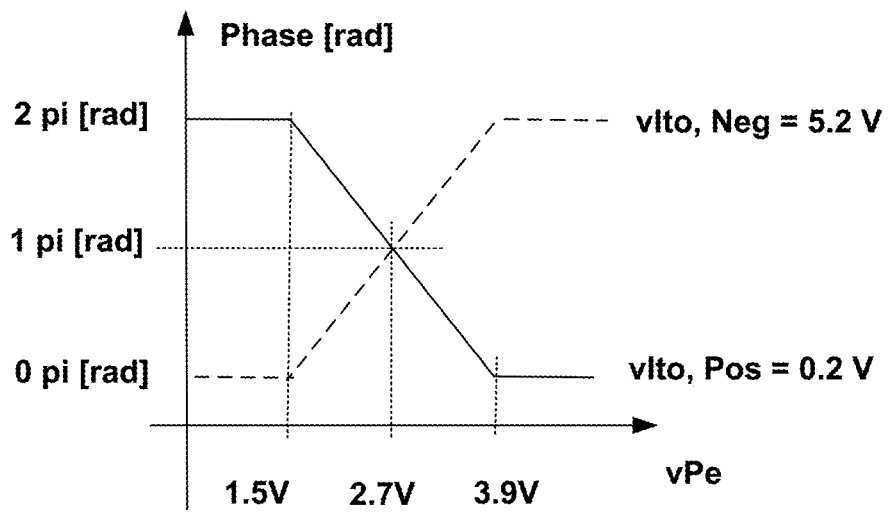
FIG. 14C depicts a plot of scanning through voltages to modulate a phase in the driving circuit of FIG. 14B.

FIG. 14C depicts a plot of scanning through voltages to modulate a phase in the driving circuit of FIG. 14B. The phase is modulated in an analog manner. When the birefringent layer 1505 is liquid crystal, the electric field is inverted to complete a full cycle through the phase values, e.g., 0 to $2\pi$. For example, for each element, half of the refresh time occurs at a positive value for the voltage (vPe−vITO>0) in the other half of the time occurs at a negative value for the voltage (vPe−vITO<0). To avoid a large voltage range when scanning through the voltages, the positive field vITO can be set to a lower value, e.g., vITO=0.2 V, and the negative field vITO can be set to a higher value, e.g., vITO=5.2 V. Accordingly, in this example, the voltage range for scanning for vPe is only 2.4 V, e.g., 3.9 V−1.5 V.

The driving circuit 1410 includes two capacitors Cs and Ce. The capacitor Ce is connected to the element electrode 1408, e.g., having a voltage of vPex at one terminal, and drives the birefringent layer. A first terminal 1415a of capacitor Ce coupled between the transfer switch 1413b and the reset switch 1413c, a second terminal 1415b of the capacitor Ce is coupled to the second input 1490 providing voltage vCm, and the first terminal 1415a of the capacitor Ce is coupled to an element electrode 1408 of a corresponding element associated with the driving circuit 1410. A second terminal 1415b of the capacitor Ce is coupled to an output 1490 of the driving circuit 1410.

The capacitor Cs samples the next value for the display, e.g., a future time step. The voltage swing on the birefringent layer can be determined by the capacitances of Cs and Ce and the voltage difference of an input voltage vDat, which is the voltage coming from the driver, e.g., DACs/drivers 1306. The row selector (rowSel) 1419 selects a row 1316 of the panel 1302 through corresponding driving circuits coupled to the row.

Advantageously, the arrangement of display 1300B can improve the operating speed of the display. In display 1300B, instead of being disposed outside of the array of panels 1302, one or more row scanners 1304 are embedded within an individual panel 1302 (see outline of panel 1302 in dashed box). For this reason, the row scanners 1304 of FIG. 13B are referred to as "embedded" row scanners. In display 1300B, the row scanners 1304 are coupled to elements that are coupled to corresponding driving circuits in panels 1302, the coupled elements in the rows arranged in both the positive and negative horizontal directions.

In some implementations, a row 1316 of elements in the panels 1302 extends along a horizontal direction, and a column 1318 of elements extends along a vertical direction perpendicular to the horizontal direction. There can be at least first and second row scanners 1304a and 1304b, where the first row scanner 1304a is coupled to a first plurality of elements coupled to a plurality of first driving circuits in a first panel 1302a, and the second row scanner 1304b is coupled to a second plurality of elements coupled to a plurality of second driving circuits in a second panel 1302b. The first panel 1302a and the second panel 1302b are arranged along the vertical direction.

Figures 1, 14D:
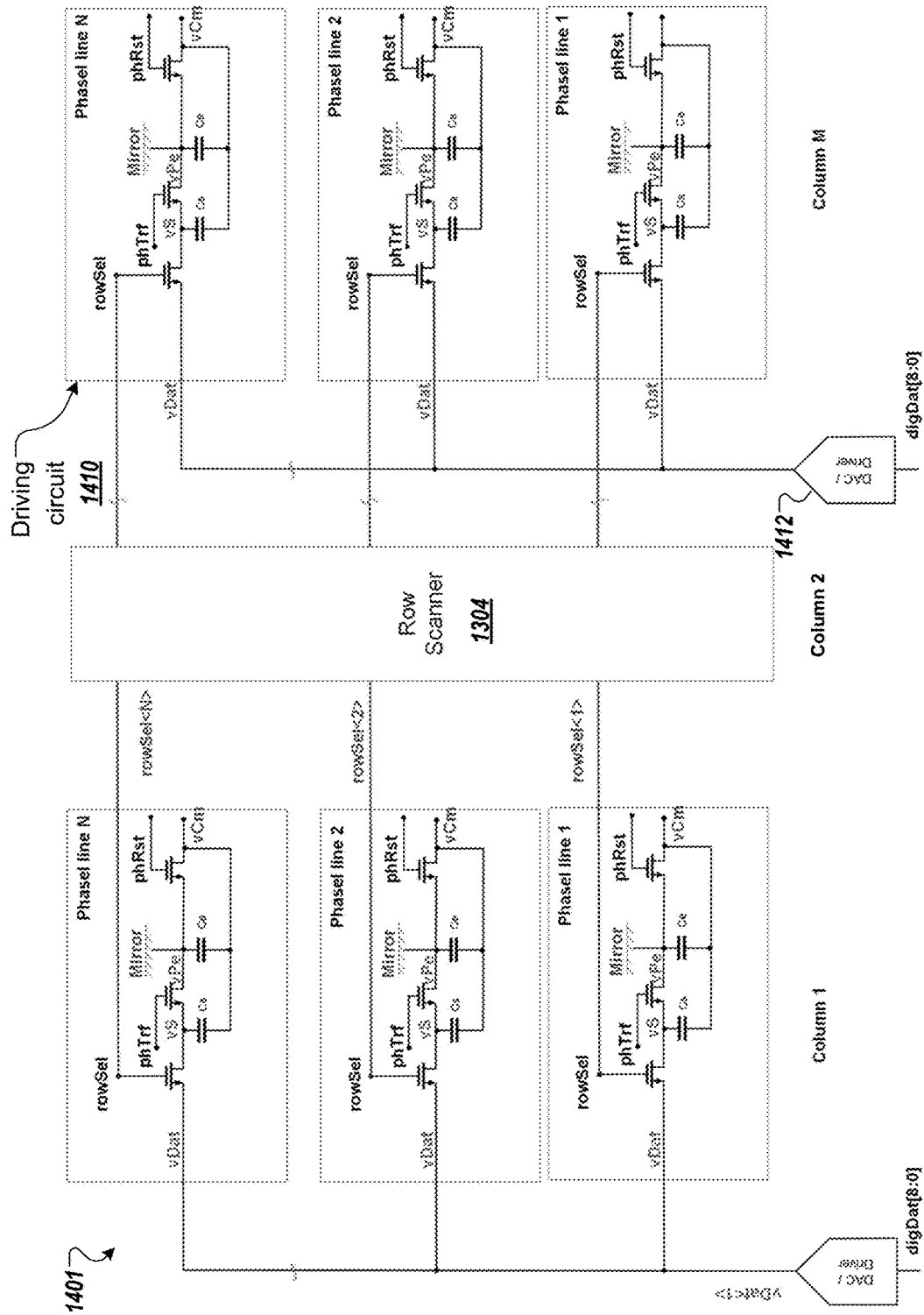
Figures 2, 14D:
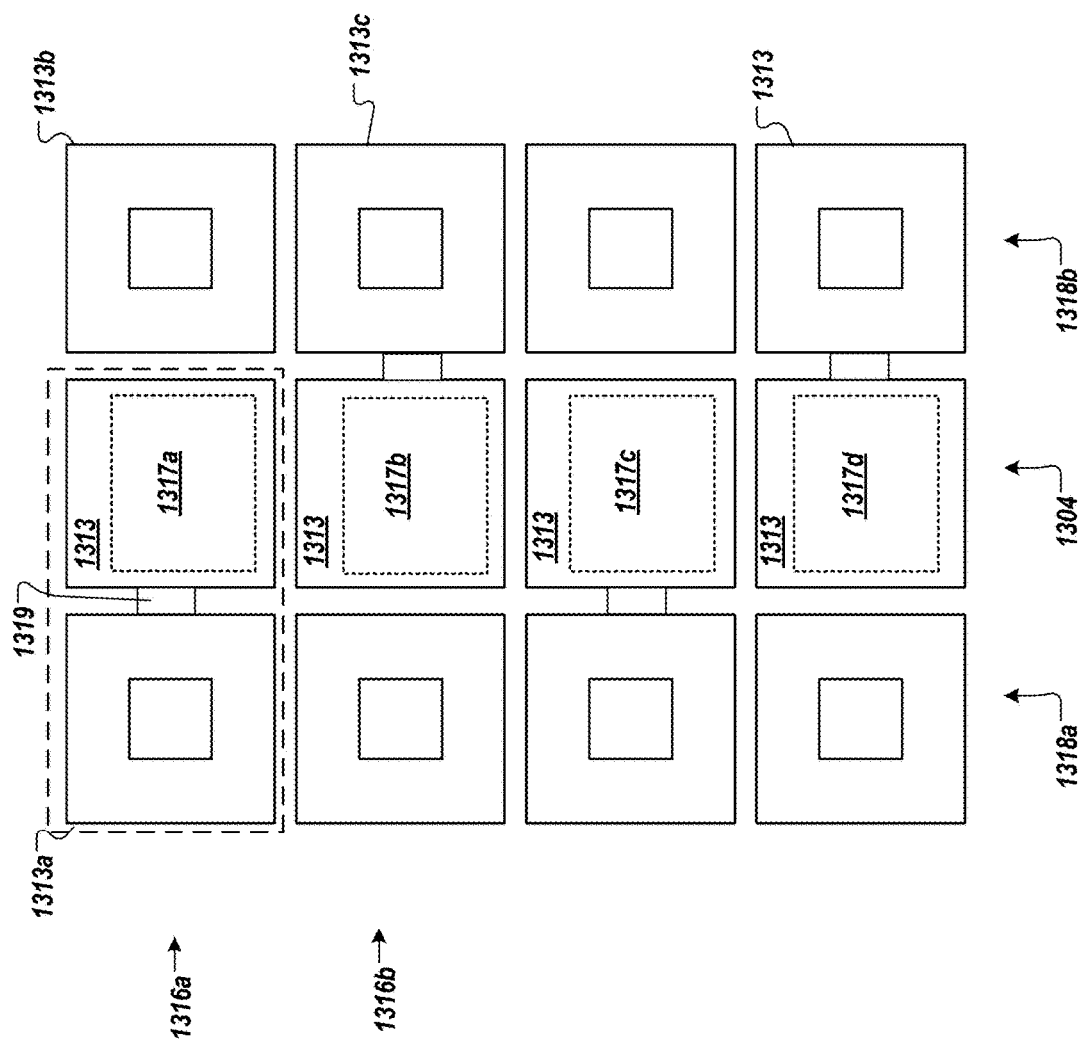

FIG. 14D-1 depicts a system 1401 including multiple driving circuits 1410 coupled to respective elements within a device. As discussed in FIG. 14D-3, a row scanner 1304 can include a number of row selectors. Each row selector (rowSel) is coupled to a respective row of individual driving circuits 1410, e.g., element line 1 through n. In some implementations, the row selector is a shift register with flip-flop or latch and optionally an output driver. The input voltage vDat is fed from a driver 1412, when there is one driver 1412 per column. The arrangement of the row scanner 1304 in FIG. 14D-1 corresponds to the arrangement of FIG. 13B, where the row scanner 1304 is embedded between adjacent columns of the elements.

FIG. 14D-2 depicts a schematic of an embedded row scanner between columns of elements. When the row scanner 1304 is embedded between adjacent columns 1318a and 1318b of elements 1313 (referred to generally as adjacent columns 1318 and individually as adjacent column 1318), the adjacent columns 1318a and 1318b of elements 1313 are no longer actually proximate to each other. Rather, a row selector of the row scanner is between each pair of adjacent elements 1313a and 1313b. The row selector can be, e.g., row selector 1317a, 1371b, 1371c, or 1317d (referred to generally as row selectors 1317 and individually as row selector 1317). The row selector 1317 of FIG. 14D-2 is configured to select a corresponding row of elements through corresponding driving circuits 1410 coupled to the corresponding row of elements.

In some implementations, the row scanner 1304 is disposed on the same layer, e.g., at the same depth, of the elements and their respective driving circuit 1410. In some implementations, the row scanner 1304 is disposed below the elements, e.g., the elements of a display, includes a column of elements arranged on (e.g., above) a series of row selectors of the row scanner. The column of elements is between the two adjacent columns of elements. The column of elements can be, e.g., metallic electrodes. However, each element of the column of elements over the row selector is not driven by its own driving circuit that determines the phase. Instead, elements over the row selector 1317 can be considered as dummy elements.

The column of elements over the row selector 1317 can be coupled to adjacent columns 1318 of the elements 1313. For example, an element over the row selector 1317a is coupled to an element 1313a in column 1318a via coupling, e.g., conductively connecting metallic electrodes of the element over the row selector 1317a and the element 1313a via a conductor 1319. Accordingly, the phase of the element over the row selector 1317a is determined by the phase of the element 1313a. The element over the row selector 1317a can be mirror-coated just as the elements 1313a and 1313b are, so effectively element 1313a and element over the row selector 1317a can form a super element (see dashed box) that has about twice the surface area of other elements, e.g., element 1313b in that row.

In some implementations, the elements over the row selectors 1317 of the row scanner 1304 are connected in alternance relative to adjacent columns 1318 of the elements 1313. For example, in the first row 1316a, the element over the row selector 1317a of the row scanner 1304 is coupled to the element 1313a in neighboring column 1318a. In the next row 1316b, the element over the row selector 1317b is coupled to element 1313c of the neighboring column 1318b. This pattern can continue for all of the row selectors 1317 of the row scanner 1304. Coupling the elements over the row selectors 1317 of the row scanner 1304 alternating relative to the adjacent columns 1318 of the elements 1313 can be beneficial for the quality of the display. For example, because each element over the row selector 1317 of the row scanner 1304 has the same phase as its coupled element 1313, the super element having twice the surface area of other elements 1313, but only a single phase, is less visually apparent when the super elements alternate in location, e.g., instead of having a fixed center. This is because the phase rather than the intensity of the elements 1313 are being modulated, which can only reduce the resolution of the resulting hologram, rather than change the form of the hologram.

In some implementations, the column of elements over the row selectors 1317 of the row scanner 1304 can be connected to a driver that sets a fixed value for the elements or randomly determines the value for every refresh.

Figures 3, 14D:
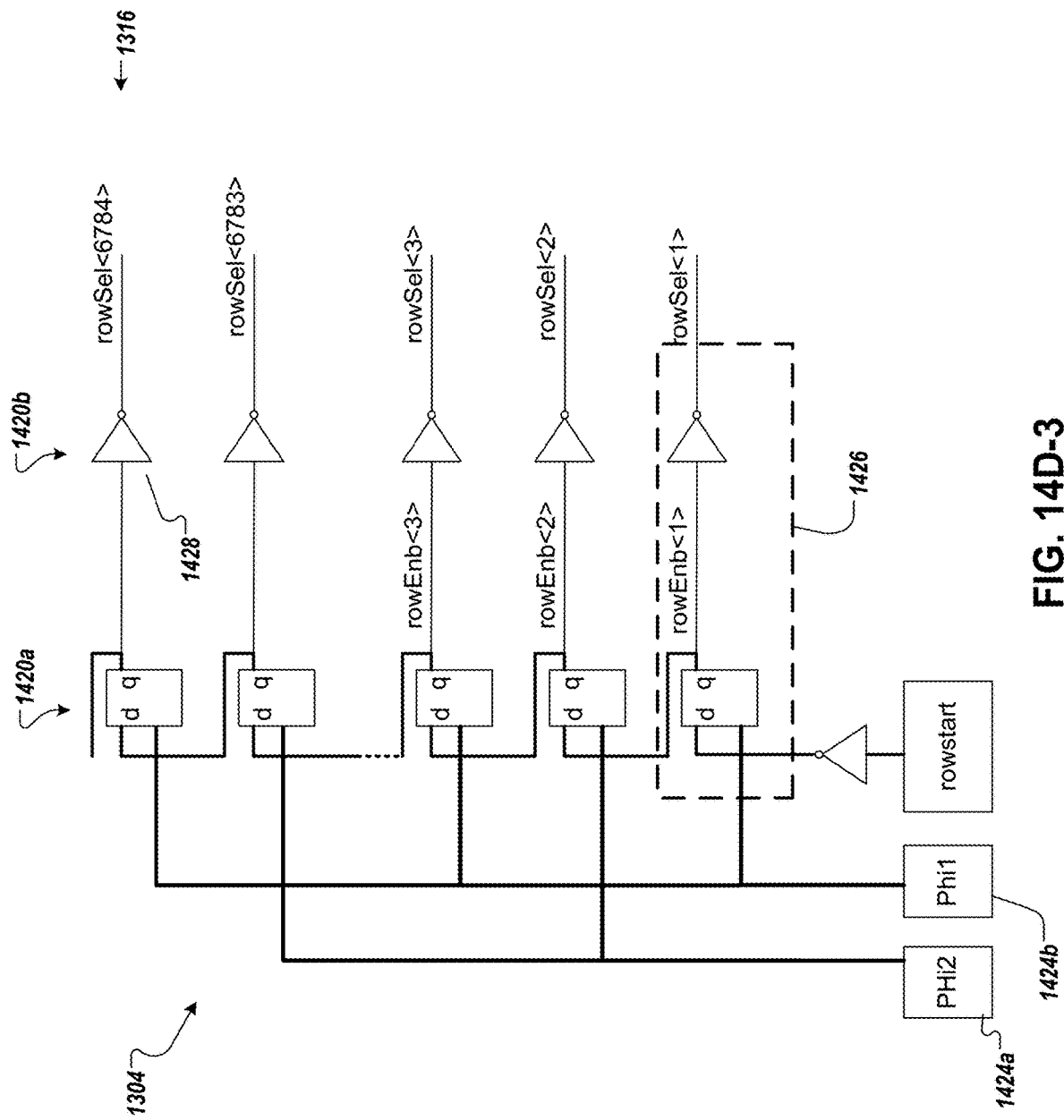

FIG. 14D-3 depicts a circuit diagram of a row scanner 1304. A first column 1420a includes a shift register 1422, e.g., including a dynamic latch to save space. The shift registers 1422 are alternatingly connected to different non-overlapping clocks 1424a and 1424b, e.g., one row of the row selector 1426 (see dashed box) is connected to clock 1424a and another, adjacent row is connected to clock 1424b.

The second column 1420b includes an inverter 1428. The inverter 1428 can be configured to drive rowSel lines with fast transition time. The inverter 1428 enables selection of one row 1316 at a time while using a latch for the shift register. The size of the inverter 1428 can be determined for driving the final row rowSel signal, e.g., of row 6784. The distance between columns 1420a and 1420b can be determined by the trade-off between image quality, e.g., a larger distance to discourage crosstalk, and having a small load on the latch, e.g., a smaller distance.

Figure 14E:
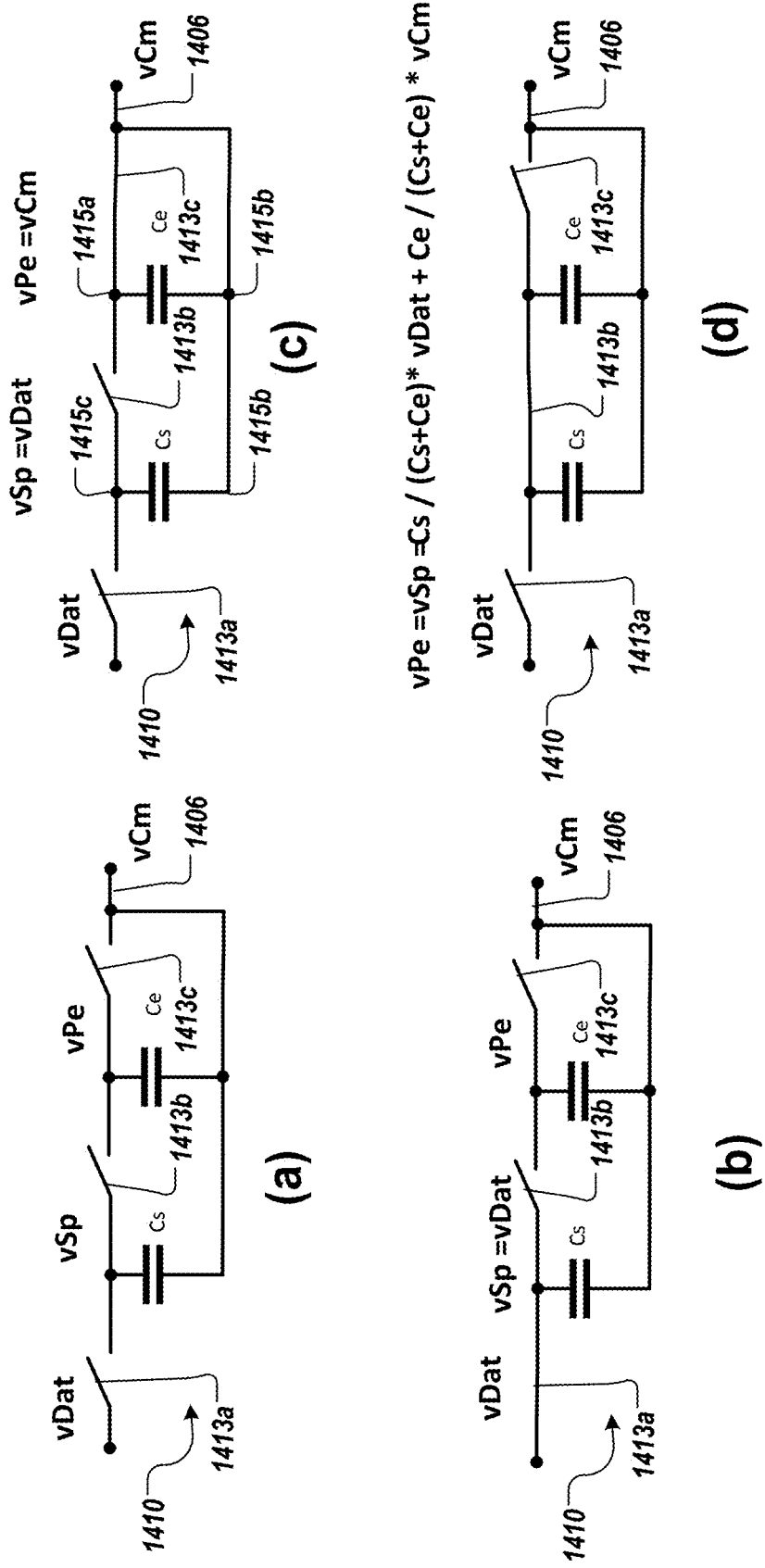
FIG. 14E depicts different states of a subcircuit of the driving circuit of FIG. 14B.
Figure 14F:
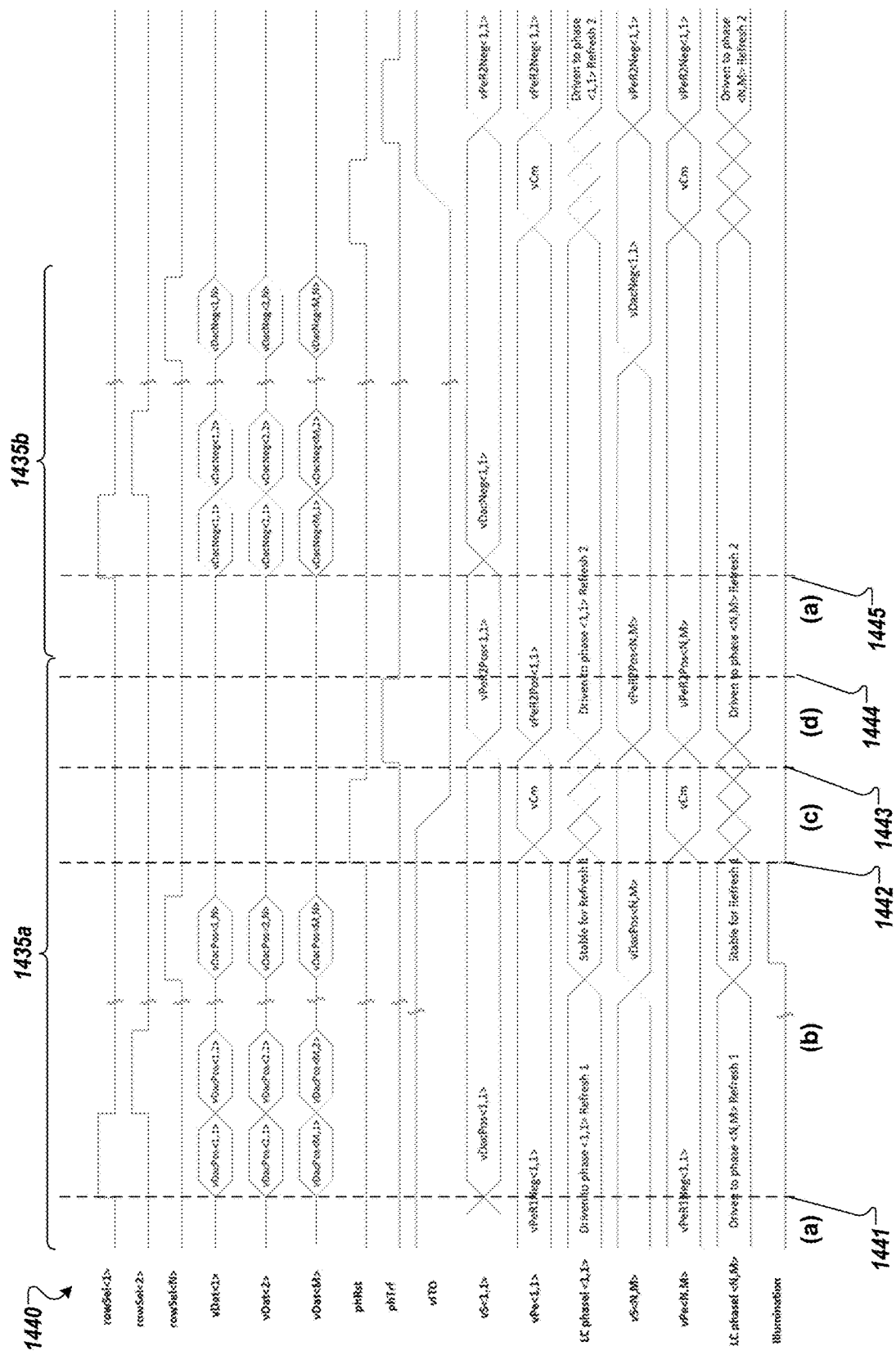
FIG. 14F depicts a timing diagram of voltages in the subcircuit of FIG. 14E.

To provide a quick refresh rate, the driving circuit 1410 can be configured to operate in different states. FIG. 14E depicts different states of a driving circuit 1410 for a corresponding element 1404. FIG. 14F depicts a timing diagram for operating the driving circuit 1410 during the different states. The states of the driving circuit 140 can include waiting state, sampling state, resetting state, and transfer state.

In a waiting state (a), the driving circuit 1410 of the corresponding element 1404, e.g., a phasel, is unselected. The waiting state corresponds to certain switches, e.g., selection switch 1413a, transfer switch 1413b, and reset switch 1413c, of the subcircuit 1430 being open, e.g., off. In the waiting state, the capacitors Cs and Ce are not connected, and no charge transfer is occurring. In the waiting state, the voltages the control row selection, resetting, and charge transfer are zero, e.g., rowSel=phRst=phTrf=0. The waiting state (a) corresponds to a time period before line 1441 in the timing diagram of FIG. 14F.

In sampling state (b), the selection switch 1413a is closed, e.g., on, and the transfer switch 1413b and reset switch 1413c are open. As a result, the phase value for the next field can be determined by sampling capacitor Cs. As a result, the voltage vS is equal to the input voltage vDat supplied from the driver, e.g., driver 1412 of FIG. 14D-1. During the sampling state, the voltages rowSel=1 (arbitrary units), and phRst=phTrf=0. The sampling state (b) corresponds to a time period between lines 1441 and 1442 in the timing diagram of FIG. 14F.

In resetting state (c), the selection switch 1413a and transfer switch 1413b are open and the reset switch 1413c is closed. The voltage vS is equal to the voltage vDat, and now the voltage vPe of the element electrode 1408 is equal to the reset voltage vCm. During the resetting state, phRst=1, and rowSel=phTrf=0. The resetting state (c) corresponds to a time period between lines 1442 and 1443 in the timing diagram of FIG. 14F.

In transfer state (d), the selection switch 1413a and reset switch 1413c are open, and the transfer switch 1413b is closed. As a result, the capacitors Cs and Ce are connected in parallel, and charge transfer can occur. The voltage vPe of the element electrode 1408 is equal to the voltage vSp, both of which are determined by the equation: vPe=vSp=Cs/Cs+Ce*vDat+Ce/Cs+Ce*vCm. The transfer state (d) corresponds to a time period between lines 1443 and 1444 in the timing diagram of FIG. 14F.

FIG. 14F depicts a timing diagram of voltages in the driving circuit 1410 of FIG. 14E. For convenience, the timing diagrams for both capacitors Ce and Cs are depicted at once, e.g., superimposed on each other. The change in the voltages of the various components of the driving circuit 1410 during the four states can be understood through timing diagram 1440, e.g., the x-axis is time. The waiting state (a) corresponds to the time period before dashed line 1441, the sampling state (b) corresponds to the time period between dashed lines 1441 and 1442, the resetting state (c) corresponds to the time period between dashed lines 1442 and 1443, and the transfer state (d) corresponds to the time period between dashed lines 1443 and 1444. The cycle begins again for negative scanning, with a second waiting state (a) corresponding to the time between dashed lines 1444 and 1445.

During the waiting state (a), rowSel, e.g., for an embedded row scanner, e.g., rowSel<1>, rowSel<2>, . . . rowSel<N>, is zero, e.g., turned off. During the sampling state (b), row selectors for one row, e.g., rowSel<1> are turned one at a time, e.g., rowSel is asserted. Similarly, vDat for each column and row, e.g., vDatPos<1,1>, vDat Pos<2, 1>, . . . vDatPos<M,1>, the voltage increases to vDacPos<x, y>, where x=1, 2, . . . M, and y=1, 2, . . . N.

phRst and phTrf are turned off for waiting state (a) and sampling state (b). The voltage vITO is set to a higher voltage, e.g., 5.2 V, during the waiting state (a) and sampling state (b). During the sampling state (b) vS for the first column and first row, e.g., vS<1,1>, turns on and takes some time to stabilize. While writing the sampling value of the next phase on Cs, the value for the previous phase is on Ce, which drives a corresponding element to the stable value, which can take a few microseconds.

Throughout both the waiting (a) and sampling (b) states, the voltage vPe<1,1> of the first column in first row is turned on, e.g., has a value vPeR1Neg<1,1>. For the remaining columns and rows, e.g., 2 through M and 2 through N, vS follows a similar pattern but at different time intervals for each row and column. During the waiting state (a) and sampling state (b), the element 1404, e.g., corresponding to a phasel, is driven to a phase <N,M> for the first refresh (though it takes time stabilize for refresh 1). Toward the end of the sampling state (b), illumination turns on and off. Throughout the sampling state (b), vDat<1> changes from vDacPos<x,1> to vDacPos<x,2>, for x=1 through M. The voltages for the corresponding elements <N,M> stabilize, as do corresponding vS<N,M>. Once all of the Cs values are written, and the illumination of the previous field is done, and a global update proceeds.

During the reset phase (c), the rowSel<1 through N> turn off, and phRst=1, e.g., is turned on. During the reset phase (c), the voltage of the common electrode vITO is set to a low voltage value, e.g., 0.2 V. While vPe is held to the low voltage value, the remaining columns and rows vary. During this time, the voltage for the corresponding element 1404 varies.

During the transfer state (d), phRst is de-asserted, e.g., phRst=0, and phTrf=1, e.g., is turned on. vS for the columns and rows stabilizes to a value vReR2Pos<1 through N, 1 through M>. During the transfer state (d), the next phase value is written to Ce. After the transfer state (d), and a second waiting state (a) each of rowSel, phRst, and phTrf are turned off.

In some implementations, instead of a driving circuit 1410 as described in FIGS. 14A to 14F, a different driving circuit is implemented to drive elements 1404, e.g., as illustrated below in FIGS. 15A to 15F.

Figure 15A:
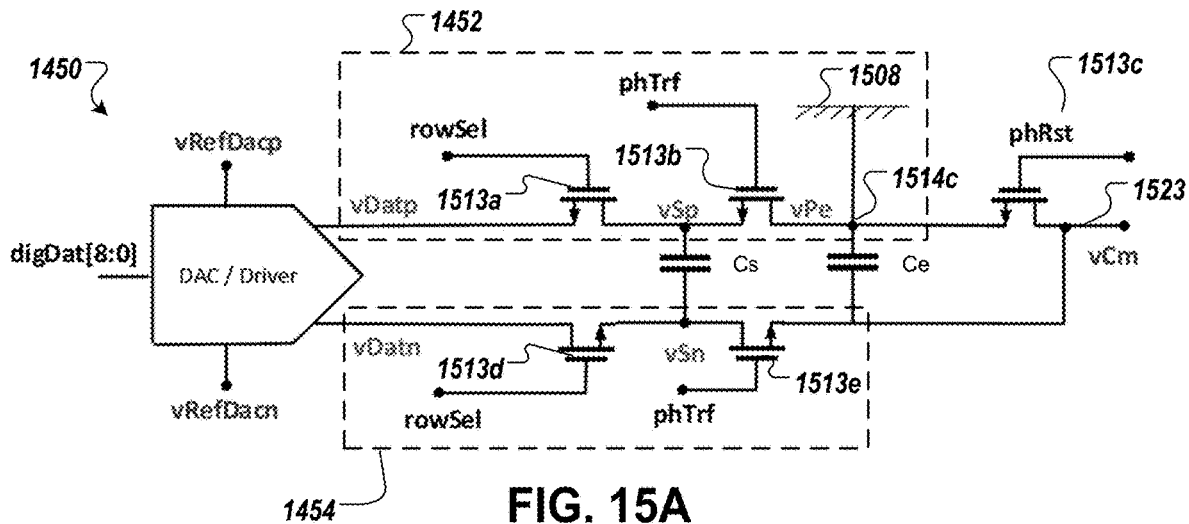
FIG. 15A depicts a differential driving circuit diagram.

FIG. 15A depicts a differential driving circuit 1450. Compared to driving circuit 1410 of FIG. 14B, the input voltage vDat with one input in the driving circuit 1410 is replaced by a differential voltage between vDatp and vDatn with two inputs in the differential driving circuit 1450.

The differential driving circuit 1450 can include an upper portion 1452 and lower portion 1454 (marked by the dashed boxes). The upper portion 1452 can include first selection switch 1513a, first transfer switch 1513b, which can function similarly to selection switch 1413a, transfer switch 1413b. The lower portion 1454 includes a second selection switch 1513d and a second transfer switch 1513e. The driving circuit 1450 can further include a reset switch 1513c, e.g., reset switch 1413c, which can be coupled between the upper portion 1452 an the lower portion 1454. The reset switch 1513c can be also coupled to a third input 1523 of the driving circuit 1450.

The first selection switch 1513a and a first transfer switch 1513b are coupled in series between the input of the first circuit portion 1452 and the upper terminal of the capacitor Cs. The upper terminal of the capacitor Cs is coupled between the first selection switch 1513a and the first transfer switch 1513b. The second selection switch 1513d and the second transfer switch 1513d are coupled in series between the input of the second circuit portion 1454 and the lower terminal of the capacitor Ce, the lower terminal of the capacitor Cs being coupled between the second selection switch 1513d and the second transfer switch 1513e. The reset switch 1513c is coupled between the upper terminal of the capacitor Ce and the lower terminal of the capacitor Ce. The reset switch 1513c is configured to receive a reset signal, e.g., vCm, to reset the voltage at the metallic electrode 1508.

In some implementations, at least one of the first selection switch 1513a, the second selection switch 1513d, the first transfer switch 1513b, the second transfer switch 1513e, or the reset switch 1513c includes a transistor, e.g., n-type metal-oxide-on-semiconductor (NMOS) or p-type metal-oxide-on-semiconductor (PMOS).

Using the differential driving circuit 1450 can have many technical advantages and benefits. For example, there is less loss at the charge transfer state, which demands a large voltage of swing for the DACs/drivers 1306, e.g., a large ΔvDat. In a driving circuit 1410, the capacitance of capacitor Cs can be bigger than the capacitance of Ce, e.g., by a ratio of 3 to 4. By using the differential driving circuit 1450, the capacitance of Cs can be only about twice that of the capacitance of Ce, e.g., generally Cs>Ce. Because the column receiving input voltage vDat is large, e.g., couples to thousands of rows, the transition during the sampling state being quicker is beneficial, which is made possible by using the differential driving circuit 1450.

For example, the change of the voltage vPe at the first terminal of the capacitor Ce is based on the capacitances of the capacitors Ce and Cs and the difference between two input voltages:

$$\Delta vPe = 2\frac{Cs}{Cs + Ce} * \Delta vDat.$$

ΔvPe represents the change of the voltage at the first terminal, and ΔvDat represents the difference between the first input voltage vDatp and the second input voltage vDatn. In some implementations, a ratio of the capacitance of the capacitor Cs to the capacitance of the capacitor Ce is greater than 1, e.g., 2.

Figure 15B:
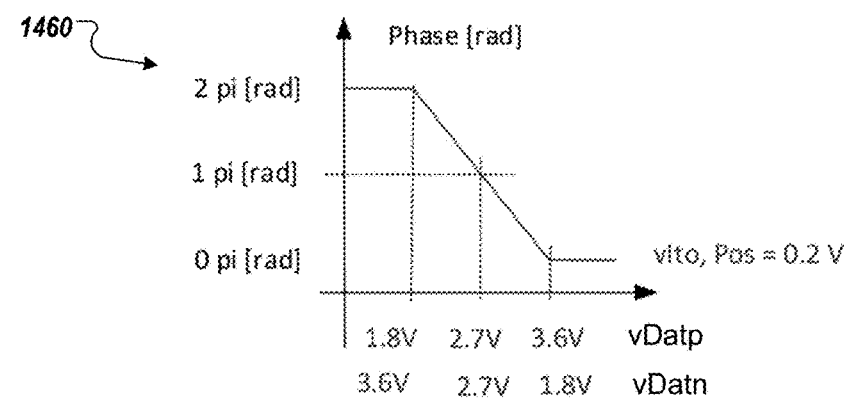
FIG. 15B depicts two plots of scanning through voltages to modulate a phase and the differential driving circuit of FIG. 15A.
Figure 15B:
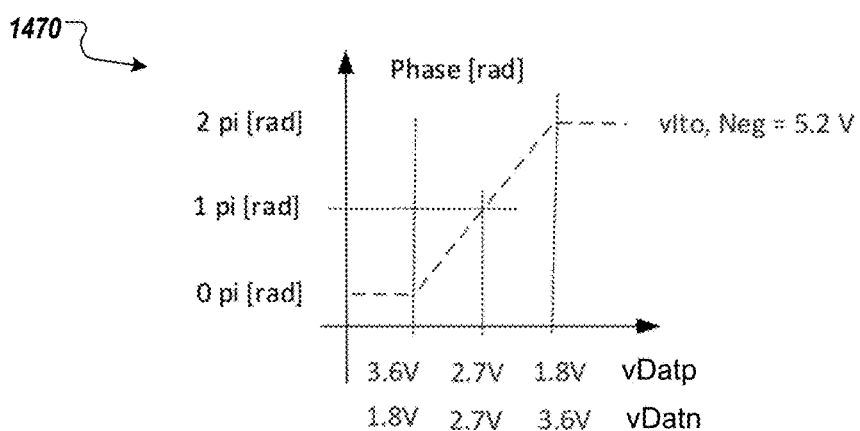

FIG. 15B depicts two plots of scanning through voltages to modulate a phase by the differential driving circuit of FIG. 15A. Plots 1460 and 1470 demonstrate how the sampling phase can be quickened by using a differential driving circuit 1450. In plot 1460, the X axis shows the voltages vDatp and vDatn of the element electrode 1408, and the Y axis is the phase as the voltage is scanned. When there are two input voltages vDatp (for the upper circuit portion 1452) and vDatn (for the lower circuit portion 1454), another input voltage vCm at input 1523 of the driving circuit 1450 is determined by the equation vDatn=2vCm−vDatp. In other words, the sum of vDatp, e.g., a first input voltage, and vDatn, e.g., a second input voltage, is equal to twice vCm. In this case, the lower terminal of the capacitor Ce is coupled to the input 1523 of the differential driving circuit 1450 and configured to receive the third input voltage vCm.

For the first scan in plot 1460, the phase decreases from 2Ξ to 0, and in the second scan in plot 1470, the phase increases from 0 to 2Ξ. As denoted by the values below each plot, as vDatp increases in plot 1460, vDatn decreases according to the equation. Similarly, in plot 1470, as vDatp decreases as the phase decreases, vDatn increases according to the equation. Accordingly, the voltage range for the voltage vPe of the elements is doubled. The increase voltage range of vPe can allow for using smaller transistors for any of the column driver, the DAC, or the element, e.g., a phasel. The increased range can increase the refresh rate and also relax the gating voltage demands on the driver, which means a simpler and more compact driver can be used. The increased range can also allow a higher signal to noise ratio (SNR), by adjusting voltages for driving a number of elements over a large voltage range.

In some implementations, the signal integrity during the sampling state is improved due to the differential between vDatp and vDatn, since the likelihood of crosstalk is reduced when there is no coupling between vDatp and vDatn, as they have different behaviors, e.g., increasing versus decreasing. When the signal of the voltage is increased while the amplitude of the noise remains constant, the SNR can improve.

Figure 15C:
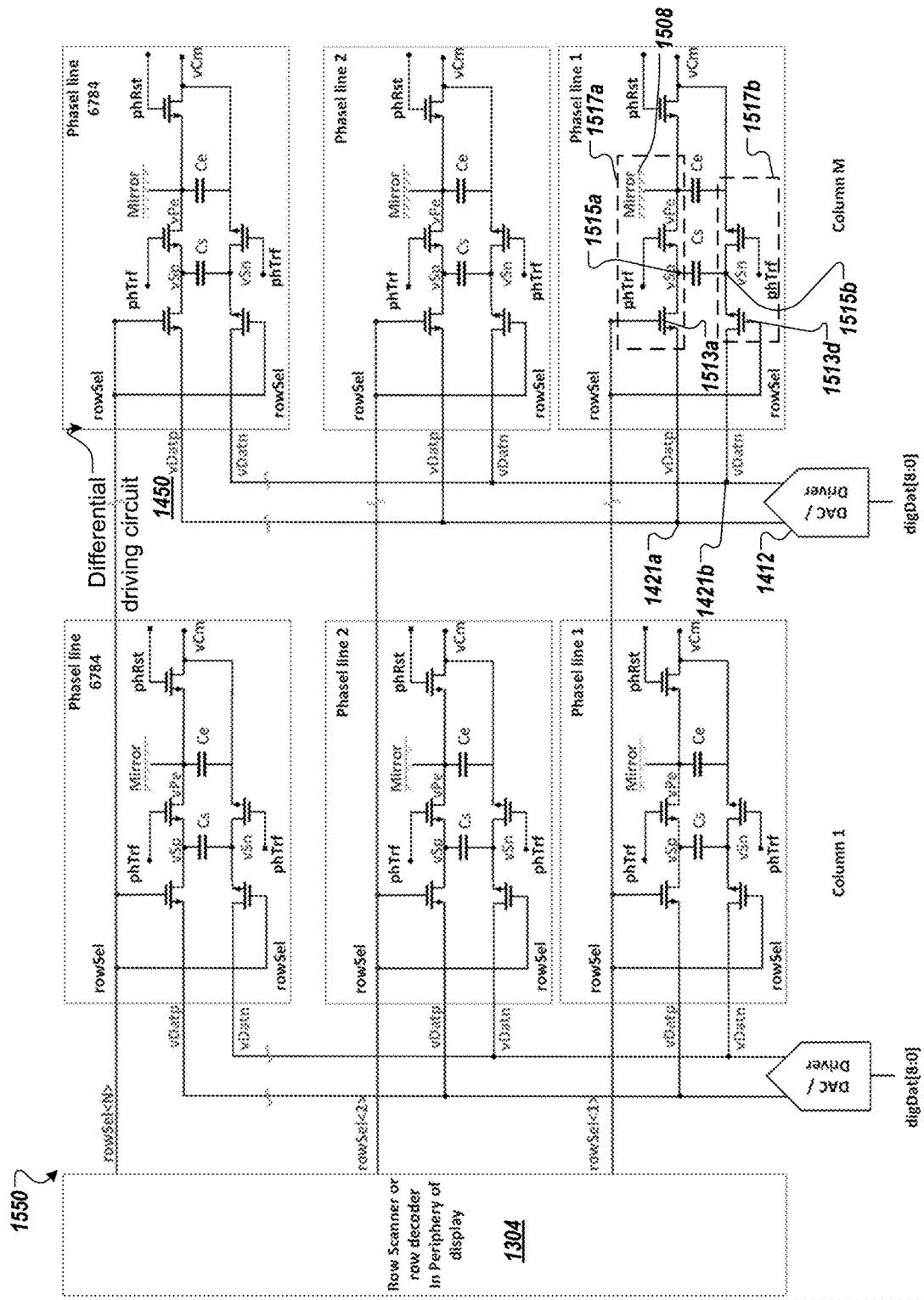
FIG. 15C depicts a system including multiple differential driving circuits with a peripheral row scanner.

FIG. 15C depicts a system 1550 including multiple differential driving circuits 1450, which are coupled to respective elements within a device. The row scanner 1304 is depicted as being disposed to the side of the differential driving circuits 1450, e.g., similar to that in FIG. 14A. The driving circuit 1410 is configured to receive a first input voltage vDatp at a first input 1421a and a second input voltage vDatn at a second input 1421b.

Each differential driving circuit 1450 includes a capacitor Cs having an upper terminal coupled to an upper circuit portion 1517a (see dashed box) of the differential driving circuit 1450 and a lower terminal coupled to a second circuit portion 1517b (see dashed box). The first terminal 1515a is coupled to a metallic electrode 1508 of a corresponding element associated with the driving circuit 1450.

Figure 15D:
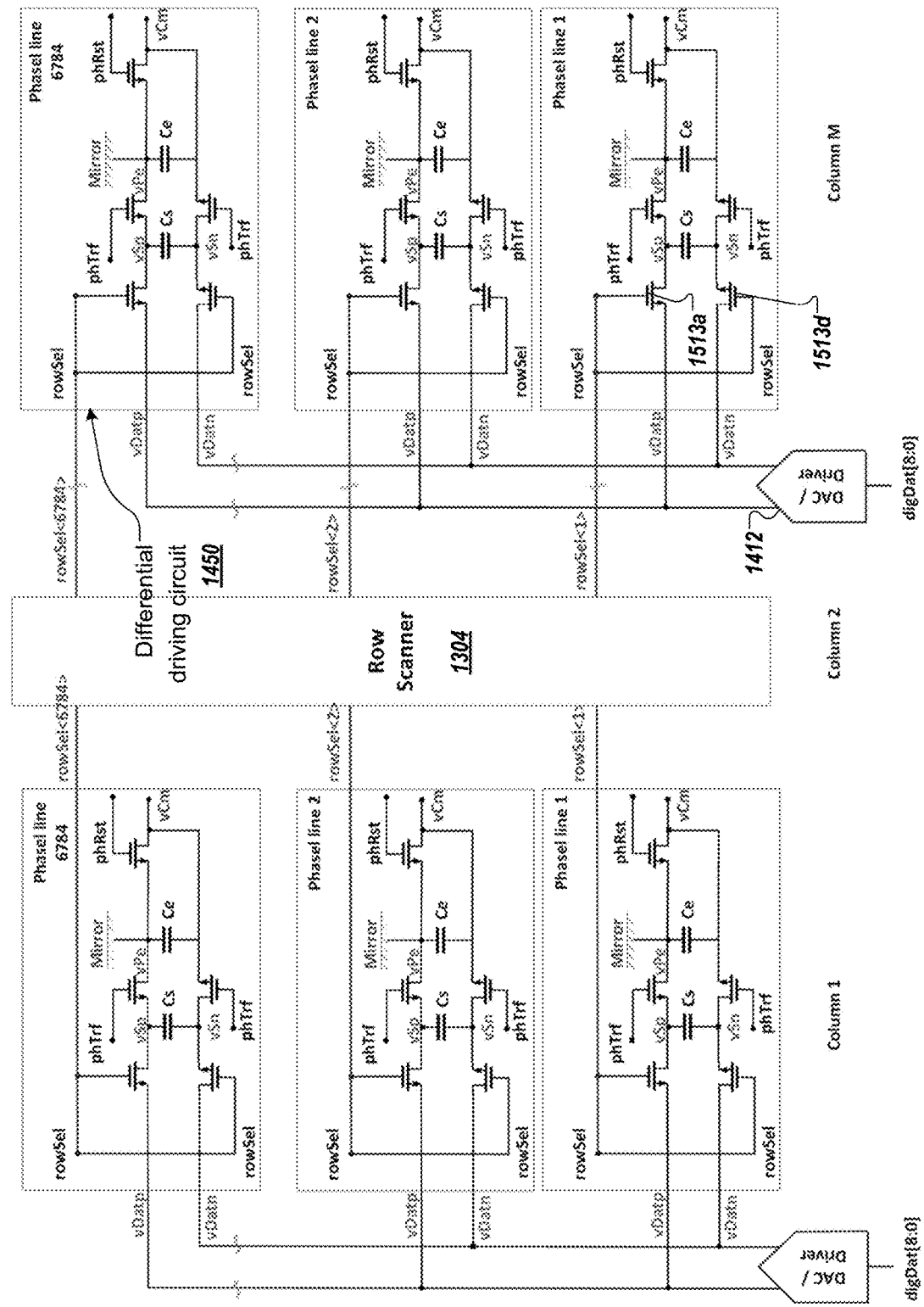
FIG. 15D depicts a system including multiple differential driving circuits with an embedded row scanner.
Figure 15E:
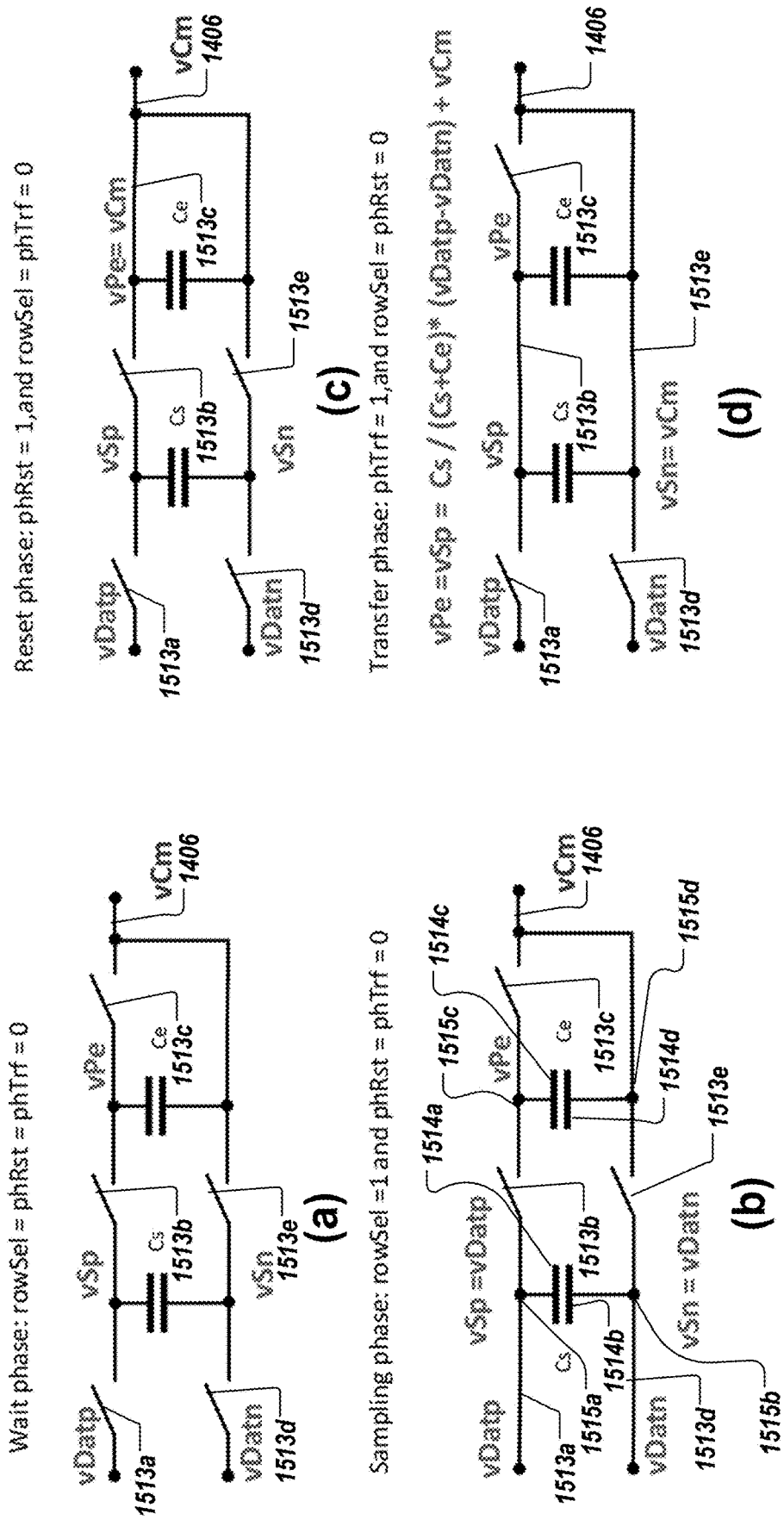
FIG. 15E depicts different states of a subcircuit of the differential driving circuit of FIG. 15A.

As discussed with further details in reference to FIG. 15E, in some states, a voltage vSp at the metallic electrode 1508 of the corresponding element is identical to a voltage vDatp at the first terminal 1515a of the capacitor Cs, and a change of the voltage at the first terminal 1515a is based on a difference between a first input voltage vDatp of the first circuit portion 1517a and a second input voltage vDatn of the second circuit portion 1517b.

Other implementations are possible. For example, FIG. 15D depicts a system including multiple differential driving circuits with an embedded row scanner, e.g., as described in FIG. 13B or 14D-1, 14D-2. In other words, the differential driving circuit 1450 can be used in implementations of both FIGS. 13A and 13B.

For both implementations of FIGS. 15C and 15D, each driver 1412 outputs input voltages vDatp and vDatn to the differential driving circuit 1450. Each of the selectors row-Sel of the upper and lower portions is connected to the same line of the row scanner, e.g., rowSel<1,1>.

FIG. 15E depicts different states of a differential driving circuit 1450 of FIG. 15A. As depicted in FIG. 15E, the waiting, sampling, resetting, and transferring states of the differential driving circuit 1450 are similar to those of driving circuit 1410 in FIG. 14E, but also involve the lower portion, e.g., the lower portion 1452 marked in FIG. 15A. The timing diagram in FIG. 15F complements the following description of each state.

For example, in the waiting state (a), the first selection switch 1513a, first transfer switch 1513b, reset switch 1513c, second selection switch 1513d, and second transfer switch 1513e are open, and the element corresponding to vPe is unselected. In waiting state (a), the first selection switch 1513a and the second selection switch 1513d are configured to receive a same selection signal to be simultaneously turned off, and the first transfer switch 1513b and the second transfer switch 1513d are configured to receive a same transfer signal to be simultaneously turned off. The waiting state (a) corresponds to a time period before dashed line 1441.

In the sampling state (b), first selection switch 1513a and second selection switch second selection switch 1513d are open, and the first transfer switch 1513b, reset switch 1513c, and second transfer switch 1513e are closed. The terminals 1514a and 1514b of transistor Cs are connected to nodes 1515a and 1515b, respectively. The first terminal 1514a of the capacitor Cs is coupled to a node 1515a between an input for the first circuit portion 1452 and the node 1515c connected to the first terminal 1514c of the capacitor Ce in the first circuit portion 1452, and a second terminal 1514b of the capacitor Cs is coupled to a node 1515b between an input for the second circuit portion 1454 and the node 1515d connected to second terminal 1514d of the capacitor Ce in the second circuit portion 1454. The sampling state (b) corresponds to the time period between dashed lines 1441 and 1442.

In sampling state (b), the first selection switch 1513a and the second selection switch 1513d are configured to receive a same selection signal to be simultaneously turned on, and where the first transfer switch 1513b and the second transfer switch 1513d are configured to receive a same transfer signal to be simultaneously turned off. The first selection switch 1513a and the second selection switch 1513d are turned on to receive the first input voltage vDatp at the upper terminal 1514a of the capacitor Cs and the second input voltage vDatn at the lower terminal 1514b of the capacitor Cs.

The terminal 1514c of capacitor Ce is connected to a corresponding element electrode 1408. A voltage at the element electrode 1508 of the corresponding element is identical to a voltage at the first terminal 1514c of the capacitor Ce, and a change of the voltage at the first terminal 1514c is based on a difference between a first input voltage vDatp of the first circuit portion 1452 and a second input voltage vDatn of the second circuit portion 1454. In the differential driving circuit 1450, a voltage vPe at the metallic electrode 1508 of the corresponding element, e.g., like element electrode 1408, is identical to a voltage at the first terminal 1514c of the capacitor Ce, and a change of the voltage at the first terminal 1514c is based on a difference between a first input voltage vDatp of the first circuit portion 1452 and a second input voltage vDatn of the second circuit portion 1454.

Node 1515a is located in the upper portion 1452 of the differential driving circuit 1450, and node 1515b is located in the lower portion 1454 of the differential driving circuit 1450. The voltages at the nodes 1515a and 1515b are generally at vSp and vSn, respectively. In the sampling state, vSp is held at vDatp, and vSn it is held at vDatn. This allows capacitor Cs to sample the phase for the next time step.

In the resetting state (c), first selection switch 1513a, first transfer switch 1513b, second selection switch 1513d, and second transfer switch 1513e are open, and reset switch 1513c is closed. First selection switch 1513a, first transfer switch 1513b, and reset switch 1513c are located in the upper portion 1452, and first transfer switch 1513b and second transfer switch 1513e are located in the lower portion 1454. First selection switch 1513a and first transfer switch 1513b are located on opposite sides of the node 1515a, first transfer switch 1513b and reset switch 1513c are located on opposite sides of node 1515c, second selection switch 1513d and second transfer switch 1513e are located on opposite sides of node 1515b. During the resetting state, the voltage vPe of the element electrode 1408 is held at the voltage vCm.

In the resetting state (c), the first selection switch 1513a and the second selection switch 1513d are configured to receive a same selection signal to be simultaneously turned off, and wherein the first transfer switch 1513b and the second transfer switch 1513d are configured to receive a same transfer signal to be simultaneously turned off. The reset switch 1513c is turned on to reset the voltage at the metallic electrode 1508 to be same as a reset voltage vCm of the differential driving circuit 1450. The resetting state (c) corresponds to the time between dashed lines 1442 and 1443.

In the transfer phase (d), the switches corresponding to first selection switch 1513a, 1513c, and second selection switch 1513d are open, and the first transfer switch 1513b and second transfer switch 1513e are open, thereby connecting capacitors Cs and Ce in parallel. When capacitors Ce and Cs are connected in parallel, charge transfer from capacitor Cs (holding value for the next time step) to capacitor Ce (holding the value vCm after the reset phase) can occur. For the differential driving circuit 1450, the charge transfer is determined by the equation vPe=vSp=Cs/Cs+Ce(vDatp−vDatn)+vCm, and the voltage vSn is equal to the voltage vCm.

In transfer phase (d), the first selection switch 1513a and the second selection switch 1513d are configured to receive a same selection signal to be simultaneously turned off, and wherein the first transfer switch 1513*b* and the second transfer switch 1513*d* are configured to receive a same transfer signal to be simultaneously turned on. The voltage at the upper terminal 1514*c* of the capacitor Cs is identical to a voltage at the upper terminal 1514*a* of the second capacitor, and the voltage at the lower terminal 1514*d* of the capacitor Ce is identical to a voltage at the lower terminal of the capacitor Cs. In some implementations, the voltage at the lower terminal 1514*d* of the capacitor Ce and the voltage at the lower terminal 1514*b* of the capacitor Cs are identical to the reset voltage vCm of the differential driving circuit 1450. The transfer state (d) corresponds to the time between dashed lines 1443 and 1444.

Figure 15F:
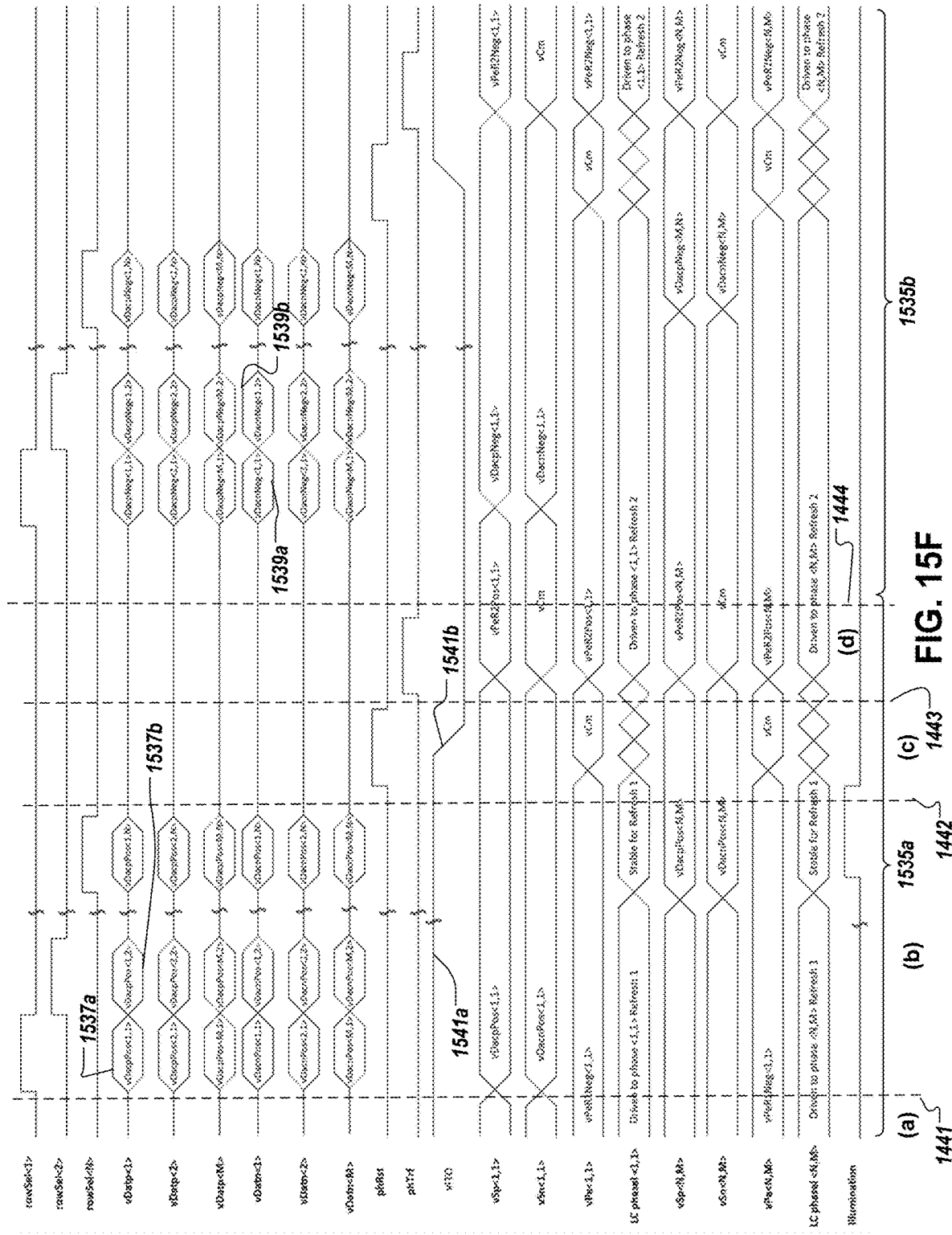
FIG. 15F depicts a timing diagram of voltages in the subcircuit of FIG. 15E.

FIG. 15F depicts a timing diagram of voltages in the subcircuit of FIG. 15E. For convenience, the timing diagrams for both capacitors Ce and Cs are depicted at once, e.g., superimposed on each other.

In general, modifying the driving circuit 1410 to the differential driving circuit 1450 does not change the timing diagram, except for adding additional controls, e.g., vDat<1> through vDat<M> is replaced with similarly behaving vDatp<1> through vDatp<M> and vDatn<1> through vDatn<M>, and vS<1, 1> through vS<N,M> is replaced with similarly behaving vSp<1,1> through vSp<N, M> and vSn<1,1> through vSn<N,M>. Accordingly, the description for FIG. 14F generally applies to FIG. 15F, and repeated description will be omitted.

In FIG. 15F, the differential driving circuit 1450 is configured to drive the corresponding element during a refresh time period having a negative period 1535*a* and a positive period 1535*b*. The common voltage vITO applied on the common electrode is set to a first fixed voltage during the negative period and to a second fixed voltage during the positive period. The common voltage vITO is changed from a first fixed voltage 1541*a* (e.g. 5.2 V) to a second fixed voltage 1541*b* (e.g., 0.2 V) during the resetting state and before the transferring state. The first input voltage vDatp<1> through vDatp<M> is configured to vary from a first higher input voltage 1537*a* to a first lower input voltage 1537*b* during the negative period 1535*a* and to vary from the first lower input voltage 1537*b* to the first higher input voltage 1537*a* during the positive period 1535*b*. The second input voltage vDatn<1> through vDatn<M> is configured to vary from a second lower input voltage 1539*a* to a second higher input voltage 1539*b* during the negative period 1535*a* and to vary from the second higher input voltage 1539*b* to the second lower input voltage 1539*a* during the positive period 1535*b*. In some implementations, the first lower input voltage 1537*b* is identical to the second lower input voltage 1539*a*, and the first higher input voltage 1537*a* is identical to the second higher input voltage 1539*b*.

9. Occlusion and Specular Lighting

Occlusion is often viewed as a difficult and important topic in computer graphics, and even more so in computational holography. This is because, in at least some cases, while the occlusion problem in projective CGI is static, what is hidden and what is visible in holographic systems depend on the location, orientation, and direction of a viewer. Wave approaches of G-S holography or its derivatives have been developed to address the holographic occlusions. However, masking or blocking contributions from parts of a scene that are behind other parts of a scene can be very complicated and computationally expensive in the G-S methodology.

In MAXWELL HOLOGRAPHY®, the occlusion issue can be addressed comparatively easily, because which display elements (e.g., phasels) correspond to which primitives is completely deterministic and trivial. For example, whether or not a given display element contributes to a reconstruction of a given primitive can be determined as the calculation for the given primitive is performed. After determining that a number of display elements do not contribute to the given primitive due to occlusion, when calculating a sum of EM contributions to one of the number of display elements, the EM contribution from the given primitive is omitted from the calculation of the sum of EM contributions to the one of the number of display elements.

Figure 16A:
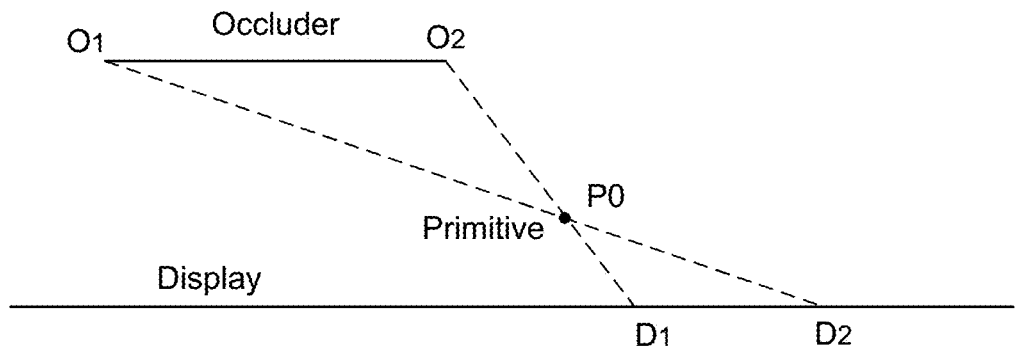
FIG. 16A illustrates an example implementation of Maxwell holographic occlusion for a point primitive with a line primitive as an occluder.
Figure 16B:
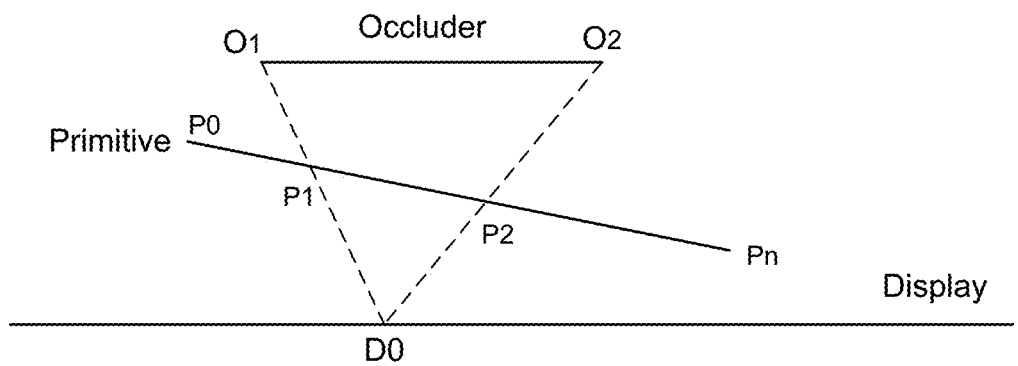
FIG. 16B illustrates an example implementation of Maxwell holographic occlusion for a line primitive with another line primitive as an occluder.
Figure 16C:
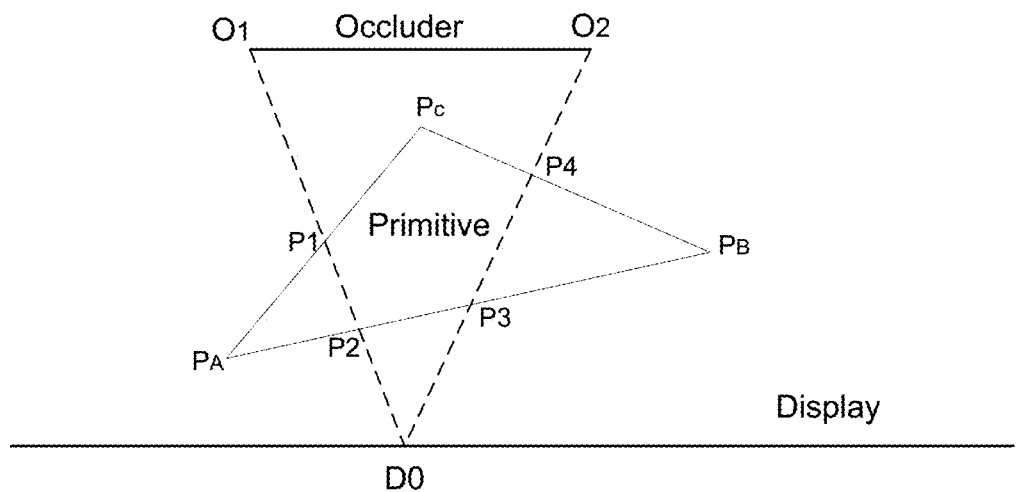
FIG. 16C illustrates an example implementation of Maxwell holographic occlusion for a triangle primitive with a line primitive as an occluder.

For illustration only, FIGS. 16A-16C show a determination of display elements not contributing to a given primitive (a point in FIG. 16A, a line in FIG. 16B, or a triangle in FIG. 16C) with a line primitive as an occluder. The line primitive has a starting point O1 and an ending point O2.

As illustrated in FIG. 16A, a point primitive P0 is behind the occluder and closer to the display. By extending lines connecting O1-P0 and O2-P0, a range of display elements from D1 to D2 in the display is determined, which do not contribute to the reconstruction of the point primitive P0.

In some examples, the coordinate information of O1, O2, and P0 is known, e.g., stored in a "Z-buffer" (e.g., the ring buffer 119 of FIG. 1A) prior to the scene being transmitted to the Maxwell holographic controller (e.g., the processing device 160 of FIG. 1A). For example, in an XZ plane with y=0, the coordinate information can be O1 (Ox1, Oz1), O2 (Ox2, Oz2), and P0 (Px, Pz), with Oz1=Oz2=Oz. Based on the coordinate information, the coordinate information of D1 and D2 can be determined to be $$Dx1 = Px + \rho(Px - Ox2), Dx2 = Dx1 + \rho(Ox2 - Ox1),$$

where $\rho = Pz/(Oz - Pz)$, and $Dz1 = Dz2 = 0$.

The information of D1 and D2 can be stored as additional information in an "S-buffer" in the Maxwell holographic controller, besides the information in a Z-buffer for the point primitive P0. In such a way, the additional information can be used to trivially mask the contributions of specific display elements (within the range from D1 to D2) to the specific primitive P0 in the indexed primitive list.

FIG. 16B illustrates a determination of how a specific display element contributes to a line primitive with an occluder before (or in front of) the line primitive. By connecting the specific display element D0 to the starting point $O_1$ and the ending point $O_2$ of the occluder, two point primitives P1 and P2 on the line primitive are determined as the intersection points. Thus, the specific display element D0 does not contribute to the reconstruction of the part of the line primitive from P1 to P2 on the line primitive. Accordingly, when calculating the sum of EM contributions to the specific display element D0, the EM contributions from the part P1-P2 of the line primitive is not calculated.

This can be implemented in two ways. In the first way, the EM contributions from the part P0-P1 and the part P2-Pn to the specific display element D0 are summed as the EM contributions of the line primitive to the specific display element D0, by considering the occlusion from the occluder. In the second way, the EM contribution from the whole line primitive P0-Pn is calculated, together with the EM contribution from the part P1-P2, and a difference between the two calculated EM contributions can be considered as the EM contribution of the line primitive to the specific display element D0 by considering the occlusion from the occluder. The coordinate information of P1 and P2 or the part P1-P2 can be stored, as the part of the line primitive that does not contribute to the specific display element D0, in the "S-buffer" of the Maxwell holographic controller, together with the information of the occluder and other information in the "Z-buffer" of the PPU.

FIG. 16C illustrates a determination of how a specific display element contributes to a triangle primitive with an occluder before the triangle primitive. By connecting the specific display element D0 to the starting point O1 and the ending point O2 of the occluder, four point primitives P1, P2, P3, and P4 on sides of the triangle primitive are determined as the intersection points. Thus, the specific display element D0 does not contribute to the reconstruction of the part of the triangle primitive enclosed by the points P1, P2, P3, P4, $P_C$. Accordingly, when calculating the sum of EM contributions to the specific display element D0, the EM contributions from the part P1-P2-P3-P4-$P_C$ of the triangle primitive is not calculated. That is, only the EM contributions from the first triangle formed by points $P_A$, P1 and P2 and the second triangle formed by points $P_B$, P3, and P4 are summed as the EM contribution of the triangle primitive $P_A$-$P_B$-$P_C$ by considering the occlusion of the occluder. The coordinate information of P1, P2, P3, and P4 or the triangle primitives $P_A$-P1-P2 and $P_B$-P3-P4 can be stored, as the part of triangle primitive $P_A$-$P_B$-$P_C$ that contributes to the specific display element D0, in the "S-buffer" of the Maxwell holographic controller, together with the information of the occluder and other information in the "Z-buffer" of the PPU.

The implementations of occlusion in MAXWELL HOLOGRAPHY® enables to convert the "Z-buffer" to the "S-buffer", and can mask the contributions of specific primitives (or specific parts of the primitives) in the indexed primitive list to a specific display element. This not only provides accurate, physically correct occlusion, it also saves computation time, as the primitives that do not contribute to a given display element can be ignored and computation can move on to computation for the next display element. The "S-buffer" can contain additional information related to diffraction efficiency of the display.

The "S-buffer" can also include rendering features such as Holographic specular highlights, in which a reflectivity of a surface is dependent upon the viewing angle. In traditional CGI, specular highlights are dependent only on the orientation of the rendered object, whereas in a Maxwell holographic context, the direction from which the object is viewed also plays a part. Therefore, view-dependent shading information (e.g., geometric specular information) can be encoded in the "S-buffer" as an additive (specular) rather than a subtractive (occlusion) contribution. In MAXWELL HOLOGRAPHY®, the mathematics for holographic specular highlights can be substantially the same as that for holographic occlusion.

10. Texture Mapping

Texture mapping is a technique developed in computer graphics. The basic idea is to take a source image and apply it as a decal to a surface in a CGI system, enabling detail to be rendered into the scene without the need for the addition of complex geometry. The texture mapping can include techniques for the creation of realistic lighting and surface effects in the CGI system, and can refer universally to the application of surface data to triangular meshes.

In MAXWELL HOLOGRAPHY®, flat shaded and also interpolated triangular meshes can be rendered in genuine 3D using the analytic relationship between arbitrary triangles in space and a phase map on a holographic device. However, to be compatible with modern rendering engines, the ability to map information on the surface of these triangles is desirable. This can present a real problem, in that the speed of the method is derived from the existence of the analytic mapping, which does not admit data-driven amplitude changes.

Discrete Cosine Transform (DCT) is an image compression technique and can be considered as the real-valued version of the FFT (Fast Fourier transform). DCT depends on an encode-decode process that assigns weights to cosine harmonics in a given image. The result of an encode is a set of weights equal in number to the number of pixels in the original image, and if every weight is used to reconstruct an image, there will be no loss in information. However, in many images, acceptable reconstructions can be made from a small subset of the weights, enabling large compression ratios.

The decode (render) process of the DCT in two dimensions involves a weighted double sum over every DCT weight and every destination pixel. This can be applied to MAXWELL HOLOGRAPHY® for texture mapping. In MAXWELL HOLOGRAPHY®, triangle rendering involves a "spiked" double integral, in phase space, to determine the phase contribution of any individual phasel to the triangle in question. The integral can be folded into a double sum which mirrors the one in the DCT reconstruction, and then re-derive the analytic triangle expression in terms of the DCT weights. This implementation of DCT technique in Maxwell holographic calculations enables to draw full, texture mapped triangles, to employ image compression to the data for the rendered texture triangles, and to take advantage of existing toolsets that automatically compress texture and image data using DCT such as JPEG.

In some implementations, to draw a Maxwell holographic textured triangle, a spatial resolution desired for the mapping on a specified surface is first calculated. Then a texture with the resolution is supplied, and DCT compressed with angular and origin information to correctly orient it on the triangle is obtained. Then, the triangle corners and a list of DCT weights are included in the indexed primitive list and sent to the Maxwell holographic controller. The DCT weights can be included in the EM contributions of the triangle primitive to each display element. The texture triangle can be n times slower than a flat triangle, where n is the number of (nonzero) DCT weights that are sent with the primitive. Modern techniques for "fragment shading" can be implemented in the Maxwell holographic system, with the step of the DCT encode replacing the filter step for traditional projective rendering.

As an example, the following expression shows the DCT weights $B_{pg}$ for an image:

$$B_{pq} \equiv \sigma_p \sigma_q \sum_{m=0}^{M-1} \sum_{n=0}^{N-1} A_{mn} \cos\left[\frac{\pi(2m+1)p}{2M}\right] \cos\left[\frac{\pi(2n+1)q}{2N}\right],$$

$$\text{where } \sigma_p = \begin{cases} 1/\sqrt{M} & p=0 \\ \sqrt{2/M} & \text{else} \end{cases}, \sigma_q = \begin{cases} 1/\sqrt{N} & q=0 \\ \sqrt{2/N} & \text{else} \end{cases},$$

M and N are corners of a rectangular image, and (p, q) is a DCT term.

By decoding, the amplitude value $A_{mn}$ can be obtained as follows:

$$A_{mn} = \sum_{p=0}^{M-1} \sum_{q=0}^{N-1} \sigma_p \sigma_q A_{mn}^*,$$

where $A_{mn}^* = B_{pq} \cos\left[\frac{\pi(2m+1)p}{2M}\right] \cos\left[\frac{\pi(2n+1)q}{2N}\right]$.

When calculating the EM contribution of the textured triangle primitive to a display element (e.g., a phasel), a DCT term with a corresponding DCT weight $A_{mn}^*$ can be included in the calculation as follows:

$$\varphi_{pq} = \sum_{y=0}^{Y} \sum_{x=0}^{X} A_{mn}^* T,$$

where X, Y are corners of the triangle in the coordinate system, T corresponds to the EM contribution of the triangle primitive to the display element, and $\varphi_{pq}$ is the partial contribution for non-zero term $B_{pq}$ in the DCT. The number of (p,q) DCT terms can be selected by considering both the information loss in reconstruction and the information compression.

11. Calibrations

The unique nature of MAXWELL HOLOGRAPHY® in the present disclosure allows for the protection of calibration techniques that can create a significant competitive advantage in the actual production of high quality displays. A number of calibration techniques can be implemented to be combined with the Maxwell holographic computational techniques, including: (i) using image sensors or light field sensors in conjunction with a Dirichlet boundary condition modulator and/or in conjunction with mechanical and software diffractive and non-diffractive calibration techniques; (ii) software alignments and software calibrations including individual color calibrations and alignments with Dirichlet boundary condition modulators; and (iii) embedding silicon features in the boundary condition modulators that allow for photo detection (including power and color) and/or thermometry to be built directly into the modulator that when combined with MAXWELL HOLOGRAPHY® creates a powerful and unique approach to simplifying manufacturing calibration processes.

In the following, for illustration only, three types of calibrations are implemented for phase based displays, e.g., LCOS displays. Each phase element can be represented as a phasel. A display can be the display 150 of FIG. 1A, 172 of FIG. 1B, 504 of FIG. 5A, 514 of FIG. 5B, 524 of FIG. 5C, 534 of FIG. 5D, 606 of FIG. 6A, 616 of FIG. 6B, 6C, or 6D, 645 of FIG. 6E, 6F, 6G, or 690 of FIG. 6H, or 900 of FIG. 9A, 930 of FIG. 9B, 1000 of FIG. 10A, or 1050 of FIG. 10B. The display can be also an irregular display formed according to FIGS. 9D-1 to FIG. 9L.

10.1 Phase Calibration

An amount of phase added to light impinging upon an LCOS phase element (or phasel) can be known directly by a voltage applied to the LCOS phasel. This is due to the birefringent liquid crystal (LC) rotating in the presence of an electric field and thus changing its index of refraction and slowing down light to alter its phase. The altered phase can depend upon electrical characteristics of the liquid crystal (LC) and the silicon device in which the LC resides. Digital signals sent to the LCOS need to be transformed into correct analog voltages to achieve high quality holographic images.

Phase calibration is involved for the LCOS device to ensure that a digital signal is properly transformed into an analog signal applied to the LC such that it produces the greatest amount of phase range. This conversion is expected to result in a linear behavior. That is, as the voltage is changed by fixed increments, the phase also changes by fixed increments, regardless of the starting voltage value.

In some cases, an LCOS device allows a user to alter a digital-to-analog converter (DAC) such that the user has a control over the amount of analog voltage output given a digital input signal. A digital potentiometer can be applied to each input bit. For example, if there are 8 input bits, there can be 8 digital potentiometers corresponding to each input bit. The same digital inputs from the digital potentiometers can be applied to all phasels of the LCOS device. Bits set to "1" activate a voltage, and bits set to "0" do not activate the voltage. All voltages from such "1" bits are summed together to obtain the final voltage sent to each phasel. There may also be a DC voltage applied in all cases such that all "0" bits results in a baseline non-zero voltage. Thus, the phase calibration of the LCOS device can be implemented by setting values of the digital potentiometers for the LCOS device. For example, as noted above, a controller can compute EM field contributions from a list of primitives to each of phasels of a display, generate a respective sum of the EM field contributions from the primitives to each of the phasels, and generate respective control signals to each of the phasels for modulating a phase of the phasel. The same digital inputs from the digital potentiometers can be applied to adjust the respective control signals to all of the phasels of the LCOS device, which is different from a phasel-by-phasel based phase calibration. The digital inputs can be set once for a duration of an operation of the LCOS device, e.g., for displaying a hologram.

To determine an optimal set of phase calibration values for the digital inputs, a genetic algorithm can be applied, where there are many input values that lead to one output value, such as phase range or holographic image contrast. This output value can be reduced to one number known as the fitness. The genetic algorithm can be configured to explore different combinations of input values until it achieves an output with the highest fitness. In some cases, the algorithm can take two or more of the most fit inputs and combine a number of their constituent values together to create a new input that has characteristics of the taken inputs but is different from each of the taken inputs. In some cases, the algorithm can alter one of these constituent values to something not from either of the taken fit inputs, which is represented as a "mutation" and can add a variety to the available fit inputs. In some cases, one or more optimal values can be found by taking advantage of the knowledge gained from prior measurements with good results while trying new values so the optimal values do not be restricted to a local maximum.

There can be multiple ways to calculate the fitness output value. One way is to calculate the phase change of the light given a set of digital inputs applied to all the phasels on the LCOS. In this scheme, the incident light can be polarized. Upon impinging upon the LCOS, the incident light's polarization can change depending on the rotation of the LC. The incident light can be diffracted back through another polarizer set to either the same polarization or 90 degrees different from the original polarization and then into a light detector. Therefore, when the LC rotation changes, the intensity as viewed from the light detector can change. Accordingly, the phase change of the light can be perceived indirectly through the intensity variations. Another way to calculate the phase change is to measure the intensity difference of a Maxwell holographic reconstruction from the background. This is most effective in a projective display. Measuring the intensity in such an instance may need the use of computer vision algorithms to identify the Maxwell holographic reconstruction and measure its intensity. Another way to determine the phase change is to measure or image it microscopically in an interferometric optical geometry.

10.2 Alignment Calibration

Light sources and other optical elements may not be adequately aligned within a holographic device and therefore may need to be aligned. Different liquid crystals (LC) and optically diffractive elements or diffractive optical elements can also behave differently for different wavelengths of the light sources. Moreover, especially the LC, diffractives, and light sources can change device to device and over time (aging and burn-in) and as a result of changes in the operating environment such as the operating temperature and mechanically induced deformation due to thermal or mechanical stress, giving different characteristics, e.g., object scaling, to the same input hologram when shown in a different base color or at a different time or in a different environment. Furthermore, certain hardware features can apply different optical effects to the output light, e.g., lensing, that also may need correction under these circumstances.

In some implementations, the problems described above can be addressed by applying mechanical translations, deformations, and rotations to one or more optical element. In some implementations, the problems described above can be addressed by applying a mathematical transform to a phase calculated for a phasel of a display. The phase is a respective sum of the EM field contributions from a list of primitives to the phasel. The mathematical transform can be derived from a mathematical expression, e.g., a Zernike polynomial, and can be varied by altering polynomial coefficients or other varying input values. The mathematical transform can vary phasel-by-phasel as well as by color. For example, there is a Zernike polynomial coefficient that corresponds to the amount of tilt to be applied to the light after it diffracts off of the display.

To determine these coefficients/input values, a hardware and software setup can be created where a 2D camera, a photometer, a light field camera, and/or other photometric or colorimetric instrumentation is pointed at a reflective or diffusely transmissive surface illuminated by the LCOS in the case of a projective display or pointed into the LCOS in the case of a direct-view display. One or more holographic test patterns and objects can be sent to the display and measured by the measuring instrument or instruments. 2D cameras or 3D (light field) cameras or camera arrays can use machine vision algorithms to determine what is being displayed and then calculate its fitness. For example, if a grid of dots is the test pattern, then the fitness can be determined by a statistical measure of how close they are together, how centered they are on their intended positions, how much distortion they exhibit (e.g., scale or pincushion), etc. There can be different fitness values for different performance characteristics. Depending on these values, corrections can be applied, e.g., in the form of changing coefficients to the Zernike polynomial, until the fitness reaches a predetermined satisfactory level or passes a visual or task-oriented A/B test. These test patterns can be rendered at different distances to ensure that alignment is consistent for objects at different distances, and not just at one 3D point or plane in particular. Such depth-based calibrations can involve iterative processes that involve altering the depth of the holographic test pattern or elements therein, as well as the position of the reflective or diffusely transmissive surface, and where the previous calibrations can be repeated until converging upon a solution that works at multiple depths. Finally, white dots can be displayed to show the effectiveness of the calibration.

10.3 Color Calibration

In displays, holographic or otherwise, it is important that, when any two units are rendering the same image, colors match between displays and additionally match colors defined by television (TV) and computer display standards, like the Rec.709 standard for high-definition television (HDTV) or the sRGB color space of computer monitors. Different batches of hardware components, e.g., LEDs and laser diodes, can exhibit different behaviors for the same inputs and can output different colors when perceived by the human eye. Therefore, it is important to have a color standard to which all display units can be calibrated.

In some implementations, an objective measurement of color specified by measurements of intensity and chromaticity can be obtained by measuring color intensity against Commission internationale de l'éclairage (CIE) Standard Observer curves. By requesting that each display reproduces a sample set of known colors and intensities, then measuring the output light using a colorimeter device calibrated to the CIE Standard Observer curves, the color output of a device in a chosen CIE color space can be objectively defined. Any deviation of the measured values from the known good values can be used to adapt the output colors on the display to bring it back into alignment or conformance, which can be implemented using an iterative measure-adapt-measure feedback loop. Once a Maxwell holographic device produces accurate outputs for a given set of inputs, the final adaptations can be encoded as look-up tables for the illuminators that map input values to output intensities, and color matrix transformations that transform input colors to output color space values. These calibration tables can be embedded in the device itself to produce reliable objective output colors. Multiple such tables can be provided for each of a multitude of operating temperature ranges. Multiple such tables can be provided for each of a multitude of different regions of the active surface of the LCOS. Calibration values can be interpolated between tables for adjacent temperature ranges and/or adjacent surface regions.

Additionally, given an LCOS device with fine enough features to control diffraction with sub-wavelength accuracy, there may be no need for tri-stimulus illumination (e.g., linear mixes of red, green, and blue), and the LCOS device can be illuminated with a single wide spectrum light source and selectively tune the phasels output to produce tri-, quad-, even N-stimulus output colors which, combined with spatial dithering patterns, can reproduce a more complete spectral output of a color rather than the common tri-stimulus approximation. Given a sufficiently wide spectrum illuminator this allows MAXWELL HOLOGRAPHY® to produce any reflected color that lies inside the spectral focus of the human visual system or outside the spectral focus for infrared (IR) or ultraviolet (UV) structured light.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, such as, one or more modules of computer program instructions encoded on a tangible, non-transitory computer-storage medium for execution by, or to control the operation of, data processing apparatus. Alternatively or in addition, the program instructions can be encoded on an artificially generated propagated signal, such as, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus and special purpose logic circuitry may be hardware-based and software-based. The apparatus can optionally include code that creates an execution environment for computer programs, for example, code that constitutes processor firmware, a protocol stack, a database management system, an operating system, or a combination of one or more of them. The present specification contemplates the use of data processing apparatuses with or without conventional operating systems.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as, a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The main elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD-R, DVD-RAM, and DVD-ROM disks. The memory may store various objects or data, including caches, look-up-tables, classes, frameworks, applications, backup data, jobs, web pages, web page templates, database tables, repositories storing business and dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), holographic or light field display, or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include multiple user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), worldwide interoperability for microwave access (WIMAX), a wireless local area network (WLAN) using, for example, 802.11 a/b/g/n and 902.20, all or a portion of the Internet, and any other communication system or systems at one or more locations. The network may communicate with, for example, internet protocol (IP) packets, frame relay frames, asynchronous transfer mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in any suitable language providing data in any suitable format. The API and service layer may be an integral or a stand-alone component in relation to other components of the computing system. Moreover, any or all parts of the service layer may be implemented as child or sub-modules of another software module, enterprise application, or hardware module without departing from the scope of this specification.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing may be advantageous and performed as deemed appropriate.

For the sake of brevity, conventional techniques for construction, use, and/or the like of holographic gratings, LCOS devices, and other optical structures and systems may not be described in detail herein. Furthermore, the connecting lines shown in various figures contained herein are intended to represent example functional relationships, signal or optical paths, and/or physical couplings between various elements. It should be noted that many alternative or additional functional relationships, signal or optical paths, or physical connections may be present in an example holographic grating, LCOS, or other optical structure or system, and/or component thereof.

The detailed description of various example embodiments herein makes reference to the accompanying drawings and pictures, which show various example embodiments by way of illustration. While these various example embodiments are described in sufficient detail to enable those skilled in the art to practice the disclosure, it should be understood that other example embodiments may be realized and that logical, optical, and mechanical changes may be made without departing from the spirit and scope of the disclosure. Thus, the detailed description herein is presented for purposes of illustration only and not of limitation. For example, the steps recited in any of the method or process descriptions may be executed in any suitable order and are not limited to the order presented unless explicitly so stated. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps.

As used in this document, "each" refers to each member of a set or each member of a subset of a set. Furthermore, any reference to singular includes plural example embodiments, and any reference to more than one component may include a singular example embodiment. Although specific advantages have been enumerated herein, various example embodiments may include some, none, or all of the enumerated advantages.

Benefits, other advantages, and solutions to problems have been described herein with regard to specific example embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an example embodiment, B alone may be present in an example embodiment, C alone may be present in an example embodiment, or that any combination of the elements A, B and C may be present in a single example embodiment; for example, A and B, A and C, B and C, or A and B and C.

Accordingly, the earlier provided description of example implementations does not define or constrain this specification. Other changes, substitutions, and alterations are also possible without departing from the spirit and scope of this specification.

The invention claimed is:

1. A device comprising:
an optical device configured to deflect target light towards a target device;
a linear polarizer configured to transmit light with a linear polarization state; and
an optical retarder configured to alter a polarization state of light passing through the optical retarder,
wherein the linear polarizer and the optical retarder are configured to cause ambient light to pass through the linear polarizer once and the optical retarder twice sequentially to be blocked by the linear polarizer, and
wherein the optical device, the linear polarizer, and the optical retarder are configured to cause the target light to pass through the optical retarder twice and the linear polarizer once sequentially to be transmitted through the linear polarizer.

2. A system comprising:
an optical device configured to deflect target light towards a target device, wherein the target device comprises a plurality of elements forming an irregular pattern;
a linear polarizer configured to transmit light with a linear polarization state; and
an optical retarder configured to alter a polarization state of light passing through the optical retarder,
wherein the linear polarizer and the optical retarder are configured to cause ambient light coming from a first side of the linear polarizer to pass through the linear polarizer and the optical retarder to be incident on the target device and deflected back from the target device to pass through the optical retarder to be blocked from a second side of the linear polarizer by the linear polarizer, the second side of the linear polarizer being opposite to the first side of the linear polarizer, and
wherein the optical device, the linear polarizer, and the optical retarder are configured to cause the target light to be incident on the target device and deflected back from the target device to transmit from the second side of the linear polarizer through the linear polarizer.

3. The system of claim 2, wherein the optical device is configured to guide the target light along a first direction and diffract to the target device along a second direction different from the first direction, without passing through the linear polarizer from the first side of the linear polarizer.

4. The system of claim 2, wherein the linear polarizer and the optical retarder are configured to cause the ambient light to pass through the linear polarizer once and the optical retarder twice sequentially, and
wherein the optical device, the linear polarizer, and the optical retarder are configured to cause the target light to pass through the optical retarder twice and the linear polarizer once sequentially.

5. The system of claim 2, wherein the linear polarizer and the optical retarder are configured to cause the ambient light incident on the second side of the linear polarizer and the ambient light transmitted out from the first side of the linear polarizer with opposite polarization states.

6. The system of claim 2, wherein the optical retarder is configured to:
alter linearly polarized light passing through the optical retarder into circular polarized light, or
alter circular polarized light passing through the optical retarder into linearly polarized light.

7. The system of claim 6, wherein the optical retarder comprises a quarter-wave plate (QWP).

8. The system of claim 7, wherein the quarter-wave plate is oriented at 45° to a transmission angle of the linear polarizer.

9. The system of claim 2, wherein the target device is configured to:
deflect the ambient light, without altering a polarization state of the ambient light, and
deflect the target light, without altering a polarization state of the target light.

10. The system of claim 2, wherein an intensity of the target light transmitted from the linear polarizer is about a half of an intensity of the target light deflected from the target device.

11. The system of claim 2, wherein the target device is a reflective device.

12. The system of claim 2, wherein the linear polarizer and the optical retarder are arranged on a first side of the optical device, and the target device is arranged on a second side of the optical device that is opposite to the first side of the optical device, and
wherein the optical retarder is between the linear polarizer and the optical device.

13. The system of claim 12, wherein,
the target light is deflected by the optical device with a first polarization state that is same as the linear polarization state of the linear polarizer,
the target light is incident on the linear polarizer from the second side of the linear polarizer with a circular polarization state, and
wherein the target light is incident on the target device with the first polarization state, and deflected back from the target device with the first polarization state.

14. The system of claim 12, wherein the linear polarization state is a first linear polarization state,
the ambient light is incident on a first side of the optical retarder with the first linear polarization state, and the optical retarder converts the first linear polarization state of the ambient light into a circular polarization state,
the ambient light is deflected back from the target device with the circular polarization state to a second side of the optical retarder opposite to the first side of the optical retarder, and the optical retarder converts the circular polarization state of the ambient light to a second linear polarization state that is opposite to the first linear polarization state.

15. The system of claim 14, wherein the first linear polarization state is one of S polarization state and P polarization state, and the second linear polarization state is the other one of S polarization state and P polarization state.

16. The system of claim 2, wherein the linear polarizer is arranged on a first side of the optical device, and the target device is arranged on a second side of the optical device that is opposite to the first side of the optical device, and
wherein the optical retarder is arranged on the second side of the optical device and between the optical device and the target device.

17. The system of claim 16, wherein the linear polarization state is a first linear polarization state,
the target light is deflected by the optical device with a second linear polarization state to be incident on a first side of the optical retarder, the second linear polarization state being opposite to the first linear polarization state, and the optical retarder converts the second linear polarization state of the target light into a circular polarization state,
the target light is incident on the target device with the circular polarization state, and is deflected back from the target device with the circular polarization state to a second side of the optical retarder that is opposite to the first side of the optical retarder, and the optical retarder converts the circular polarization state of the target light into the first linear polarization state, and
the target light is incident on the second side of the linear polarizer with the first linear polarization state and transmitted through the linear polarizer.

18. The system of claim 17, wherein the first linear polarization state is one of S polarization state and P polarization state, and the second linear polarization state is the other one of S polarization state and P polarization state.

19. The system of claim 16, wherein the linear polarization state is a first linear polarization state,
the ambient light is incident on a first side of the optical retarder with the first linear polarization state, and the optical retarder converts the first linear polarization state of the ambient light into a circular polarization state,
the ambient light is deflected back from the target device with the circular polarization state to the optical retarder, and the optical retarder converts the circular polarization state of the ambient light to a second linear polarization state that is opposite to the first linear polarization state, and
the ambient light is incident on the second side of the linear polarizer with the second linear polarization state and is blocked by the linear polarizer.

20. The system of claim 2, wherein the linear polarizer and the optical retarder are formed on the optical device, and
wherein the system further comprises an anti-reflection (AR) coating formed on the first side of the linear polarizer.

21. The system of claim 2, wherein the optical device comprises:
an optical guiding device configured to guide the target light to propagate along a first direction within the optical guiding device, the light having a spectral bandwidth with a peak wavelength;
an in-coupling diffractive structure configured to diffract the light to propagate in the optical guiding device; and
one or more out-coupling diffractive structures arranged downstream the in-coupling diffractive structure along the first direction and configured to diffract at least part of the light out of the optical guiding device to the target device along a second direction different from the first direction.

22. The system of claim 21, wherein the in-coupling diffractive structure is configured to cause a first optical dispersion for the light, and at least one of the one or more out-coupling diffractive structures is configured to cause a second optical dispersion for the light, and
wherein the first optical dispersion and the second optical dispersion are compensated with each other, such that light diffracted out of the optical guiding device has no or little optical dispersion.

23. The system of claim 21, wherein the target light comprises light with different colors, and wherein the in-coupling diffractive structure comprises a corresponding first diffraction grating for light with each of the different colors, and
wherein each of the plurality of out-coupling diffractive structures comprises a corresponding second diffraction grating for light with each of the different colors.

24. The system of claim 2, wherein the linear polarizer and the optical retarder are formed on a same side of the optical device.

25. The system of claim 2, wherein the linear polarizer and the optical retarder are formed on opposite sides of the optical device.

26. The system of claim 2, wherein one of the linear polarizer and the optical retarder halves an intensity of the target light.

27. The system of claim 2, wherein the target device comprises a display, a light sensor, or a camera.

28. A system comprising:
a target device, wherein the target device comprises a display that includes: a backplane having a plurality of circuits and a plurality of display elements arranged on the backplane, the plurality of display elements forming an irregular pattern, each of the plurality of display elements being coupled to a respective circuit of the plurality of circuits;
an optical device configured to deflect target light towards the target device;
a linear polarizer configured to transmit light with a linear polarization state;
an optical retarder configured to alter a polarization state of light passing through the optical retarder, wherein the linear polarizer and the optical retarder are configured to cause ambient light coming from a first side of the linear polarizer to pass through the linear polarizer and the optical retarder to be incident on the target device and deflected back from the target device to pass through the optical retarder to be blocked from a second side of the linear polarizer by the linear polarizer, the second side of the linear polarizer being opposite to the first side of the linear polarizer, and wherein the optical device, the linear polarizer, and the optical retarder are configured to cause the target light to be incident on the target device and deflected back from the target device to transmit from the second side of the linear polarizer through the linear polarizer;
an illuminator configured to emit the target light; and
a controller coupled to the display and the illuminator, wherein the controller is configured to:
transmit at least one control signal to at least one of the plurality of display elements for modulating at least one property of the at least one of the plurality of display elements, sequentially modulate the display with information associated with a first color during a first time period and modulate the display with information associated with a second color during a second, sequential time period, and control the illuminator to sequentially turn on a first light emitting element to emit light with the first color during the first time period and a second light emitting element to emit light with the second color during the second, sequential time period.

29. A system comprising:

an optical device configured to deflect target light towards a target device;

a linear polarizer configured to transmit light with a linear polarization state; and an optical retarder configured to alter a polarization state of light passing through the optical retarder, wherein the linear polarizer and the optical retarder are configured to cause ambient light coming from a first side of the linear polarizer to pass through the linear polarizer and the optical retarder to be incident on the target device and deflected back from the target device to pass through the optical retarder to be blocked from a second side of the linear polarizer by the linear polarizer, the second side of the linear polarizer being opposite to the first side of the linear polarizer, wherein the optical device, the linear polarizer, and the optical retarder are configured to cause the target light to be incident on the target device and deflected back from the target device to transmit from the second side of the linear polarizer through the linear polarizer, and wherein the optical device comprises:

an optical guiding device configured to guide the target light to propagate along a first direction within the optical guiding device, the light having a spectral bandwidth with a peak wavelength;

an in-coupling diffractive structure configured to diffract the light to propagate in the optical guiding device; and one or more out-coupling diffractive structures arranged downstream the in-coupling diffractive structure along the first direction and configured to diffract at least part of the light out of the optical guiding device to the target device along a second direction different from the first direction.

30. The system of claim 29, wherein the in-coupling diffractive structure is configured to cause a first optical dispersion for the light, and at least one of the one or more out-coupling diffractive structures is configured to cause a second optical dispersion for the light, and wherein the first optical dispersion and the second optical dispersion are compensated with each other, such that light diffracted out of the optical guiding device has no or little optical dispersion.

* * * * *